United States Patent [19]

Takenaka et al.

[11] Patent Number: 5,586,139
[45] Date of Patent: Dec. 17, 1996

[54] LASER SYSTEM

[75] Inventors: Yushi Takenaka; Masaki Kuzumoto; Kenji Yoshizawa; Takashi Yamamoto; Masato Matsubara; Junichi Nishimae; Koji Yasui, all of Hyogo; Akihiro Otani, Aichi, all of Japan

[73] Assignee: Mitsubishi Denki Kabushiki Kaisha, Tokyo, Japan

[21] Appl. No.: 525,198

[22] Filed: Sep. 8, 1995

Related U.S. Application Data

[62] Division of Ser. No. 121,347, Sep. 15, 1993, Pat. No. 5,506,858.

[30] Foreign Application Priority Data

Oct. 21, 1992 [JP] Japan .................................. 4-305897
Mar. 25, 1993 [JP] Japan .................................. 5-089455

[51] Int. Cl.$^6$ ............................. H01S 3/08; H01S 3/139
[52] U.S. Cl. ........................ 372/99; 372/92; 372/108; 372/19
[58] Field of Search ........................ 372/92, 99, 108, 372/103, 19

Primary Examiner—Rodney B. Bovernick
Assistant Examiner—Robert McNutt
Attorney, Agent, or Firm—Burns, Doane, Swecker & Mathis, LLP

[57] ABSTRACT

A laser system wherein, in order that a high-output and high-quality single mode of a cross sectional area larger than the beam diameter determined by the construction of a resonator can be obtained stably, although this has heretofore been impossible, there is used a coupling mirror provided with a partial reflection film and an antireflecting film, a laser beam mode is selected using the partial reflection film, a phase difference between laser beam portions caused by a difference in construction between the partial reflection film and the antireflecting film is compensated using a phase difference compensating means, and there is formed an aperture whose diameter is set to a value of not larger than four times the diameter of the partial reflection film.

38 Claims, 71 Drawing Sheets

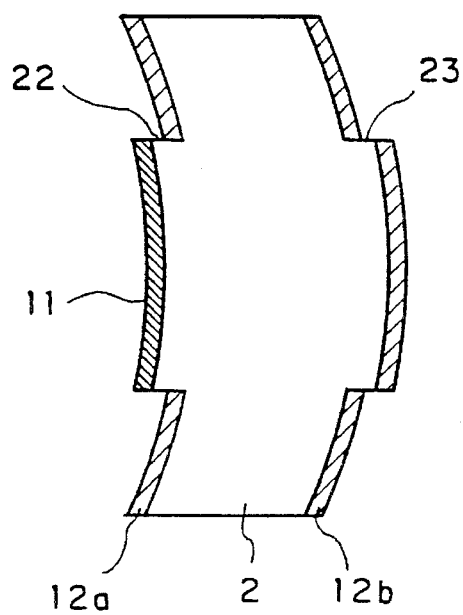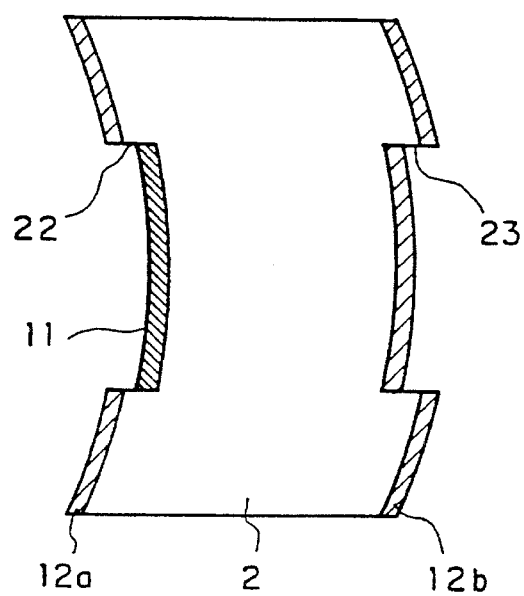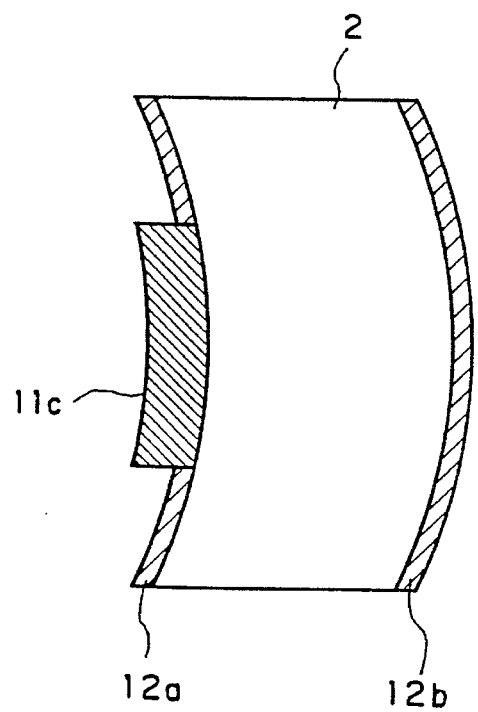

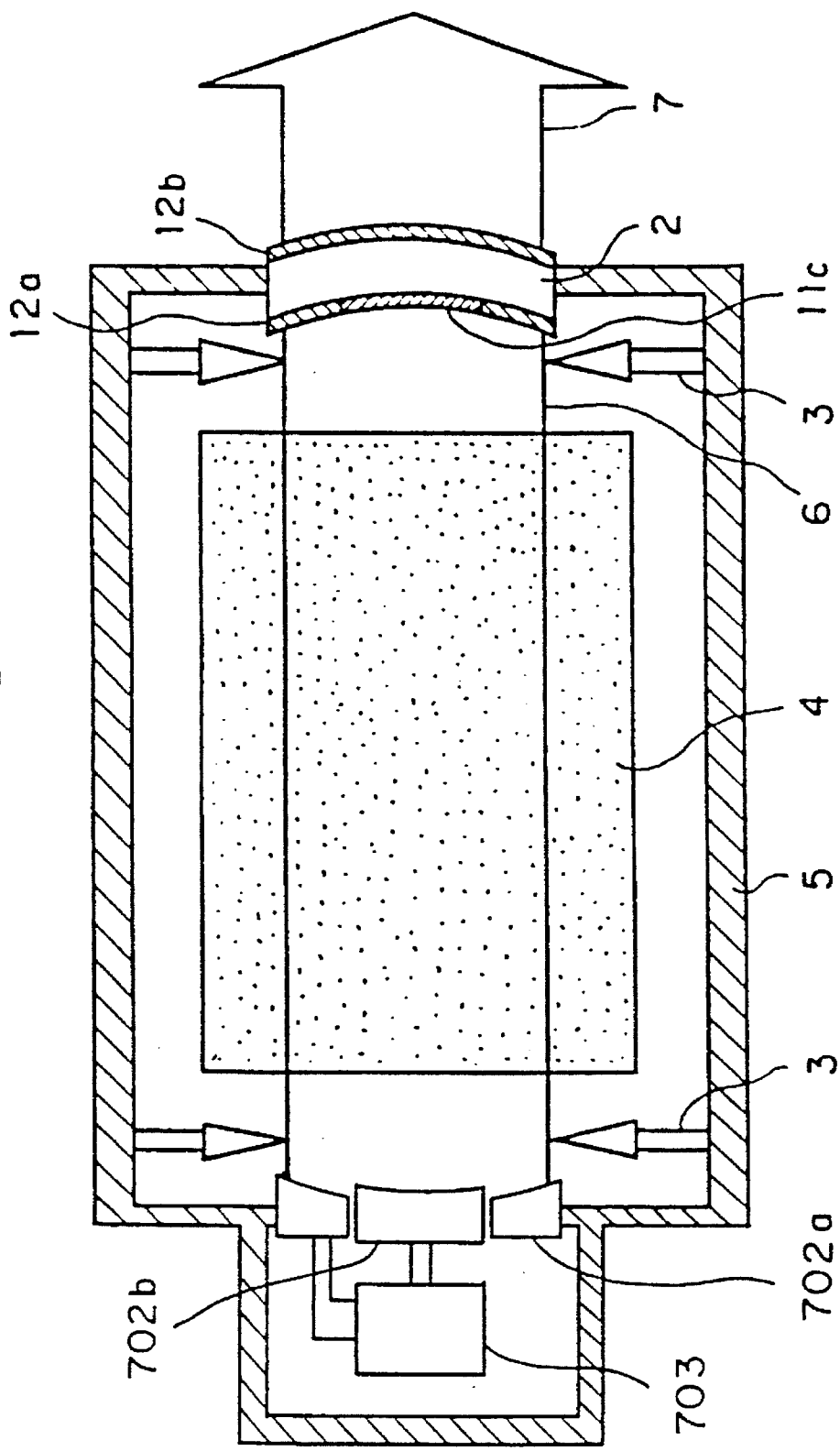

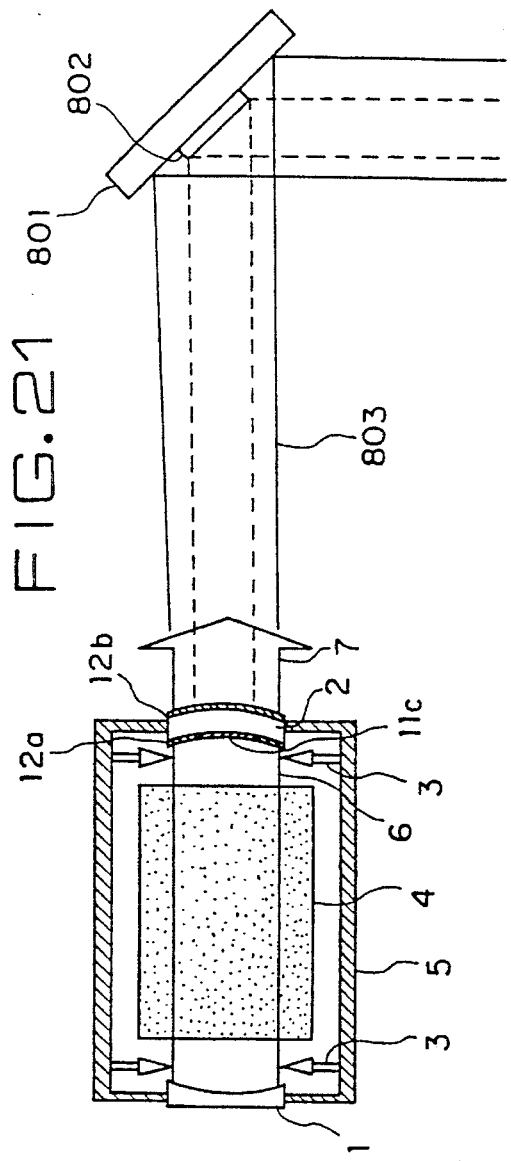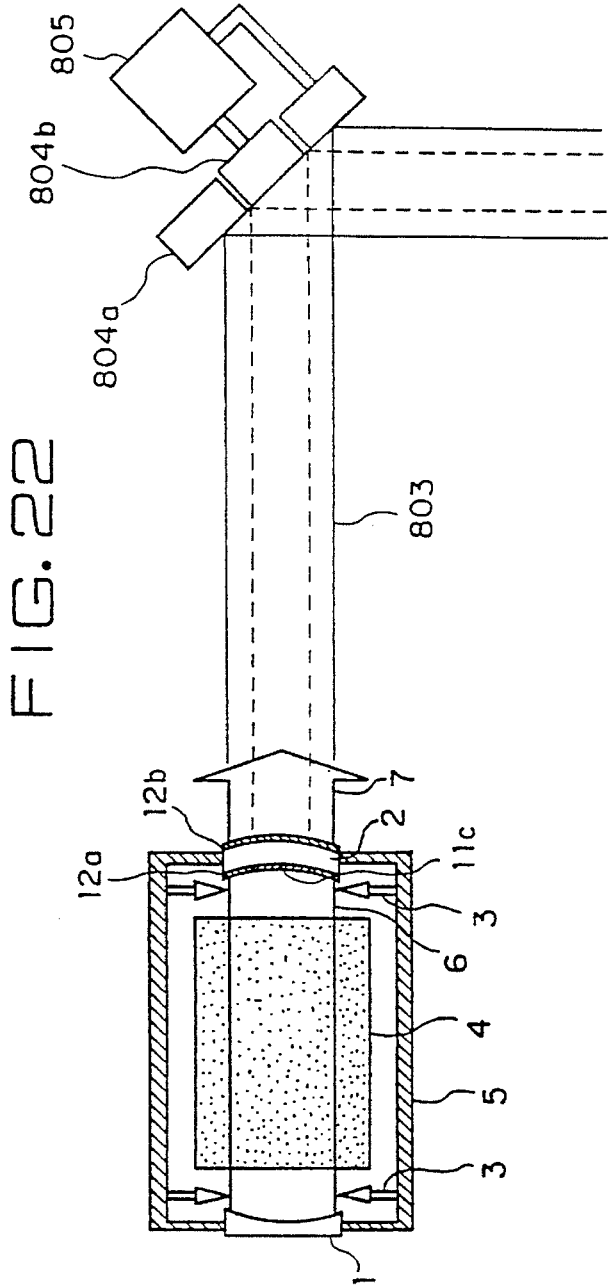

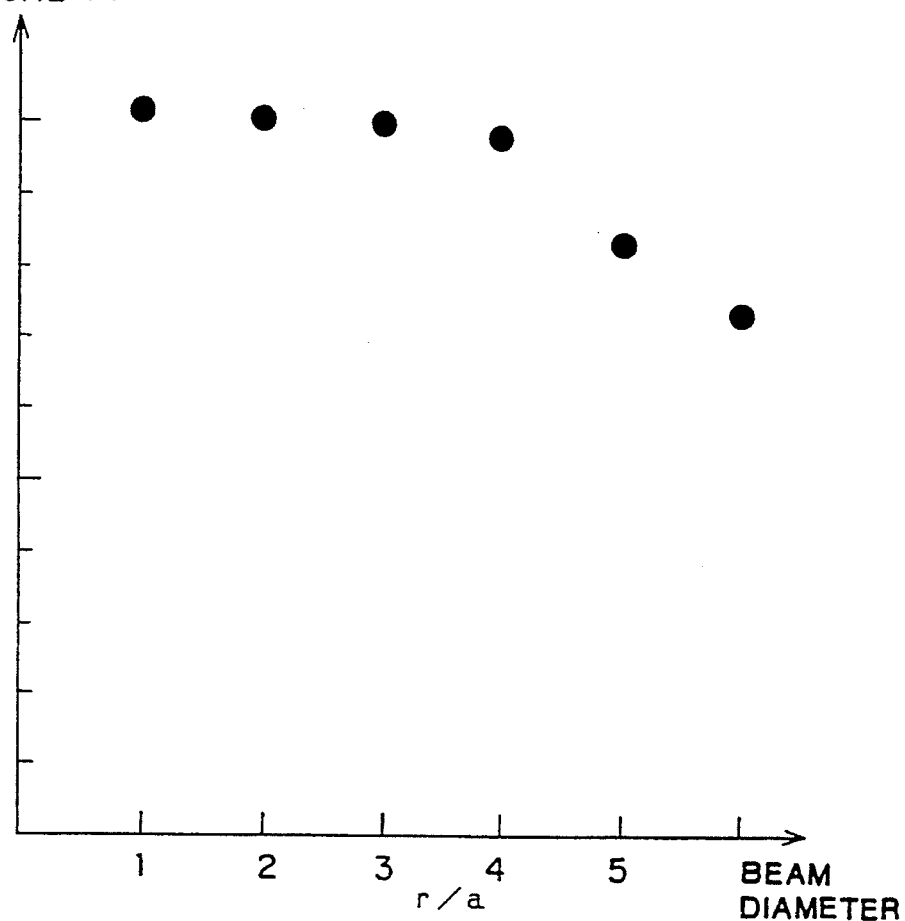
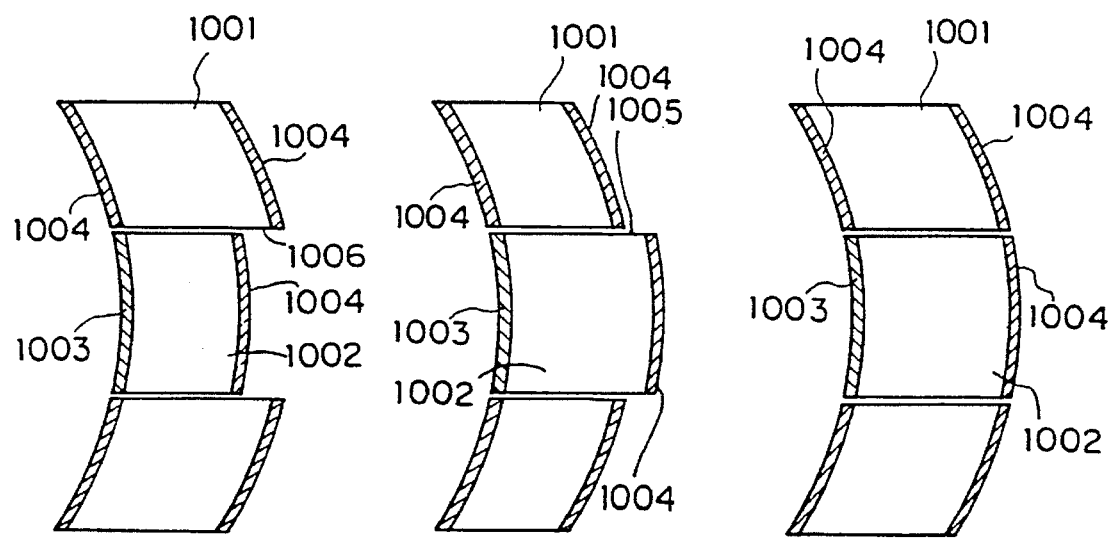

FIG.39(a)  FIG.39(b)
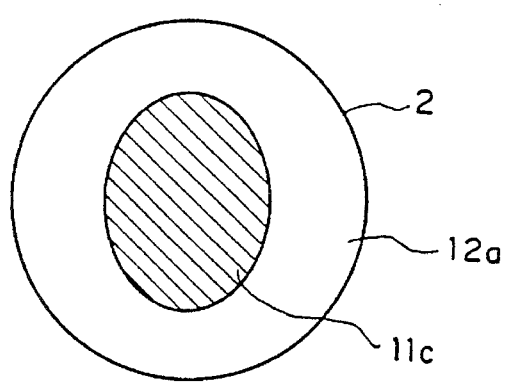
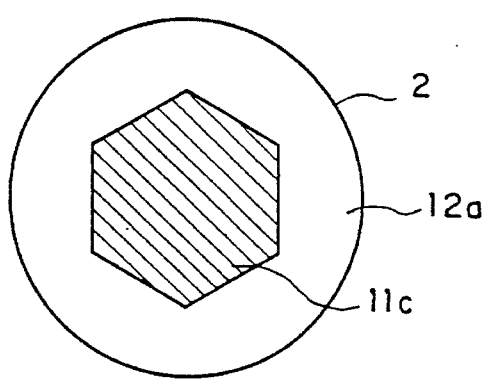
FIG. 40
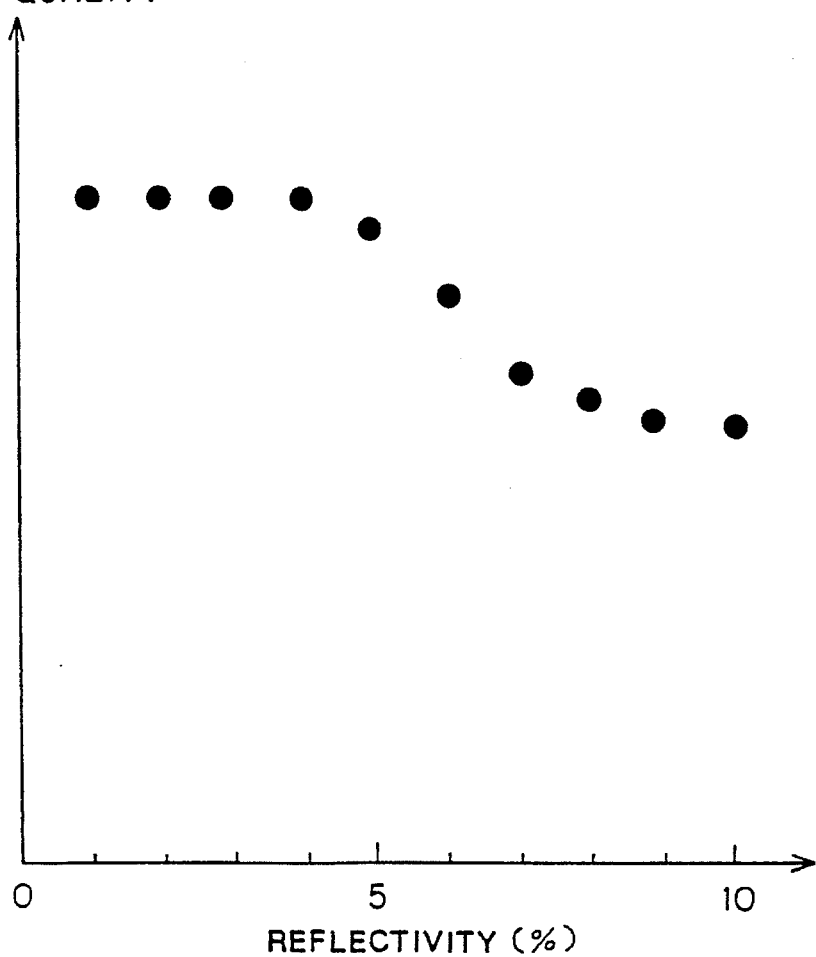

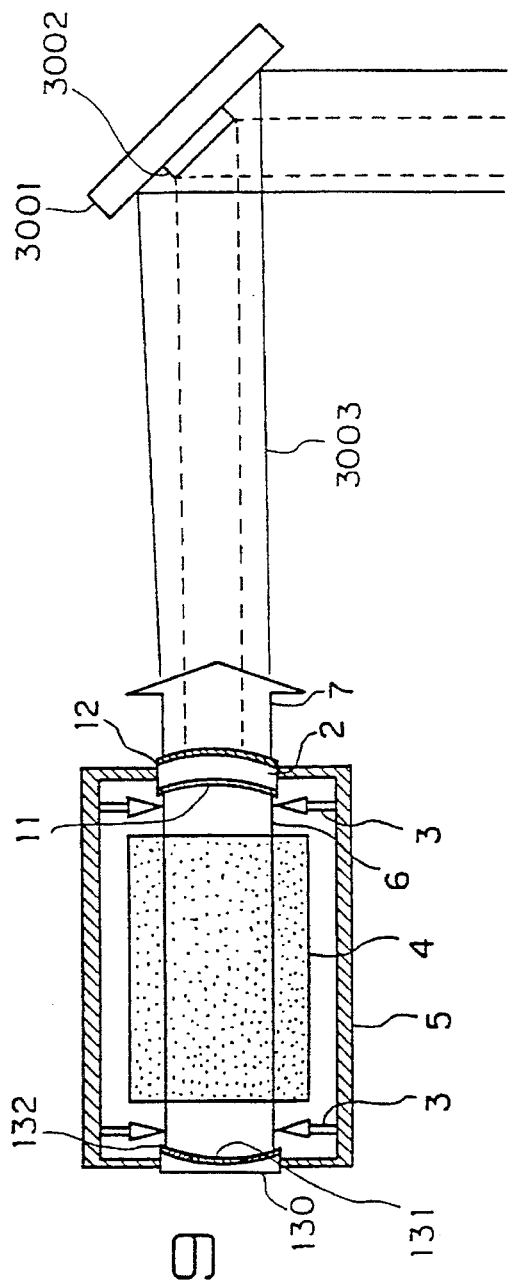
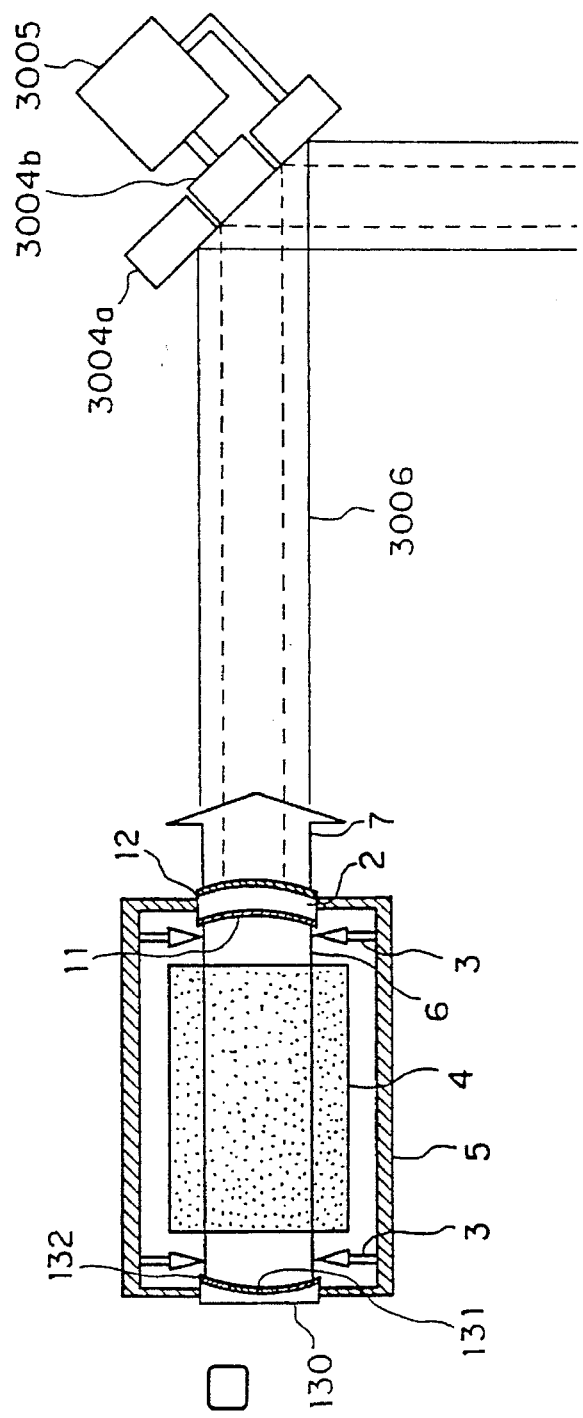
FIG. 59
FIG. 60

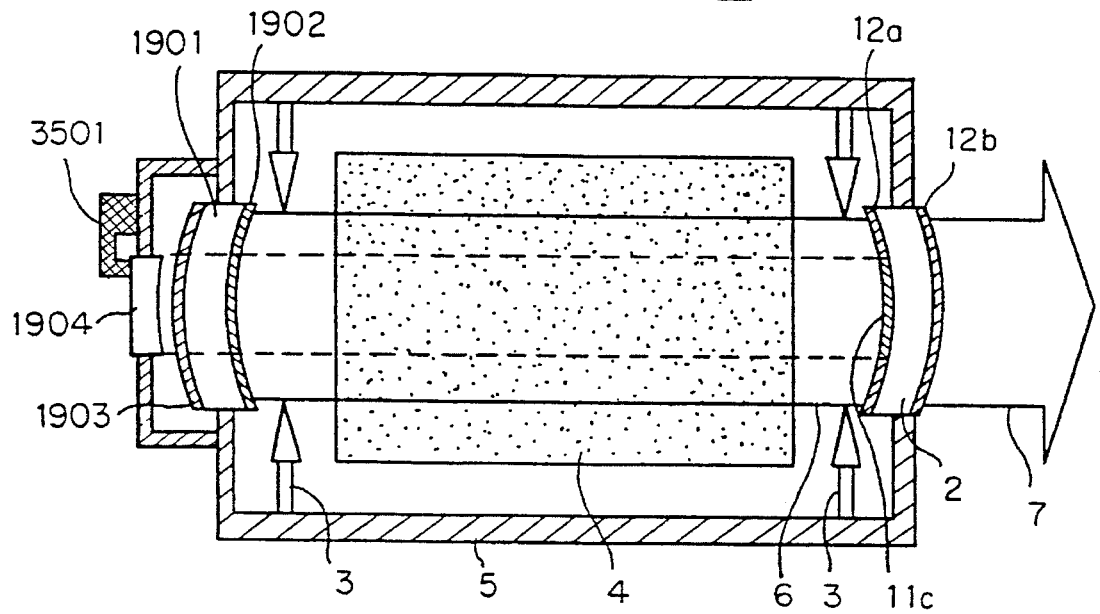
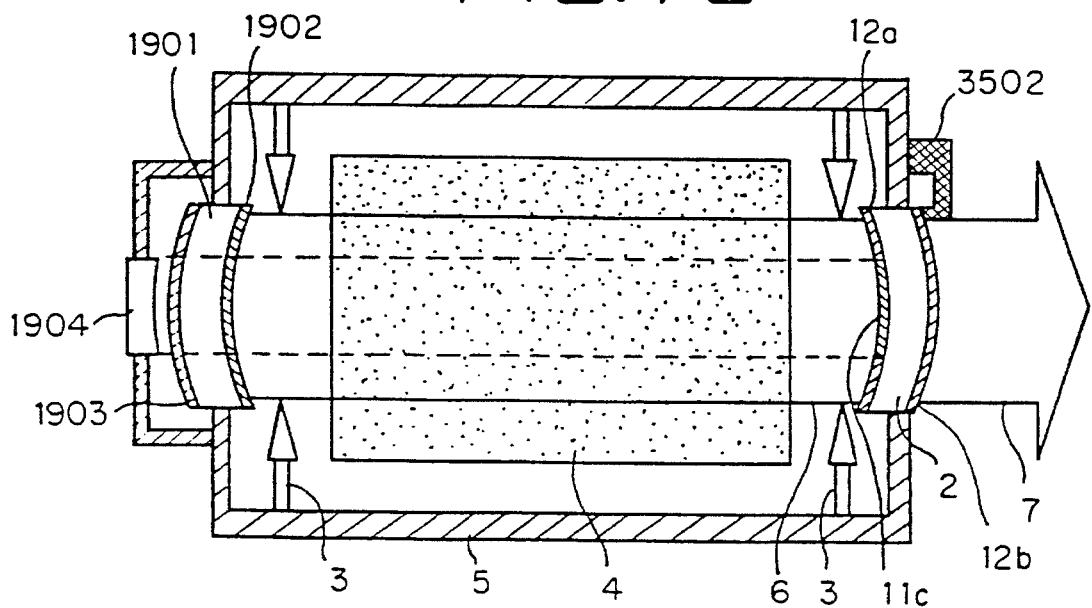

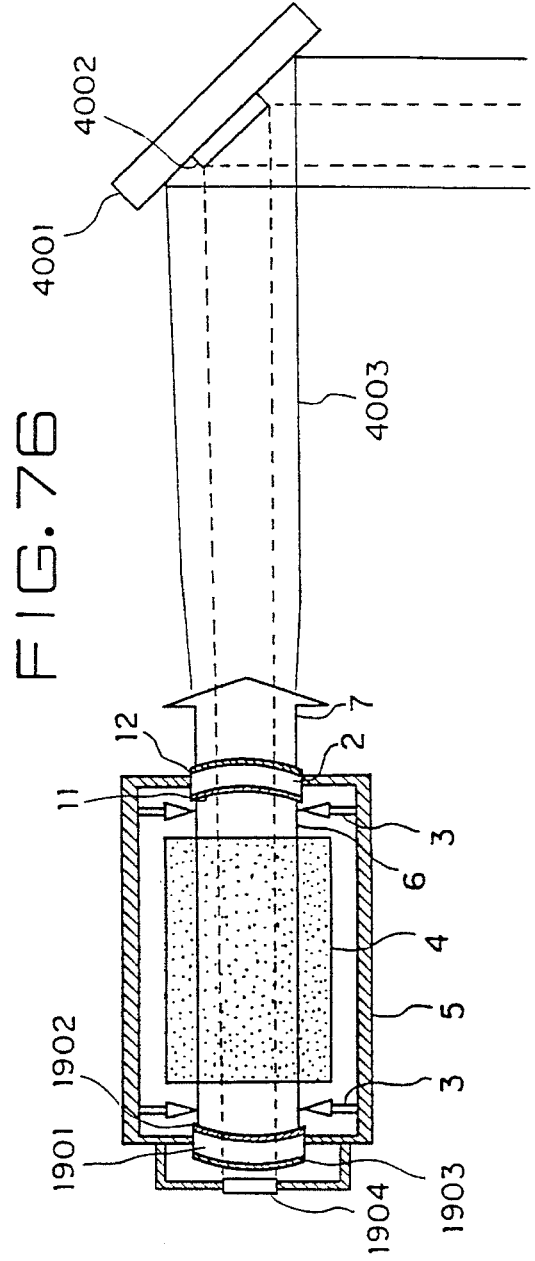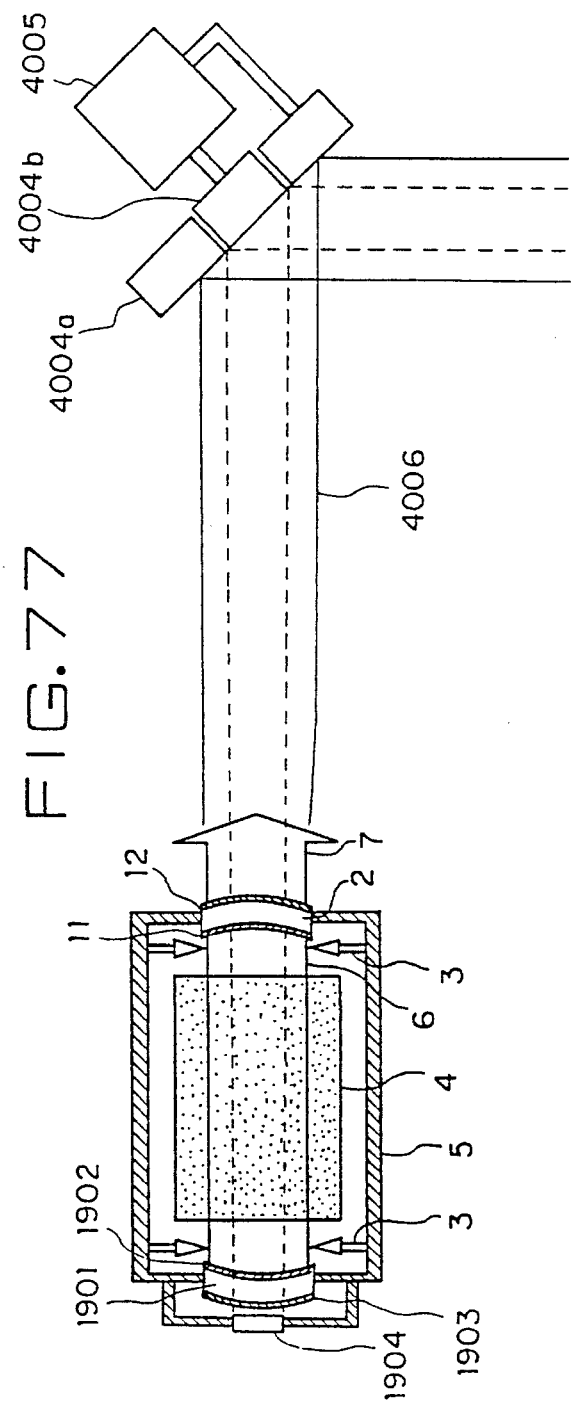

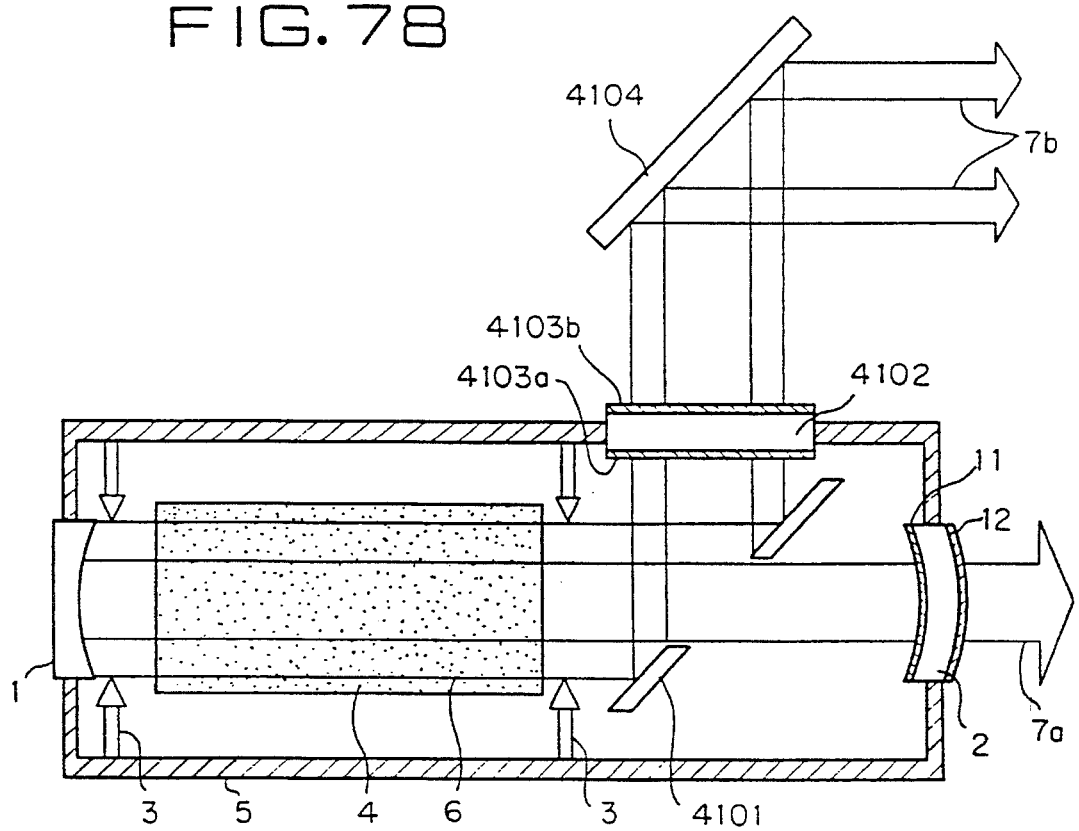

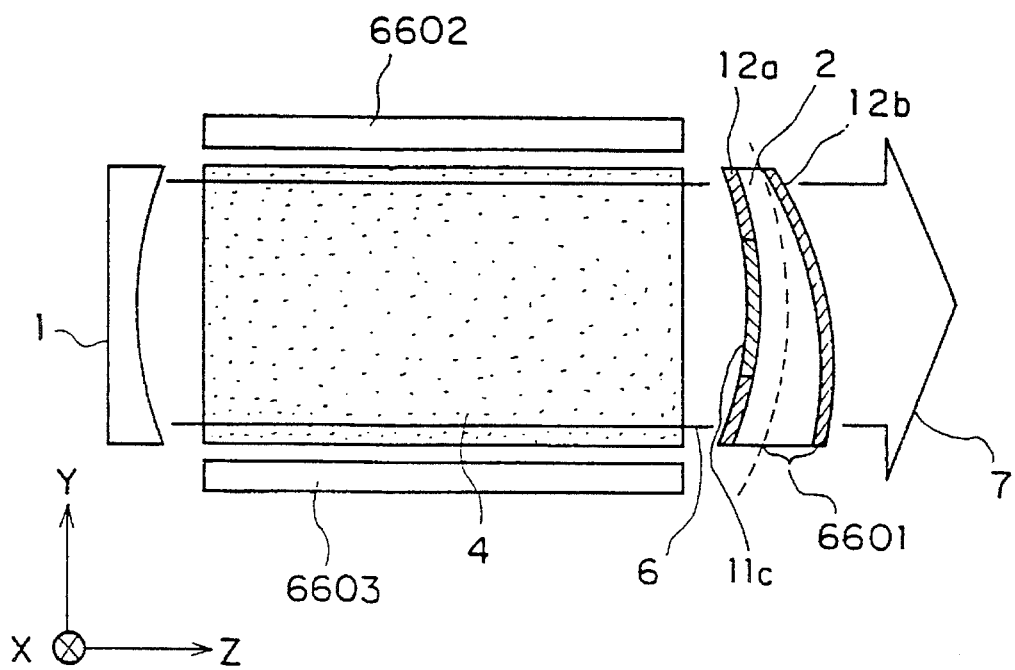
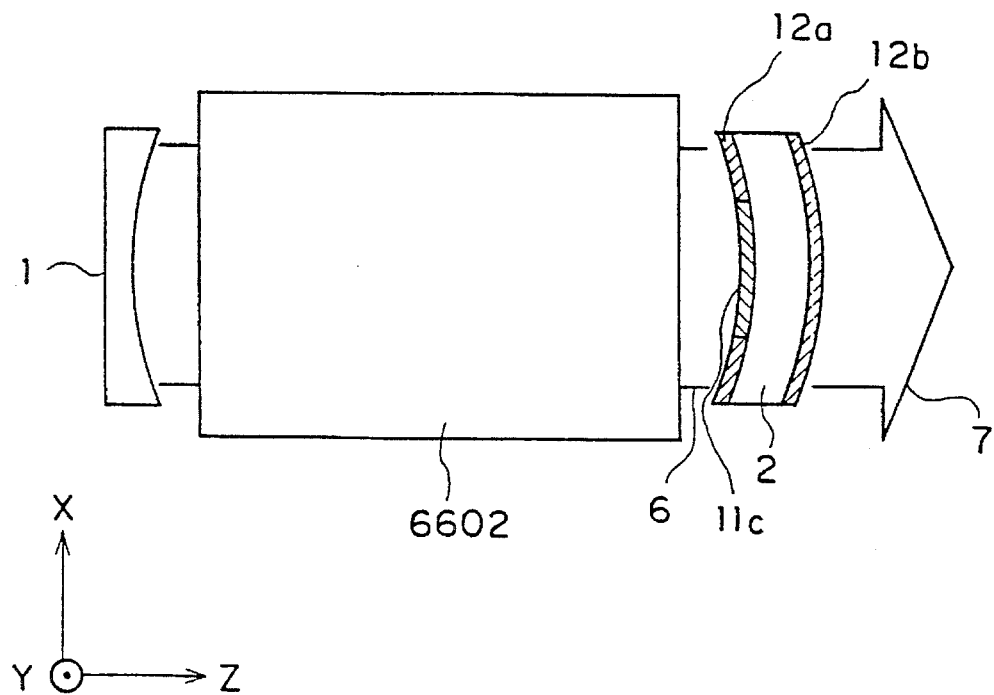

FIG. 111(a)
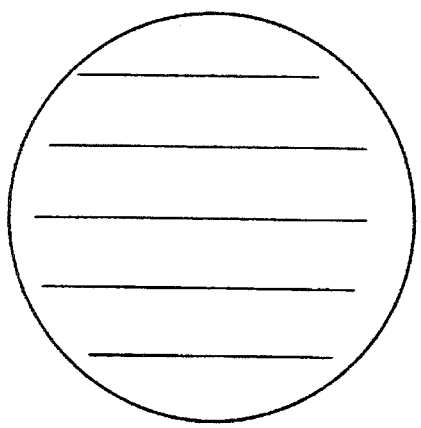
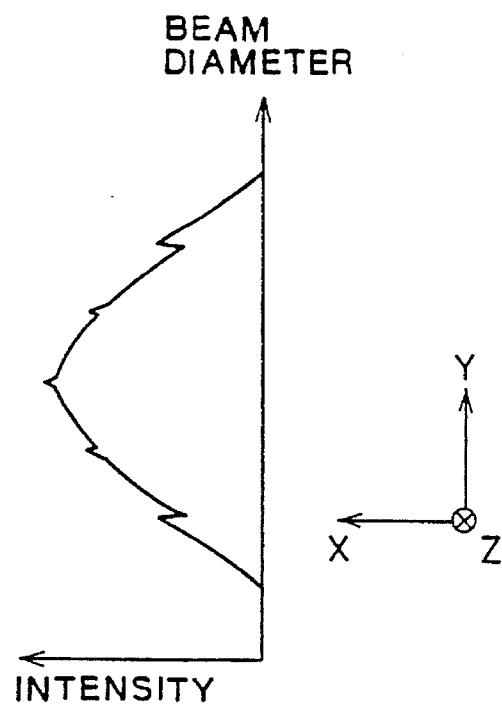
FIG. 111(b) (PRIOR ART)
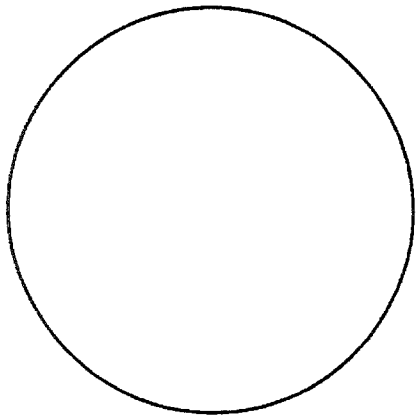
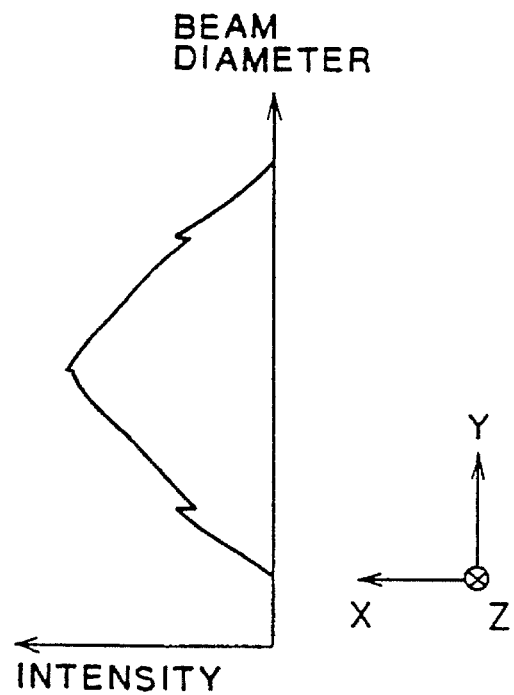

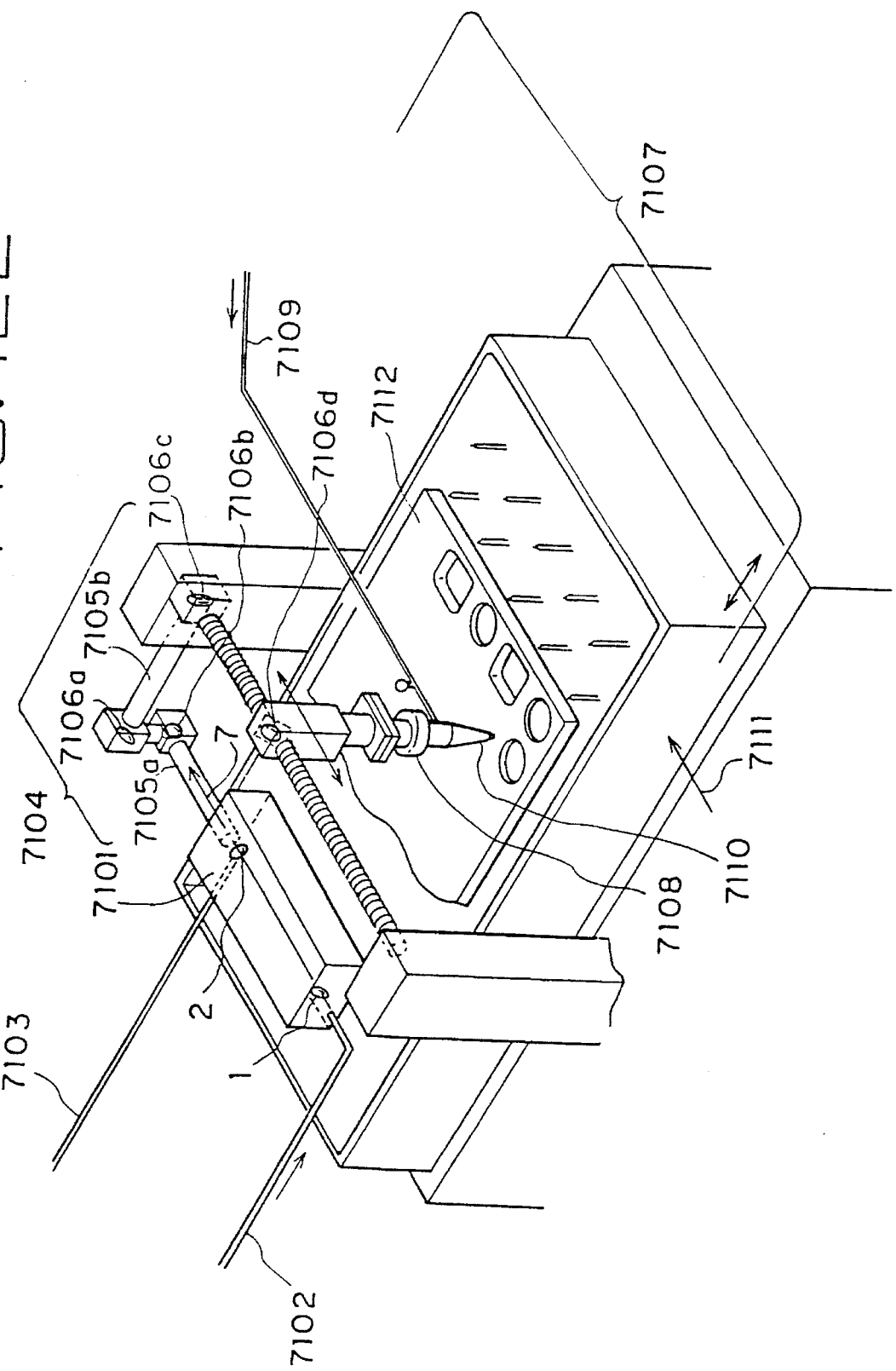

5,586,139

LASER SYSTEM

This application is a divisional of application Ser. No. 08/121,347, filed Sep. 15, 1993 now U.S. Pat. No. 5,506,858.

BACKGROUND OF THE INVENTION

1. Field of the Invention

The present invention relates to a laser system in which a laser beam generated through a laser medium is emitted from a stable resonator.

2. Description of the Prior Art

FIG. 1 is a view showing the construction of a conventional laser system which is disclosed, for example, in Japanese Patent Laid Open No. 152777/89. In the same figure, the reference numeral 1 denotes a concave total reflector formed of Cu for example; the numeral 2 denotes a coupling mirror formed of ZnSe for example and disposed in an opposed relation to the total reflector 1; numeral 11a denotes a partial reflection film formed on the opposed surface to the total reflector 1 of the coupling mirror 2; numeral 11b denotes a partial reflection film provided around the partial reflection film 11a and having a partial reflectivity lower than that of the partial reflection film 11a; and numeral 12 denotes an antireflecting film formed on the surface of the coupling mirror 2 on the side opposite to the side where the partial reflection films 11a and 11b are provided. Numeral 3 denotes an aperture formed in front of the total reflector 1 and also in front of the coupling mirror 2 within a stable resonator. Numeral 4 denotes a laser medium. In the case of a gas laser such as $CO_2$ laser, the laser medium is a gas medium pumped by electric discharge for example, or in the case of a solid-state laser such as YAG laser, the laser medium is a solid-state medium pumped by a flash lamp for example. Numeral 5 denotes a housing; numeral 6 denotes a laser beam generated in the interior of a stable resonator composed of the mirrors 1 and 2; and numeral 7 denotes a laser beam taken out to the exterior of the laser oscillator by the coupling mirror 2.

Description is now directed to the operation of such conventional laser system. The mirrors 1 and 2 constitute a stable resonator, in which the laser beam 6 is amplified by the laser medium 4 while propagating between the mirror, 1 and 2. At the same time, part of the laser beam 6 passes through the partial reflection films 11a, 11b and further through the antireflecting film 12 which are provided in the coupling mirror 2, and is extracted as laser beam 7 to the exterior of the laser oscillator. If the extracted laser beam 7 thus is converged using a lens or the like, there will be obtained a converged beam of a crown shape, namely a laser beam having a remarkably high intensity distribution at the central part, which can be used for cutting or welding iron plates, etc.

Not only the output of laser beam but also the mode thereof is an important factor. A suitable mode is selected according to the total reflector 1 and coupling mirror 2 which constitute a resonator, as well as the resonator length and both the aperture diameter in the resonator and the resonator length. In the case of a $CO_2$ laser processing machine, there usually is employed $TEM_{00}$ (Transverse Electro-Magnetic) mode or $TEM_{01}*$ mode for the cutting of an iron plate or the like, in which TEM represents a light wave from an electromagnetic field perpendicular to the propagating direction, and $_{00}$ or $_{01}$ represents the number of transverse modes.

In the stable resonator of the conventional laser system shown in FIG. 1 and constructed as above, the aperture 3 is merely for defining an outer diameter of the laser beam 6 and does not perform the mode selection. The partial reflectors 11a and 11b also merely function to pass a portion of the laser beam 6 therethrough and cause the laser beam to assume an inner-stuffed state (namely, a laser beam having a uniform intensity distribution). In such a construction, therefore, the mode selection is not performed strictly and a laser beam is generated in a multi-mode wherein the beam quality is poor.

In the case of the laser system shown in FIG. 2, which is generally used, apertures 3 provided within a stable resonator perform the mode selection and can generate $TEM_{00}$ mode wherein the beam quality is good, but at the same time the pumping space is limited, so there has been the problem that the laser output is limited.

The laser output can be increased by increasing the applied electric power, or laser gain. However, since the diameter of the apertures 3 is fixed, the increase of laser gain leads to an increase in intensity of the laser beam incident on a partial reflector 11 of a coupling mirror 2. On the other hand, an upper limit of output at the time of extracting the laser beam from the coupling mirror 2 is determined by the light-resisting strength of the coupling mirror 2. For example, in the case where laser beam is generated in $TEM_{00}$ mode, a maximum output of a laser beam 7 capable of being extracted stably is 2 kW. Generating a laser beam of greater than 2 kW in $TEM_{00}$ mode and extracting it stably are in many cases difficult due to the problem related to the light-resisting strength of the coupling mirror. Even in the laser processing machines presently available on the market, a maximum laser beam output is 4 kW, and various improvements are applied to the coupling mirror for attaining this maximum output. This is the actual situation.

SUMMARY OF THE INVENTION

In view of the foregoing, it is an object of the present invention to provide a laser system capable of affording an increased laser output by increasing the diameter of laser beam emitted from a resonator in the laser system.

It is another object of the present invention to provide a laser system capable of stably taking out a large capacity laser beam of several kW without improving the strength of a mirror as a constituent of a resonator in the laser system.

It is a further object of the present invention to provide a laser system capable of stably taking out a laser beam of several kW or more even in $TEM_{00}$ mode or $TEM_{01}*$ mode which modes are generally used for cutting or the like in the case of using the laser system in a laser processing machine.

According to the first aspect of the present invention, for achieving the above-mentioned objects, there is provided a laser system including a stable resonator and a laser medium provided within the resonator, the stable resonator comprising a coupling mirror and a total reflector disposed in an opposed relation to the coupling mirror, the coupling mirror having a partially reflecting portion located centrally and an antireflecting portion located around the partially reflecting portion.

According to the second aspect of the present invention, there is provided a laser system which has a construction similar to that of the construction according to the first aspect of the invention and in which, with respect to a laser beam generated through the laser medium, the partially reflecting portion of the coupling mirror selects a mode on the basis of a diametrical size thereof and emits the laser beam in the selected mode from the coupling mirror.

According to the third aspect of the present invention, there is provided a laser system in which, if the radius of curvature of a coupling mirror is $R_1$, that of a total reflector is $R_2$ and the length of a stable resonator is L, the relation of $0<(1-L/R_1)(1-L/R_2)<1$ is satisfied.

According to the fourth aspect of the present invention, there is provided a laser system in which a total reflector as a constituent of a stable resonator is replaced with a partial reflector having an intensity reflectivity of 99%, thereby allowing a laser beam in a stable resonator to be outputted 1% through the partial reflector.

According to the fifth aspect of the present invention, there is provided a laser system in which at least one of a coupling mirror and a total reflector disposed oppositely to the coupling mirror is provided with a mirror angle adjusting mechanism.

According to the sixth aspect of the present invention, there is provided a laser system in which a total reflector disposed oppositely to a coupling mirror is provided with a curvature changing mechanism.

According to the seventh aspect of the present invention, there is provided a laser system in which a coupling mirror is provided with a phase difference compensating means so that a phase difference between laser beam portions emitted respectively from a partially reflecting portion and an antireflecting portion of a coupling mirror to the exterior of a stable resonator is an integer multiple of $2\pi$ in order to improve the laser beam quality.

According to the eighth aspect of the present invention, there is provided a laser system in which, in order to control the laser beam quality, a coupling mirror is provided with a phase difference controlling means for controlling a phase difference between laser beam portions emitted respectively from a partially reflecting portion and an antireflecting mirror of the coupling mirror to the exterior of a stable resonator.

According to the ninth aspect of the present invention, there is provided a laser system in which, in order to improve the laser beam quality, a total reflector is provided with a phase difference compensating means so that a phase difference between laser beam portions emitted respectively from a partially reflecting portion and an antireflecting portion of a coupling mirror to the exterior of a stable resonator is an integer multiple of $2\pi$.

According to the tenth aspect of the present invention, there is provided a laser system in which, in order to control the laser beam quality, a total reflector is provided with a phase difference controlling means for controlling a phase difference between laser beam portions emitted respectively from a partially reflecting portion and an antireflecting portion of a coupling mirror to the exterior of a stable resonator.

According to the eleventh aspect of the present invention, there is provided a laser system in which, in order to improve the laser beam quality, a phase difference compensating means is provided exteriorly of a stable resonator so that a phase difference between laser beam portions emitted respectively from a partially reflecting portion and an antireflecting portion of a coupling mirror to the exterior of the stable resonator is $2\pi$.

According to the twelfth aspect of the present invention, there is provided a laser system in which, in order to control the laser beam quality, a phase difference controlling means for controlling a phase difference between laser beam portions emitted respectively from a partially reflecting portion an antireflecting portion of a coupling mirror to the exterior of a stable resonator is provided exteriorly of the stable resonator.

According to the thirteenth aspect of the present invention, there is provided a laser system in which, in order to maintain the quality of emitted laser beam, there is formed an aperture for defining a diameter of laser beam in a stable resonator which beam is conducted to at least one of a coupling mirror and a total reflector both constituting the stable resonator, the diameter of the aperture being set to a value of not larger than four times the diameter of a partially reflecting portion of the coupling mirror.

According to the fourteenth aspect of the present invention, there is provided a laser system in which a coupling mirror is composed of a ring-shaped mirror base and a mirror base engageable with the ring-shaped mirror base, the ring-shaped mirror base having antireflecting films formed on both sides thereof, and the engageable mirror base having a partial reflection film on the side thereof constituting a stable resonator and an antireflecting film on the side opposite to the resonator constituting side thereof.

According to the fifteenth aspect of the present invention, there is provided a laser system in which a partially reflecting portion of a coupling mirror is composed of some reflecting films of different intensity reflectivities so that the intensity reflectivity of the partially reflecting portion changes stepwise.

According to the sixteenth aspect of the present invention, there is provided a laser system in which a partially reflecting portion of a coupling mirror is provided with a ring-shaped partial reflection film or total reflection film having an intensity reflectivity different from that of the partially reflecting portion.

According to the seventeenth aspect of the present invention, there is provided a laser system in which a thin metallic film is provided as a partially reflecting portion centrally of a coupling mirror and an antireflecting film is formed around the thin metallic film.

According to the eighteenth aspect of the present invention, there is provided a laser system in which a partially reflecting portion of a coupling mirror is constituted by a ring-shaped partial reflection film.

According to the nineteenth aspect of the present invention, there is provided a laser system in which a partially reflecting portion of a coupling mirror is formed by a plurality of ring-shaped partial reflection film or total reflection film.

According to the twentieth aspect of the present invention, there is provided a laser system in which a diameter of a coupling mirror is set larger than that in TEM$_{00}$ mode oscillation to generate a low-order multi-mode of a large sectional area.

According to the twenty-first aspect of the present invention, there is provided a laser system in which a boundary surface between a partially reflecting portion and an antireflecting portion both of a coupling mirror and formed on a resonator constituting side of the mirror is formed so as to have an inclination angle or a curvilinear shape relative to the coupling mirror axis.

According to the twenty-second aspect of the present invention, there is provided a laser system in which an outer peripheral part of a partially reflecting portion of a coupling mirror formed on the side of the mirror constituting a resonator is formed in a geometrical shape other a circle.

According to the twenty-third aspect of the present invention, there is provided a laser system in which an intensity reflectivity of a non-reflecting portion formed along the outer periphery of a coupling mirror is set to a value not larger than 5%.

According to the twenty-fourth aspect of the present invention, there is provided a laser system, in which a resonator constituting side of a coupling mirror and the side opposite thereto of the coupling mirror are different in radius of curvature from each other.

According to the twenty-fifth aspect of the present invention, there is provided a laser system including a stable resonator comprising a reflecting mirror and a coupling mirror disposed in an opposed relation to the reflecting mirror, the reflecting mirror having a totally reflecting portion located centrally and a partially reflecting portion formed around the totally reflecting portion.

According to the twenty-sixth aspect of the present invention, there is provided a laser system including a stable resonator, the resonator comprising a coupling mirror, a partial reflector and a total reflector disposed behind the partial reflector, in which a mode to be generated in the stable resonator is selected on the basis of the diameter of the total reflector and that of a partially reflecting portion of the coupling mirror.

According to the twenty-seventh aspect of the present invention, there is provided a laser system including a stable resonator and a laser medium provided within the resonator, the stable resonator comprising a reflecting mirror and a coupling mirror disposed in an opposed relation to the reflecting mirror and having a partially reflecting portion, the reflecting mirror having a totally reflecting portion located centrally and a partially reflecting portion formed around the totally reflecting portion.

According to the twenty-eighth aspect of the present invention, there is provided a laser system which has a construction similar to the construction according to the twenty-seventh aspect of the invention and in which, with respect to a laser beam generated through the laser medium, the totally reflecting portion of the reflecting mirror selects a mode on the basis of a diametrical size thereof and emits the laser beam in the selected mode from the coupling mirror.

According to the twenty-ninth aspect of the present invention, there is provided a laser system in which at least one of a reflecting mirror and a coupling mirror is provided with a mirror angle adjusting mechanism.

According to the thirtieth aspect of the present invention, there is provided a laser system in which, in order to improve the laser beam quality, a reflecting mirror is provided with a phase difference compensating means so that a phase difference between laser beam portions reflected by a totally reflecting portion and a partially reflecting portion, respectively, of the reflecting mirror is an integer multiple of $2\pi$.

According to the thirty-first aspect of the present invention, there is provided a laser system in which, in order to control the laser beam quality, a reflecting mirror is provided with a phase difference controlling means for controlling a phase difference between laser beam portions reflected by a totally reflecting portion and a partially reflecting portion, respectively, of the reflecting mirror.

According to the thirty-second aspect of the present invention, there is provided a laser system in which, in order to improve the laser beam quality, a coupling mirror is provided with a phase difference compensating means so that a phase difference between laser beam portions reflected by a totally reflecting portion and a partially reflecting portion, respectively, of a reflecting mirror is an integer multiple of $2\pi$.

According to the thirty-third aspect of the present invention, there is provided a laser system in which, in order to control the laser beam quality, a coupling mirror is provided with a phase difference controlling means for controlling a phase difference between laser beam portions reflected by a totally reflecting portion and a partially reflecting portion, respectively, of a reflecting mirror.

According to the thirty-fourth aspect of the present invention, there is provided a laser system in which, in order to improve the laser beam quality, a phase difference compensating means is provided exteriorly of a stable resonator so that a phase difference between laser beam portions reflected by a totally reflecting portion and a partially reflecting portion, respectively, of a reflecting mirror is an integer multiple of $2\pi$.

According to the thirty-fifth aspect of the present invention, there is provided a laser system in which, in order to control the laser beam quality, a phase difference controlling means for controlling a phase difference between laser beam portions reflected by a totally reflecting portion and a partially reflecting portion, respectively, of a reflecting mirror is provided exteriorly of a stable resonator.

According to the thirty-sixth aspect of the present invention, there is provided a laser system in which, in order to maintain the laser beam quality, there is formed an aperture for defining the diameter of laser beam in a stable resonator which beam is conducted to at least one of a-coupling mirror and a reflecting mirror both constituting the stable resonator, the diameter of the aperture being set to a value of not larger than four times the diameter of a totally reflecting portion of the reflecting mirror.

According to the thirty-seventh aspect of the present invention, there is provided a laser system in which a stable resonator is composed of a coupling mirror, a partial reflector, which are disposed opposedly to each other, and a total reflector disposed behind the partial reflector.

According to the thirty-eighth aspect of the present invention, there is provided a laser system which has a construction similar to the construction according to the thirty-seventh aspect of the invention and in which a mode to be generated in the stable resonator is selected on the basis of the diameter of the total reflector.

According to the thirty-ninth aspect of the present invention, there is provided a laser system in which at least one of a total reflector and a coupling mirror is provided with a mirror angle adjusting mechanism.

According to the fortieth aspect of the present invention, there is provided a laser system in which, in order to improve the laser beam quality, a partial reflector is provided with a phase difference compensating means so that a phase difference between laser beam portions reflected respectively by the partial reflector and a total reflector disposed behind the partial reflector is an integer multiple of $2\pi$.

According to the forty-first aspect of the present invention, there is provided a laser system in which, in order to control the laser beam quality, a partial reflector is provided with a phase difference controlling means for controlling a phase difference between laser beam portions reflected respectively by the partial reflector and a total reflector disposed behind the partial reflector.

According to the forty-second aspect of the present invention, there is provided a laser system in which, in order to improve the laser beam quality, a coupling mirror is provided with a phase difference compensating means so that a phase difference between laser beam portions reflected respectively by a partial reflector and a total reflector disposed behind the partial reflector is an integer multiple of $2\pi$.

According to the forty-third aspect of the present invention, there is provided a laser system in which, in order to control the laser beam quality, a coupling mirror is provided with a phase difference controlling means for controlling a phase difference between laser beam portions reflected respectively by a partial reflector and a total reflector disposed behind the partial reflector.

According to the forty-fourth aspect of the present invention, there is provided a laser system in which a phase difference compensating means is disposed exteriorly of a stable resonator so that a phase difference between laser beam portions reflected respectively by a partial reflector and a total reflector disposed behind the partial reflector is an integer multiple of $2\pi$.

According to the forty-fifth aspect of the present invention, there is provided a laser system in which a phase difference controlling means for controlling a phase difference between laser beam portions reflected respectively by a partial reflector and a total reflector disposed behind the partial reflector is disposed exteriorly of a stable resonator.

According to the forty-sixth aspect of the present invention, there is provided a laser system in which, in order to maintain the quality of emitted laser beam, there is formed an aperture for defining the diameter of laser beam in a stable resonator which beam is conducted to at least one of a partial reflector and a coupling mirror both constituting the stable resonator, the diameter of the aperture being set to a value of not larger than four times the diameter of a total reflector.

According to the forty-seventh aspect of the present invention, there is provided a laser system including a partial reflector and another mirror both constituting a stable resonator, and further including a ring-shaped mirror inserted into the stable resonator.

According to the forty-eighth aspect of the present invention, there is provided a laser system which has a construction similar to the construction according to the forty-seventh aspect of the invention and in which a mode to be generated in the stable resonator is selected on the basis of an inside diameter of the ring-shaped mirror.

According to the forty-ninth aspect of the present invention, there is provided a laser system in which at least one of a coupling mirror and another mirror both constituting a resonator is provided with a mirror angle adjusting mechanism.

According to the fiftieth aspect of the present invention, there is provided a laser system in which a resonator is constituted by a coupling mirror and another mirror, the another mirror having a curvature changing mechanism.

According to the fifty-first aspect of the present invention, there is provided a laser system in which, in order to maintain the quality of emitted laser beam, there is formed an aperture for defining the diameter of laser beam in a stable resonator which beam is conducted to at least one of a coupling mirror and another mirror both constituting a stable resonator, the diameter of the aperture being set to a value of not larger than four times the inside diameter of a ring-shaped mirror.

According to the fifty-second aspect of the present invention, there is provided a laser system including a coupling mirror having a partially reflecting portion different in the radius of curvature between its central part and outer peripheral part, and a total reflector constituting a stable resonator conjointly with the central part of the coupling mirror, in which the central part of the coupling mirror selects a mode to be generated in the stable resonator.

According to the fifty-third aspect of the present invention, there is provided a laser system including a total reflector different in the radius of curvature between its central part and outer peripheral part, and a coupling mirror having a partially reflecting portion, the partially reflecting portion constituting a stable resonator conjointly with the central part of the total reflector, in which the central part of the total reflector selects a mode to be generated in the stable resonator.

According to the fifty-fourth aspect of the present invention, there is provided a laser system including a coupling mirror having a partially reflecting portion different in the radius of curvature between its central part and outer peripheral part, and a total reflector, the central part of the coupling mirror and that of the total reflector constituting a stable resonator and selecting a mode to be generated in the resonator.

According to the fifty-fifth aspect of the present invention, there is provided a laser system in which at least one of mirrors constituting a stable resonator is provided with a mirror angle adjusting mechanism.

According to the fifty-sixth aspect of the present invention, there is provided a laser system in which, in order to maintain the quality of emitted laser beam, there is formed an aperture for defining the diameter of laser beam in a stable resonator which is conducted to at least one of mirrors constituting the resonator, the diameter of the aperture being set to a value of not larger than four times the diameter of the central part of a mirror provided near the aperture.

According to the fifty-seventh aspect of the present invention, there is provided a laser system in which a stable resonator included in the laser system is used as a laser beam generating stage, and a laser beam emitted from the laser beam generating stage is amplified in a laser beam amplifying stage.

According to the fifty-eighth aspect of the present invention, there is provided a laser system which is used as a laser beam generating stage for emitting a laser beam to a plurality of laser beam amplifying stages.

According to the fifty-ninth aspect of the present invention, there is provided a laser system used in a discharge-excited gas laser system, in which a surface having an inclination angle of a coupling mirror which constitutes a stable resonator, the surface having an inclination angle being formed on the side opposite to a resonator constituting side of the coupling mirror and not parallel to the resonator constituting side, and sections of discharge electrodes disposed oppositely to each other in the stable resonator, are present in different planes.

According to the sixtieth aspect of the present invention, there is provided a laser system used in a discharge-excited gas laser system, in which two or more sets of discharge electrodes are disposed within the laser system in such a manner that one set of discharge electrodes are in a 90°-turned position with respect to another set of discharge electrodes.

According to the sixty-first aspect of the present invention, there is provided a laser system used in a gas laser system in which an optical axis is orthogonal to a gas flowing direction.

According to the sixty-second aspect of the present invention, there is provided a laser system in which a gas downstream end in a discharge-exciting portion and a laser beam downstream end are approximately coincident with each other.

According to the sixty-third aspect of the present invention, there is provided a laser system in which the flow of gas is reversed within a resonator.

According to the sixty-fourth aspect of the present invention, there is provided a laser system in which a laser beam is turned back in ⊃ shape in a gas flowing direction.

According to the sixty-fifth aspect of the present invention, there is provided a laser system used in a laser processing system in which a laser beam generated from the laser system is transmitted and directed to a workpiece.

According to the sixty-sixth aspect of the present invention, there is provided a laser system which is used in a discharge-excited gas laser system.

According to the sixty-seventh aspect of the present invention, there is provided a laser system which is used in a discharge-excited $CO_2$ laser system.

According to the sixty-eighth aspect of the present invention, there is provided a laser system which is used in a metal vapor laser system.

According to the sixty-ninth aspect of the present invention, there is provided a laser system which is used in a solid-state laser system.

According to the seventieth aspect of the present invention, there is provided a laser system which is used in a solid-state laser system and in which at least either a Q-switch element or a wavelength changing element is provided within a stable resonator.

According to the seventy-first aspect of the present invention, there is provided a laser system which is used in a semiconductor laser system.

As stated above, in the laser system according to the first aspect of the present invention, the partially reflecting portion of the coupling mirror selects a mode on the basis of a diametrical size thereof and in this point there is performed the same function as that of an aperture of a stable resonator in a conventional laser system. However, unlike the aperture in the conventional laser system, the partially reflecting portion of the coupling mirror in the present invention does not restrict the laser pumping space. Consequently, a high laser gain portion which has been eliminated in the conventional resonator can be used effectively.

Further, in the laser system according to the second aspect of the present invention, like the one according to the first aspect, since the partially reflecting portion of the coupling mirror selects a mode on the basis of a diametrical size thereof without restricting the laser pumping space, it is possible to effectively use a high laser gain portion.

Further, in the laser system according to the third aspect of the present invention, if the radius of curvature of the coupling mirror and that of the total reflector are $R_1$ and $R_2$, respectively, and the length of the stable resonator is L, a curvature shape of the coupling mirror and that of the total reflector can be selected to either a concave shape or convex shape within the range satisfying the relationship of $0<(1-L/R_1)(1-L/R_2)<1$.

Further, in the laser system according to the fourth aspect of the present invention, a partial reflector having an intensity reflectivity of 99% is used in place of the total reflector, and the laser beam in the stable resonator can be outputted 1% through the partial reflector.

Further, in the laser system according to the fifth aspect of the present invention, since at least one of the coupling mirror and the total reflector disposed oppositely to the coupling mirror is provided with a mirror angle adjusting mechanism, it is possible to correct deviations in the position and direction of the laser beam emitted from the stable resonator.

Further, in the laser system according to the sixth aspect of the present invention, the total reflector disposed opposedly to the coupling mirror is provided with a curvature changing mechanism. Consequently, it is possible to change the radius of curvature of the total reflector and hence possible to freely select a mode of laser beam generated within the resonator.

Further, in the laser system according to the seventh aspect of the present invention, the coupling mirror is provided with a phase difference compensating means so that a phase difference between laser beam portions emitted from the partially reflecting portion and the antireflecting portion, respectively, of the coupling mirror to the exterior of the stable resonator is an integer multiple of $2\pi$. Thus, the phase difference between the laser beam portions emitted to the exterior of the stable resonator is compensated, so it is possible to improve the laser beam quality.

Further, in the laser system according to the eighth aspect of the present invention, the coupling mirror is provided with a phase difference controlling means for controlling a phase difference between laser beam portions emitted from the partially reflecting portion and the antireflecting portion, respectively of the coupling mirror to the exterior of the stable resonator. Thus, the phase difference between the laser beam portions emitted to the exterior of the stable resonator is controlled, so it is possible to control the laser beam quality.

Further, in the laser system according to the ninth aspect of the present invention, the total reflector is provided with a phase difference compensating means so that a phase difference between laser beam portions emitted from the partially reflecting portion and the antireflecting portion, respectively, of the coupling mirror to the exterior of the stable resonator is an integer multiple of $2\pi$. Thus, the phase difference between the laser beam portions emitted to the exterior of the resonator is compensated, so it is possible to improve the laser beam quality.

Further, in the laser system according to the tenth aspect of the present invention, the total reflector is provided with a phase difference controlling means for controlling a phase difference between laser beam portions emitted from the partiality reflecting portion and the antireflecting portion, respectively, of the coupling mirror to the exterior of the stable resonator. Thus, the phase difference between the laser beam portions emitted to the exterior of the resonator is controlled, so it is possible to control the laser beam quality.

Further, in the laser system according to the eleventh aspect of the present invention, a phase difference compensating means is disposed exteriorly of the stable resonator so that a phase difference between laser beam portions emitted from the partially reflecting portion and the antireflecting portion, respectively, of the coupling mirror is an integer multiple of $2\pi$. Thus, the phase difference between the laser beam portions emitted to the exterior of the resonator is compensated, so it is possible to improve the laser beam quality.

Further, in the laser system according to the twelfth aspect of the present invention, a phase difference controlling means for controlling a phase difference between laser beam portions emitted from the partially reflecting portion and the antireflecting portion, respectively, of the coupling mirror to the exterior of the stable resonator is disposed exteriorly of the resonator. Thus, the phase difference between the laser beam portions emitted to the exterior of the resonator is controlled, so it is possible to control the laser beam quality.

Further, in the laser system according to the thirteenth aspect of the present invention, there is formed an aperture for defining a diameter of laser beam in the stable resonator which beam is conducted to at least one of the coupling mirror and the total reflector both constituting the resonator, and the diameter of the aperture is set to a value of not larger than four times the diameter of the partially reflecting portion of the coupling mirror, whereby the high quality of the laser beam emitted from the resonator can be maintained.

Further, in the laser system according to the fourteenth aspect of the present invention, a coupling mirror is composed of a ring-shaped mirror base and a mirror base engageable with the ring-shaped mirror base, the ring-shaped mirror base having antireflecting films formed on both sides thereof, while the engageable mirror base has a partial reflection film on its side opposed to the total reflector and also has an antireflecting film on the opposite side thereof. Therefore, by merely providing several kinds of mirror bases having partial reflection films of different partial reflectivities, it is made possible to easily constitute resonators having different partial reflectivities. Moreover, by adjusting a relative thickness of the ring-shaped mirror base and the engageable mirror base it is made possible to control a phase difference between laser beam portions emitted from both mirror bases respectively.

Further, in the laser system according to the fifteenth aspect of the present invention, the partially reflecting portion of the coupling mirror is formed by a plurality of reflecting films different in intensity reflectivity to change the intensity reflectivity of the partially reflecting portion stepwise. Consequently, it is possible to enlarge the mode volume of the laser beam generated and hence it is possible to improve the laser output.

Further, in the laser system according to the sixteenth aspect of the present invention, it is possible to enlarge the mode volume of the laser beam generated as in the laser system according to the fifteenth aspect of the invention, so it is possible to improve the laser output.

Further, in the laser system according to the seventeenth aspect of the present invention, a thin metallic film is formed as a partially reflecting portion centrally of the coupling mirror, and an antireflecting film is formed around the thin metallic film, so that there is little difference in phase between the laser beam portion passing through the thin metallic film and the laser beam portion passing through the antireflecting portion. Therefore, it is not necessary to use a phase compensating means.

Further, in the laser system according to the eighteenth aspect of the present invention, the partially reflecting portion of the coupling mirror is constituted by a concentric, ring-shaped, partial reflection film, so that it is possible to generate a low-order multi-mode of a large cross sectional area in the stable resonator.

Further, in the laser system according to the nineteenth aspect of the present invention, the partially reflecting portion of the coupling mirror is formed by a plurality of concentric, ring-shaped, partial or total reflection films, so that it is possible to generate a low-order multi-mode of a large cross sectional area in the stable resonator.

Further, in the laser system according to the twentieth aspect of the present invention, it is possible to generate a low-order multi-mode of a large cross sectional area because the diameter of the coupling mirror is set large.

In the laser system according to the twenty-first aspect of the present invention, the boundary surface between the partially reflecting portion and the antireflecting portion both formed on the resonator constituting side of the coupling mirror is formed inclinedly or curvilinearly relative to the axis of the coupling mirror, so that it is possible to enlarge the mode volume of the laser beam generated and hence possible to improve the laser output.

Further, in the laser system according to the twenty-second aspect of the present invention, since the outer peripheral part of the partially reflecting portion on the resonator constituting side of the coupling mirror is formed in a geometric shape other than a circle, it is possible to enlarge the mode volume of the laser beam generated and therefore possible to improve the laser output.

Further, in the laser system according to the twenty-third aspect of the present invention, the intensity reflectivity of the antireflecting portion formed on the outer periphery of the coupling mirror is set within 5%, and therefore it is possible to maintain good quality of the laser beam emitted from the stable resonator.

Further, in the laser system according to the twenty-fourth aspect of the present invention, the coupling mirror is formed so that the surface thereof opposed to the total reflector and the surface thereof on the opposite side are different in the radius of curvature from each other. Consequently, it becomes possible for the coupling mirror to also exhibit the function of lens and hence possible to freely set a desired radius of curvature of the laser beam emitted from the coupling mirror.

Further, in the laser system according to the twenty-fifth aspect of the present invention, the mode selection is performed on the basis of the diameter of the total reflector and that of the partially reflecting portion of the coupling mirror, and in this point there is performed the same function as that of the aperture of a stable resonator in the conventional laser system. In the laser system according to the present invention, however, unlike the aperture in the conventional laser system, the diameter of the total reflector and the partially reflecting portion of the coupling mirror do not restrict the laser pumping space.

Further, in the laser system according to the twenty-sixth aspect of the present invention, it is possible to effect the mode selection without restricting the laser pumping space, as in the laser system according to the twenty-fifth aspect of the invention.

Further, in the laser system according to the twenty-seventh aspect of the present invention, the totally reflecting portion of the reflecting mirror performs the mode selection on the basis of a diametrical size thereof, and in this point there is performed the same function as that of the aperture of a stable resonator in the conventional laser system. In the laser system according to the present invention, however, unlike the aperture in the conventional laser system, the totally reflecting portion of the reflecting mirror does not restrict the laser pumping space. Consequently, a high laser gain portion which has been eliminated in the conventional resonator can be used effectively.

Further, in the laser system according to the twenty-eighth aspect of the present invention, like the laser system according to the twenty-sixth aspect of the invention, the totally reflecting portion of the reflecting mirror performs the mode selection on the basis of a diametrical size thereof without restricting the laser pumping space, thus permitting effective use of a high laser gain portion.

Further, in the laser system according to the twenty-ninth aspect of the present invention, at least one of the reflecting mirror and the coupling mirror is provided with a mirror angle adjusting mechanism, so it is possible to correct deviations in the position and direction of the laser beam emitted from the stable resonator.

Further, in the laser system according to the thirtieth aspect of the present invention, the reflecting mirror is provided with a phase difference compensating means so that a phase difference between laser beam portions reflected by the totally reflecting portion and the partially reflecting portion, respectively, of the reflecting mirror is an integer multiple of $2\pi$. Thus, the phase difference between the laser beam portions emitted to the exterior of the stable resonator is compensated, so it is possible to improve the laser beam quality.

Further, in the laser system according to the thirty-first aspect of the present invention, the reflecting mirror is provided with a phase difference controlling means for controlling a phase difference between laser beam portions reflected by the totally reflecting portion and the partially reflecting portion, respectively, of the reflecting mirror, so that the phase difference between the laser beam portions emitted to the exterior of the stable resonator is controlled and hence it is possible to control the laser beam quality.

Further, in the laser system according to the thirty-two aspect of the present invention, the coupling mirror is provided with a phase difference compensating means so that a phase difference between laser beam portions reflected by the totally reflecting portion and the partially reflecting portions, respectively, of the reflecting mirror is an integer multiple of $2\pi$. Thus, the phase difference between the laser beam portions emitted to the exterior of the stable resonator is compensated and hence it is possible to improve the laser beam quality.

Further, in the laser system according to the thirty-third aspect of the present invention, the coupling mirror is provided with a phase difference controlling means for controlling a phase difference between laser beam portions reflected by the totally reflecting portion and the partially reflecting portion, respectively, of the reflecting mirror. Thus, the phase difference between the laser beam portions emitted to the exterior of the stable resonator is controlled, so it is possible to control the laser beam quality.

Further, in the laser system according to the thirty-fourth aspect of the present invention, a phase difference compensating means is disposed outside the stable resonator so that a phase difference between laser beam portions reflected by the totally reflecting portion and the partially reflecting portion, respectively, of the reflecting mirror is an integer multiple of $2\pi$. Thus, the phase difference between the laser beam portions emitted to the exterior of the resonator is compensated, so it is possible to improve the laser beam quality.

Further, in the laser system according to the thirty-fifth aspect of the present invention, a phase difference controlling means for controlling a phase difference between laser beam portions reflected by the totally reflecting portion and the partially reflecting portion, respectively, of the reflecting mirror is disposed outside the stable resonator. Since the phase difference between the laser beam portions emitted to the exterior of the resonator is thus controlled, it is possible to control the laser beam quality.

Further, in the laser system according to the thirty-sixth aspect of the present invention, there is formed an aperture for defining the diameter of laser beam in the stable resonator which beam is conducted to at least one of the coupling mirror and the reflecting mirror both constituting the resonator, and the diameter of the aperture is set to a value of not larger than four times the diameter of the totally reflecting portion of the reflecting mirror, whereby the quality of the laser beam emitted from the resonator can be maintained.

Further, in the laser system according to the thirty-seventh aspect of the present invention, the stable resonator is composed of a coupling mirror, a partial reflector, both disposed oppositely to each other, and a total reflector disposed behind the partial reflector, and the mode selection is performed on the basis of the diameter of a totally reflecting portion of the total reflector. In this point there is performed the same function as that of the aperture of a stable resonator in the conventional laser system. In the laser system according to the present invention, however, the totally reflecting portion of the total reflector does not restrict the laser pumping space, unlike the aperture in the conventional laser system.

Further, in the laser system according to the thirty-eighth aspect of the present invention, the mode selection can be done without restricting the laser pumping space, as in the laser system according to the thirty-seventh aspect of the present invention.

Further, in the laser system according to the thirty-ninth aspect of the present invention, at least one of the total reflector and the coupling mirror is provided with a mirror angle adjusting mechanism, so that deviations in the position and direction of the laser beam emitted from the stable resonator can be corrected.

Further, in the laser system according to the fortieth aspect of the present invention, the partial reflector is provided with a phase difference compensating means so that a phase difference between laser beam portions reflected respectively by the partial reflector and the total reflector disposed behind the partial reflector is an integer multiple of $2\pi$. Since the phase difference between the laser beam portions emitted to the exterior of the stable resonator is thus compensated, it is possible to improve the laser beam quality.

Further, in the forty-first aspect of the present invention, the partial reflector is provided with a phase difference controlling means for controlling a phase difference between laser beam portions reflected respectively by the partial reflector and the reflecting mirror disposed behind the partial reflector. Since the phase difference between the laser beam portions emitted to the exterior of the stable resonator is thus controlled, it is possible to control the laser beam quality.

Further, in the laser system according to the forty-second aspect of the present invention, the coupling mirror is provided with a phase difference compensating means so that a phase difference between laser beam portions reflected respectively by the partial reflector and the reflecting mirror disposed behind the partial reflector is an integer multiple of $2\pi$. Since the phase difference between the laser beam portions emitted to the exterior of the stable resonator is thus compensated, it is possible to improve the laser beam quality.

Further, in the laser system according to the forty-third aspect of the present invention, the coupling mirror is provided with a phase difference controlling means for controlling a phase difference between laser beam portions reflected respectively by the partial reflector and the total reflector disposed behind the partial reflector, in order to control the laser beam quality. Since the phase difference between the laser beam portions emitted to the exterior of the stable resonator is thus controlled, it is possible to control the laser beam quality.

Further, in the laser system according to the forty-fourth aspect of the present invention, a phase difference compensating means is disposed outside the stable resonator so that a phase difference between laser beam portions reflected respectively by the partial reflector and the total reflector disposed behind the partial reflector is an integer multiple of $2\pi$. Since the phase difference between the laser beam portions emitted to the exterior of the resonator is thus compensated, it is possible to improve the laser beam quality.

Further, in the laser system according to the forty-fifth aspect of the present invention, a phase difference controlling means for controlling a phase difference between laser beam portions reflected respectively by the partial reflector and the total reflector disposed behind the partial reflector is disposed outside the stable resonator. Since the phase difference between the laser beam portions emitted to the exterior of the resonator is controlled, it is possible to control the laser beam quality.

Further, in the laser system according to the forty-sixth aspect of the present invention, there is formed an aperture for defining the diameter of laser beam in the stable resonator which beam is conducted to at least one of the partial reflector and the coupling mirror both constituting the resonator, and the diameter of the aperture is set to a value of not larger than four times the diameter of the total reflector, whereby the quality of the laser beam emitted from the resonator can be kept high.

Further, in the laser system according to the forty-seventh aspect of the present invention, there are used a partial reflector and another mirror both constituting a stable resonator, and further used is a ring-shaped mirror inserted into the resonator, and the ring-shaped mirror performs the mode selection on the basis of its inside diameter. In this point there is performed the same function as that of the aperture of a stable resonator in the conventional laser system. In the laser system according to the present invention, however, the inside diameter of the ring-shaped mirror does not restrict the laser pumping space, unlike the aperture in the conventional laser system.

Further, in the laser system according to the forty-eighth aspect of the present invention, the mode selection can be done without restricting the laser pumping space, as in the laser system according to the forty-seventh aspect of the invention.

Further, in the laser system according to the forty-ninth aspect of the present invention, at least one of the partial reflector and another mirror both constituting a stable resonator is provided with a mirror angle adjusting mechanism, whereby it is made possible to correct deviations in the position and direction of the laser beam emitted from the resonator.

Further, in the laser system according to the fiftieth aspect of the present invention, a partial reflector and another mirror are used to constitute a resonator, said another mirror having a curvature changing mechanism, so that it is possible to change the radius of curvature of the total reflector. Therefore, it is possible to freely select a mode of the laser beam generated in the resonator.

Further, in the laser system according to the fifty-first aspect of the present invention, there is formed an aperture for defining the diameter of laser beam in the stable resonator which beam is conducted to at least one of the partial reflector and another mirror both constituting the resonator, and the diameter of the aperture is set to a value of not larger than four times the inside diameter of a ring-shaped mirror, whereby the quality of the laser beam emitted from the resonator can be kept high.

Further, in the laser system according to the fifty-second aspect of the present invention, there are used a partial reflector different in the radius of curvature between its central part and outer peripheral part, and a total reflector which constitutes a stable resonator conjointly with the central part of the partial reflector, and the central part of the partial reflector performs the mode selection. In this point there is performed the same function as that of the aperture of a stable resonator in the conventional laser system. In the laser system according to the present invention, however, the central part of the partial reflector does not restrict the laser pumping space unlike the aperture in the conventional laser system.

Further, in the laser system according to the fifty-third aspect of the present invention, there are used a total reflector different in the radius of curvature between its central part and outer peripheral part, and a partial reflector which constitutes a stable resonator conjointly with the central part of the total reflector, and the central part of the total reflector performs the mode selection. In this point there is performed the same function as that of the aperture of a stable resonator in the conventional laser system. In the laser system according to the present invention, however, the central part of the total reflector does not restrict the laser pumping space unlike the aperture in the conventional laser system.

Further, in the laser system according to the fifty-fourth aspect of the present invention, there are used a partial reflector different in the radius of curvature between its central part and outer peripheral part, and a total reflector, a stable resonator is constituted by the central part of the partial reflector and that of the total reflector, and both the central part of the partial reflector and that of the total reflector perform the mode selection. In this point there is performed the same function as that of the aperture of a stable resonator in the conventional laser system. In the laser system according to the present invention, however, the central part of the partial reflector and that of the total reflector do not restrict the laser pumping space unlike the aperture in the conventional laser system.

Further, in the laser system according to the fifty-fifth aspect of the present invention, at least one of the mirrors constituting a stable resonator is provided with a mirror angle adjusting mechanism, so that it is possible to correct deviations in the position and direction of the laser beam emitted from the resonator.

Further, in the laser system according to the fifty-sixth aspect of the present invention, there is formed an aperture for defining the diameter of laser beam in a stable resonator which beam is conducted to at least one of the mirrors constituting the resonator, and the diameter of the aperture is set to a value of not larger than four times the diameter of the central part of the mirror located near the aperture, whereby the quality of the laser beam emitted from the resonator can be kept high.

Further, in the laser system according to the fifty-seventh aspect of the present invention, there are used a stable resonator as a laser beam generating stage and a laser beam amplifying stage for amplifying the laser beam emitted from the laser beam generating stage. The laser beam which has been conducted into the laser beam amplifying stage is amplified by a laser medium in the amplifying stage and results in a large output laser beam.

Further, in the laser system according to the fifty-eighth aspect of the present invention, there are used a plurality of laser beam amplifying stages. The laser beam which has been conducted into the laser beam amplifying stages is amplified by a laser medium in each amplifying stage and results in a large output laser beam.

Further, in the laser system according to the fifty-ninth aspect of the present invention, which is used in a discharge-excited gas laser system, a surface having a predetermined inclination angle of the coupling mirror which constitutes a stable resonator, the surface being formed on the side opposite to the resonator constituting side of the coupling mirror, and sections of discharge electrodes disposed opposedly to each other in the resonator, are present in different planes, whereby the quality of the laser beam emitted from the resonator can be kept high.

Further, in the laser system according to the sixtieth aspect of the present invention, which is used in a discharge-excited gas laser system, two or more sets of discharge electrodes are disposed within the laser system in such a manner that one set of discharge electrodes are in a 90°-turned position with respect to another set of discharge electrodes. Consequently, the laser beam emitted from the stable resonator has an extremely good symmetry.

Further, in the laser system according to the sixty-first aspect of the present invention, the laser system is used in a gas laser system the gas flowing direction and the optical axis of the stable resonator are orthogonal to each other. This construction permits the laser beam emitted from the resonator to have an extremely good symmetry.

Further, in the laser system according to the sixty-second aspect of the present invention, a gas downstream end in a discharge-exciting portion and a laser beam downstream end are approximately coincident with each other. Consequently, the laser beam emitted from the stable resonator has an extremely good symmetry.

Further, in the laser system according to the sixty-third aspect of the present invention, the flow of gas is reversed within the stable resonator, so that the laser beam emitted from the resonator has an extremely good symmetry.

Further, in the laser system according to the sixty-fourth aspect of the present invention, the laser beam is turned back in ⊃ shape in the gas flowing direction, so that the laser beam emitted from the stable resonator has an extremely good symmetry.

Further, in the laser system according to the sixty-fifth aspect of the present invention, the laser system is used in a laser processing equipment in which the laser beam generated from the laser system is transmitted and directed to a workpiece. Consequently, the workpiece can be processed with a large output laser beam of a large diameter superior in converging property.

Further, in the laser system according to the sixty-sixth aspect of the present invention, the laser system is used in a discharge-excited gas laser system in which electric discharge is created between electrodes to pump laser gas in the resonator.

Further, in the laser system according to the sixty-seventh aspect of the present invention, the laser system is used in a discharge-excited $CO_2$ laser system in which laser gas is optically pumped in the resonator by inducing electric discharge between electrodes, as in the gas laser system according to the sixty-sixth aspect of the present invention.

Further, in the laser system according to the sixty-eighth aspect of the present invention, the laser system is used in a metal vapor laser system in which a $TEM_{00}$ mode laser beam of a large cross sectional area can be obtained by selecting an appropriate diameter of a partially reflecting portion of a coupling mirror.

Further, in the laser system according to the sixty-ninth aspect of the present invention, the laser system is used in a solid-state laser system in which a solid-state element is excited by light to form a laser medium.

Further, in the laser system according to the seventieth aspect of the present invention, the laser system is used in a solid-state laser system in which at least one of a Q-switch element and a wavelength changing element is disposed within a resonator used in the solid-state laser system, whereby there can be obtained a laser beam of a large peak output and an efficient wavelength change can be realized.

Further, in the laser system according to the seventy-first aspect of the present invention, the laser system is used in a semiconductor laser system which selects an appropriate diameter of a partially reflecting portion of a coupling mirror, thereby permitting a laser beam of a large sectional area and a single $TEM_{00}$ mode to be obtained.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIGS. 17(a) and 17(b) are views each explanatory of a phase difference compensating method in embodiment 5 of the invention;

FIG. 18 is a view explanatory of a phase difference compensating method in embodiment 5 of the invention;

FIG. 20 is a sectional view showing embodiment 7 of the invention;

FIG. 21 is a sectional view showing embodiment 8 of the invention;

FIG. 22 is a sectional view showing embodiment 8 of the invention;

FIG. 23 is a diagram showing changes of beam quality in embodiment 9 of the invention;

FIG. 24 is a sectional view of mirrors in embodiment 10 of the invention;

FIG. 25 is a sectional view of mirrors in embodiment 10 of the invention;

FIG. 26 is a sectional view of mirrors in embodiment 10 of the invention;

FIGS. 39(a) and 39(b) are each a top view of a mirror in embodiment 15 of the invention;

FIG. 40 is an explanatory view showing changes of beam quality in embodiment 16 of the invention;

FIG. 59 is a sectional view showing embodiment 30 of the invention;

FIG. 60 is a sectional view showing embodiment 30 of the invention;

FIG. 69 is a sectional view showing embodiment 35 of the invention;

FIG. 70 is a sectional view showing embodiment 35 of the invention;

FIG. 76 is a sectional view showing embodiment 40 of the invention;

FIG. 77 is a sectional view showing embodiment 40 of the invention;

FIG. 78 is a sectional view showing embodiment 41 of the invention;

FIGS. 110(a) and 110(b) are a sectional view and a top view, showing embodiment 66 of the invention;

FIG. 111(a) is an intensity distribution diagram of laser beam emitted from the laser system of embodiment 66 in the invention;

FIG. 111(b) is an intensity distribution diagram of laser beam emitted from a conventional laser system;

FIG. 116 is a gain distribution diagram in a gas flowing direction in the laser pumping space of the conventional laser system;

FIG. 117 is a sectional view in which an optical resonator according to the present invention is applied to a conventional laser system with gas flow and optical axis perpendicularly intersecting each other;

FIG. 118 is a sectional view of a laser beam which is outputted in the construction illustrated in FIG. 117;

FIG. 119 is as a sectional view showing a laser pumping space in embodiment 68 of the invention;

FIG. 120 is a top view showing embodiment 69 of the invention;

Figure 121A:
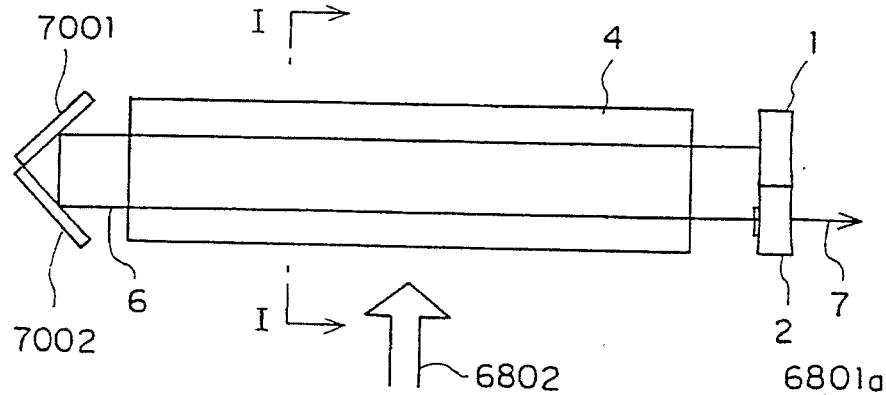
Figure 121B:
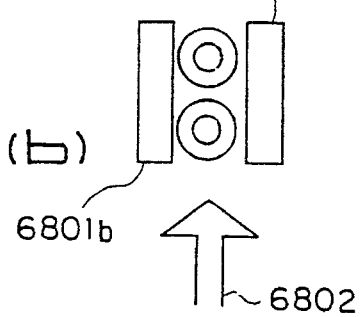

FIGS. 121(a) and 121(b) are a side view and a sectional view, showing embodiment 70 of the invention; and FIG. 122 is an entire view showing embodiment 71 of the invention.

DETAILED DESCRIPTION OF THE PREFERRED EMBODIMENTS

Figure 1:
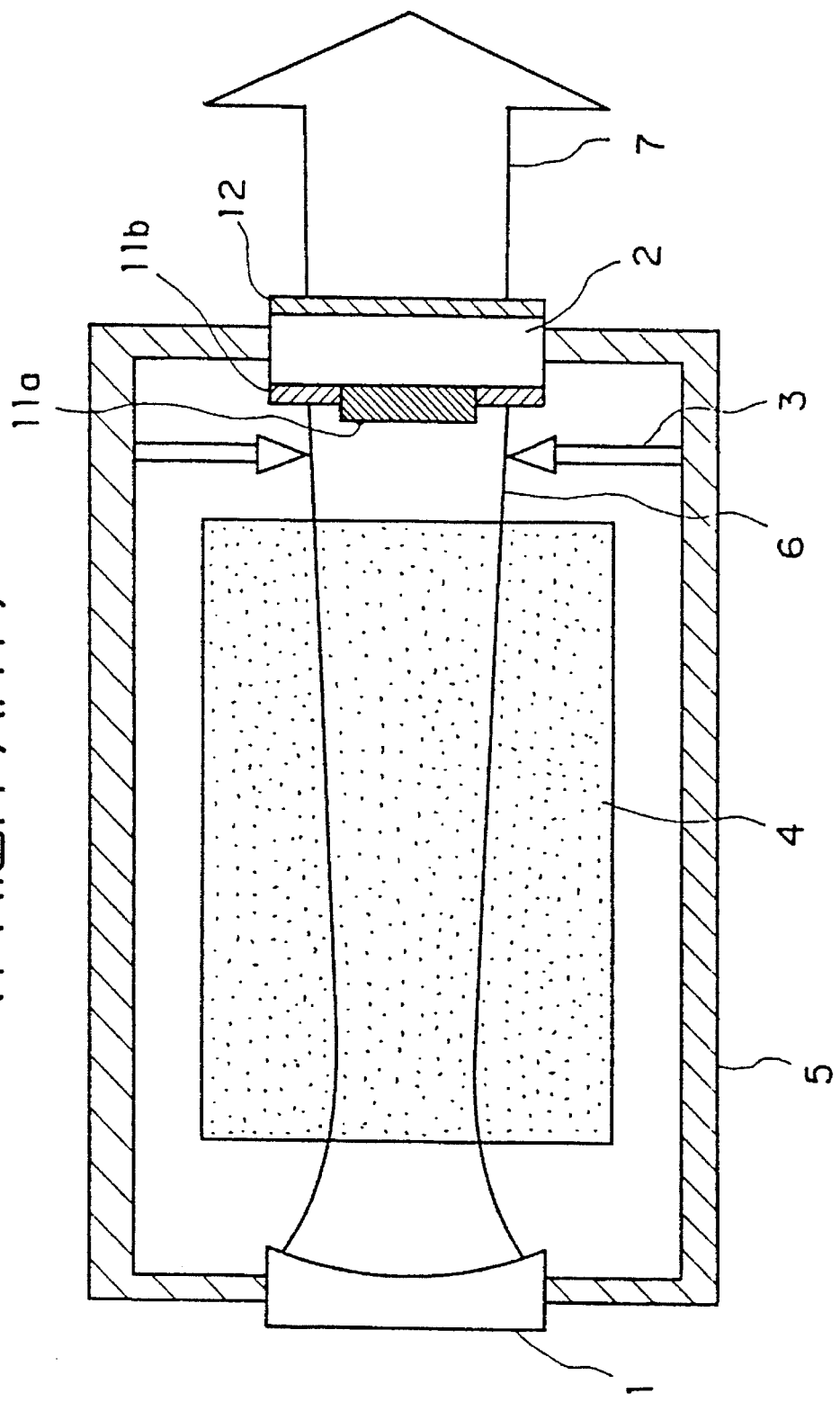
FIG. 1 is a sectional view showing a conventional laser system.

Preferred embodiments of the invention will now be described in detail referring to the accompanying drawings, in which the component parts common to FIG. 1 are designated by common reference numerals. The descriptions of the common component parts are omitted here to avoid unnecessary repetition.

Embodiment 1

Figure 2:
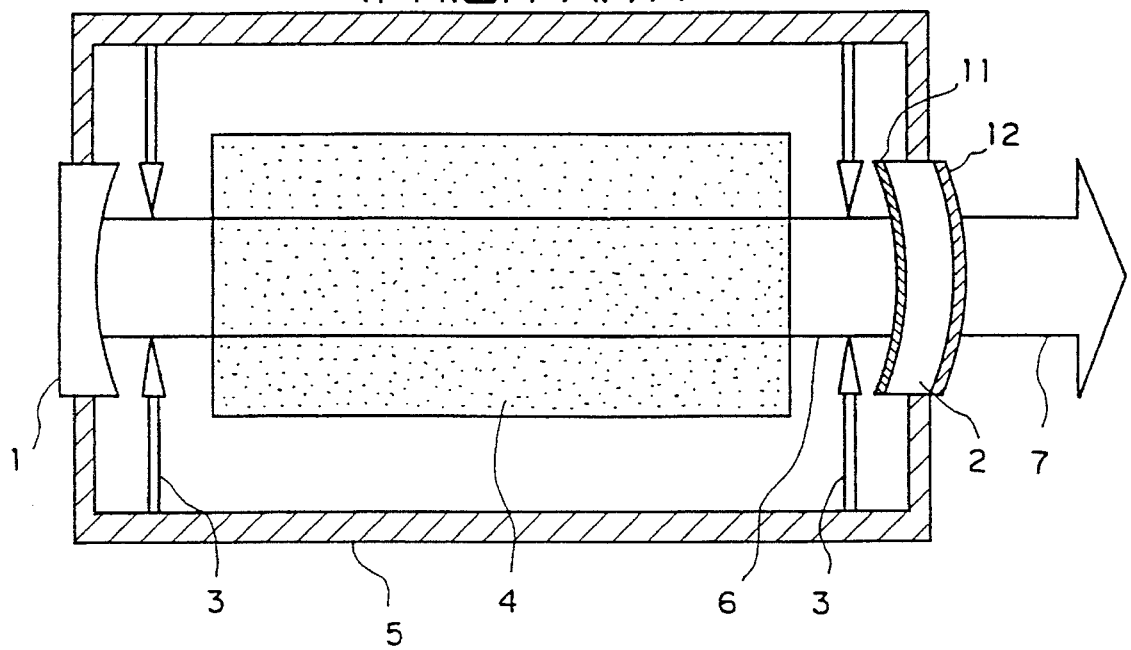
FIG. 2 is a sectional view showing a conventional laser system.
Figure 3:
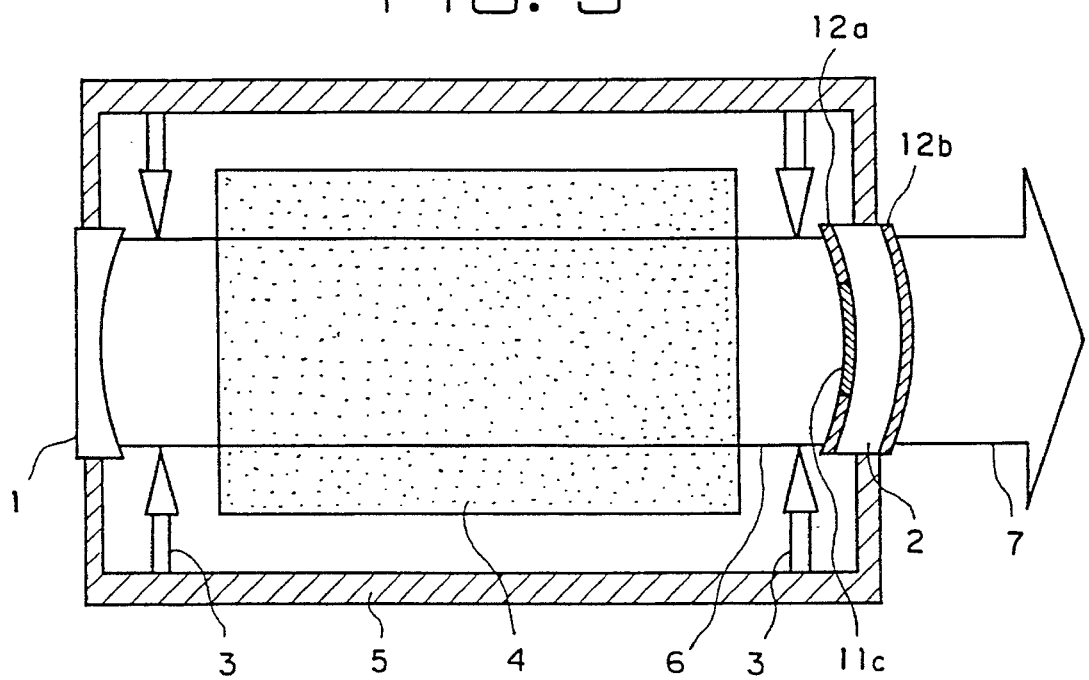
FIG. 3 is a sectional view showing embodiment 1 of the present invention.

An embodiment of the present invention will now be described. FIG. 3 is a sectional view showing embodiment 1 of the present invention. In the same figure, the reference numerals 1 to 7 represent portions which are the same as or similar to the corresponding portions in the conventional laser system illustrated in FIG. 2, so are indicated by the same reference numerals to omit explanation. The numeral 11c in FIG. 3 denotes a partial reflection film formed on a surface of a coupling mirror 2 which surface is opposed to a total reflector 1. The partial reflection film 11c performs the mode selection in a resonator and causes a laser beam to be emitted to the exterior of the resonator. Numeral 12a denotes a ring-shaped antireflecting film formed on the opposed surface to the total reflector 1 of the coupling mirror 2 in a surrounding relation to the partial reflection film (partially reflecting portion) 11c, and numeral 12b denotes an antireflecting film (non-reflecting portion) formed on a surface of the coupling mirror 2 on the side opposite to the partial reflection film 11c.

The operation of the laser system of this embodiment 1 will now be described. This laser system operates in almost the same manner as the conventional laser system, but is different in that the partial reflection film 11c of the coupling mirror 2 performs the mode selection in the resonator. When the applied power, or laser gain, is low, the mode selection by the partial reflection film 11c is performed in about the same way as in the mode selection by the aperture 3 in the conventional stable resonator. However, when the applied power is high, that is, when the laser gain is high, the aperture 3 in the conventional laser system performs both mode selection and restriction of the laser pumping space at a time, like the case where the laser gain is low, whereas the partial reflection film 11c in embodiment 1 of the present invention performs only the mode selection and does not restrict the laser pumping space. Further, in the conventional laser system, the outer peripheral portion of the laser beam is cut off by the aperture, thus resulting in deteriorated quality of the laser beam 7. On the other hand, in the laser system of embodiment 1, the outer peripheral portion of the laser beam 6 is not cut off, so the deterioration in quality of the laser beam 7 is prevented.

Now, with reference to FIGS. 4(a), 4(b), 5(a) and 5(b), the operation of the laser system of embodiment 1 and that of the conventional laser system will be described below with respect to the case where the laser gain is low and the case where it is high.

Figure 4A:
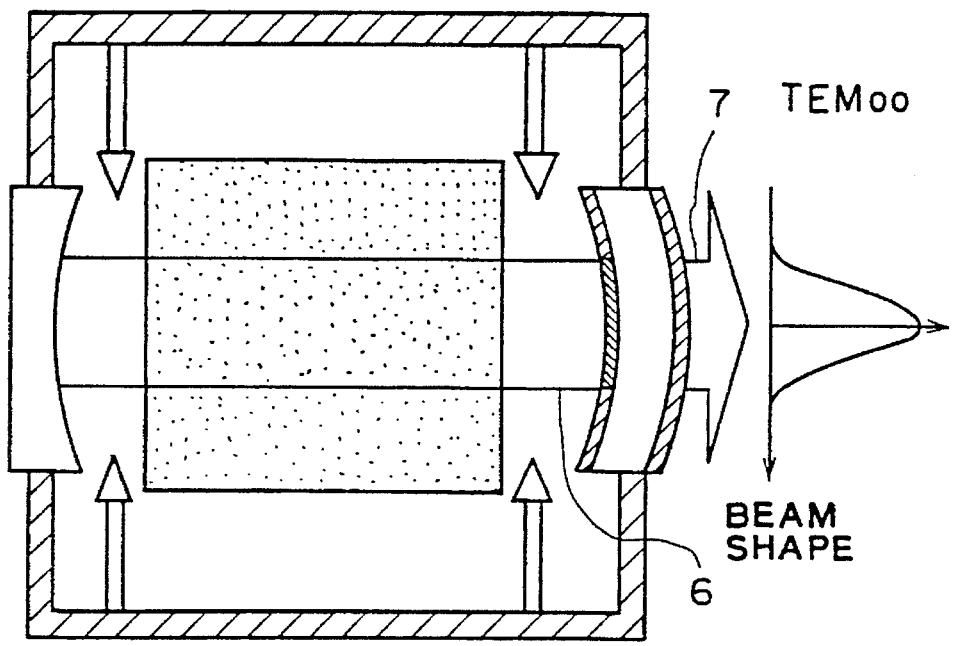
FIG. 4(a) is a view showing a state of laser beam in a low laser gain in embodiment 1 of the invention.
Figure 4B:
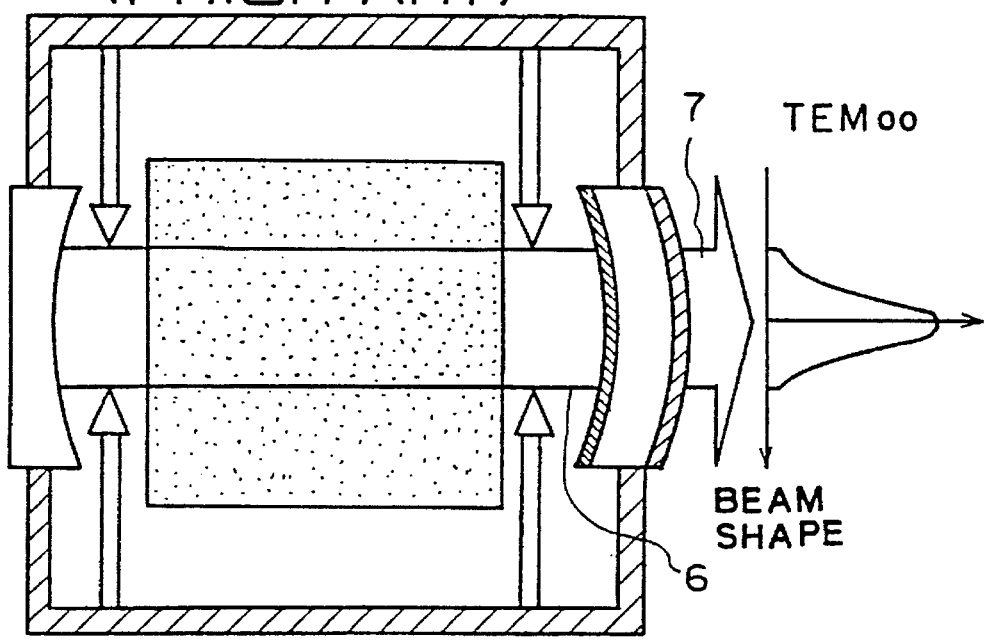
FIG. 4(b) is a view showing a state of laser beam in a low laser gain in a conventional laser system.

It is now assumed that $TEM_{00}$ mode is to be generated in the resonator. FIGS. 4(a) and 4(b) respectively show the state of laser beam 6 in the resonator of the laser system according to embodiment 1 of the present invention and that of the laser beam 6 in the resonator of the conventional laser system, in the case where the laser gain is low, while FIGS. 5(a) and 5(b) illustrate the states of laser beam 6 in the resonators of the embodiment laser system and the conventional laser system, respectively, in the case where the laser gain is high.

First, when the laser gain is low, the laser beam 6 in the laser system of embodiment 1 illustrated in FIG. 4(a) is almost concentrated on an optical path of beam which is determined by the radius of curvature of the mirrors 1, 2 and the resonator length, so that the laser beam is amplified by only the laser gain in the optical path. Therefore, the shape of the laser beam emitted from the coupling mirror 2 is approximately the same as that of the laser beam in the conventional laser system.

Figure 5A:
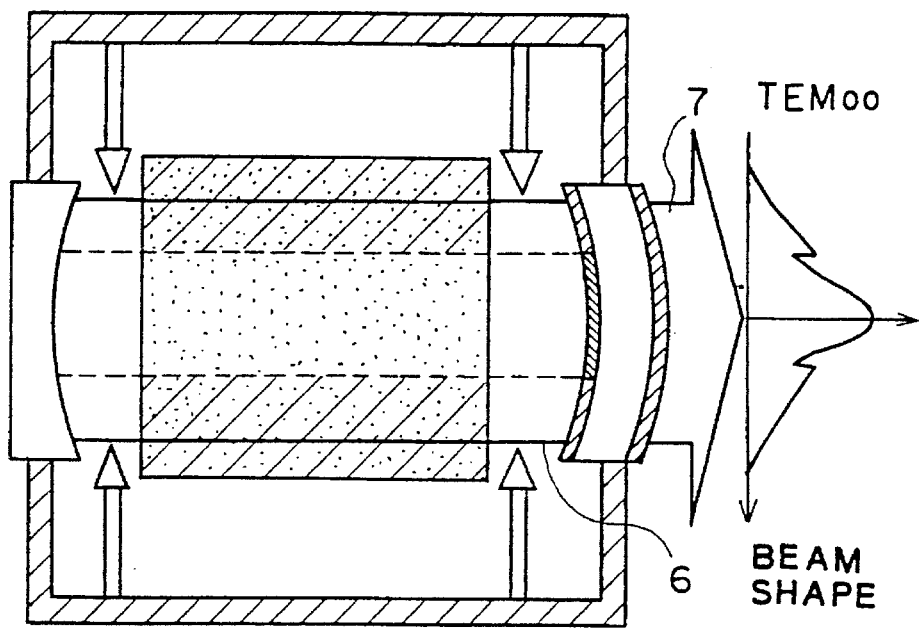
FIG. 5(a) is view showing a state of laser beam in a high laser gain in embodiment 1 of the invention.
Figure 5B:
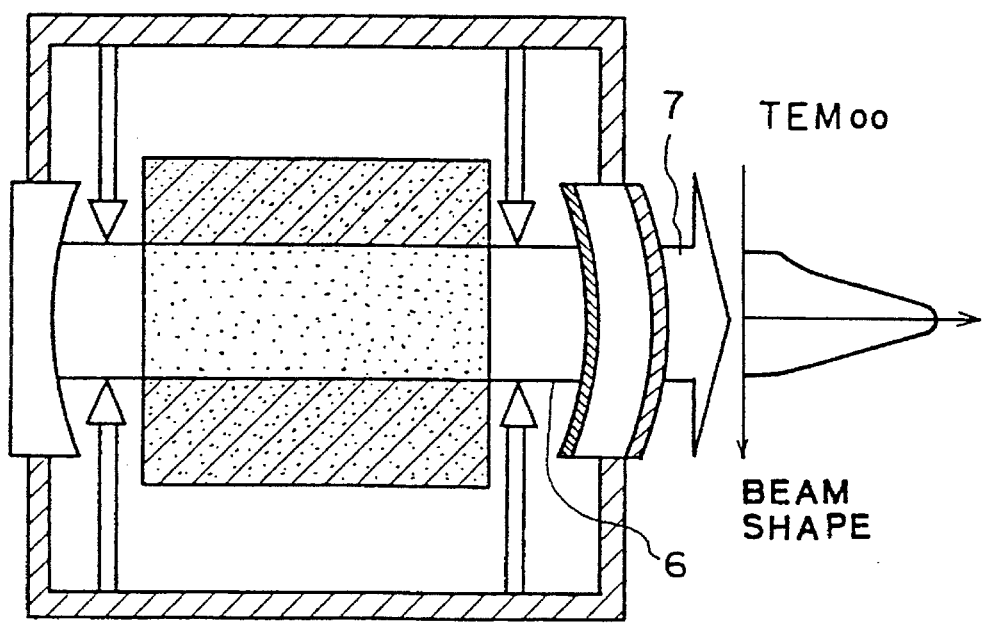
FIG. 5(b) is a view showing a state of laser beam in a high laser gain in a conventional laser system.

On the other hand, when the laser gain is high, the aperture 3 in the conventional laser system performs the mode selection and at the same time restricts the laser pumping space, as shown in FIG. 5(b). Consequently, like the case where the laser gain is low, the laser beam 6 present in the resonator is amplified by the laser gain in the beam optical path. In this case, even if the pumping range in the conventional laser system includes the hatched area shown in FIG. 5(b), the laser gain in this area is completely wasteful because it is not used at all. For increasing the laser output in the conventional laser system, therefore, it is necessary that the laser beam 6 be amplified by only the gain in the beam optical path which is determined by the resonator construction.

When a high laser gain is created in the laser system of embodiment 1, the laser gain in the hatched area shown in FIG. 5(a) can be used for the amplification of diffraction beam. More particularly, although the laser beam 6 in the resonator reciprocates through the optical path determined by the resonator construction, there also exists a laser beam deviated from the optical path. At a low laser gain, the diffraction beam deviated from the optical path leaves the resonator prior to be largely amplified, so no problem arises. But in an ordinary laser system, for example, in a laser system of a high laser gain used in a laser processing machine, diffraction beam is largely amplified during one round trip through the resonator. Although this largely amplified diffraction beam mostly leaves the resonator after one round trip through the resonator, a portion thereof reaches the interior of the partial reflection film 11c of the coupling mirror. This diffraction beam again propagates through the interior of the resonator and greatly contributes to the formation of a mode present in the resonator. The laser beam 6 obtained in the laser system of embodiment 1, as shown in FIG. 5(a), is emitted at $TEM_{00}$ mode having a large cross sectional area by both a partially transmitted light through the partial reflection film 11c of the coupling mirror 2 and a transmitted light from the antireflecting film 12a of the same mirror, so it is possible to increase the laser output.

On the other hand, in the case of the conventional laser system, the diffraction beam is amplified by the high laser gain of the hatched area shown in FIG. 5(b), but is intercepted by apertures 3, 3 located inside and close to the coupling mirror and the total reflector; besides, the diameter of the laser beam is determined by the diameter of the apertures 3, 3. Therefore, it is impossible to extract the laser beam at $TEM_{00}$ mode of a large cross sectional area.

Thus, in the laser system of embodiment 1, the partial reflection film 11c of the coupling mirror 2 selects a mode present in the resonator, and a high laser gain portion which has been removed in the conventional resonator can be used effectively in amplifying the laser beam 6. As a result, it became possible to extract a laser beam at $TEM_{00}$ mode of a cross sectional area larger than the beam diameter determined by the resonator construction, which has heretofore been impossible.

As to the laser beam 6 of a large cross sectional area, an increase of the laser output can be attained, and it turned out as a result of experiment that an on-axis intensity of the laser beam 6 at the time of emission from the resonator became lower than that of a laser beam of the same output obtained from the conventional resonator. This coincides with calculation. Upon lowering in the on-axis intensity of the laser beam 6, the influence of intensity on the partial reflection film 11c of the coupling mirror 2 becomes lower, so it is possible to generate a stabler laser beam also in view of the light-resisting strength of the coupling mirror 2.

When the generation of a $TEM_{00}$ mode laser beam was tried using the stable resonator in the laser system of embodiment 1, it was possible to generate a laser beam of 6 kW output having an outer diameter of 30 mm.

Embodiment 2

Figure 6:
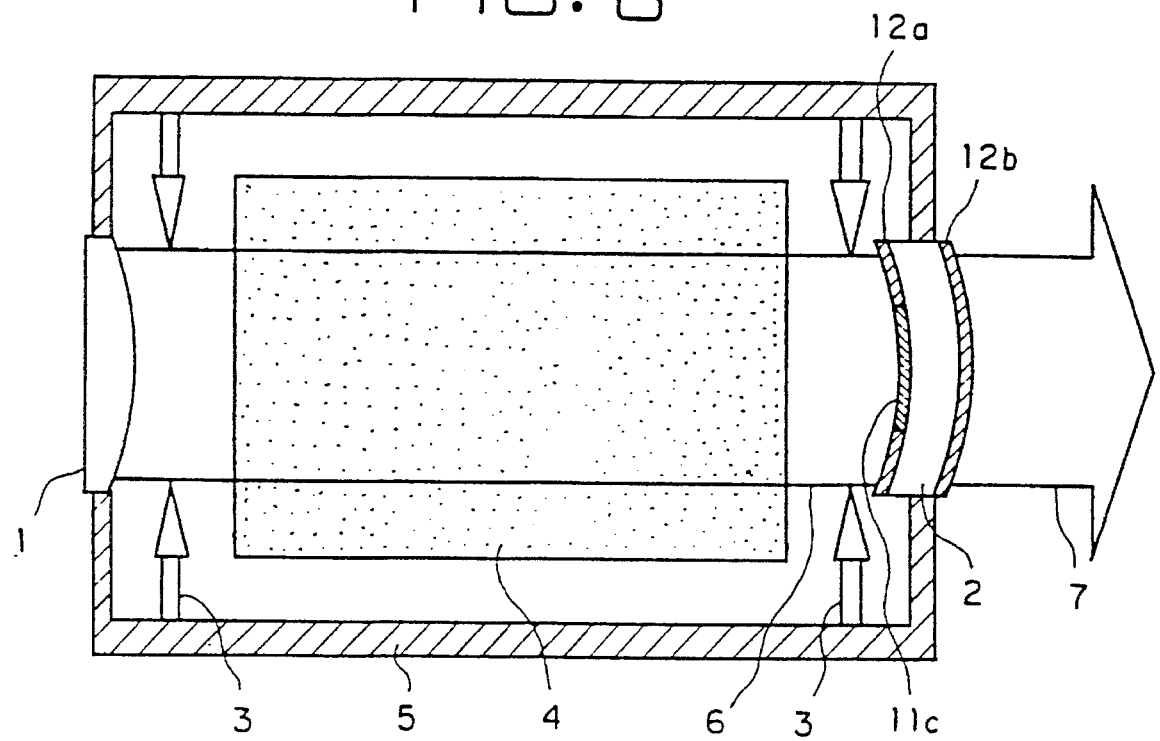
FIG. 6 is a sectional view showing embodiment 2 of the present invention.
Figure 7:
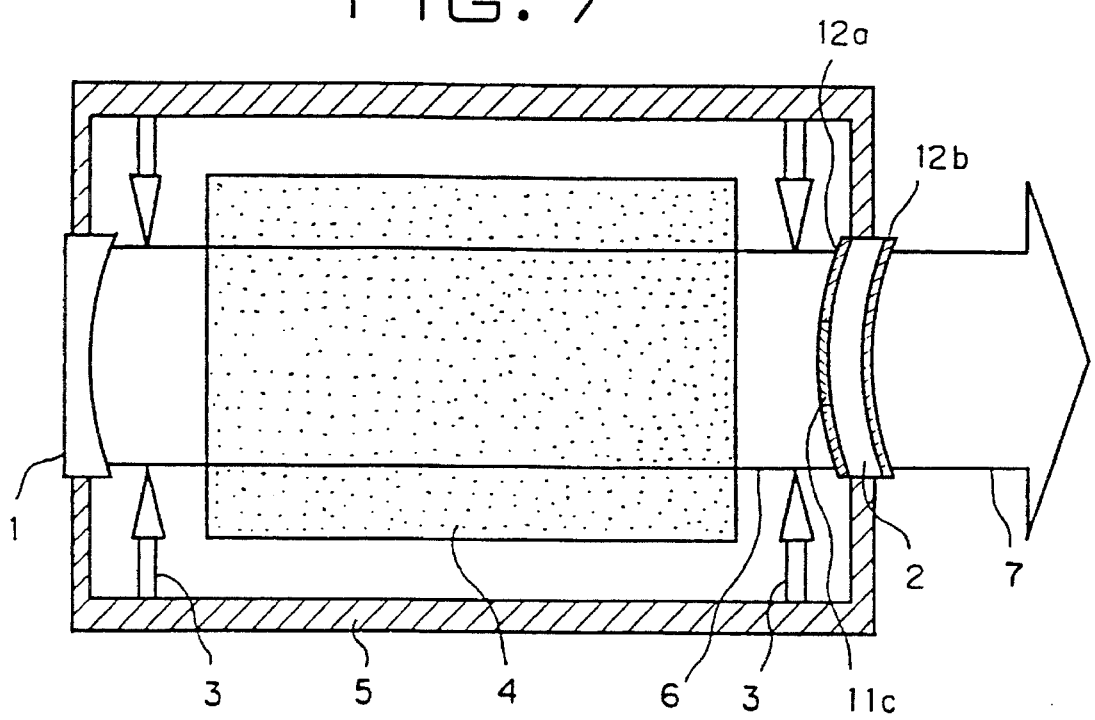
FIG. 7 is a sectional view showing embodiment 2 of the invention.

Although in the above embodiment 1 the curvature shapes of the resonator constituting mirrors 1 and 2 were both concave, one of the mirrors 1 and 2 may be convex, as shown in FIGS. 6 and 7. More specifically, desired shapes of the mirrors 1 and 2 can be selected if the resonator length L and the radii of curvature, $R_1$, $R_2$ of the mirrors 1 and 2 satisfy the following relationship (1):

$$0 < (1 - L/R_1)(1 - L/R_2) < 1 \tag{1}$$

Embodiment 3

Figure 8:
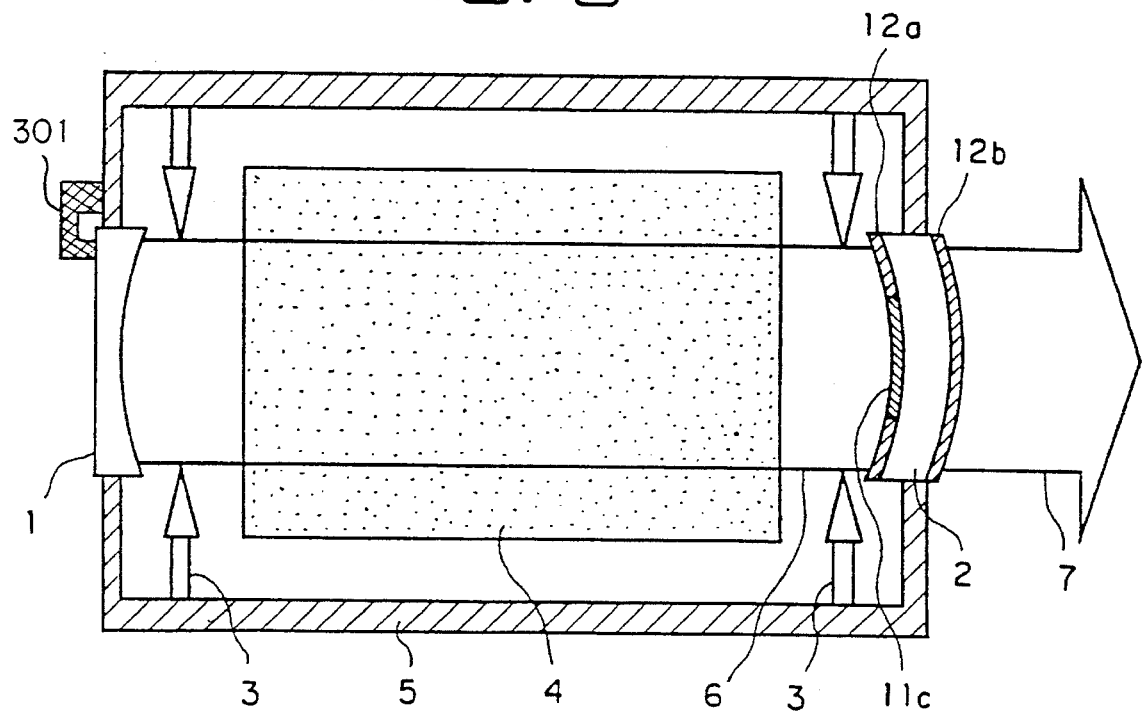
FIG. 8 is a sectional view showing embodiment 3 of the invention.
Figure 9:
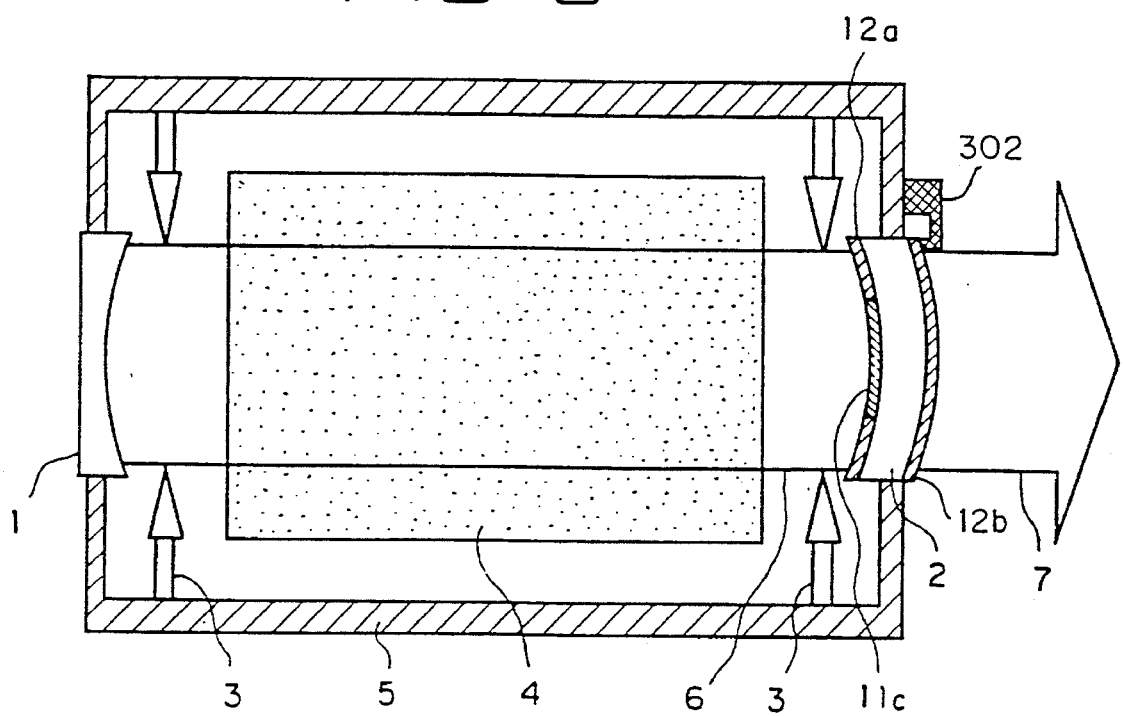
FIG. 9 is a sectional view showing embodiment 3 of the invention.
Figure 10:
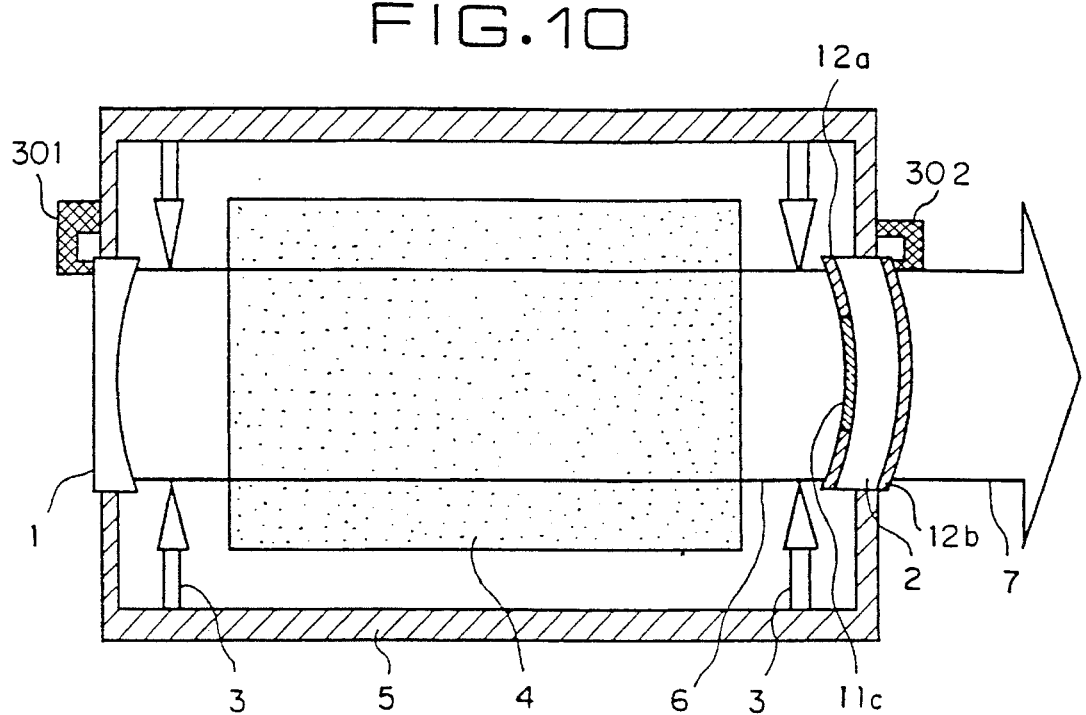
FIG. 10 is a sectional view showing embodiment 3 of the invention.

Although in the foregoing embodiment 1 neither of the resonator constituting mirrors 1 and 2 is provided with a mirror angle adjusting mechanism, at least one of the mirrors 1 and 2 may be provided with a mirror angle adjusting mechanism 301 or 302, as shown in FIGS. 8 to 10, whereby in a laser system wherein the position and direction of emitted laser beam 7 are deviated with increase of applied power, it is possible to correct such positional and directional deviations. Since it is possible to correct deviations in the position and direction of emitted laser beam 7 by operating the mirror angle adjusting mechanism 301 or 302 in response to an increase of applied power, it is possible to obtain a laser system extremely superior in the stability of beam.

Embodiment 4

Figure 12:
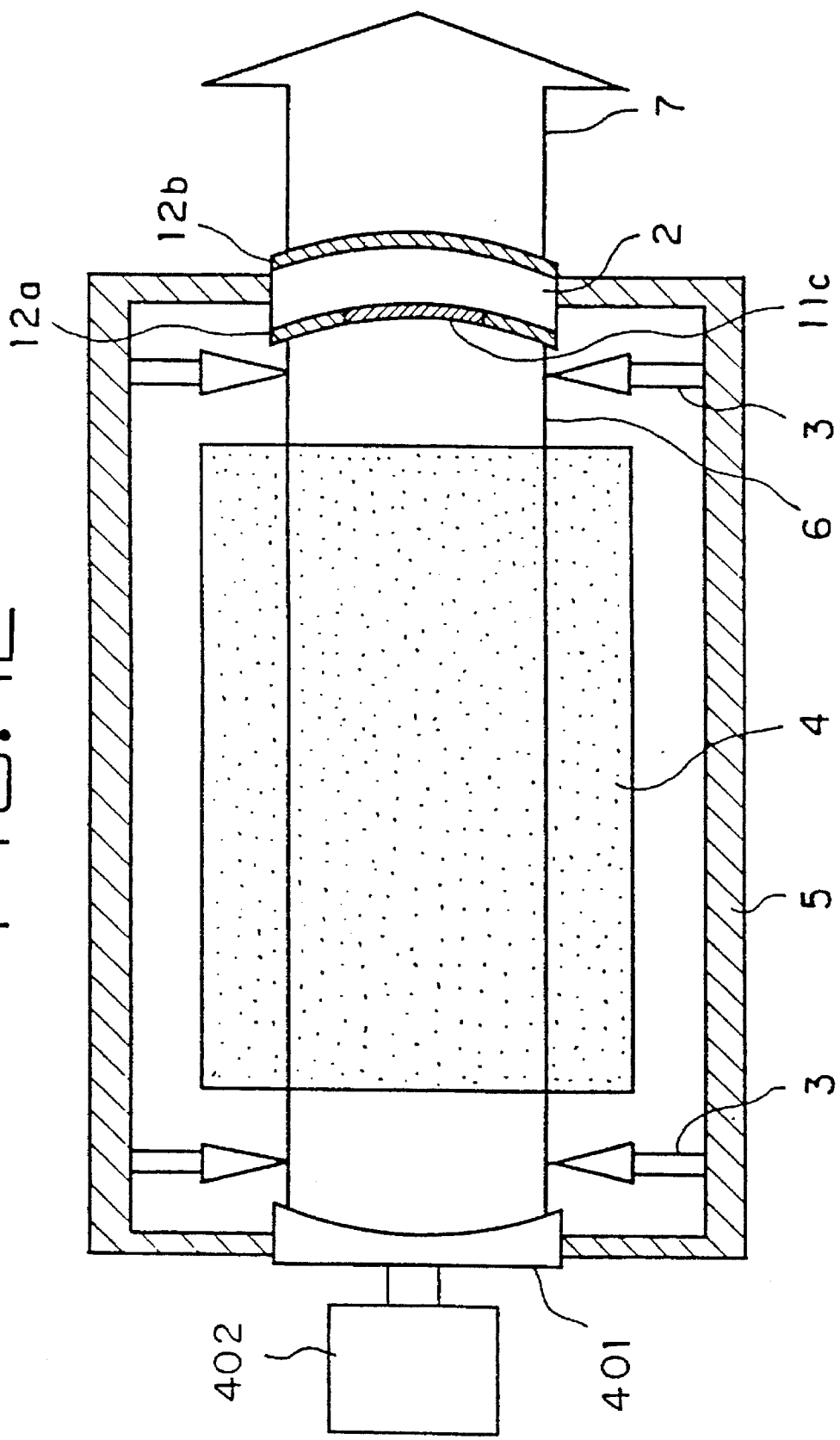
FIG. 12 is a view explanatory of a phase difference compensating method in embodiment 4 of the invention.

Although in the foregoing embodiment 1 there was used a total reflector having a fixed radius of curvature as the mirror 1 constituting the resonator, a mirror 401 provided with a curvature changing mechanism 402 may be used in place of the total reflector 1, as shown in FIG. 12. In this case, a desired mode of laser beam generated in the resonator can be selected by changing the radius of curvature of the mirror 401, using the curvature changing mechanism 402.

Embodiment 5

In the foregoing embodiment 1, when the laser beam 7 is extracted from the coupling mirror 2, it is emitted to the exterior of the resonator through the coupling mirror 2 and the antireflecting film 12b while having the phase difference generated between the partial reflection film 11c and the antireflecting film 12a. However, as shown in FIG. 11 which illustrates embodiment 5, it is also possible to improve the quality of the laser beam 7 by using a phase difference compensating means (stepped portion 20) for compensating for the phase difference between the partial reflection film 11c and the antireflecting film 12a of the coupling mirror 2.

Figure 13A:
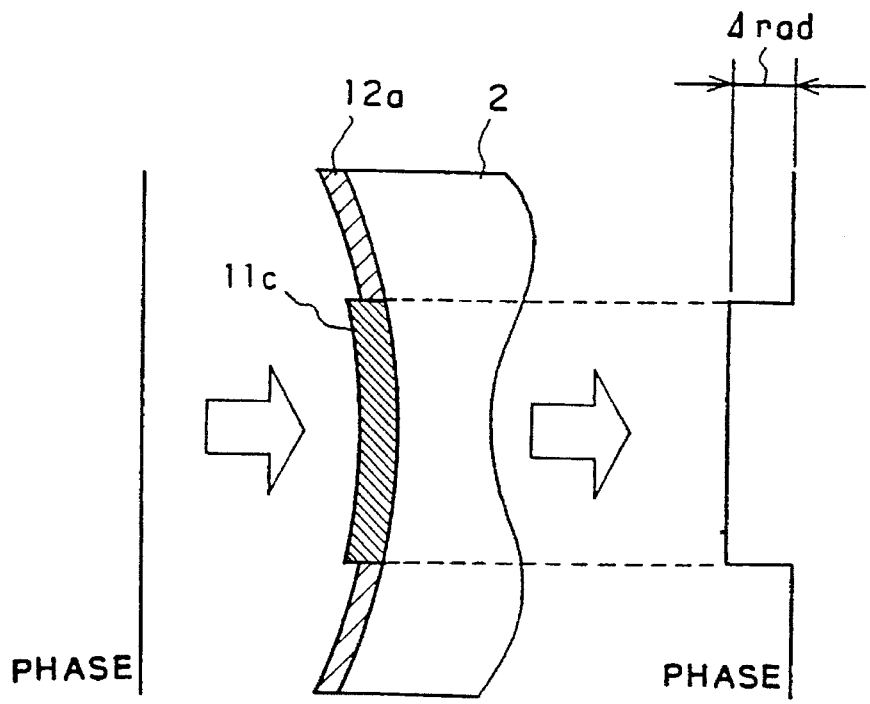
FIGS. 13(a) and 13(b) are diagrams showing phase changes of laser beam in embodiment 5 of the invention.
Figure 13B:
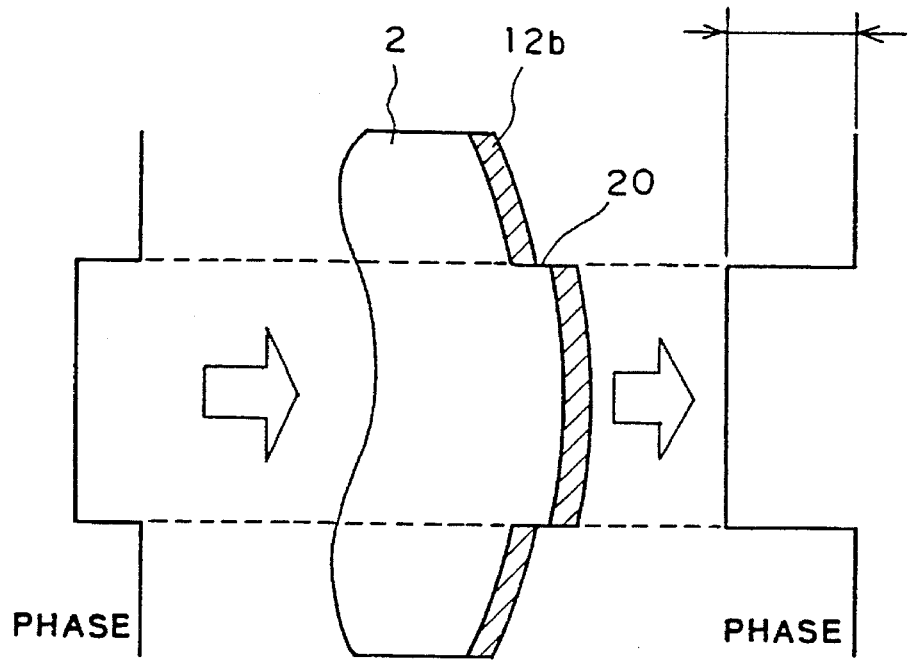
Figure 14A:
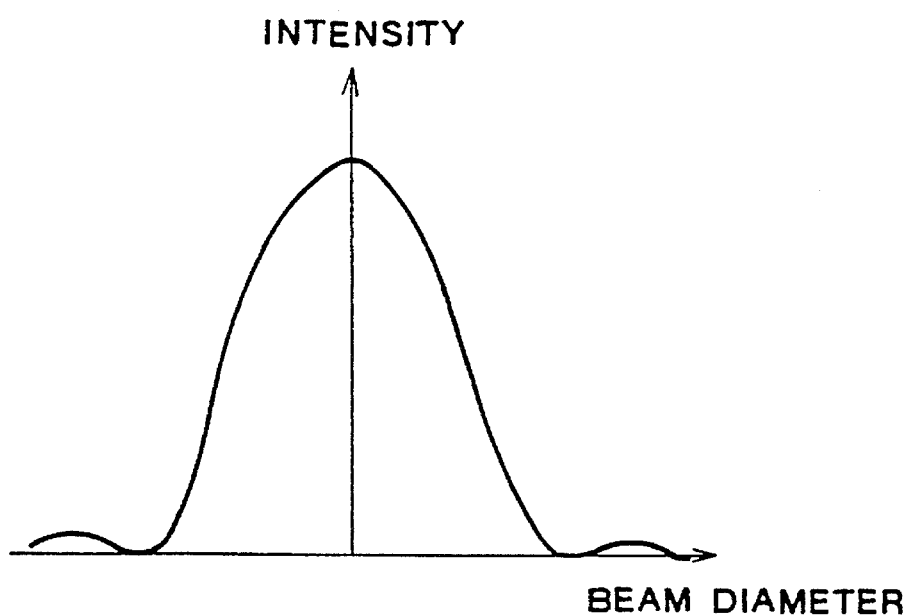
FIGS. 14(a) and 14(b) are intensity distribution diagrams of laser beam in embodiment 5 of the invention.
Figure 14B:
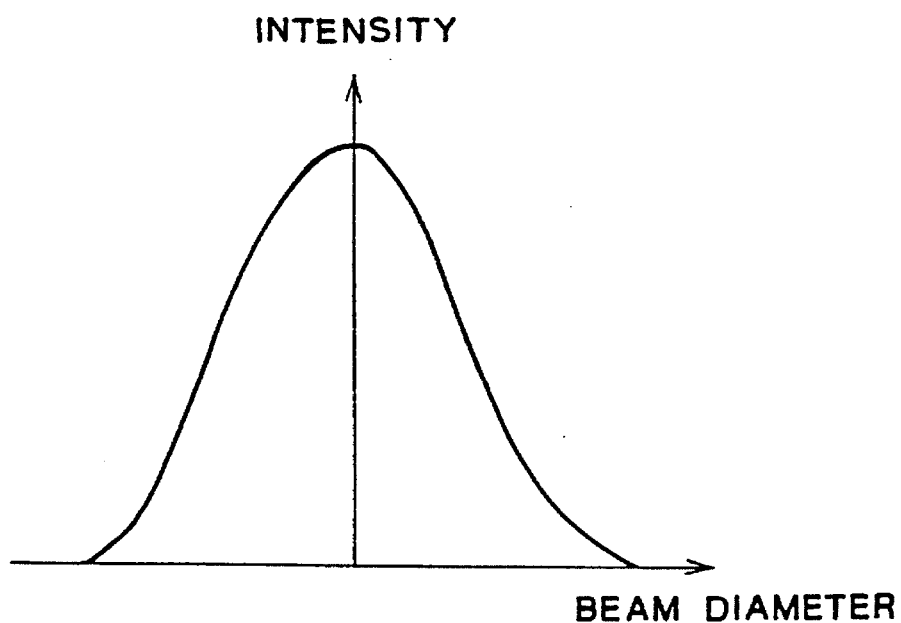

The operation of this embodiment will now be described. When the laser beam 7 passes through the partial reflection film 11c and the antireflecting film 12a of the coupling mirror 2, it comes to have a phase difference $\Delta$ (rad) induced by the difference in construction between those two films, as shown in FIG. 13(a). If the laser beam 7 having such phase difference $\Delta$ is converged through a lens for example, it exhibits a distribution having side lobes as shown in FIG. 14(a), and generally in the case where the phase difference is larger than $\pi/4$ (rad), the quality of the laser beam is deteriorated. The stepped portion 20 is formed for preventing this qualitative deterioration. In this embodiment 5, the thickness of ZnSe of the stepped portion 20 shown in FIG. 13(b) is set so that the phase difference $\Delta$ is an integer multiple of $2\pi$, whereby the phase difference $\Delta$ is compensated and the laser beam 7 generally becomes a surface wave. If this laser beam 7 is converged by means of a laser for example, its intensity distribution becomes a near-Gaussian distribution not having a side lobe, as shown in FIG. 14(b), thus leading to the improvement in quality of the laser beam. The same effect can be obtained even when the phase difference $\Delta$ is in the range of an integer multiple of $2\pi \pm \pi/4$ (rad).

Figure 11:
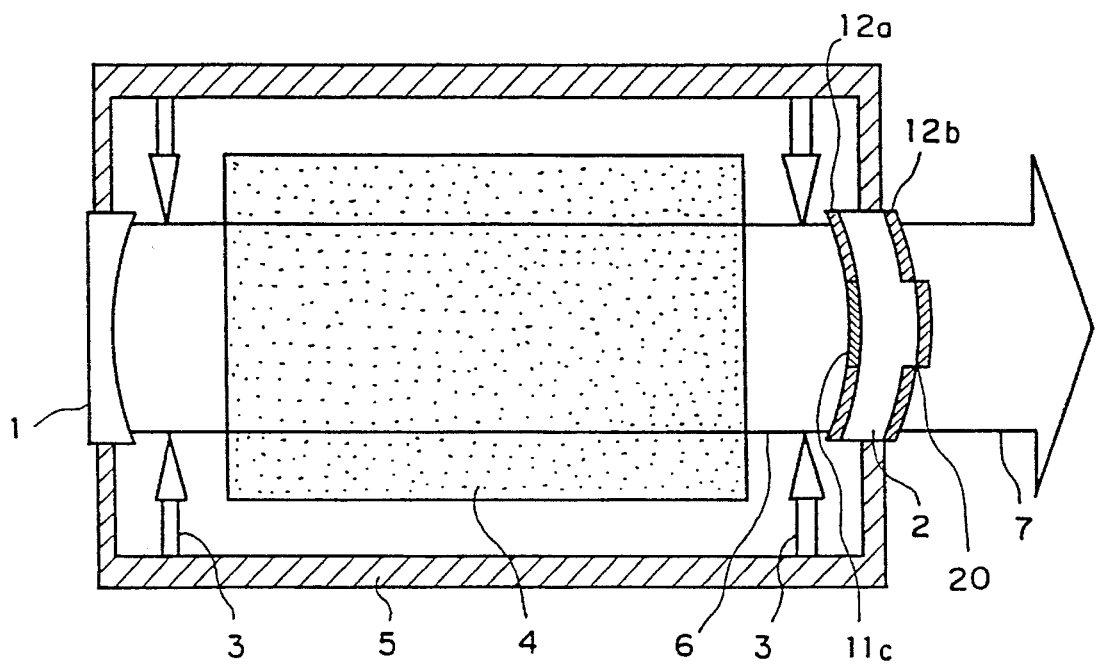
FIG. 11 is a sectional view showing embodiment 5 of the invention.
Figure 15A:
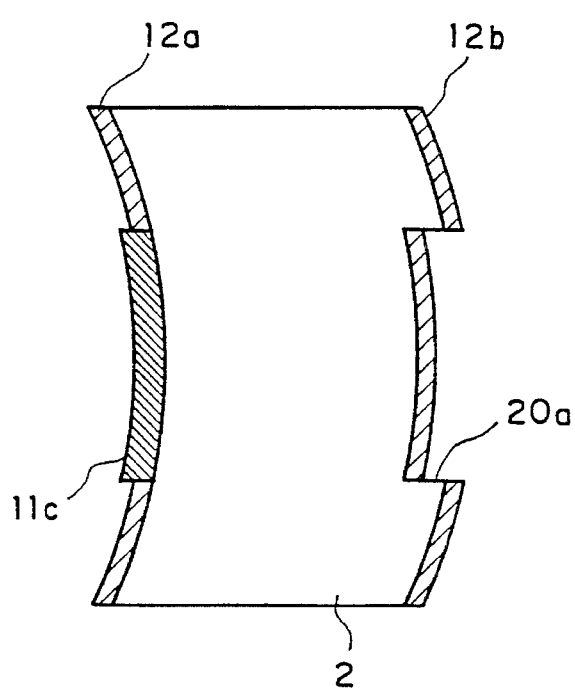
FIGS. 15(a) and 15(b) are views each explanatory of a phase difference compensating method in embodiment 5 of the invention.
Figure 15B:
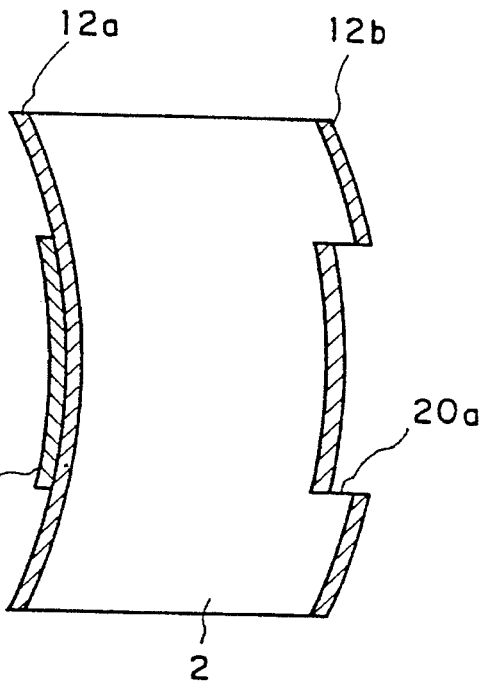

The phase difference compensating means is not limited to the stepped portion 20 shown in FIGS. 11 and 13(b). For example, a stepped portion 20a may be formed by cutting the surface of the coupling mirror 2 opposite to the surface thereof where the partial reflection film 11c or a thin film 19 which will be described later is formed, as shown in FIGS. 15(a) and 15(b), in such a manner that the phase difference $\Delta$ is an integer multiple of $2\pi$. Also in this case, the same effect as above can be expected.

FIGS. 15(a) and 15(b) are different in that in FIG. 15(a), the partial reflection film 11c and the antireflecting film 12a are each independently provided in the coupling mirror 2, whereas in FIG. 15(b), a thin film 19 is vapor-deposited on the antireflecting film 12a to impart a central reflectivity to the central part of the coupling mirror 2. This difference between the two is a mere difference in construction between the partial reflection films, so hereinafter both will be described merely as partial reflection films and be treated as the same films, with no reference to the difference in construction between the two.

Figure 16A:
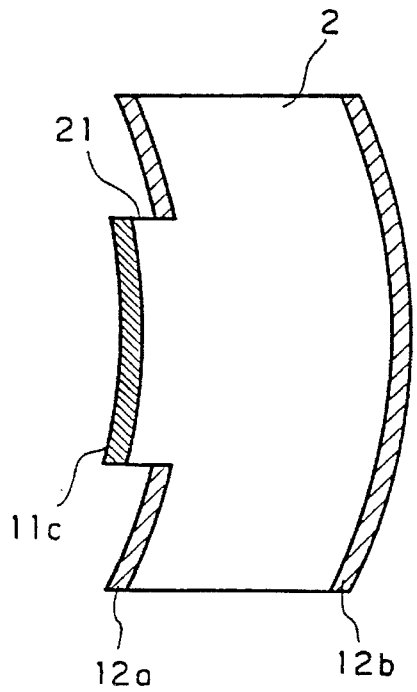
FIGS. 16(a) and 16(b) are views each explanatory of a phase difference compensating method in embodiment 5 of the invention.
Figure 16B:
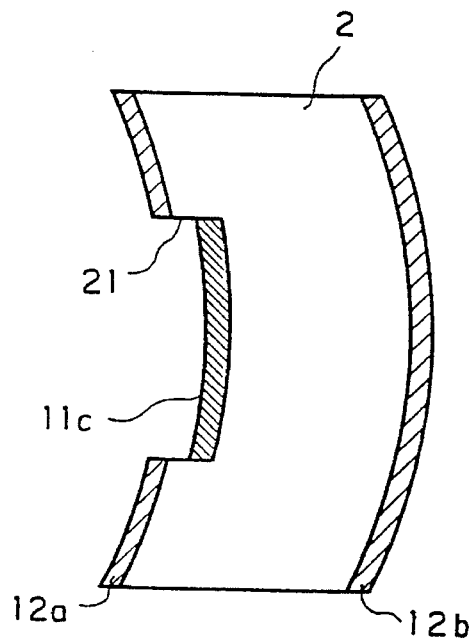

The phase difference compensating means are not limited to the stepped portions (phase difference compensating means) 20 and 20a shown above. As shown in FIGS. 16(a) and 16(b), a stepped portion 21 may be formed on the surface of the coupling mirror 2 which surface is provided with the partial reflection film 11c in such a manner that the phase difference $\Delta$ is an integer multiple of $2\pi$. Also in this case, the same effect as above can be expected.

Further, as shown in FIGS. 17(a) and 17(b), stepped portions 22 and 23 may be formed on both sides of the coupling mirror 2 so that the phase difference $\Delta$ is an integer multiple of $2\pi$, whereby the same effect as above can be expected.

Instead of forming such stepped portions in the coupling mirror 2 for compensating the phase difference $\Delta$, the thickness of the partial reflection film 11c and that of the antireflecting film 12a may be set so as to give a phase difference $\Delta$ equal to an integer multiple of $2\pi$, whereby the same effect as above can be expected.

Embodiment 6

Although in the above embodiment 5 the phase difference $\Delta$ is compensated by setting the stepped portions 20, 20a, 21, 22 and 23 or the thickness of the partial reflection film 11c and that of the antireflecting film 12a so as to give a phase difference $\Delta$ equal to an integer multiple of $2\pi$, the thicknesses of the stepped portions 20, 20a, 21, 22 and 23 or the partial reflection film 11a and the antireflecting film 12a may be adjusted appropriately to control the phase difference and thereby improve the quality of the laser beam 7.

Embodiment 7

Figure 19:
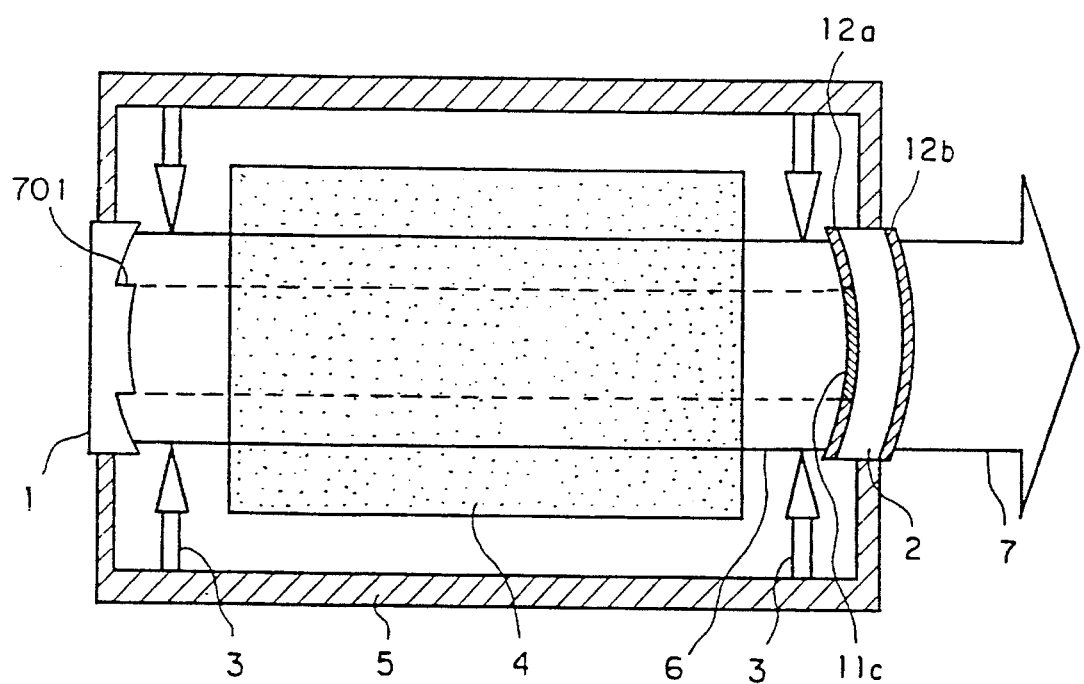
FIG. 19 is a sectional view showing embodiment 7 of the invention.

Although in the foregoing embodiment 5 the coupling mirror 2 is provided with a phase difference compensating means, the other mirror which constitutes the resonator conjointly with the coupling mirror 2, namely the total reflector 1, may be provided with a phase difference compensating means (stepped portion 701), as shown in FIG. 19. This construction permits the beam quality to be improved as in the case of embodiment 5. Moreover, the total reflector may be constituted as shown in FIG. 20, in which it is divided into mirrors 702a and 702b, and one of the divided mirrors is driven using a driving element 703, e.g. piezo-electric element, to adjust the difference in thickness between the mirrors 702a and 702b and thereby control the phase difference.

Embodiment 8

Although in the previous embodiments 5, 6 and 7 a phase difference compensating or controlling means is provided within the resonator, a phase difference compensating means 801 may be disposed outside the resonator, as shown in FIG. 21. Since the phase difference compensating means 801 is formed with a stepped portion 802, a laser beam 803 reflected by the phase difference compensating means 801 is compensated its phase difference as in the embodiment 5. Further, divided total reflectors 804a and 804b may be disposed outside the resonator, as shown in FIG. 22, in which one divided mirror is driven using a driving element 805 (phase difference controlling means), e.g. piezo-electric element, to adjust the difference in thickness between the mirrors 804a and 804b and thereby control the phase difference of the laser beam 803.

Embodiment 9

FIG. 23 is a diagram showing how the quality of laser beam 7 changes with change in the diameter of apertures 3 formed in front of the coupling mirror 2 and the total reflector 1, respectively, in the laser system according to the present invention. In the graph of FIG. 23, the beam quality is plotted along the ordinate axis, while a diametrical ratio of the aperture 3 to the partial reflection film 11c, r/a, is plotted along the abscissa axis. 2a represents the diameter of the partial reflection film 11c and 2r represents the diameter of each aperture 3. From the same figure it is seen that the beam quality is deteriorated when the diameter of the aperture 3 exceeds about four times the diameter of the partial reflection film 11c of the coupling mirror 2. That is, by setting the aperture diameter at a value of not larger than four times the diameter of the partial reflection film 11c, it is made possible to maintain the beam quality always in a good condition.

Embodiment 10

In this embodiment, description will be directed to the construction of the coupling mirror which is a main portion of the present invention. FIG. 24 shows an example of construction of a coupling mirror. The coupling mirror illustrated in the same figure comprises a ring-shaped mirror base 1001 and a mirror base 1002 which is engageable with the mirror base 1001. The mirror base 1002 is fitted in the central part of the mirror base 1001. An antireflecting film 1004 is formed on both sides of the ring-shaped mirror base 1001, and a partial reflection film 1003 is formed on the side of the mirror base 1002 which side constitutes a resonator, while the antireflecting film 1004 is formed on the other side of the mirror base 1002.

The operation of this coupling mirror is the same as in embodiment 1. The use of this coupling mirror is advantageous in that by merely providing several kinds of mirror bases 1002 having partial reflection films 1003 of different partial reflectivities it is made possible to easily constitute resonators having different partial reflectivities.

Further, as shown in FIGS. 25 and 26, by adjusting a relative thickness of a ring-shaped mirror base 1001 and a mirror base 1002 engageable therewith, a phase difference between a laser beam portion emitted from the ring-shaped mirror base 1001 and a laser beam portion from the mirror base 1002 can be controlled at stepped portions 1005 and 1006.

Embodiment 11

Figure 27A:
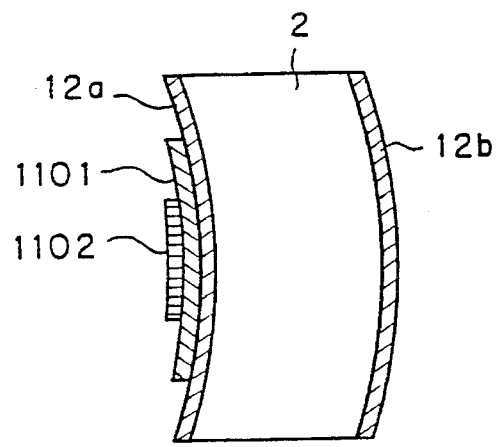
FIGS. 27(a) and 27(b) are each a sectional view of a mirror in embodiment 11 of the invention.
Figure 27B:
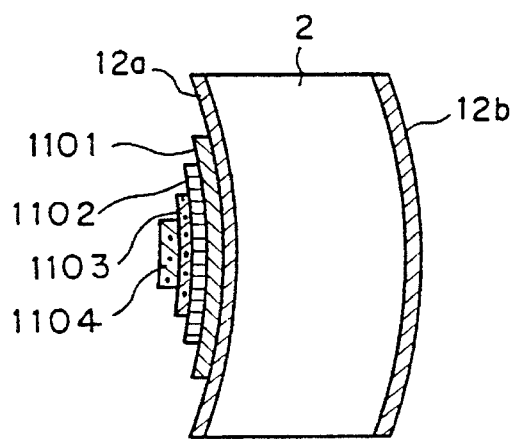
Figure 28:
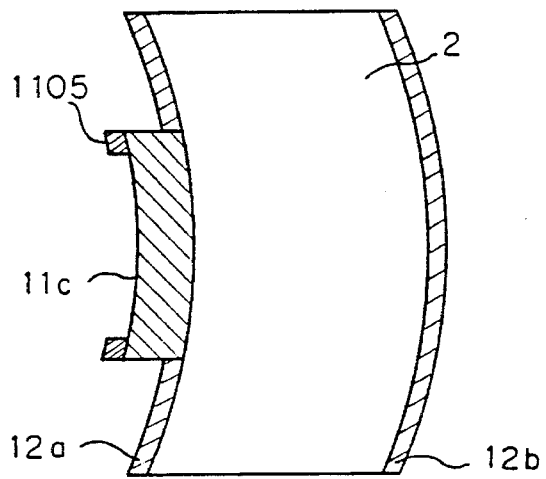
FIG. 28 is a sectional view of a mirror in embodiment 11 of the invention.
Figure 29:
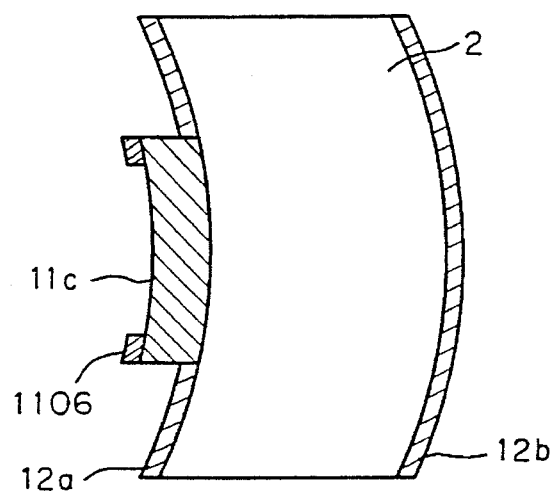
FIG. 29 is a sectional view of a mirror in embodiment 11 of the invention.

Although in the foregoing embodiment 1 the intensity reflectivity of the coupling mirror is only the reflectivity from the partial reflection film 11c, the same effect can be obtained also by forming partial reflection films 1101, 1102, 1103 and 1104 of different reflectivities in a multi-stage fashion so that reflectivity changes stepwise, as shown in FIGS. 27(a) and 27(b). The same effect can be obtained also by forming a ring-shaped partial reflection film 1105 of an intensity reflectivity different from that of a partial reflection film 11c along the peripheral edge of the film 11c, as shown in FIG. 28. Moreover, even if a ring-shaped total reflection film (totally reflecting portion) 1106 is used in place of the partial reflection film 1105, as shown in FIG. 29, there will be obtained the same effect.

Figure 30:
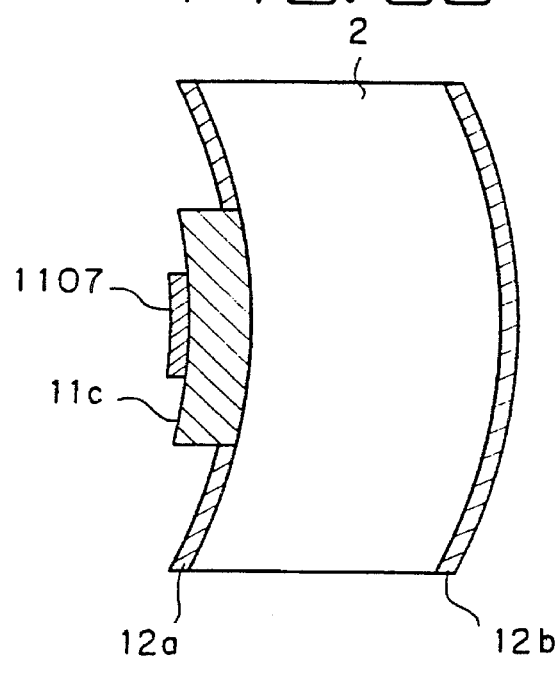
FIG. 30 is a sectional view of a mirror in embodiment 11 of the invention.

Further, as shown in FIG. 30, even if a total reflection film 1107 is formed centrally of the partial reflection film 11c of the coupling mirror 2, the same effect can be obtained. Although the operation of such coupling mirror is the same as in embodiment 1, there is attained an advantage that the laser output can be improved because it is possible to increase the mode volume.

Embodiment 12

Figure 31:
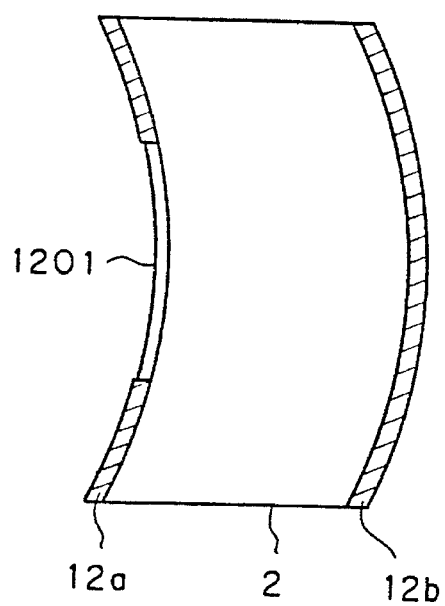
FIG. 31 is a sectional view of a mirror in embodiment 12 of the invention.

Although in embodiment 1 the partial reflection film 11c is formed in the coupling mirror 2 and the mode selection is performed, a thin metallic film 1201 may be used in place of the partial reflection film 11c, as shown in FIG. 31, whereby there can be obtained the same effect. However, the thickness of the thin metallic film 1201 is restricted. It is necessary that the thickness of this thin film be set at a value not larger than the thickness at which the metal begins to exhibit a skin effect. For example, in the case of a $CO_2$ laser system as an example, it is necessary to set the thickness of the thin metallic film 1201 at a value not larger than several nanometers. If it is so set, there will arise scarcely any phase difference between the laser beam portion passing through the thin metallic film 1201 and that passing through the antireflecting film 12a. Therefore, it is not necessary to use a phase compensating means.

Embodiment 13

Figure 32:
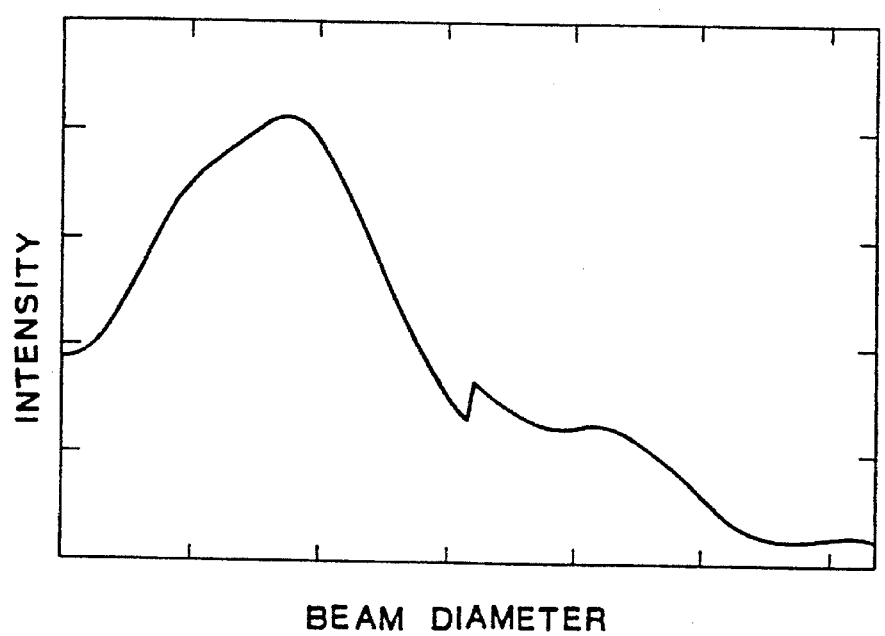
FIG. 32 is an intensity distribution diagram of laser beam in embodiment 13 of the invention.

Although in the foregoing embodiment 1 the resonator generates a laser beam at $TEN_{00}$ mode, it becomes possible to realize a low-order multi-mode of a large cross sectional area by making the diameter of the partial reflection film 11c shown in FIG. 3 larger than the diameter in the $TEM_{00}$ mode. In FIG. 32 there is shown an intensity distribution of laser beam in, for example, $TEM_{00}^*$ mode of a large cross sectional area. The use of such a laser beam permits laser cutting of a thick plate.

Embodiment 14

Figure 33:
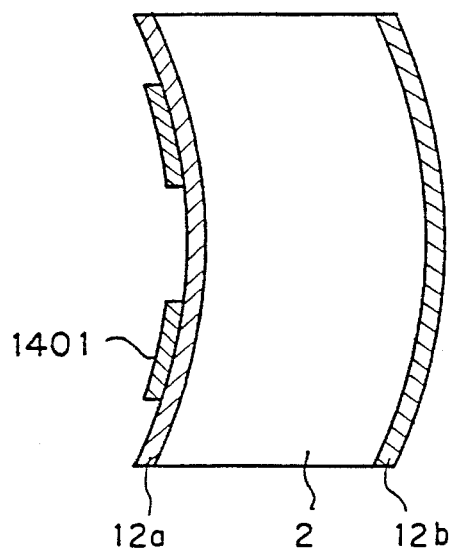
FIG. 33 is a sectional view of a mirror in embodiment 14 of the invention.
Figure 34:
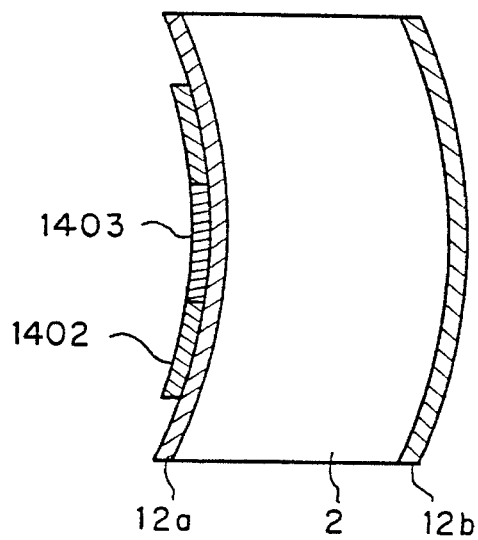
FIG. 34 is a sectional view of a mirror in embodiment 14 of the invention.

Although in the above embodiment 13 a low-order multi-mode of a large cross sectional area is realized by making the diameter of the partial reflection film 11c larger than that in the $TEM_{00}$ mode, a ring-shaped partial reflection film 1401 may be formed coaxially on the antireflecting film 12a, as shown in FIG. 33, whereby there also can be realized a low-order multi-mode of a large cross sectional area. Further, even if inside a ring-shaped partial reflection film 1402 there is disposed a partial reflection film 1403 of a lower reflectivity than the intensity reflectivity of the partial reflection film 1402, it is possible to generate a laser beam in a low-order multi-mode of a large cross sectional area. In such a laser system, since the intensity reflectivity of the central part of the coupling mirror 2 which plays an important role in the generation of $TEM_{00}$ mode laser beam is set lower than that of the peripheral portion, the laser beam is easier to be generated in the low-order multi-mode than in the $TEM_{00}$ mode.

Figure 35:
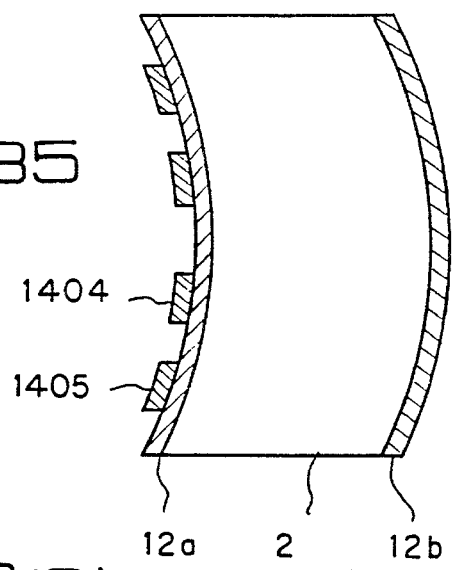
FIG. 35 is a sectional view of a mirror in embodiment 14 of the invention.

Further, as shown in FIG. 35, even if ring-shaped partial reflection films 1404 and 1405 are provided double coaxially, there can be obtained the same effect as above. Even if several ring-shaped partial or total reflection films are disposed in an inside-outside relation to one another, it is possible to obtain the same effect as above.

Embodiment 15

Figure 36A:
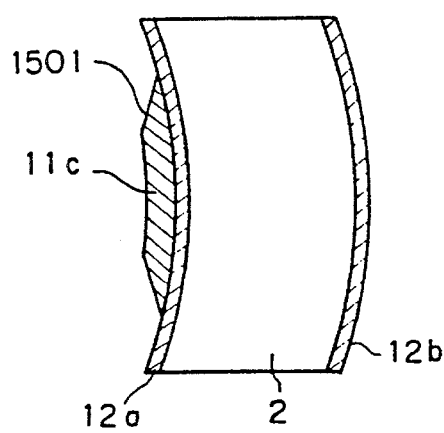
FIGS. 36(a) and 36(b) are each a sectional view of a mirror in embodiment 15 of the invention.
Figure 36B:
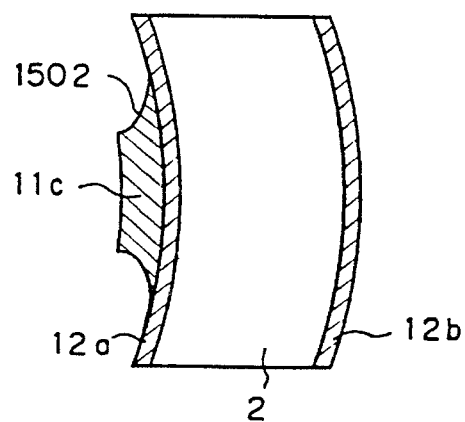

Although in embodiment 1 the boundary surface between the partial reflection film 11c and the antireflecting film 12a both formed on the resonator constituting side of the coupling mirror 2 is approximately horizontal relative to the axis of the coupling mirror, it may have a certain inclined portion 1501 or curvilinear portion 1502 with respect to the coupling mirror 2, as shown in FIGS. 36(a) and 36(b). Also in this case it is possible to obtain the same effect as above.

Figure 37A:
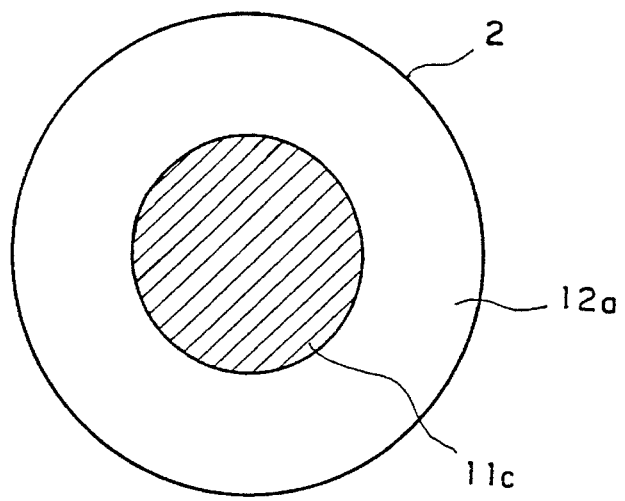
FIG. 37(a) is a top view of a mirror in an embodiment of the invention.

Although the partial reflection film 11c used in embodiment 1 is circular as shown in FIG. 37(a), this constitutes no limitation. Even when the partial reflection film 11c is of a shape other than a circle as in FIGS. 37(b), 38, 39(a) and 39(*b*), there can be obtained the same effect as above. The operation of such coupling mirrors is the same as in embodiment 1, there is attained an advantage that the laser output can be improved because it is possible to enlarge the mode volume.

Embodiment 16

In this embodiment reference will be made to the relation between the intensity reflectivity accuracy of the antireflecting film 12*a* as a constituent of the coupling mirror 2 which is a main portion of this invention and the beam quality. The antireflecting film 12*a* has a slight intensity reflectivity from the standpoint of production accuracy. Therefore, in connection with the present invention, a study has been made about an allowable range of intensity reflectivity of the antireflecting film 12*a* in the resonator construction of embodiment 1. FIG. 40 is a graph showing the results of a study made about the dependency of the beam quality on the intensity reflectivity of the antireflecting film 12*a*. In this graph, the beam quality is plotted along the ordinate axis and the reflectivity of the antireflecting film 12*a* plotted along the abscissa axis. From this figure it is seen that the beam quality begins to deteriorate when the intensity reflectivity of the antireflecting film 12*a* exceeds 5% or so. That is, if the intensity reflectivity of the antireflecting film 12*a* is set at a value not larger than 5%, it will be possible to maintain the beam quality always in a good condition.

Embodiment 17

Figure 41:
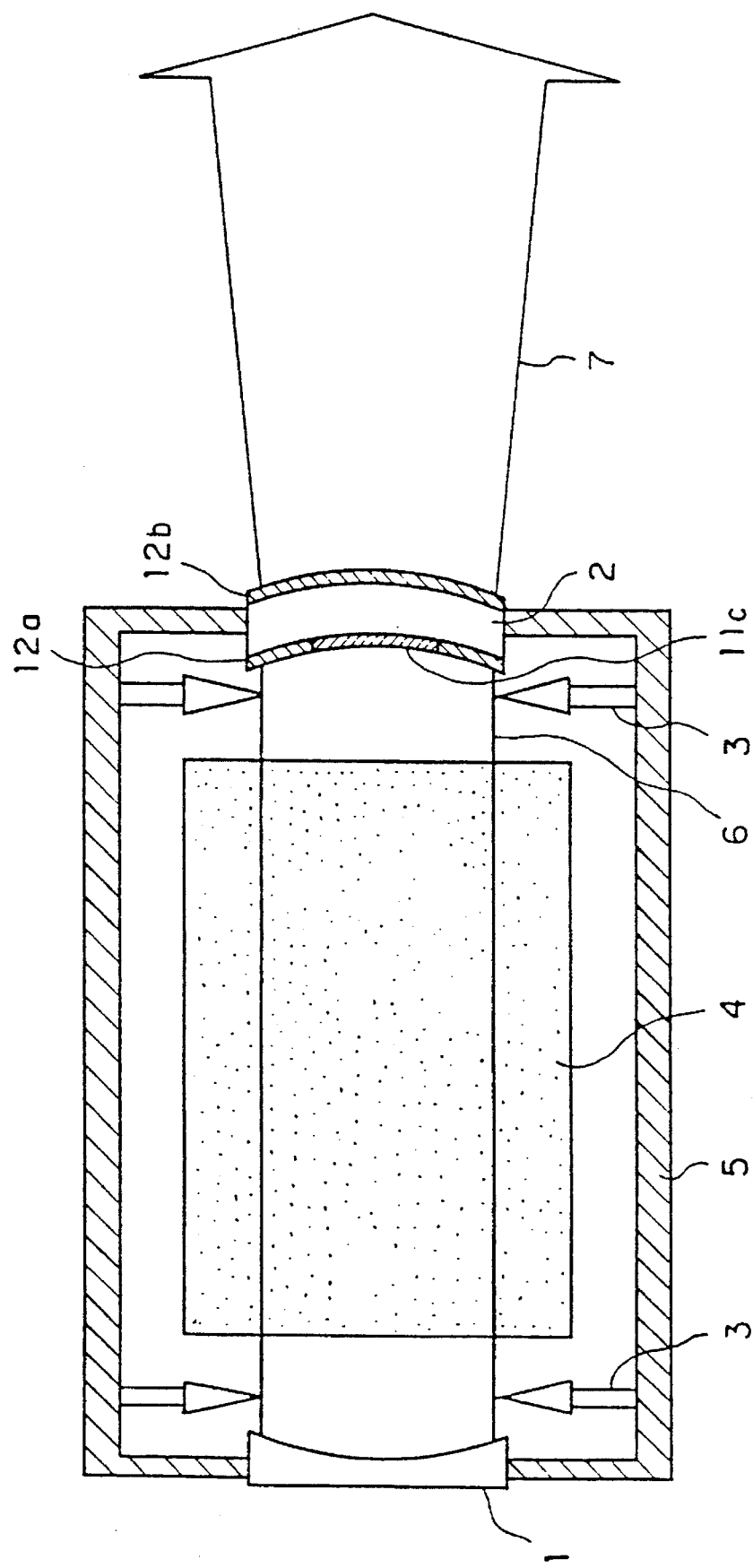
FIG. 41 is a sectional view showing embodiment 17 of the invention.

In the resonator construction described in embodiment 1, the phase distribution of the laser beam 6 present in the resonator is nearly coincident with the radius of curvature of the coupling mirror 2 on the surface of the same mirror. Therefore, in the case of using a stable resonator, the laser beam 7 emitted from the resonator travels in an expanded manner in its diameter as in FIG. 41.

Figure 42:
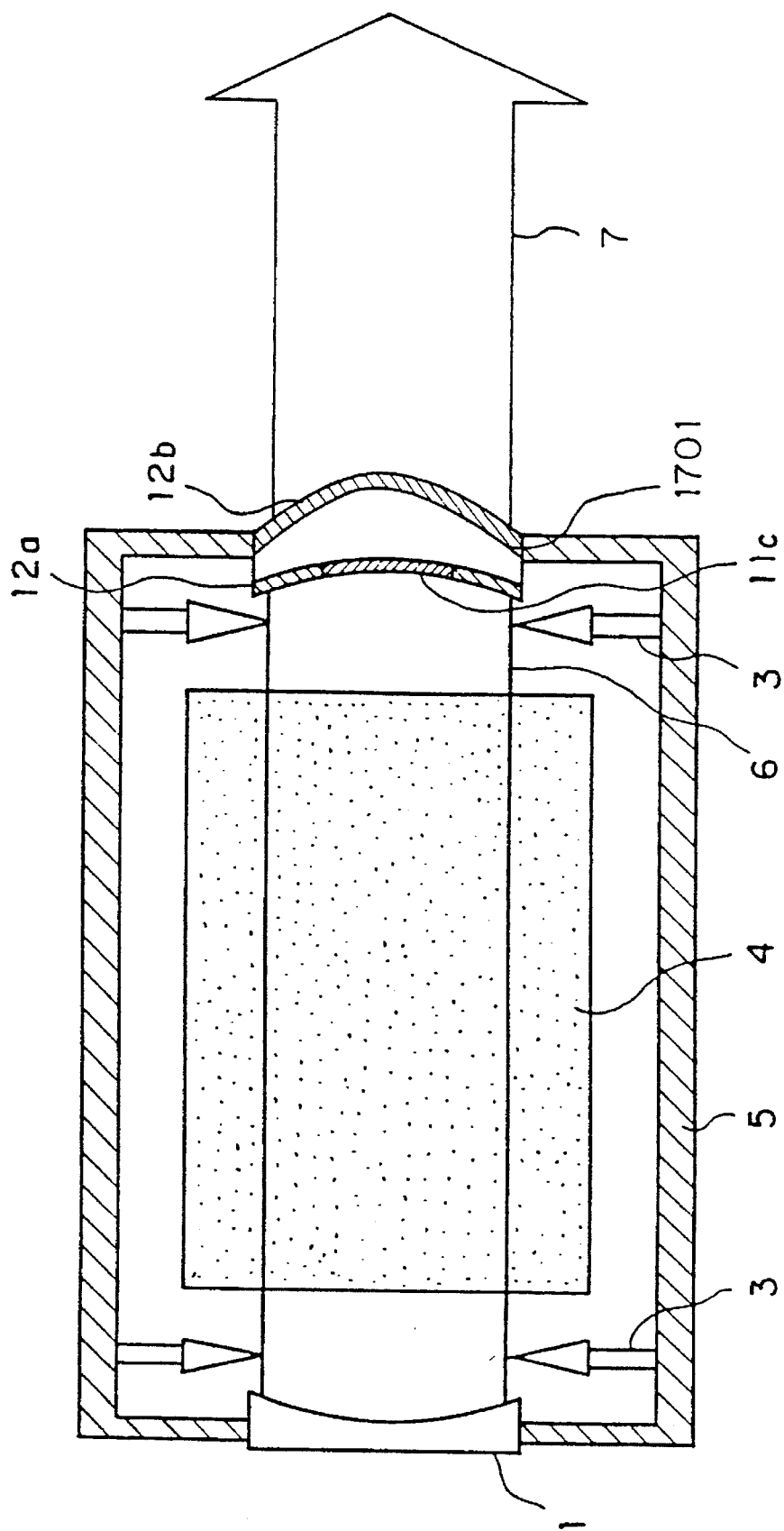
FIG. 42 is a sectional view showing embodiment 17 of the invention.

FIG. 42 illustrates a laser system using a coupling mirror 1701 which prevents such expansion of the beam diameter. The coupling mirror 1701 is formed in such a manner that the resonator constituting side thereof and the opposite side thereof have a different in radius of curvature, whereby it is made possible for the coupling mirror 1701 to also have the function of lens, and hence the laser beam 7 emitted from this coupling mirror can be obtained as parallel rays.

Figure 43:
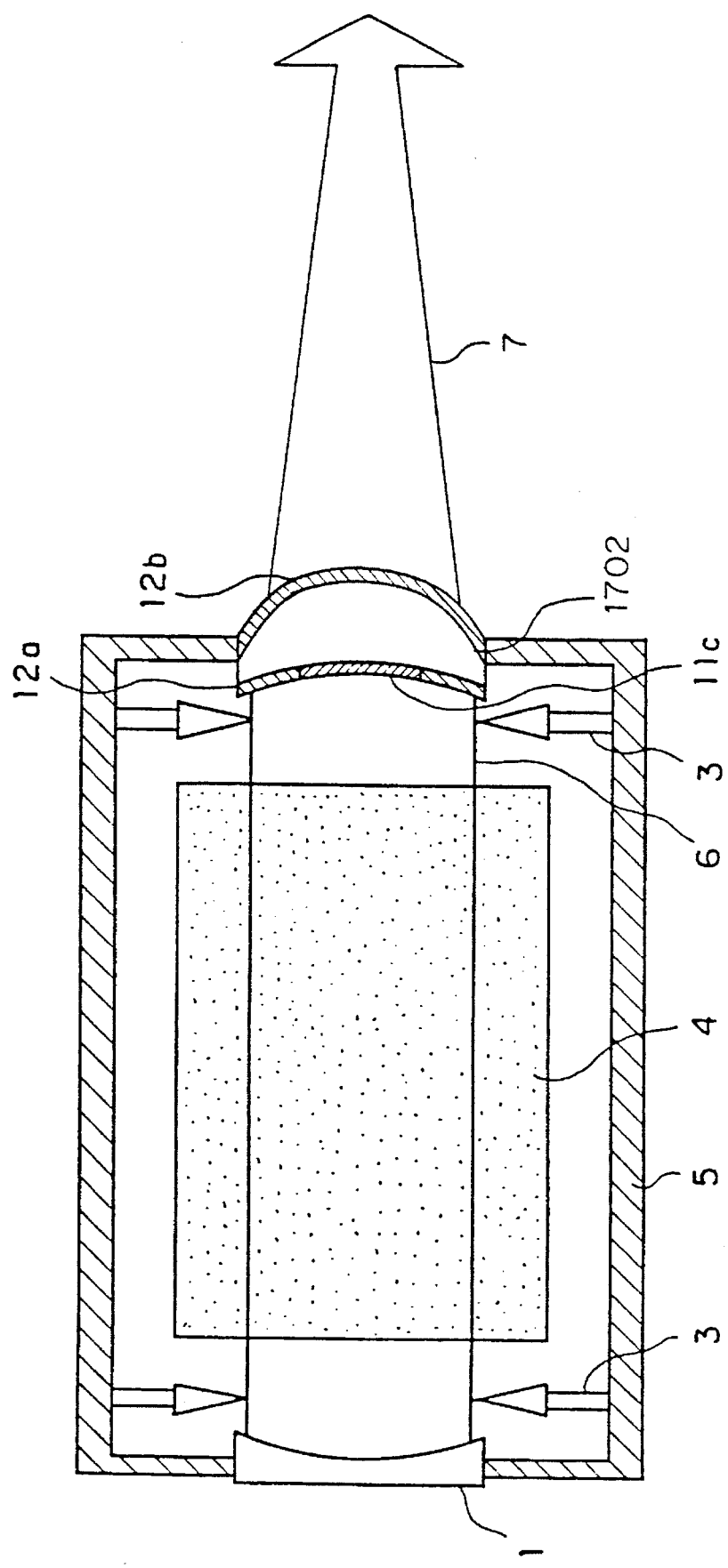
FIG. 43 is a sectional view showing embodiment 17 of the invention.

Further, as shown in FIG. 43, by making the radius of curvature of the opposite side of the coupling mirror 1702 still smaller, it also becomes possible to obtain the laser beam 7 as a converged beam.

Embodiment 18

Figure 44:
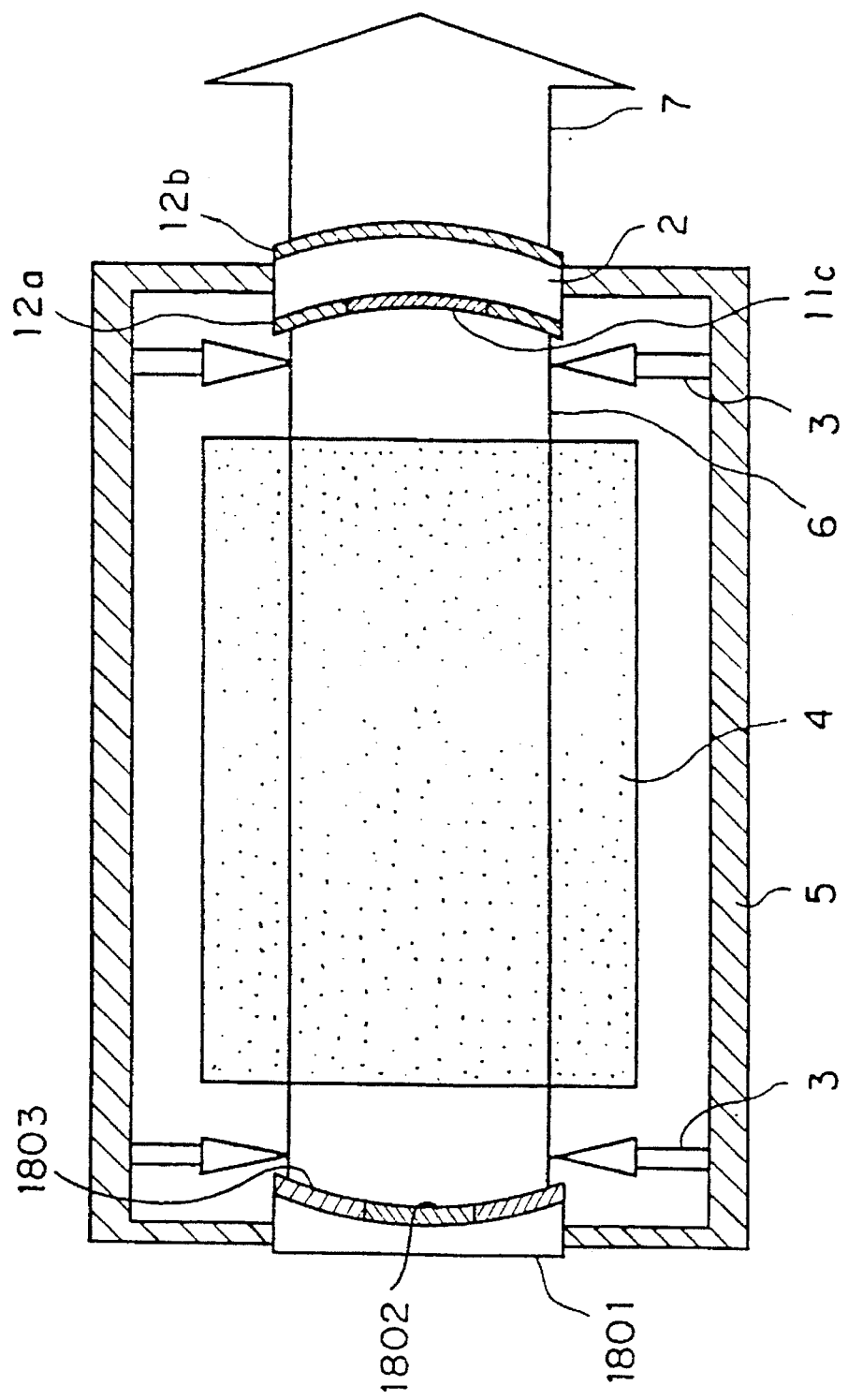
FIG. 44 is a sectional view showing embodiment 18 of the invention.

FIG. 44 is a sectional view illustrating a further embodiment of the present invention, in which the numeral 1801 denotes a concave reflecting mirror disposed in an opposed relation to a coupling mirror 2 like the total reflector 1 in embodiment 1, and numeral 1802 denotes a total reflection film formed on the reflecting mirror 1801. Numeral 1803 denotes a ring-shaped partial reflection film disposed coaxially with the total reflection film 1802 on the reflecting mirror 1801. In this embodiment, the mode selection is performed by both a partial reflection film 11*c* of the coupling mirror 2 and the total reflection film 1802 of the reflecting mirror 1801.

A portion of laser beam which has passed through the partial reflection film 1803 is used for specifying various laser characteristics. In this embodiment there is obtained just the same effect as in the foregoing embodiment 1. A mode present in the resonator is selected by both the partial reflection film 11*c* of the coupling mirror 2 and the total reflection film 1802 of the reflecting mirror 1801, and the laser gain portion which has not been used in the conventional resonator can be used extremely effectively for the amplification of laser beam 6. Consequently, it is possible to extract a laser beam of $TEM_{00}$ mode having a cross sectional area larger than the beam diameter determined by the resonator construction, which has heretofore been impossible.

Embodiment 19

Figure 45:
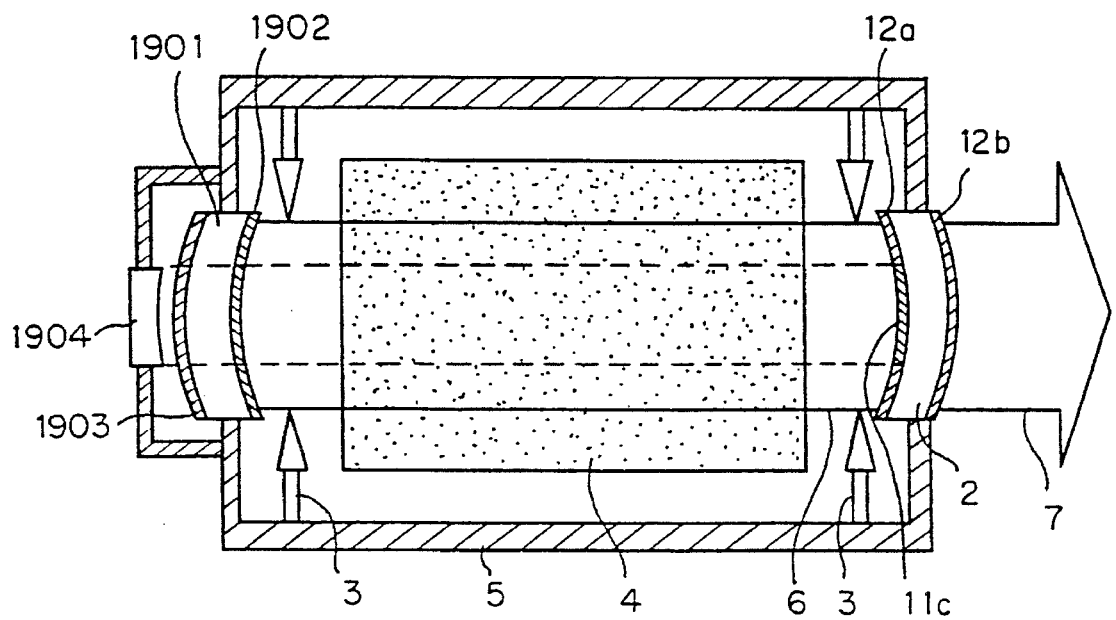
FIG. 45 is a sectional view showing embodiment 19 of the invention.

Although in the previous embodiment 18 the mode selection is performed using the total reflection film 1802 of the concave reflecting mirror 1801 disposed opposedly to the coupling mirror 2, the mode selection in the resonator may be done using two kinds of mirrors which are a partial reflector 1901 having a partial reflection film 1902 and an antireflecting film 1903 and a total reflector 1904, in place of the concave reflecting mirror 1801, as shown in FIG. 45. Also in this case there can be obtained the same effect as above.

Figure 46:
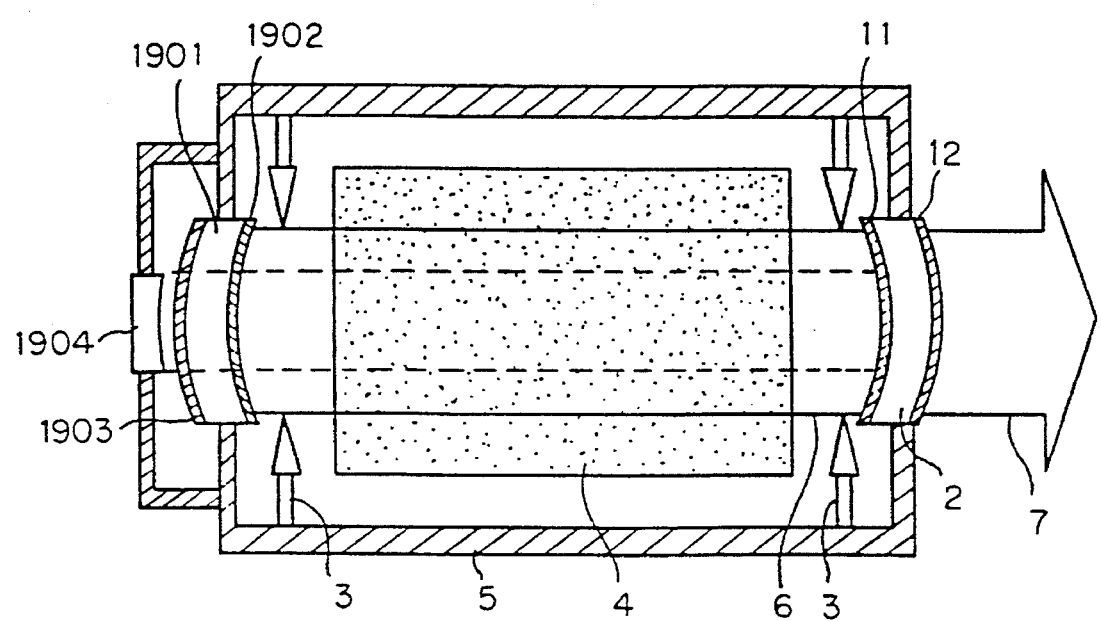
FIG. 46 is a sectional view showing embodiment 19 of the invention.

Further, as shown in FIG. 46, also by using a coupling mirror having a partial reflector 11 in place of the coupling mirror 2 in the laser system illustrated in FIG. 45, there can be obtained the same effect as above.

Embodiment 20

Figure 47:
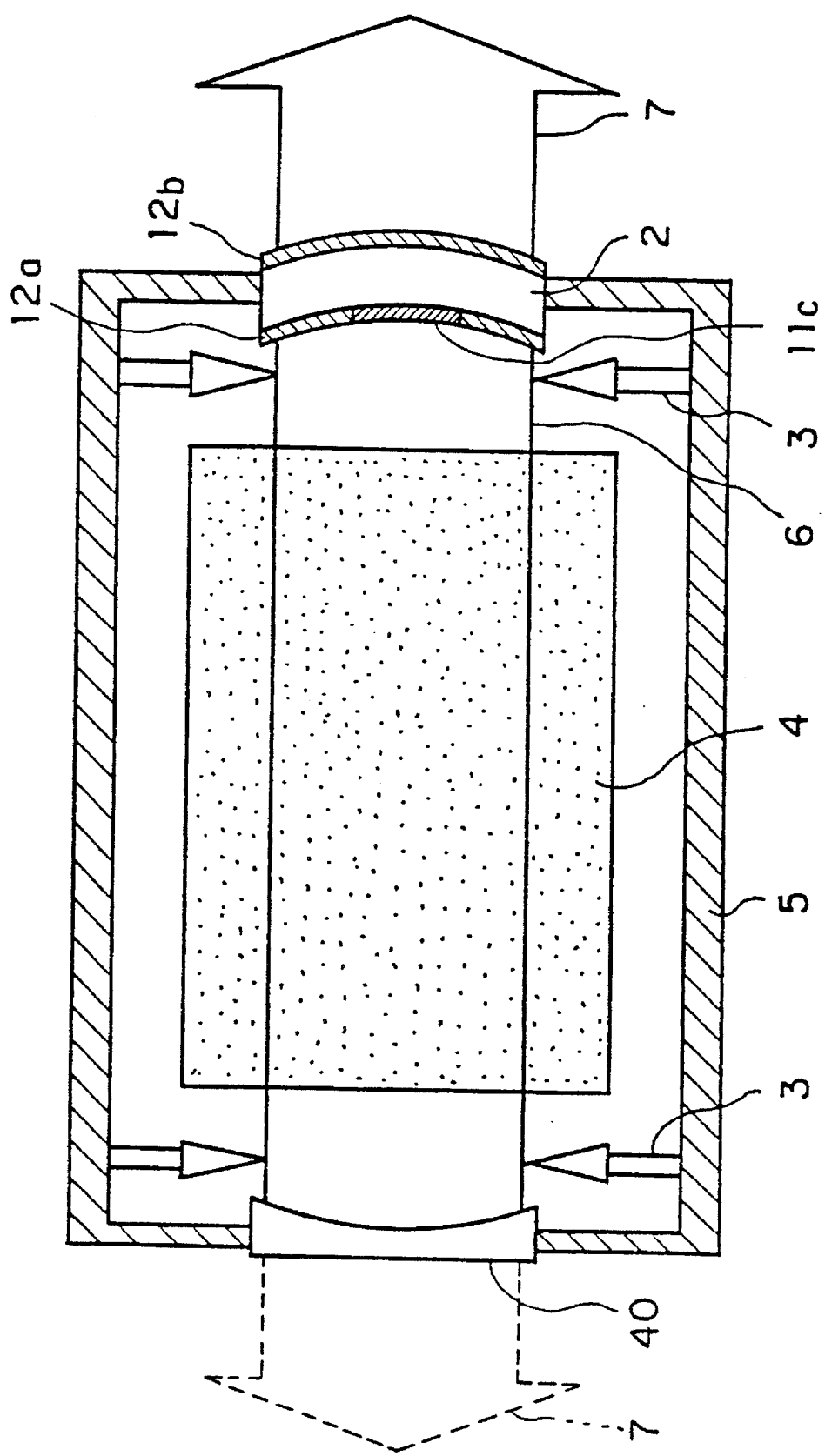
FIG. 47 is a sectional view showing embodiment 20 of the invention.

In FIG. 47 there is illustrated a stable resonator constituted by both a coupling mirror 2 and a partial reflector 40 disposed in an opposed relation to the coupling mirror. In the same figure, the portions same as or similar to those in the conventional laser system shown in FIG. 2 are indicated by the same reference numerals as in FIG. 2 and explanations thereof will be omitted. This embodiment thus constructed affords the same effect as in embodiment 1. In this embodiment, the partial reflector 40 is used in place of the total reflector used in embodiment 1. For example, if the intensity reflectivity of the partial reflector 40 is set to 99%, a laser beam of 1% intensity is emitted from to the exterior of the resonator. Therefore, the use of this laser beam in the measurement of laser output permits the same measurement to be greatly simplified and facilitated.

Embodiment 21

Figure 48:
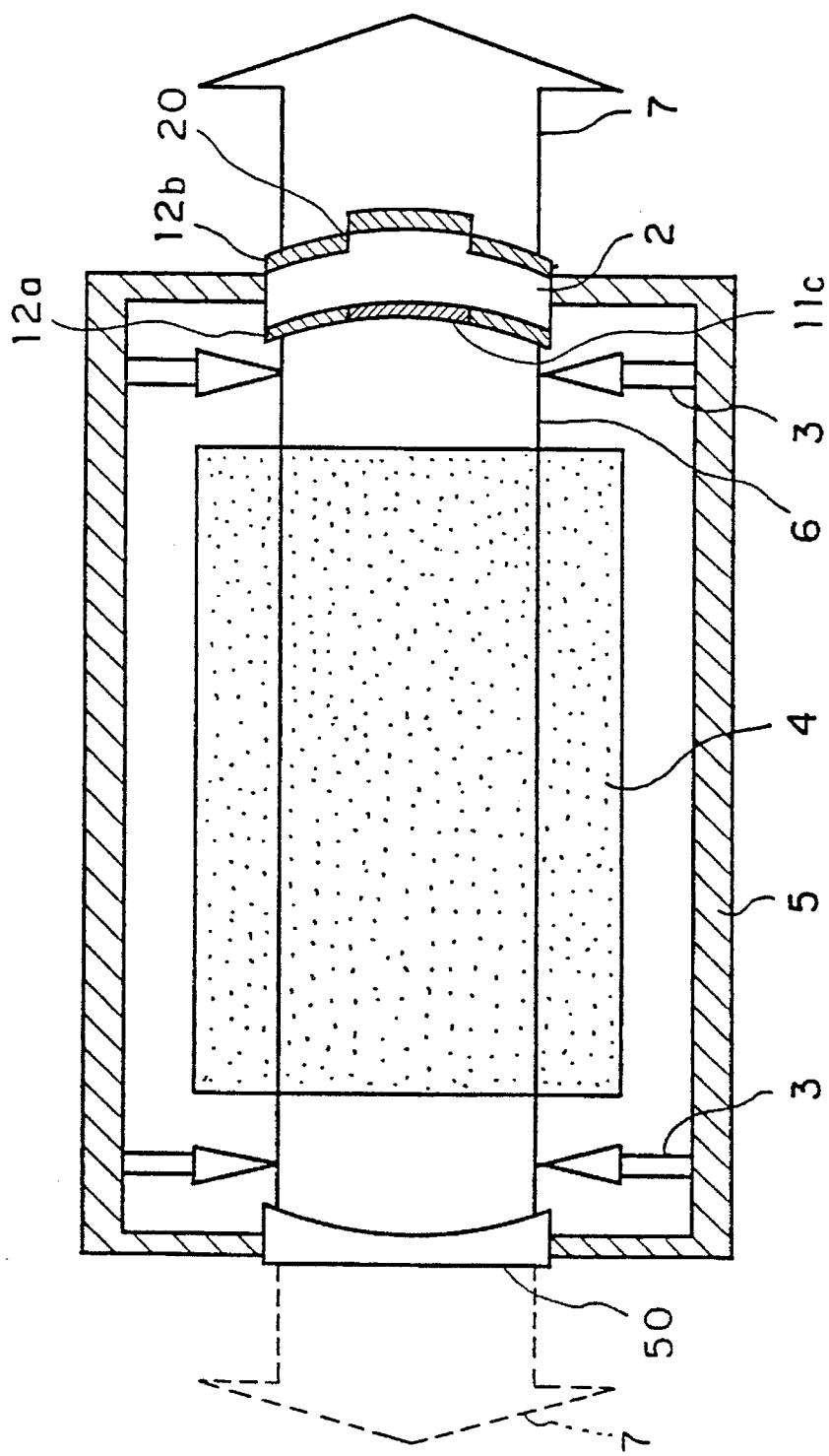
FIG. 48 is a sectional view showing embodiment 21 of the invention.

Although in the foregoing embodiment 5 illustrated in FIG. 11 there were used the coupling mirror 2 and the total reflector 1 as mirrors constituting the resonator, a partial reflector 50 may be used instead of the total reflector 1, as shown in FIG. 48. In this embodiment there is obtained the same effect as in embodiment 5, and if the intensity reflectivity of the partial reflector 50 is set to 99%, a laser beam of 1% intensity is emitted to the exterior of the resonator. When this laser beam is used in the measurement of laser output, the same measurement is greatly simplified and facilitated.

Embodiment 22

In the foregoing embodiment 9 illustrated in FIG. 23 it has been explained that the beam quality in the resonator constituted by the coupling mirror and the total reflector is deteriorated when the diameter of the aperture 3 exceeds four times the diameter of the partial reflection film 11*c*. But this characteristic also applies in the case of using a partial reflector in place of the total reflector. In this embodiment, if the intensity reflectivity of the partial reflector is set to, say, 99%, a taster beam of 1% intensity is emitted to the exterior of the resonator. Therefore, the use of this laser beam in the measurement of laser output permits the same measurement to be greatly simplified and facilitated.

Embodiment 23

Figure 49:
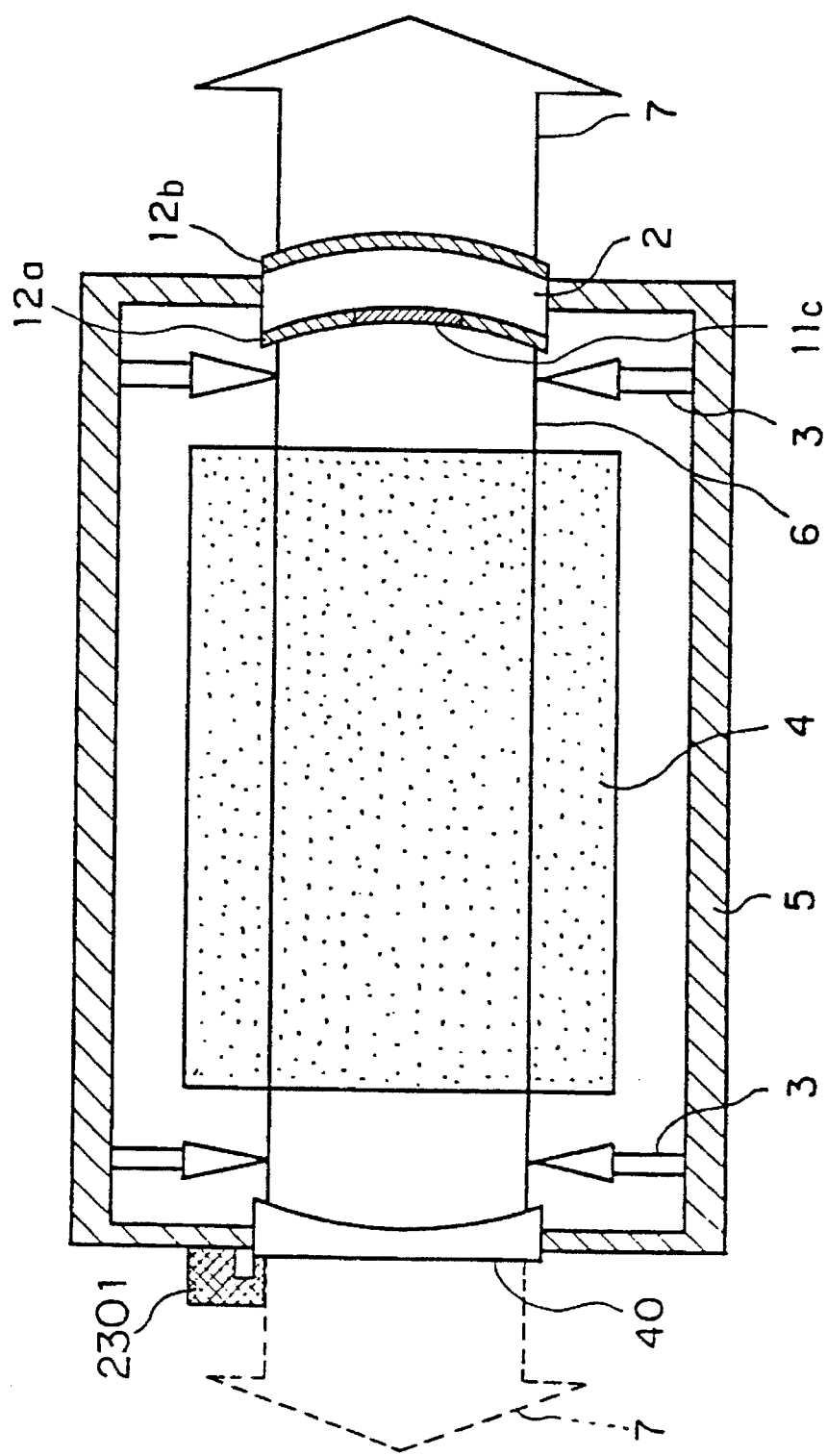
FIG. 49 is a sectional view showing embodiment 23 of the invention.
Figure 50:
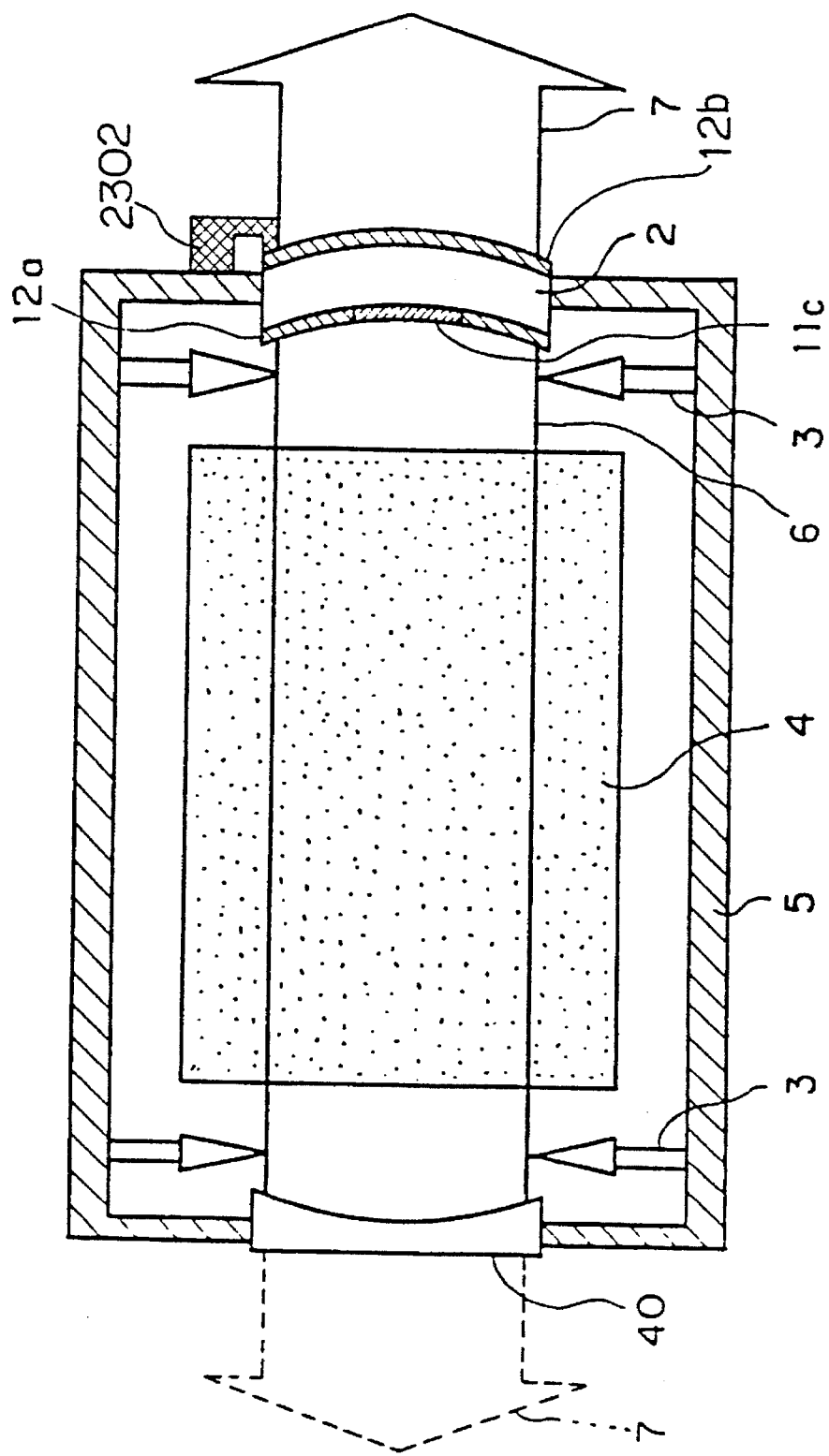
FIG. 50 is a sectional view showing embodiment 23 of the invention.
Figure 51:
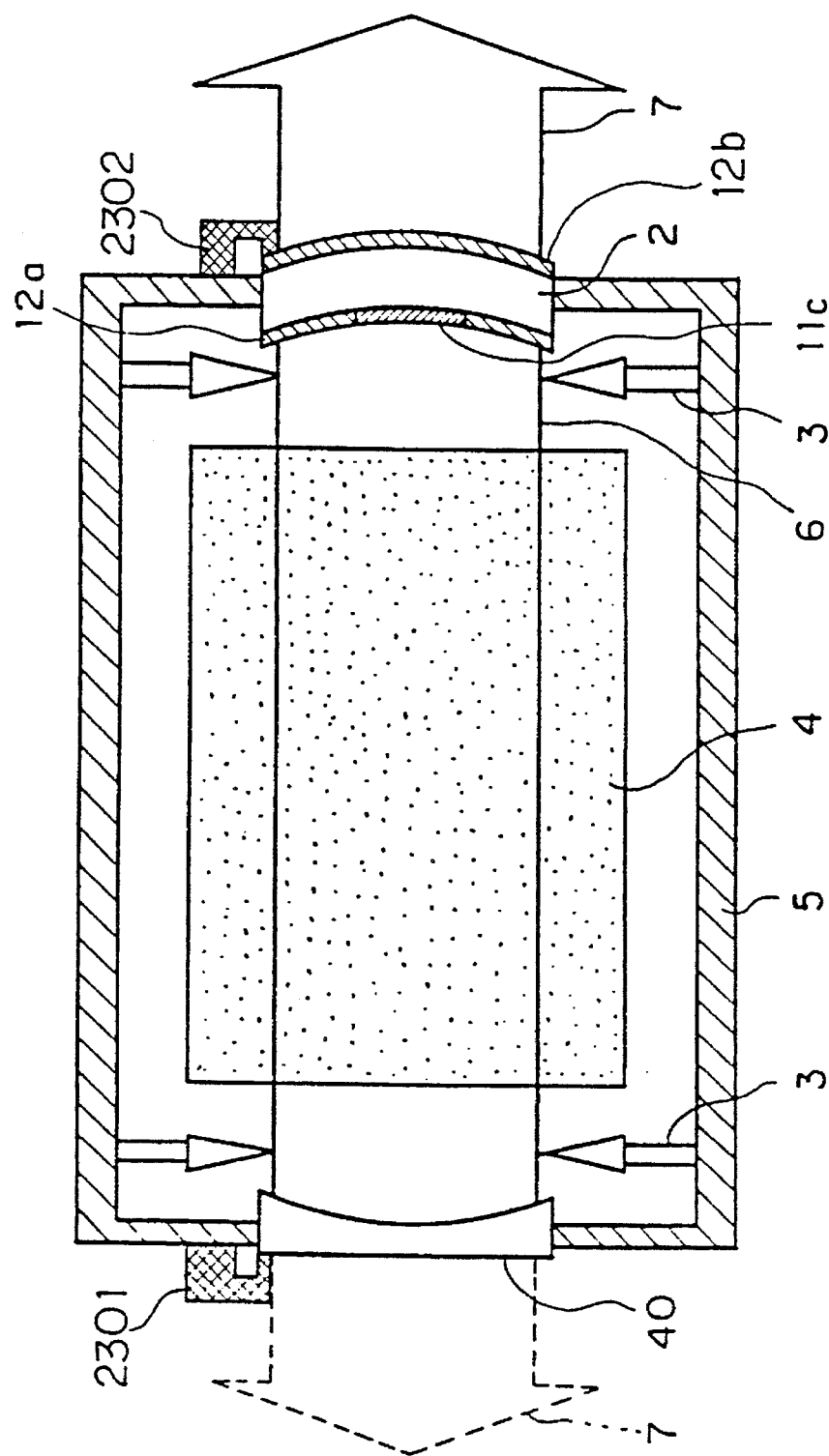
FIG. 51 is a sectional view showing embodiment 23 of the invention.

Although in the foregoing embodiment 20 the mirrors 1 and 2 which constitute the resonator are not provided with a mirror angle adjusting mechanism, at least one of the coupling mirror 2 and the other mirror 40 both constituting a resonator may be provided with a mirror angle adjusting mechanism 2301 or 2302, as shown in FIGS. 49 to 51. Such a construction is effective for a laser system wherein the position and direction of laser beam 7 emitted are deviated with increase of applied power. More specifically, as the applied power increases, the mirror angle adjusting mechanism 2301 or 2302 is operated to correct the deviations in the position and direction of the laser beam 7 emitted, thereby affording a laser system extremely superior in the stability of laser beam.

Even when at least one of the coupling mirror 2 and the other mirror 50 both constituting a resonator, explained in embodiment 21 shown in FIG. 48, may be provided with a mirror angle adjusting mechanism 2301 or 2302, whereby there can be obtained the same effect as above.

Embodiment 24

Figure 52:
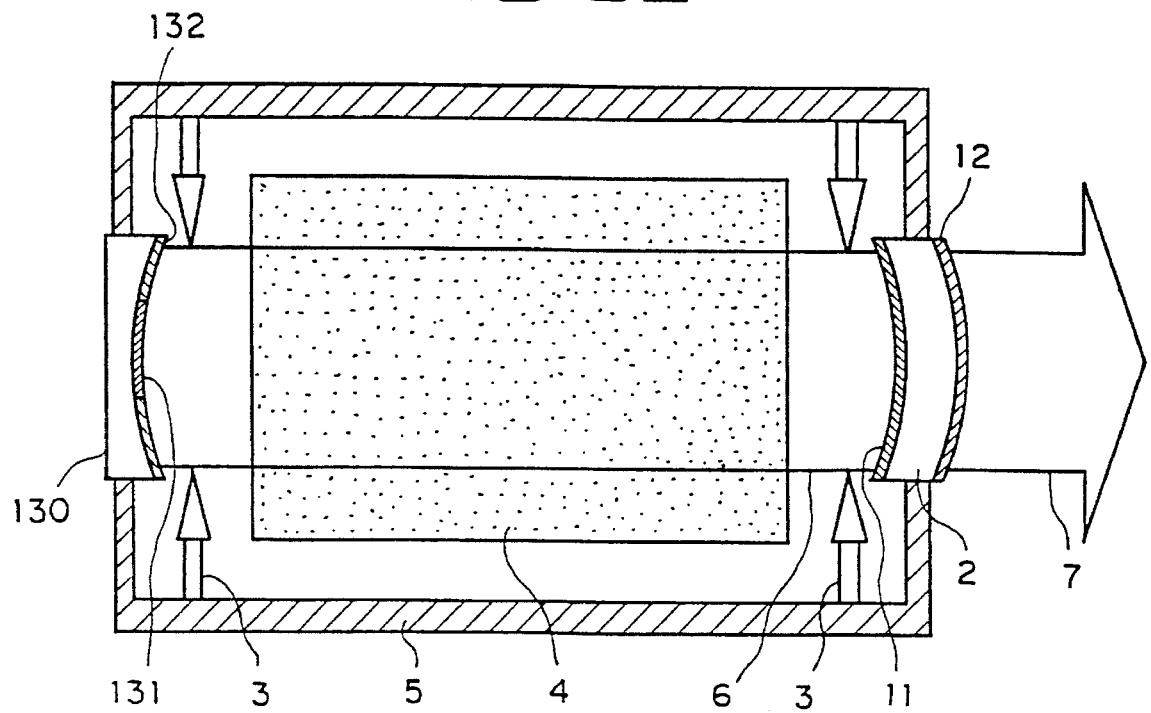
FIG. 52 is a sectional view showing embodiment 24 of the invention.
Figure 53:
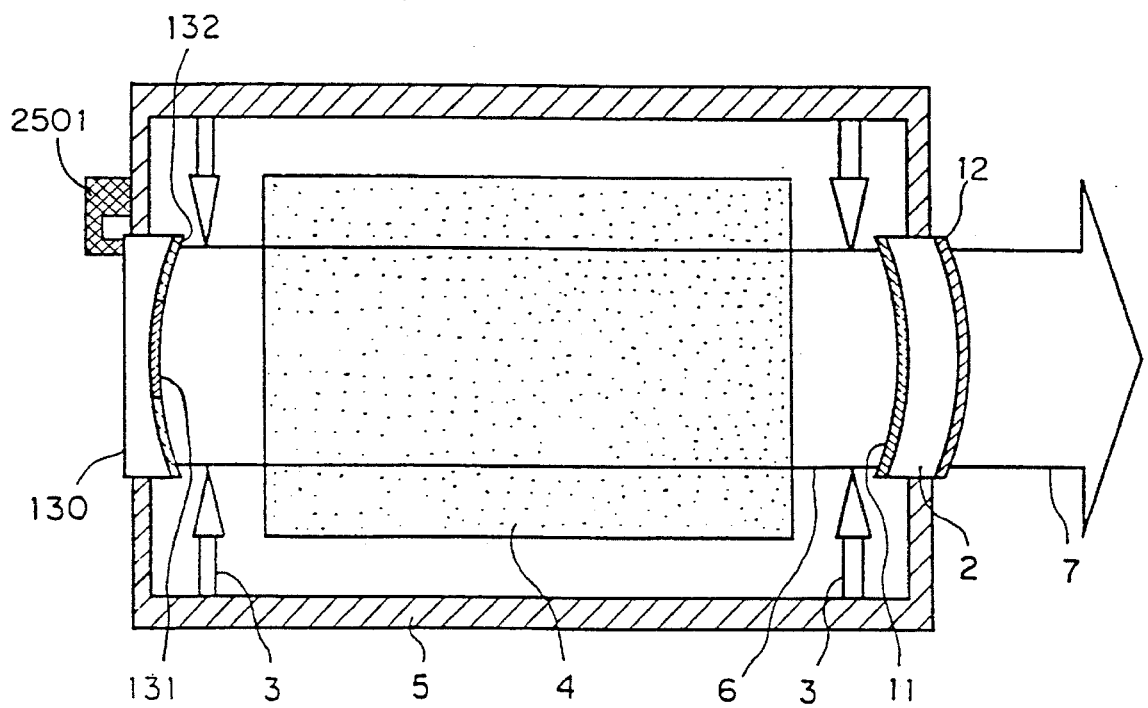
FIG. 53 is a sectional view showing embodiment 25 of the invention.
Figure 54:
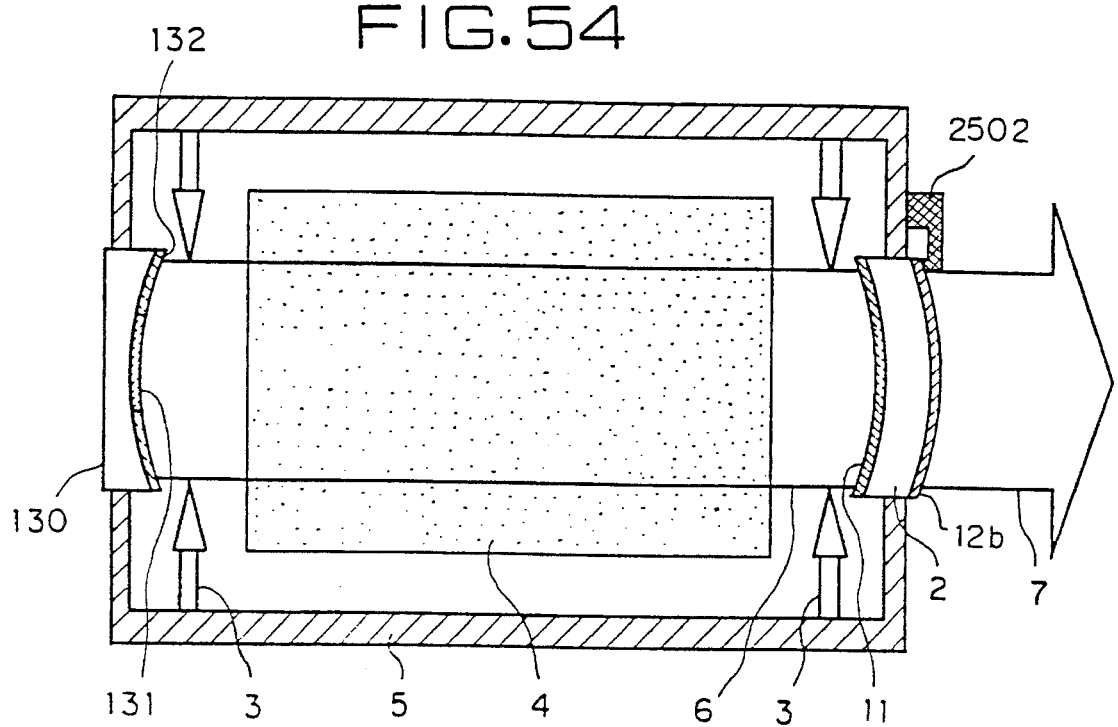
FIG. 54 is a sectional view showing embodiment 25 of the invention.
Figure 55:
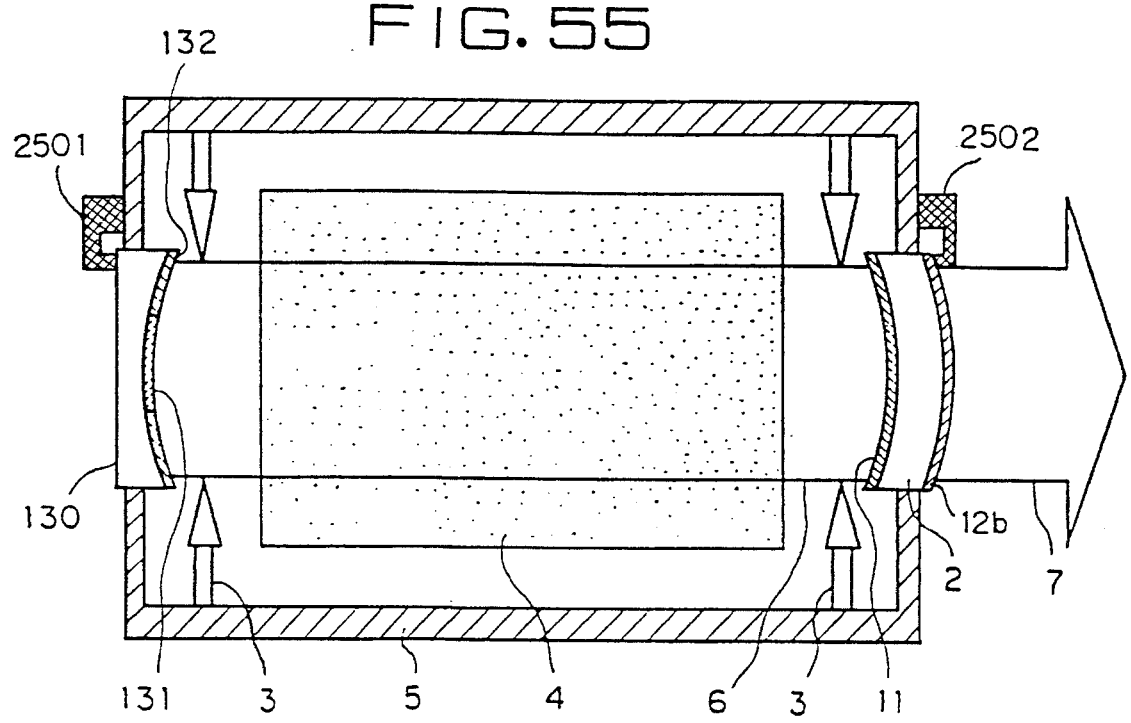
FIG. 55 is a sectional view showing embodiment 25 of the invention.

FIG. 52 is a sectional view illustrating embodiment 24 of the present invention, in which the numeral 130 denotes a concave reflecting mirror disposed in an opposed relation to a coupling mirror 2, numeral 131 denotes a total reflection film formed on the reflecting mirror 130, and numeral 132 denotes a ring-shaped partial reflection film disposed coaxially With the total reflection film 131. The other members used in this embodiment are the same as or similar to those used in the conventional laser system illustrated in FIG. 2, so are indicated by the same reference numerals and explanations thereof will be omitted.

In the laser system of this embodiment, the mode selection in the resonator is performed by the total reflection film 131 of the reflecting mirror 130, as in the foregoing embodiment 1. A portion of laser beam which has passed through the partial reflection film 132 is used for measuring various laser characteristics as in the foregoing embodiments 20 to 22.

The effect obtained in this embodiment 24 is the same as that obtained in embodiment 1. A mode present in the resonator is selected by the total reflection film 131 of the reflecting mirror 130 and the laser gain portion which has not been used in the conventional resonator can be used effectively for the amplification of laser beam 6. Consequently, it is possible to extract a laser beam of $TEM_{00}$ mode having a cross sectional area larger than the beam diameter determined by the resonator construction, which has heretofore been impossible.

Embodiment 25

Although in the previous embodiment 24 the mirrors 1 and 2 which constitute the resonator are not provided with a mirror angle adjusting mechanism, at least one of the coupling mirror 2 and the mirror 130 both constituting a resonator may be provided with a mirror angle adjusting mechanism 2501 or 2502. This construction is effective for a laser system wherein the position and direction of laser beam 7 emitted are deviated with increase of applied power. In more particular terms, as the applied power increases, the mirror angle adjusting mechanism 2501 or 2502 is operated to correct the positional and directional deviations of the laser beam 7 emitted, whereby there can be obtained a laser system extremely superior in the stability of laser beam.

Embodiment 26

Figure 56A:
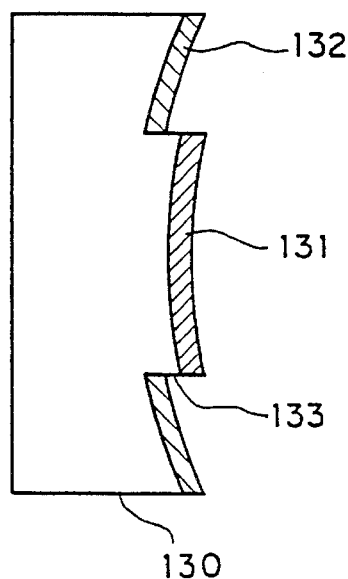
FIGS. 56(a) and 56(b) are each a sectional view of a mirror in embodiment 26 of the invention.
Figure 56B:
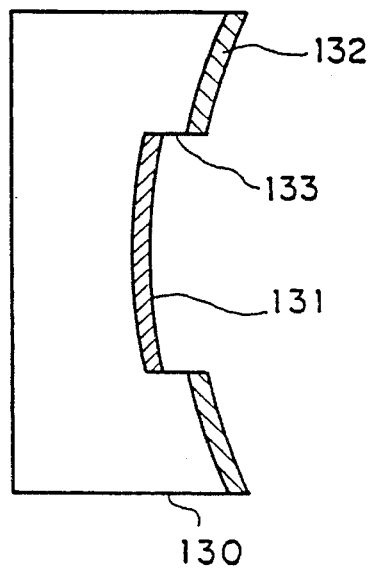
Figure 57A:
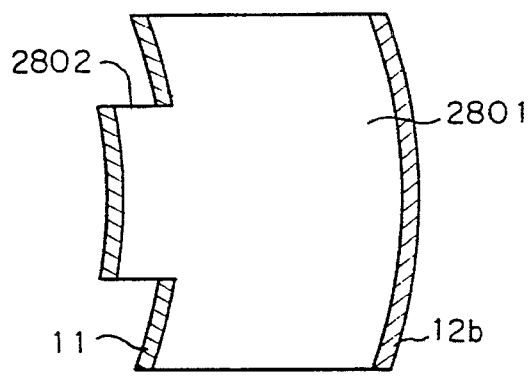
FIGS. 57(a) and 57(b) are each a sectional view of a mirror in embodiment 28 of the invention.
Figure 57B:
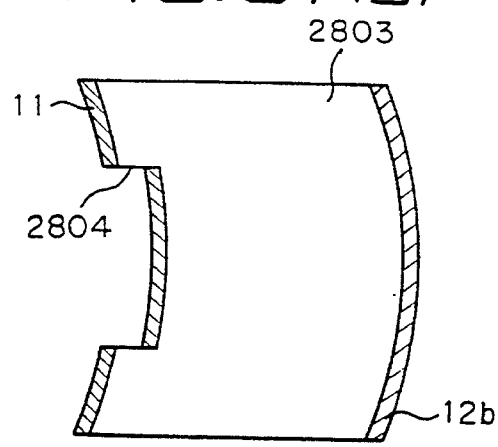
Figure 58A:
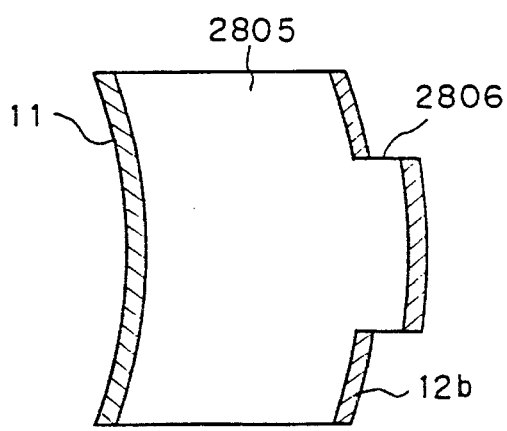
FIGS. 58(a) and 58(b) are each a sectional view of a mirror in embodiment 28 of the invention.
Figure 58B:
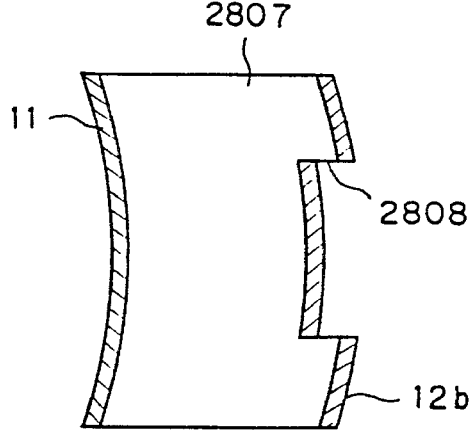

The description of the foregoing embodiment 24 is based on the assumption that the thickness of the total reflection film 131 and that of the partial reflection film 132 are equal to each other and that there is no phase difference induced at the time of reflection due to a difference in film construction. Generally, however, the thickness of the film 131 and that of the film 132 are different from each other in most cases and there arises a phase difference at the time of reflection due to a difference in film construction. In the presence of a phase difference, therefore, the total reflection film 131 may be formed with a stepped portion 133 so that the phase difference $\Delta$ is an integer multiple of $2\pi$, as shown in FIGS. 56(a) and 56(b). By forming the stepped portion 133 it is made possible to cancel a phase difference between the laser beam 6 reflected by the total reflection film 131 and that reflected by the partial reflection film 132.

Embodiment 27

Although in the above embodiment 26 the stepped portion 133 is formed so that the phase difference $\Delta$ is an integer multiple of $2\pi$ to compensate the phase difference, the phase difference may be controlled by suitable adjusting the thickness of the stepped portion or of the partial reflection film 132 or the total reflection film 131, thereby improving the quality of the laser beam 7.

Embodiment 28

Although in the foregoing embodiment 26 the reflecting mirror 130 is provided with a phase difference compensating means (stepped portion 133), the partial reflection film 11 or the antireflecting film 12b may be formed with a stepped portion (phase difference compensating means) 2802, 2804, 2806 or 2808 so that the phase difference $\Delta$ is an integer multiple of $2\pi$ in the other mirror that constitutes a resonator conjointly with the reflector 130, i.e., a coupling mirror 2801, 2803, 2805 or 2807, as shown in FIGS. 57(a), 57(b), 28(a) and 58(b). This construction results in improvement of the beam quality as in the embodiment 26.

Embodiment 29

Although in the previous embodiment 28 the phase difference $\Delta$ is compensated in the coupling mirror by setting it at an integer multiple of $2\pi$, the phase difference may be controlled by appropriately adjusting the thickness of the stepped portion 2802, 2804, 2806 or 2808 or of the partial reflection film 11 and the total reflection film 12b to improve the quality of the laser beam 7.

Embodiment 30

Although in the above embodiments 26 to 29 a phase difference compensating means or a phase difference controlling means is disposed in the interior of the resonator, a phase difference compensating means 3001 may be disposed outside the resonator, as shown in FIG. 59, to control the phase difference of laser beam 3003, whereby there can be obtained the same effect as above.

Further, a phase difference of laser beam 3006 may be controlled by using such a construction as shown in FIG. 60, in which divided total reflectors 3004a and 3004b are disposed outside the resonator. In this case, one divided mirror is driven using a drive element (phase difference controlling means) 3005, e.g. piezo-electric element, to adjust the difference in thickness between the total reflectors 3004a and 3004b.

Embodiment 31

Figure 61:
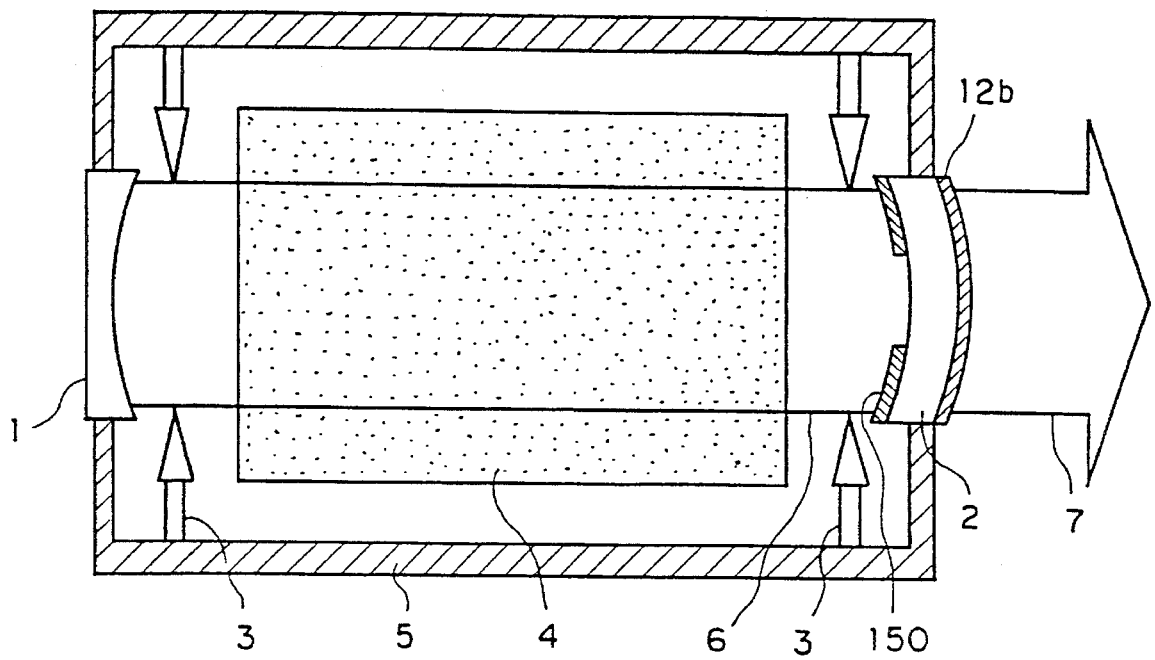
FIG. 61 is a sectional view showing embodiment 31 of the invention.

FIG. 61 is a sectional view illustrating embodiment 31 of the present invention, in which the numeral 150 denotes a ring-shaped antireflecting film formed on the opposed side of a coupling mirror 2 to a total reflector 1. Other constructional members used in this embodiment are the same as or similar to those used in the conventional laser system, so are indicated by the same reference numerals as in the conventional system and explanations thereof will be omitted.

The operation of this embodiment will now be described. In the laser system of this embodiment, like embodiment 1, the surface of the coupling mirror 2 located inside the ring-shaped antireflecting film 150 functions as a partially reflecting portion. Therefore, the base itself of the coupling mirror 2 performs the mode selection in the resonator.

Thus, by selecting a mode present in the resonator as in embodiment 1, using the surface of the coupling mirror 2 located inside the ring-shaped non-reflecting film 150, the laser gain portion which has not been used in the conventional resonator can be used in an extremely effective manner for the amplification of laser beam 6. Consequently, it is possible to extract a laser beam of $TEM_{00}$ mode having a cross sectional area larger than the beam diameter determined by the resonator construction which has heretofore been impossible.

Embodiment 32

Figure 62:
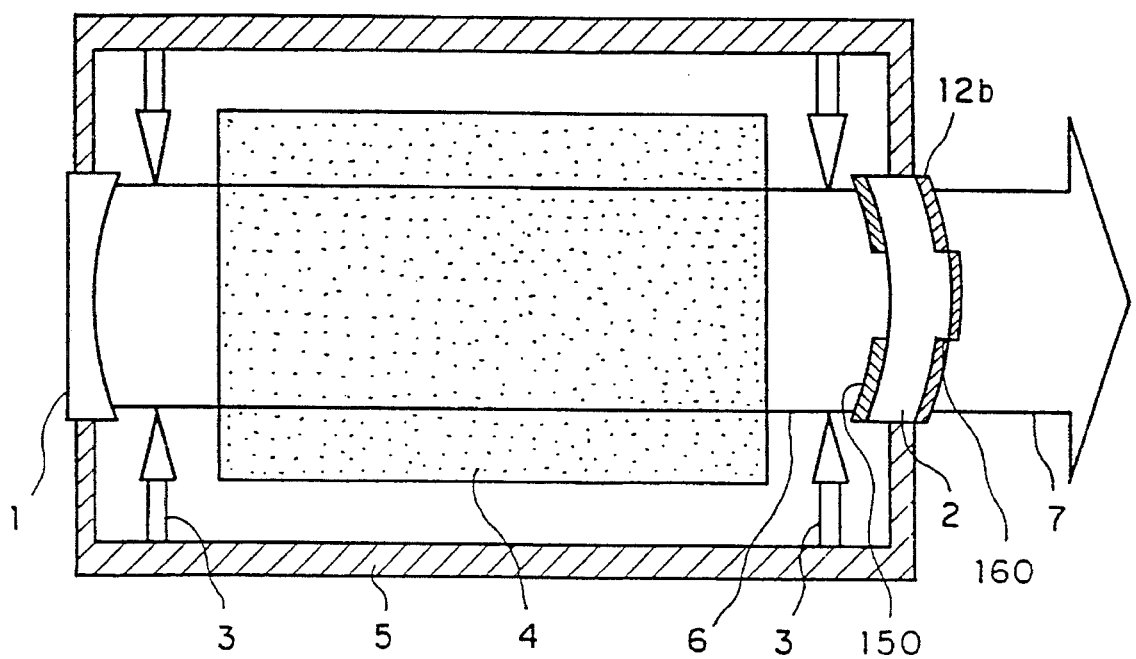
FIG. 62 is a sectional view showing embodiment 32 of the invention.

FIG. 62 illustrates embodiment 32 in which the coupling mirror 2 used in the previous embodiment 31 is provided with a phase difference compensating means. More specifically, a coupling mirror 2 used in this embodiment is formed with a stepped portion 160 on the side thereof opposite to the antireflecting film 150, whereby the quality of laser beam 7 outputted from the resonator of this embodiment is improved as in embodiment 5.

Figure 63:
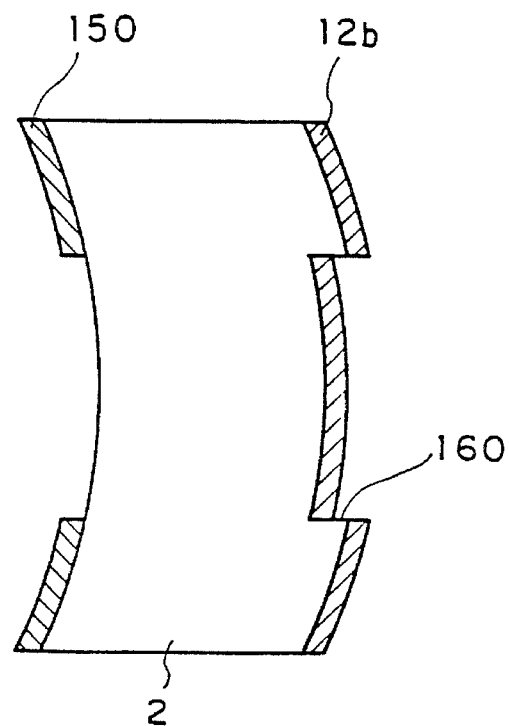
FIG. 63 is a sectional view of a mirror in embodiment 32 of the invention.

Although in this embodiment the central part of the coupling mirror 2 is projected on the side opposite to the antireflecting film 150 side to form the stepped portion 160 as a phase difference compensating means, a stepped portion 160 may be formed by cutting the central part of the opposite side to the antireflecting film 150 side of the coupling mirror 2 as in FIG. 63. In this case, the stepped portion 160 is formed in such a manner that the phase difference Δ of the laser beam 7 is an integer multiple of $2\pi$.

Figure 64A:
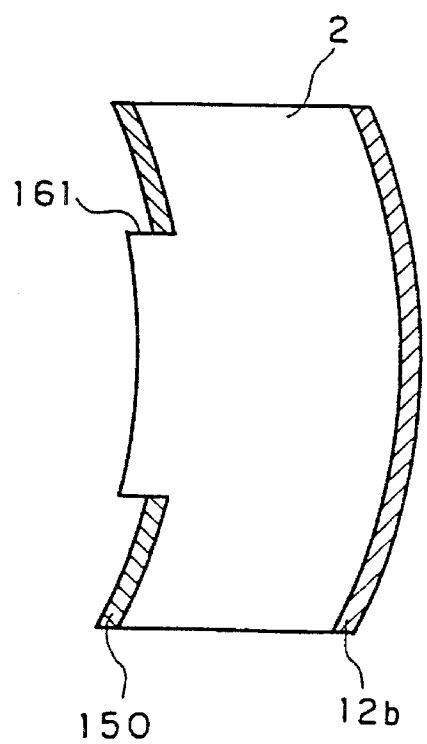
FIGS. 64(a) and 64(b) are each a sectional view of a mirror in embodiment 32 of the invention.
Figure 64B:
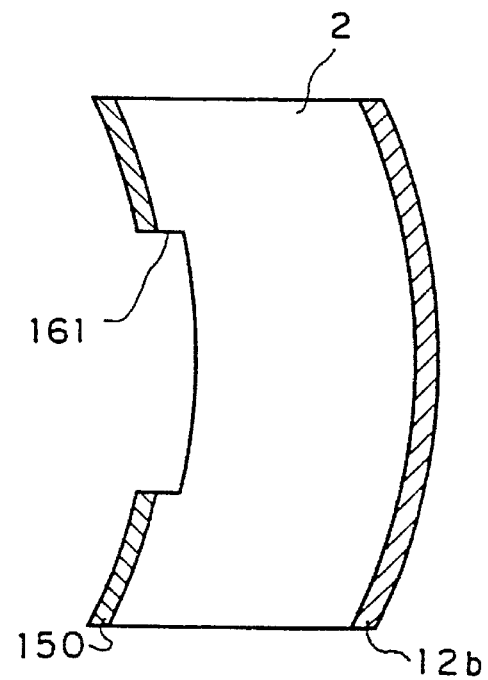

The phase difference compensating means is not limited to those shown in embodiment 32. As illustrated in FIGS. 64(*a*) and 64(*b*), a stepped portion 161 may be formed on the antireflecting film 150 side of the coupling mirror 2 in such a manner that the phase difference Δ is an integer multiple of $2\pi$.

Figure 65A:
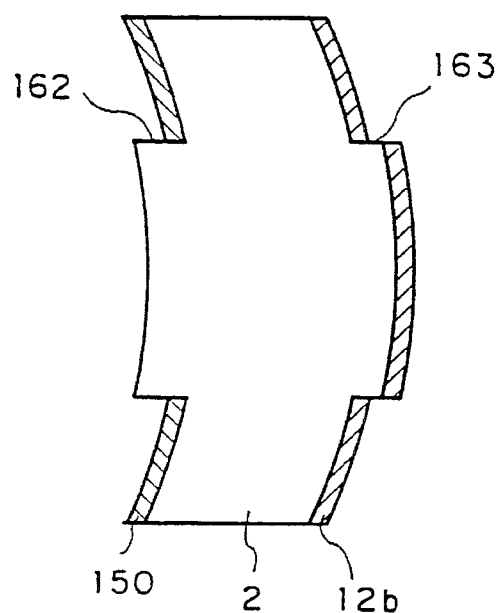
FIGS. 65(a) and 65(b) are each a sectional view of a mirror in embodiment 32 of the invention.
Figure 65B:
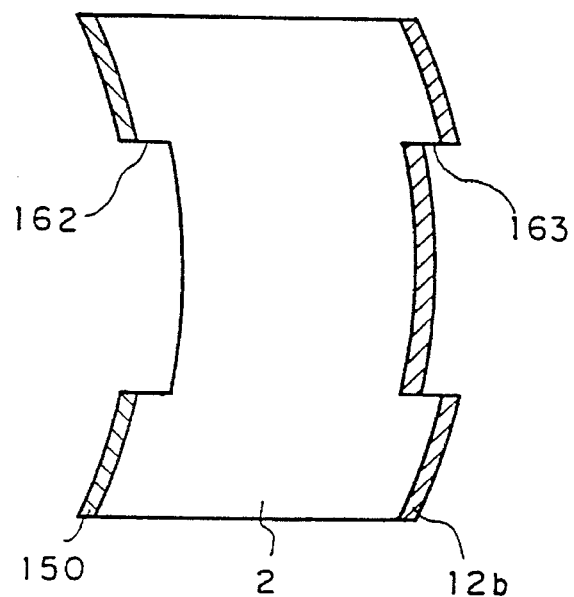

Further, as shown in FIGS. 65(*a*) and 65(*b*), stepped portions 162 and 163 may be formed on both sides of the coupling mirror 2 so that the phase difference Δ of the laser beam 7 outputted from the resonator is an integer multiple of $2\pi$.

Figure 66:
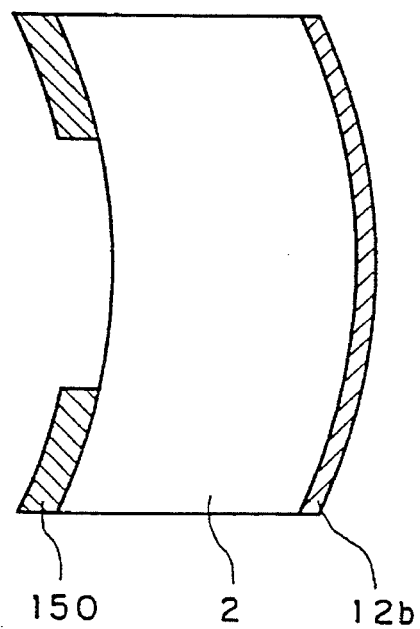
FIG. 66 is a sectional view of a mirror in embodiment 32 of the invention.

Although in this embodiment a stepped portion or stepped portions are formed in the coupling mirror 2 for compensating the phase difference Δ of the laser beam 7, this does not constitute any limitation. The same effect as above can be expected even if the thickness of the antireflecting film 150 is set so as to give a phase difference Δ0 of the laser beam 7 equal to an integer multiple of $2\pi$, as shown in FIG. 66.

Embodiment 33

Figure 67:
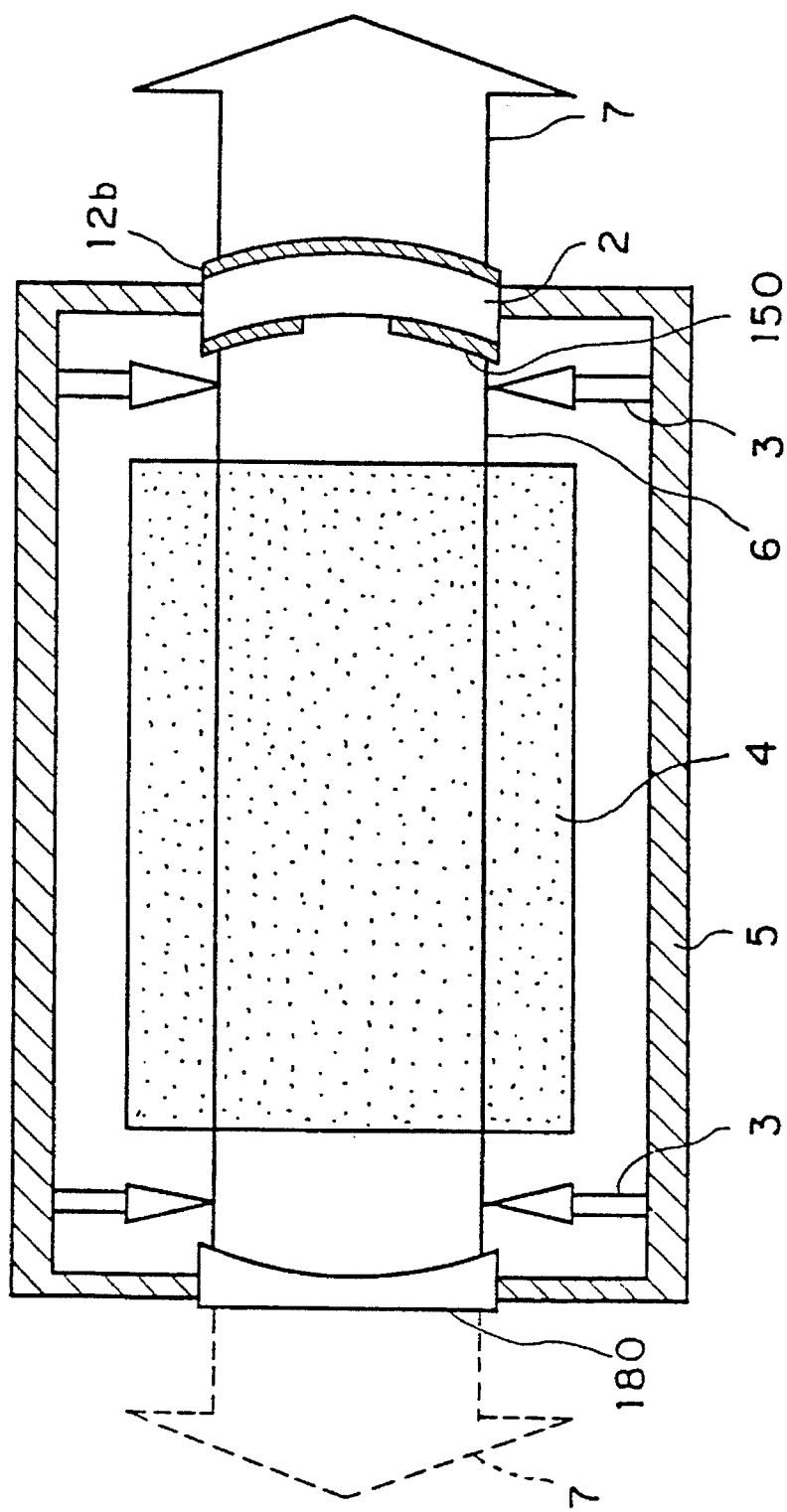
FIG. 67 is a sectional view showing embodiment 33 of the invention.

Although in the embodiment 31 illustrated in FIG. 61 the coupling mirror 2 and the total reflector 1 are used as the mirrors which constitute the resonator, a partial reflector 180 may be used in place of the total reflector 1, as shown in FIG. 67. In this embodiment illustrated therein, the same effect as in the embodiment 31 is attained. Further, if the intensity reflectivity of the partial reflector 180 is set to, say, 99%, a laser beam of 1% intensity is emitted to the exterior of the resonator. Therefore, the use of this laser beam in the measurement of laser outputs permits the same measurement to be greatly simplified and facilitated.

Embodiment 34

Figure 68:
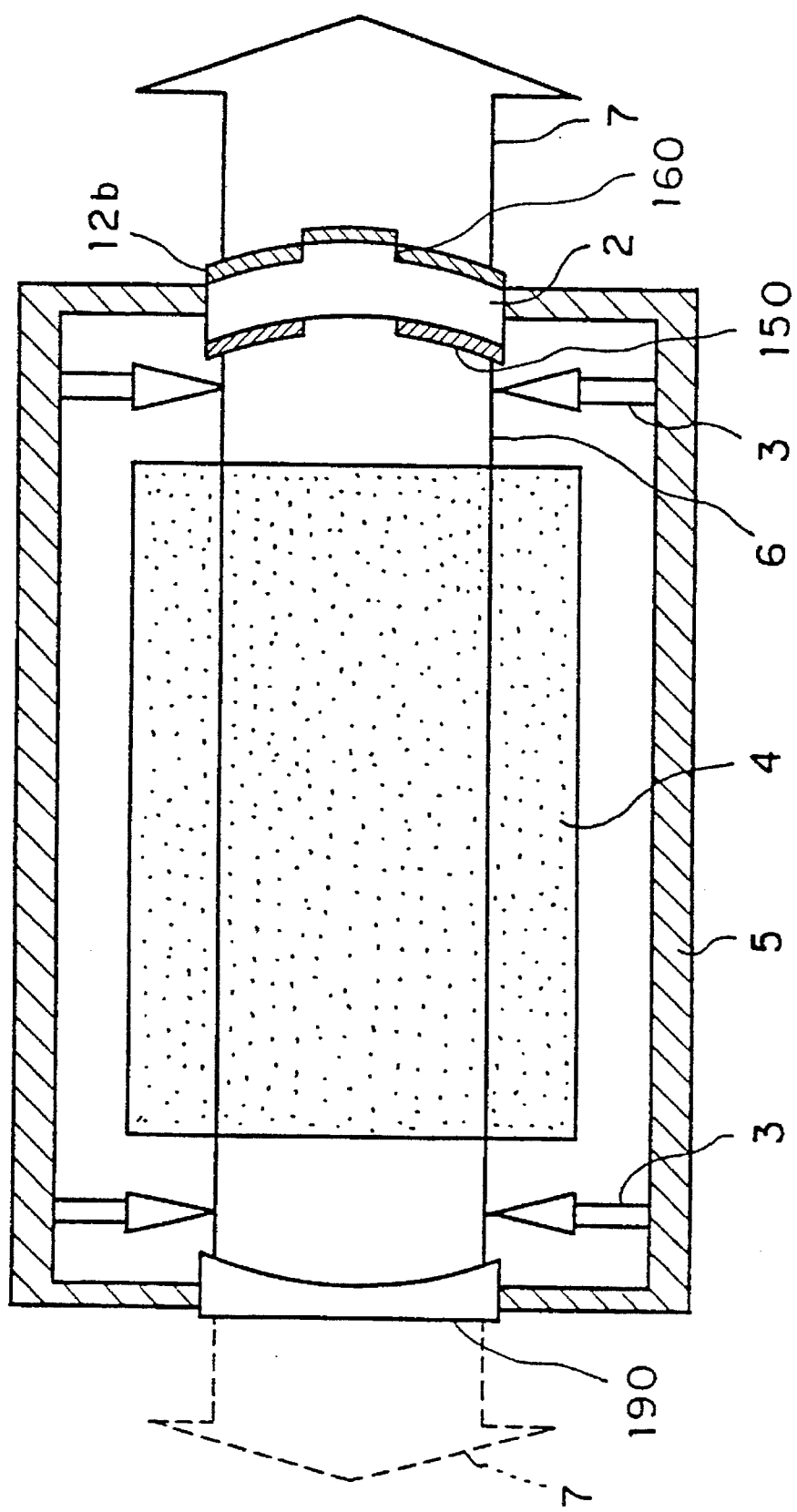
FIG. 68 is a sectional view showing embodiment 34 of the invention.

Although in the embodiment 32 illustrated in FIG. 62, the coupling mirror 2 and the total reflector 1 are used as the mirrors which constitute the resonator, a partial reflector 190 may be used instead of the total reflector 1, as shown in FIG. 68. In this embodiment illustrated therein, the same effect as in the embodiment 32 is attained. Further, if the intensity reflectivity of the partial reflector 190 is set to, say, 99%, a laser beam of 1% intensity is emitted to the exterior of the resonator. Therefore, if this laser beam is used in the measurement of laser output, the measurement is greatly simplified and becomes easier.

Embodiment 35

Figure 71:
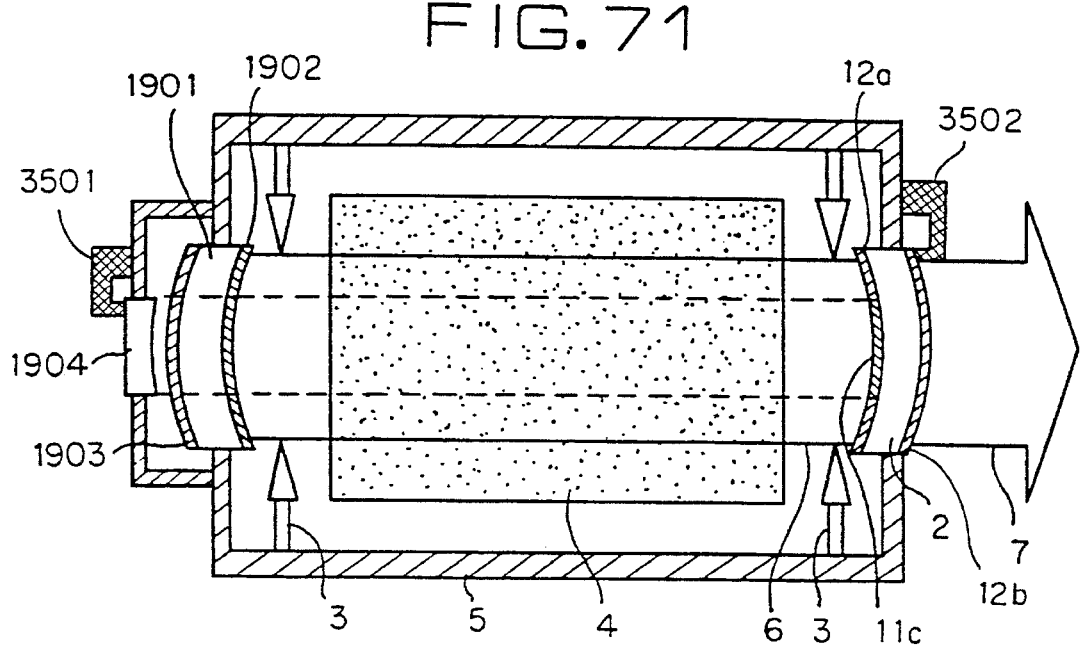
FIG. 71 is a sectional view showing embodiment 35 of the invention.

Although in the foregoing embodiment illustrated in FIG. 45, the mirrors 1904 and 2 which constitute the resonator are not provided with a mirror angle adjusting mechanism, at least one of mirrors 2 and 1901 which constitute a resonator may be provided with a mirror angle adjusting mechanism 3501 or 3502, as shown in FIGS. 69 to 71. For example, this construction is effective for a laser system wherein the position and direction of laser beam 7 emitted are deviated as the applied power increases. More specifically, by operating the mirror angle adjusting mechanisms 3501 and 3502 with increase of applied power to correct such positional and directional deviations of the emitted laser beam 7, there can be obtained a laser system extremely superior in the stability of laser beam. Even if the mirror angle adjusting mechanism shown in FIGS. 69 to 71 are attached to the laser system of the foregoing embodiment 19 illustrated in FIG. 46, there can be obtained the same effect.

Embodiment 36

Figure 72A:
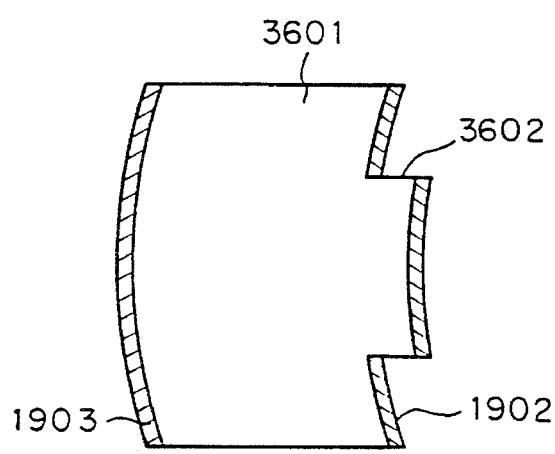
FIGS. 72(a) and 72(b) are each a sectional view of a mirror in embodiment 36 of the invention.
Figure 72B:
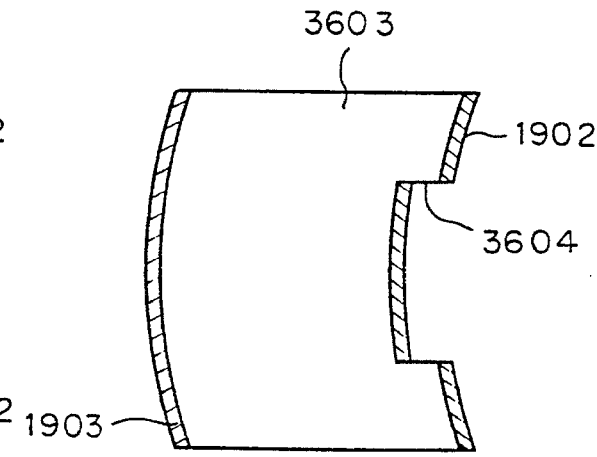
Figure 73A:
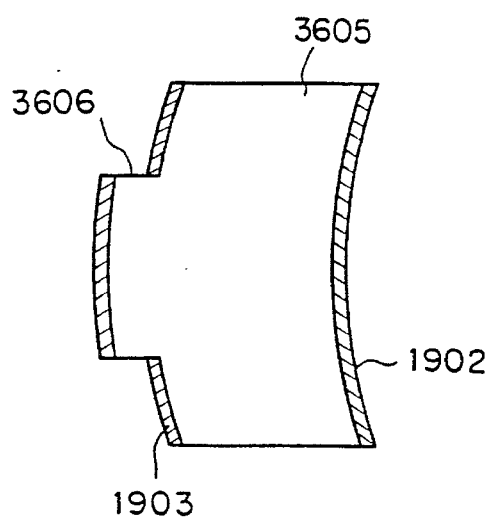
FIGS. 73(a) and 73(b) are each a sectional view of a mirror in embodiment 36 of the invention.
Figure 73B:
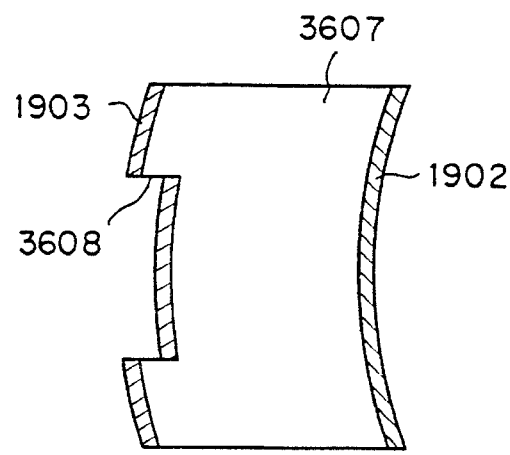

In the foregoing embodiment 19 illustrated in FIG. 46 a phase difference generated between the laser beam portion reflected by the total reflector 1904 and that reflected by the partial reflector 1901 is not compensated, while in FIGS. 72(*a*), 72(*b*), 73(*a*) and 73(*b*), stepped portions 3602 and 3604, or 3606 and 3608, are formed in a partial reflection film 1902 or an antireflecting film 1903 of partial reflectors 3601, 3603, 3605 and 3607 so that a phase difference Δ between the laser beam portion reflected by the total reflector 1904 and that reflected by the partial reflector 1901 is an integer multiple of $2\pi$, whereby the phase difference can be cancelled by the stepped portion 3602, 3604, 3606 or 3608.

Embodiment 37

Although in embodiment 36 the phase difference Δ is compensated by forming the stepped portions 3602, 3604, 3606 and 3608 so that the phase difference is an integer multiple of $2\pi$, the phase difference may be controlled by appropriately adjusting the thickness of those stepped portions or of the partial reflection film 1902 or the total reflection film 1903 to thereby improve the beam quality.

Embodiment 38

Figure 74A:
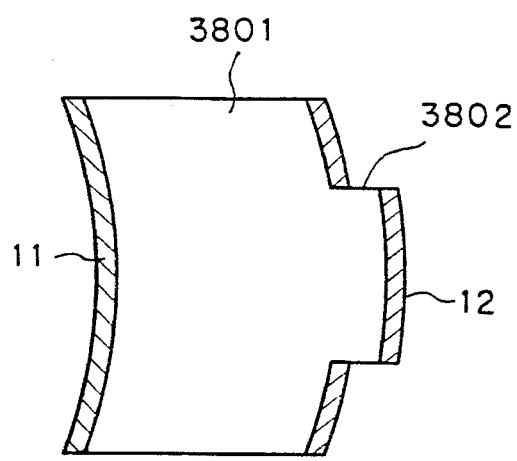
FIGS. 74(a) and 74(b) are each a sectional view of a mirror in embodiment 38 of the invention.
Figure 74B:
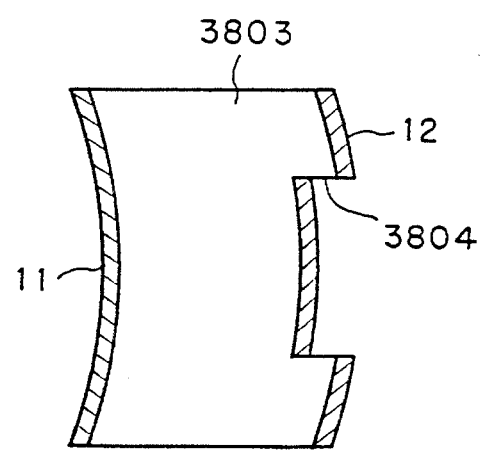
Figure 75A:
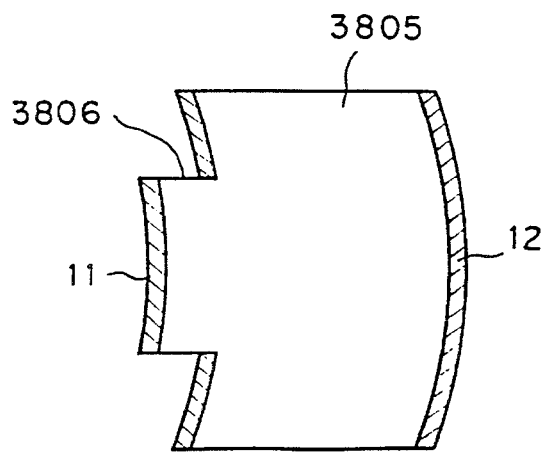
FIGS. 75(a) and 75(b) are each a sectional view of a mirror in embodiment 38 of the invention.
Figure 75B:
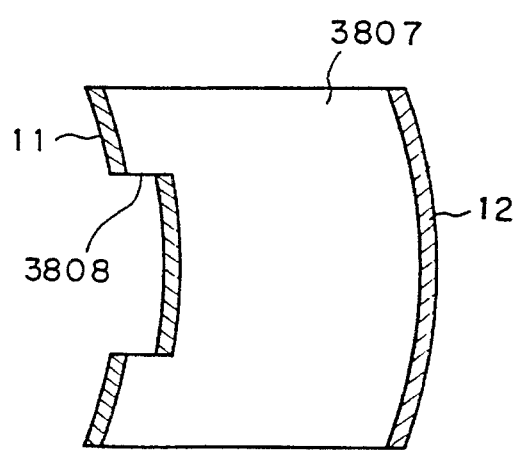

Although in embodiment 36 the partial reflectors are provided with phase difference compensating means, the other mirror which constitutes a resonator together with the total reflector 1904 may be provided with a phase difference compensating means. More specifically, stepped portions 3802 and 3804, or 3806 and 3808, may be formed in an antireflecting film 12 or a partial reflection film 11 of coupling mirrors 3801, 3803, 3805 and 3807 so that the phase difference Δ is an integer multiple of $2\pi$, as shown in FIGS. 74(*a*), 74(*b*), 75(*a*) and 75(*b*). This construction permits improvement of the beam quality as in embodiment 36.

Embodiment 39

Although in embodiment 38 the phase difference Δ is compensated by forming phase difference compensating means in the coupling mirrors in such a manner that the phase difference is an integer multiple of $2\pi$, the phase difference may be controlled by appropriately adjusting the thickness of the stepped portions 3802, 3804, 3806 and 3808 or of the partial reflection film 11 or the total reflection film 12 to improve the quality of the laser beam 7.

Embodiment 40

Although in the above embodiments 36 to 39 a phase difference compensating or controlling means is disposed in the interior of the resonator, a phase difference compensating means 4001 may be disposed outside the resonator, as shown in FIG. 76, to compensate a phase difference of laser beam 4003. Also in this case there can be obtained the same effect as above.

Alternatively, there may be adopted such an arrangement as shown in FIG. 77, in which divided total reflectors 4004*a* and 4004*b* are disposed outside the resonator and one divided mirror is driven by using a driving element (phase difference control means) 4005 such as a piezo-electric element for example to adjust the difference in thickness between the total reflectors 4004*a* and 4004*b* and thereby control the phase difference of laser beam 4006.

Embodiment 41

FIG. 78 is a sectional view illustrating embodiment 41 of the present invention. In the same figure, the numeral 4101 denotes a ring-shaped mirror inserted in a stable resonator constituted by both a partial reflector 2 and a total reflector 1; numeral 4102 denotes a transmission mirror; numerals 4103*a* and 4103*b* represent antireflecting films formed on both sides of the transmission mirror 4102; numeral 4104 denotes a plane mirror; and numerals 7*a* and 7*b* represent laser beams emitted from the resonator. In FIG. 78, the same members as in the conventional laser system illustrated in FIG. 2 are indicated by the same reference numerals and explanations thereof will be omitted.

The operation of the laser system of this embodiment is almost the same as in embodiment 1. The ring-shaped mirror 4101 performs the mode selection in the resonator.

More specifically, such mode selection is effected by the inside diameter of the ring-shaped mirror 4101, whereby the laser gain portion which has not been used in the conventional laser system of FIG. 2 can be used extremely effectively for the amplification of laser beam 6.

In this embodiment, moreover, since the laser beam 7*b* reflected by the ring-shaped mirror 4101 and emitted through the antireflecting films 4103*a* and 4103*b* of the transmission mirror 4102 is separate from the laser beam 7*a* emitted through the partial reflector 2, it is possible, for example, to perform two kinds of laser processings at a time in a single laser system.

Embodiment 42

Figure 79:
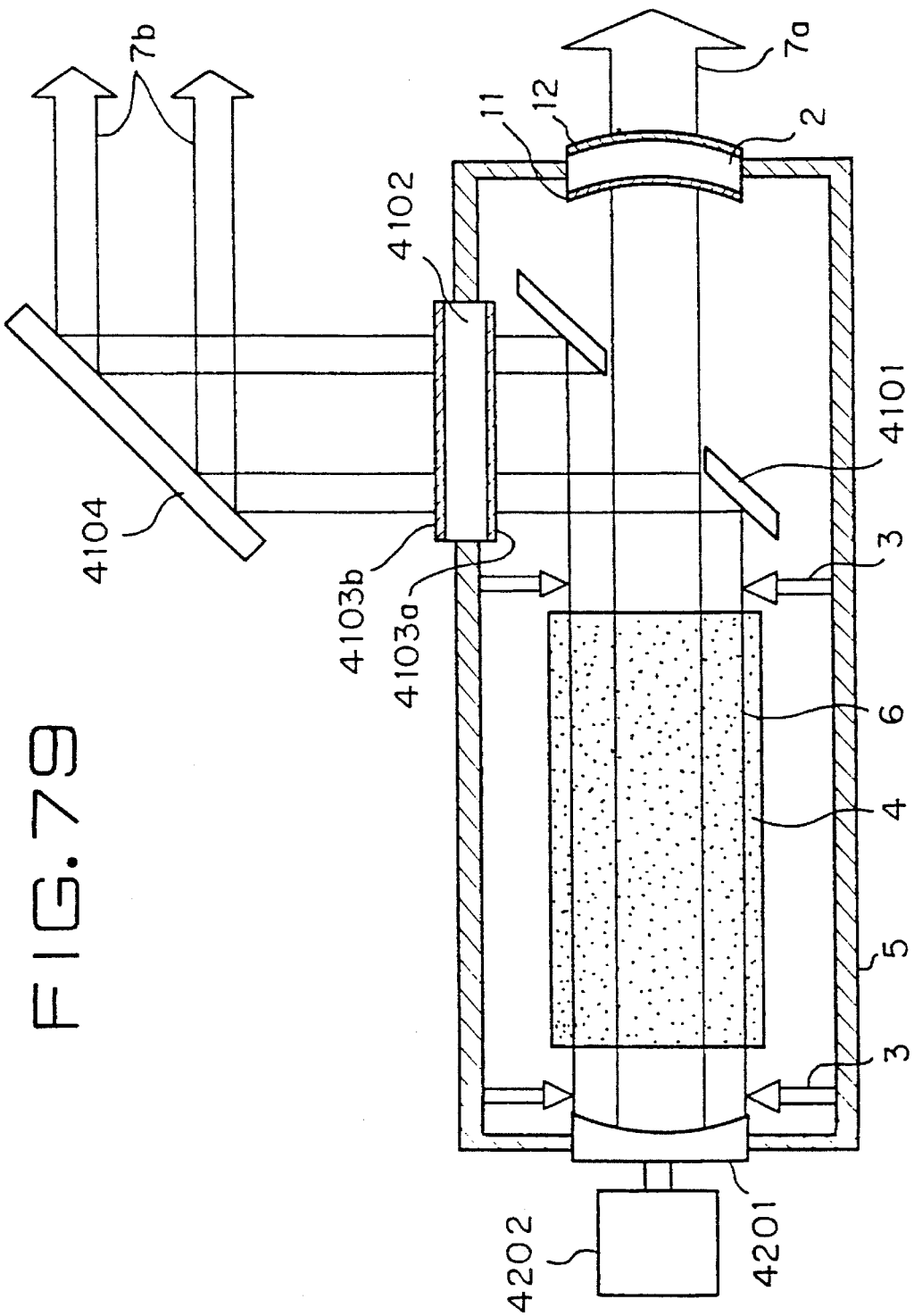
FIG. 79 is a sectional view showing embodiment 42 of the invention.

Although in the above embodiment 41 a total reflector having a fixed radius of curvature is used as the mirror 1 which constitutes the resonator, a mirror 4201 having a curvature changing mechanism 4202 may be used in place of the total reflector 1, as shown in FIG. 79. In this case, by changing the radius of curvature of the mirror 4201, using the curvature changing mechanism 4202, it is made possible to freely select a mode of laser beam 6 generated in the resonator.

Embodiment 43

Figure 80:
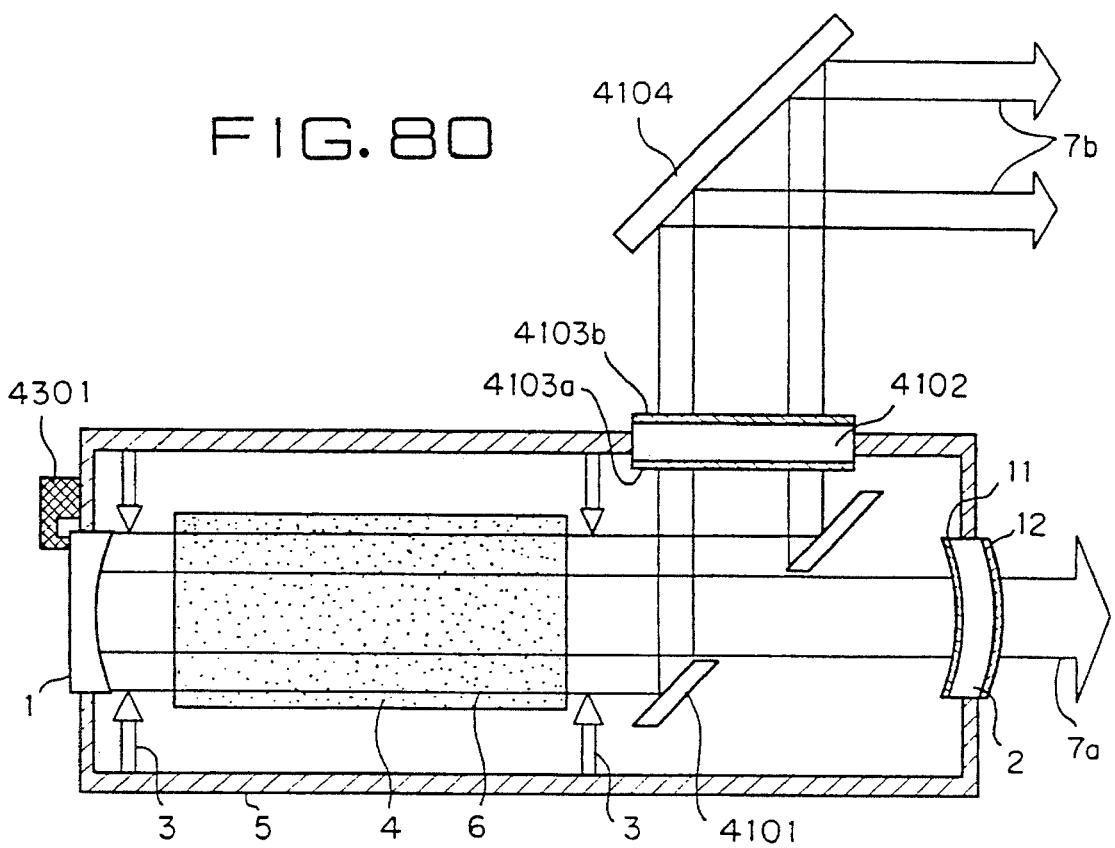
FIG. 80 is a sectional view showing embodiment 43 of the invention.
Figure 81:
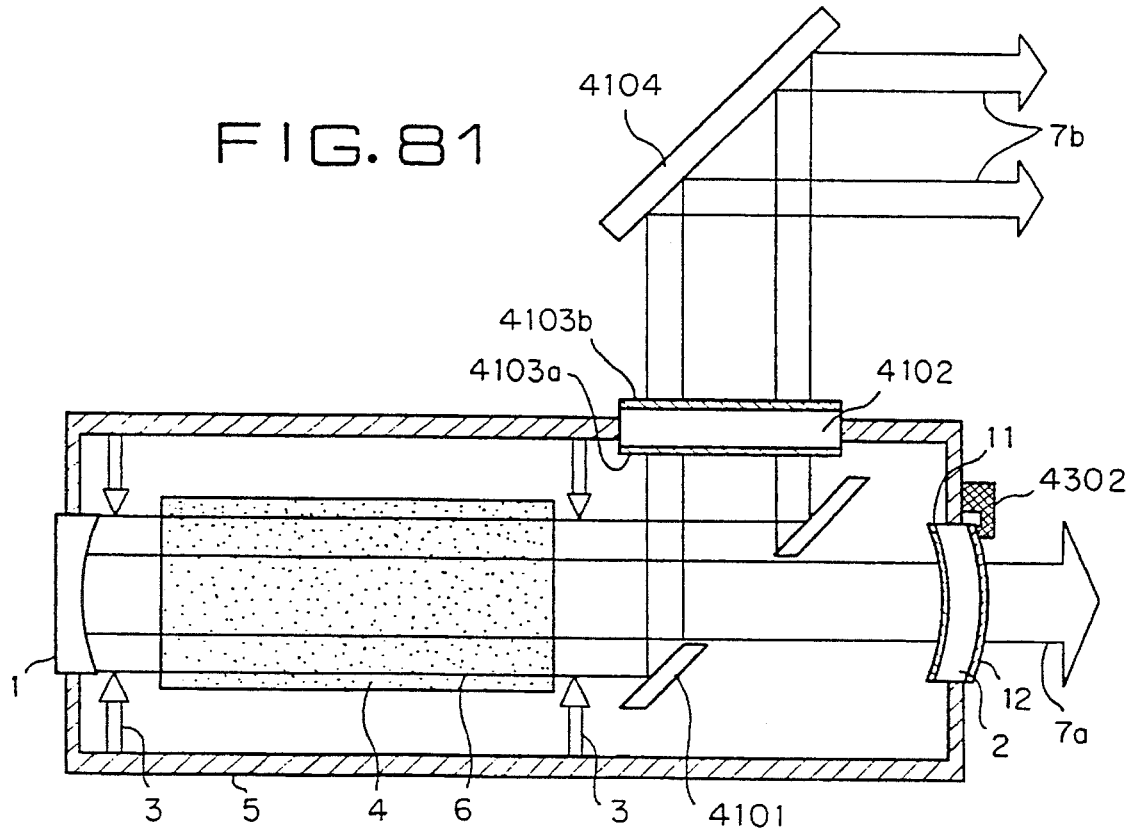
FIG. 81 is a sectional view showing embodiment 43 of the invention.
Figure 82:
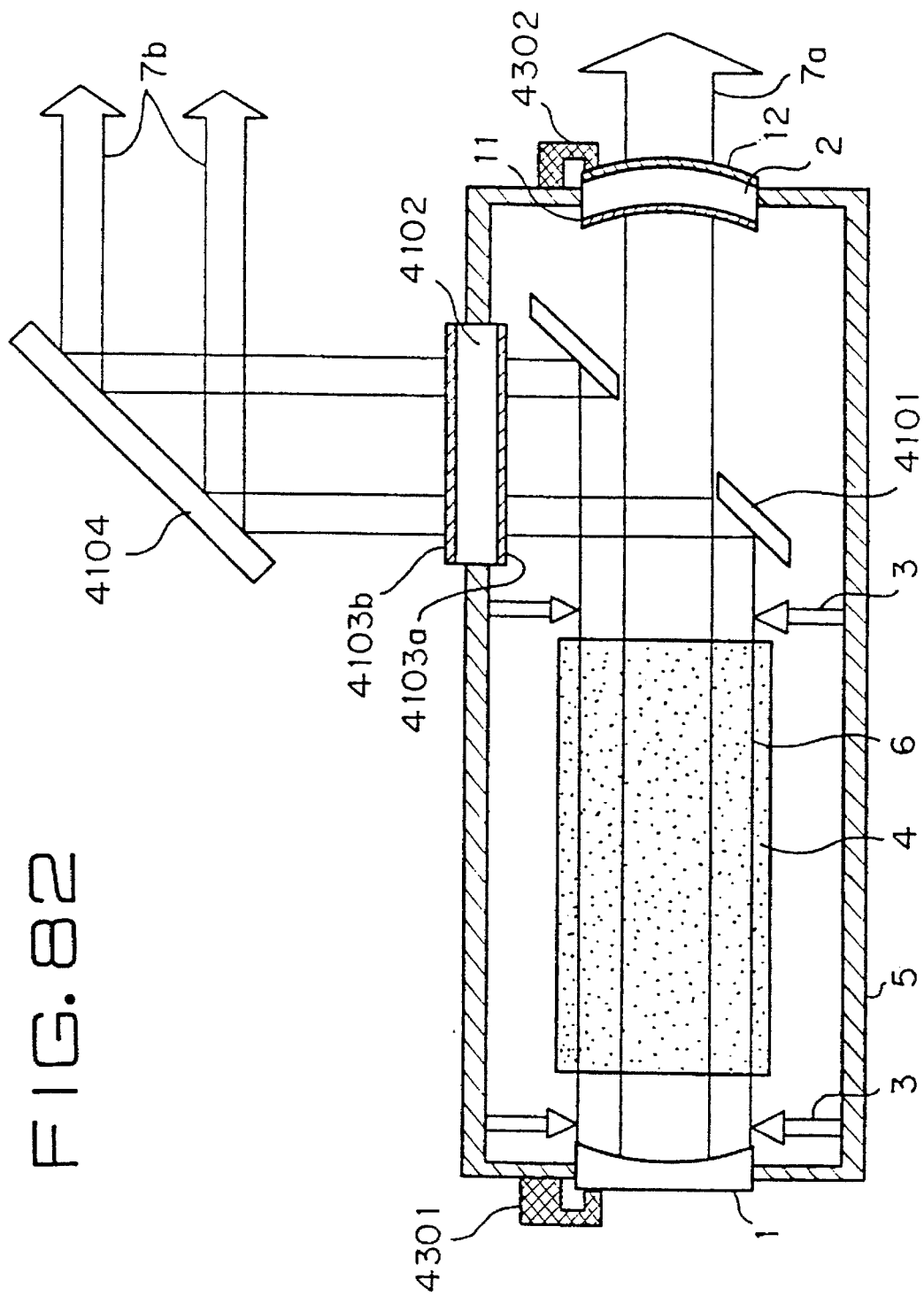
FIG. 82 is a sectional view showing embodiment 43 of the invention.

Although in embodiment 41 the mirrors 1 and 2 which constitute the resonator are not provided with a mirror angle adjusting mechanism, at least one of the mirrors 1 and 2 may be provided with a mirror angle adjusting mechanism 4301 or 4302, as shown in FIGS. 80 to 82. For example, this construction is effective in a laser system wherein the laser beams 7*a* and 7*b* are deviated in their emitted position and direction as the applied power increases. More particularly, by operating the mirror angle adjusting mechanisms 4301 and 4302 with increase of applied powers to correct such positional and directional deviations of the laser beams 7*a* and 7*b*, it is made possible to improve the beam stability.

Embodiment 44

Figure 83:
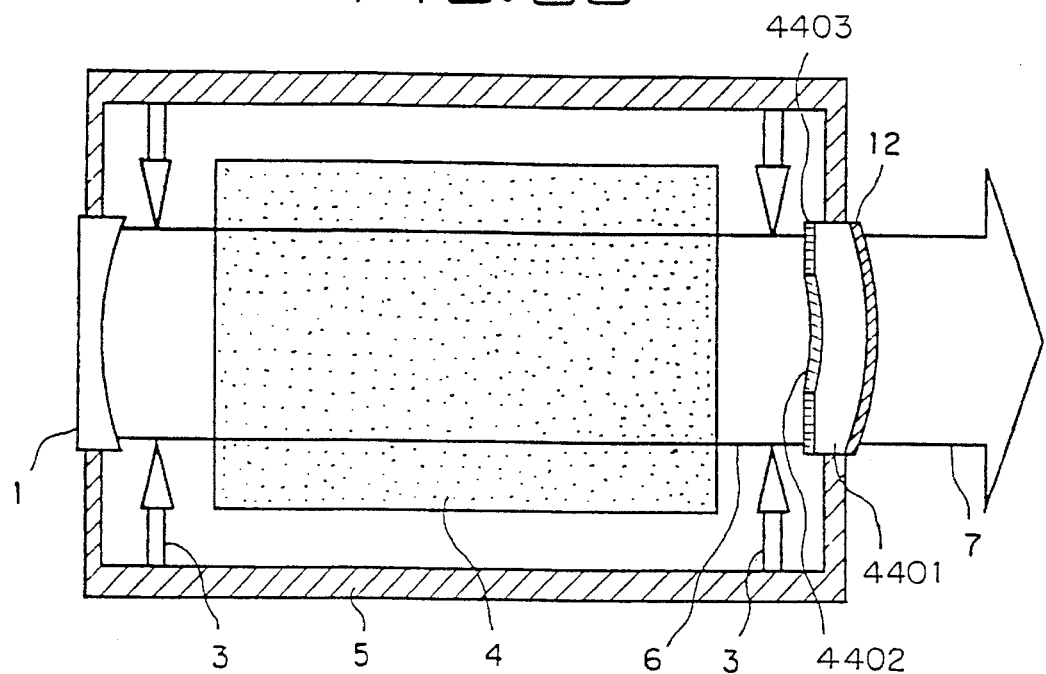
FIG. 83 is a sectional view showing embodiment 44 of the invention.

FIG. 83 is a sectional view illustrating embodiment 44 of the present invention. In the same figure, the numeral 4401 denotes a partial reflector; numeral 4402 denotes a partial reflection film disposed in the central part of the partial reflector 4401; and numeral 4403 denotes a partial reflection film as an outer peripheral film. The radius of curvature of the central, partial reflection film 4402 and that of the outer peripheral, partial reflection film 4403 are different from each other. The central, partial reflection film 4402 of the partial reflector 4401 and a total reflector 1 constitute a stable resonator. In FIG. 83, as to the members which are the same as or similar to those used in the conventional laser system of FIG. 2, explanations thereof will be omitted.

The operation of the laser system of this embodiment is about the same as in embodiment 1. The central, partial reflection film 4402 of the partial reflector 4401 performs the mode selection in the resonator.

By selecting a mode in the resonator, using the central, a partial reflection film 4402 of the partial reflector 4401, the laser gain of the outer peripheral laser beam portion near the partial reflection film 4403 which has not been used in the conventional resonator can be used extremely effectively for the amplification of laser beam 6.

Embodiment 45

Figure 84:
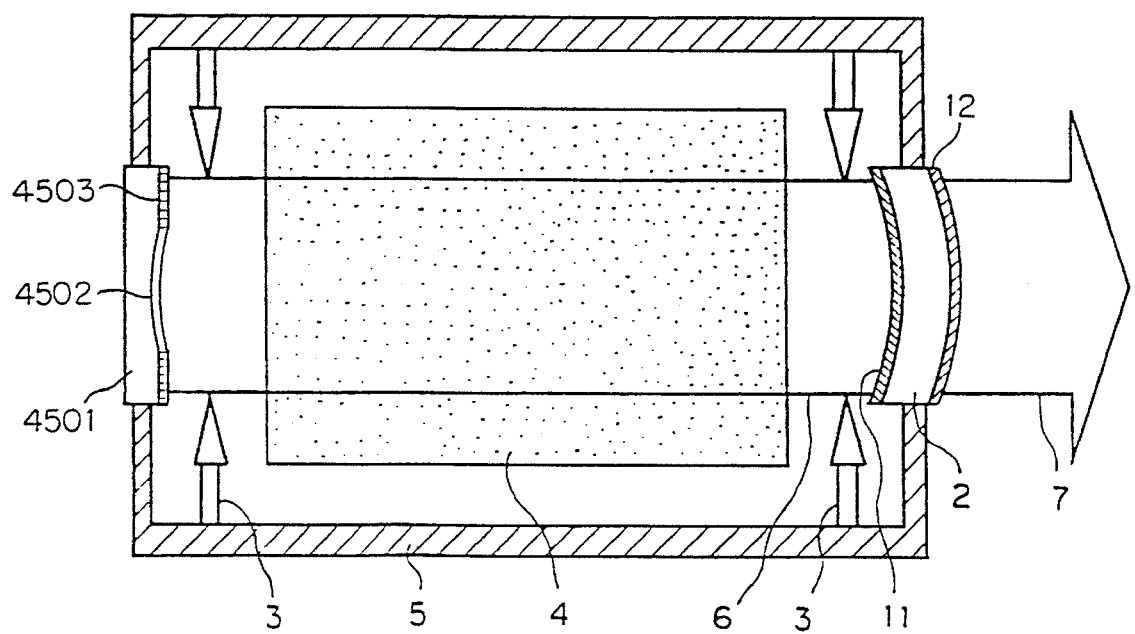
FIG. 84 is a sectional view showing embodiment 45 of the invention.

FIG. 84 is a sectional view illustrating embodiment 45 of the present invention. In the same figure, the numeral 4501 denotes a total reflector, numeral 4502 denotes a total reflection film disposed centrally of the total reflector 4501, and numeral 4503 denotes a total reflection film as an outer peripheral film. The radius of curvature of the central, total reflection film 4502 and that of the outer peripheral, total reflection film 4503 are different from each other. The central, total reflection film 4502 of the total reflector 4501 and a partial reflector 2 constitute a stable resonator. In FIG. 84, as to the members which are the same as or similar to those used in the conventional laser system of FIG. 2, explanations thereof will be omitted.

The operation of the laser system of this embodiment is almost the same as in embodiment 44. The central, total reflection film 4502 of the total reflector 4501 performs the mode selection in the resonator.

By selecting a mode present in the resonator, using the central, total reflection film 4502 of the total reflector 4501, the laser gain of the outer peripheral laser beam portion near the total reflection film 4503 which has not been used in the conventional resonator can be used in an extremely effective manner for the amplification of laser beam 6.

Embodiment 46

Figure 85:
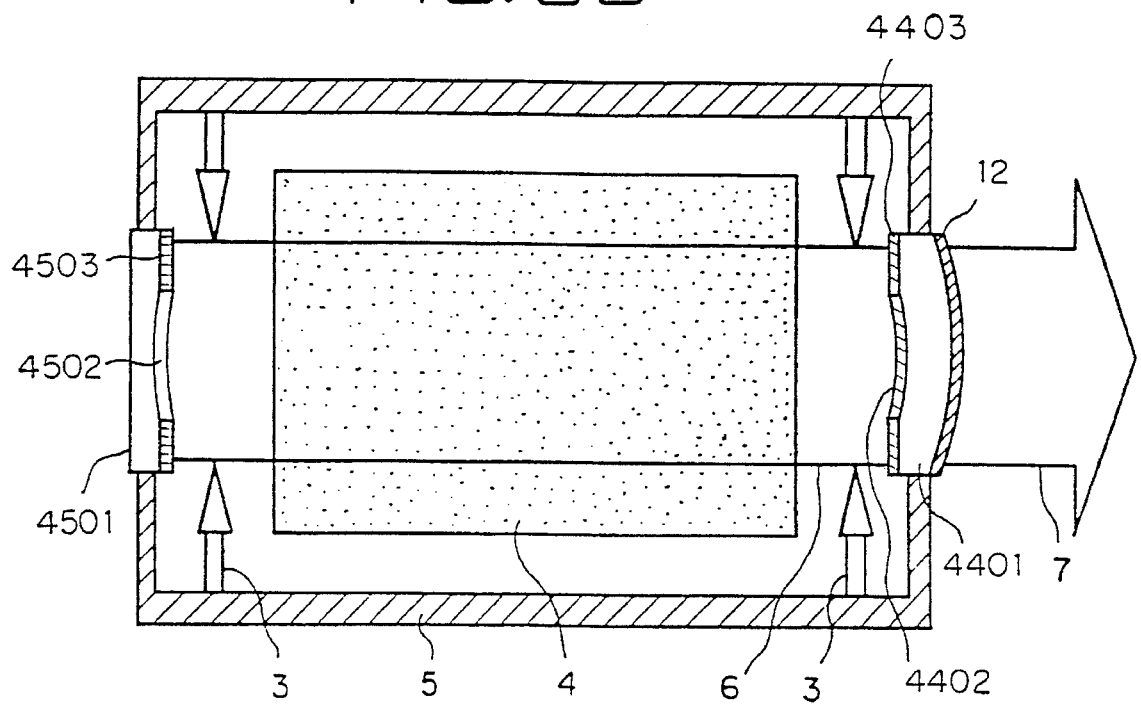
FIG. 85 is a sectional view showing embodiment 46 of the invention.

Although in the previous embodiments 44 and 45 the mode selection is performed by one of the paired mirrors which constitute the resonator, it may be done using a pair of mirrors which constitute a resonator, as shown in FIG. 85. Also in this case there can be obtained the same effect as above.

Embodiment 47

Figure 86:
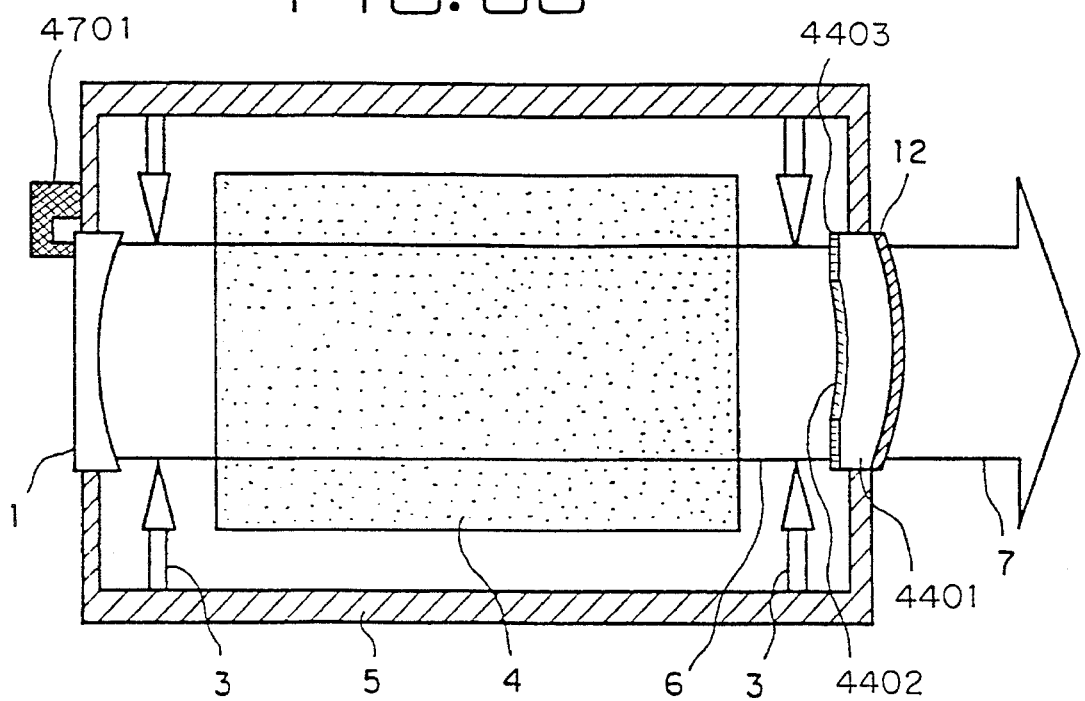
FIG. 86 is a sectional view showing embodiment 47 of the invention.
Figure 87:
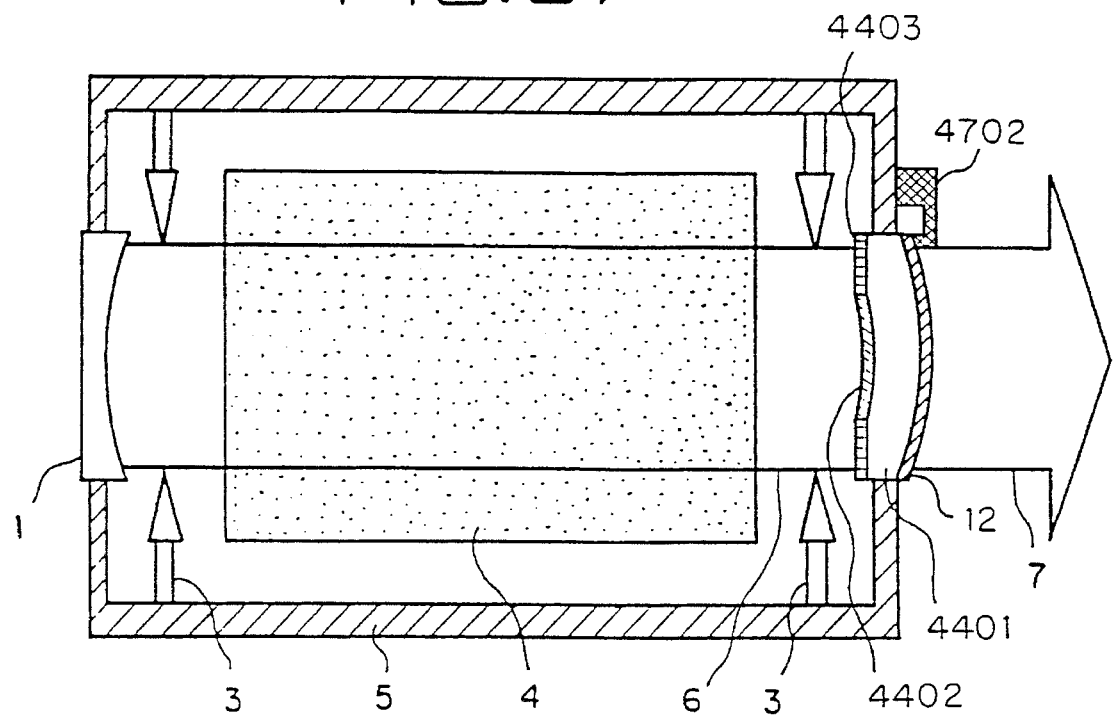
FIG. 87 is a sectional view showing embodiment 47 of the invention.
Figure 88:
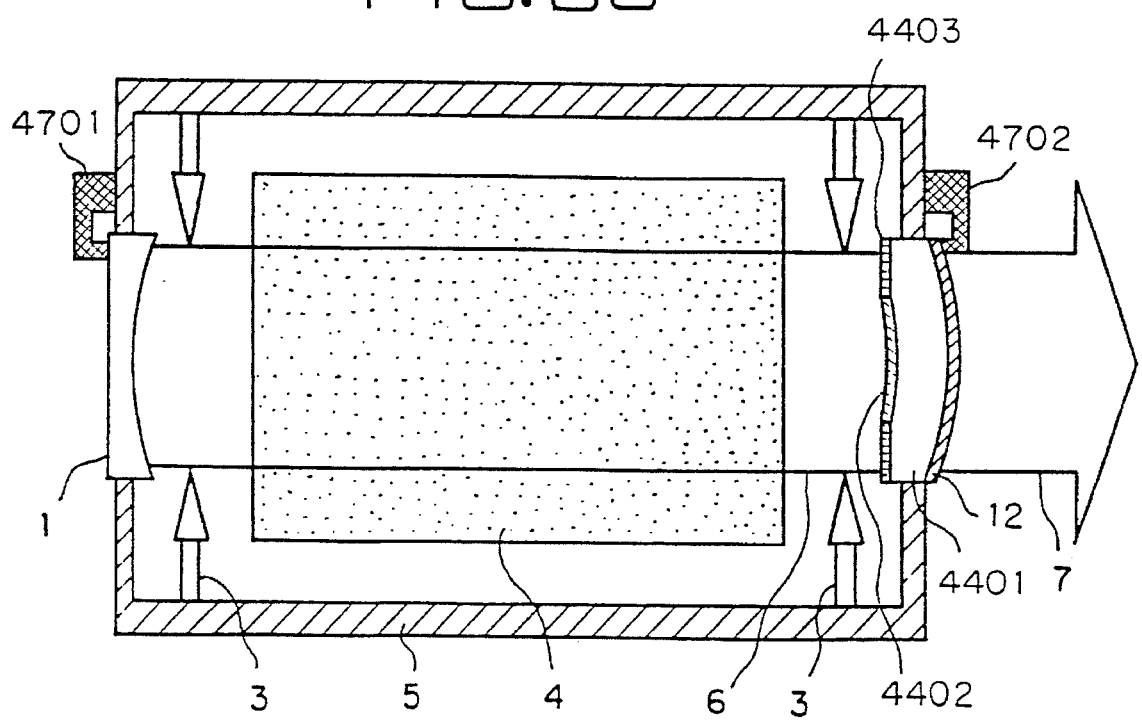
FIG. 88 is a sectional view showing embodiment 47 of the invention.

Although in the foregoing embodiment 44 the partial reflector 4401 as a constituent of the resonator is not provided with a mirror angle adjusting mechanism, at least one of mirrors 1 and 2 which constitute a resonator may be provided with a mirror angle adjusting mechanism 4701 or 4702, a shown in FIGS. 86 to 88. For example, this construction exhibits an effect in a laser system wherein the position and direction of laser beam 7 emitted are deviated with increase of applied power. More particularly, by operating the mirror angle adjusting mechanism 4701 or 4702 as the applied power increases to correct such positional and directional deviations of the emitted laser beam 7, it is made possible to improve the stability of laser beam.

By attaching the mirror angle adjusting mechanism used in this embodiment to the laser system of embodiments 45 and 46 illustrated in FIGS. 84 and 85, respectively, there can be obtained the same effect as above.

Embodiment 48

Figure 89:
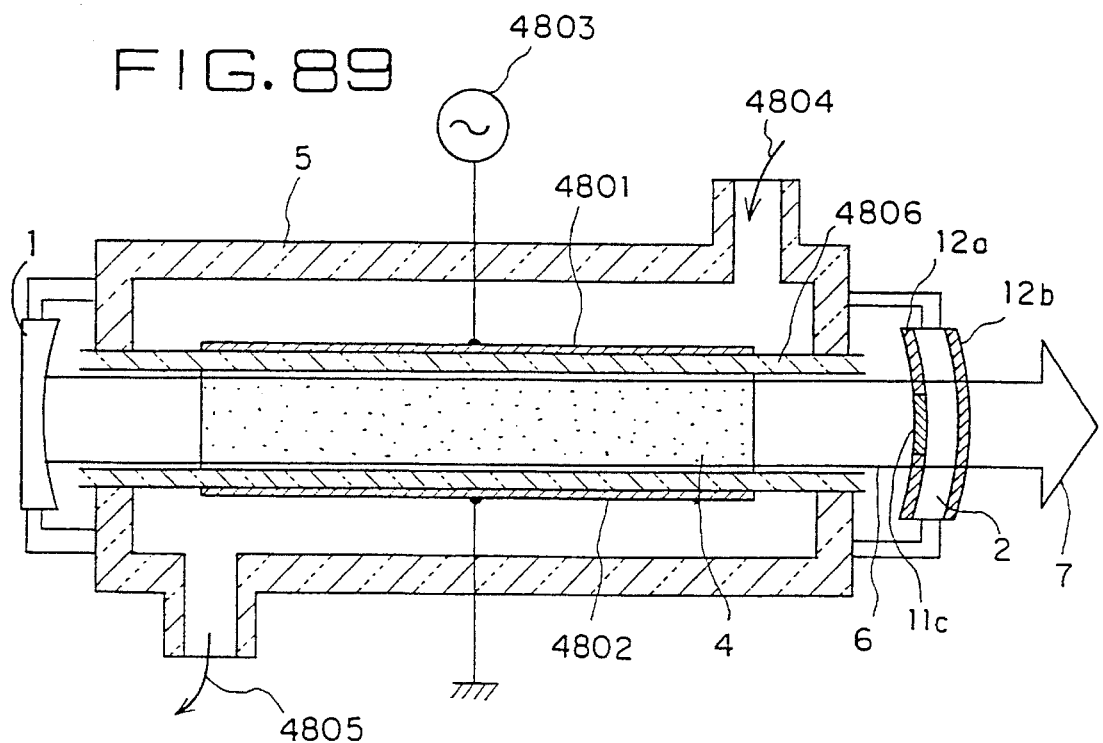
FIG. 89 is a sectional view showing embodiment 48 of the invention.

FIG. 89 shows an example in which, for example, the laser system of embodiment 1 in the present invention is applied to an axial-flow type $CO_2$ laser system. In the same figure, the numeral 4806 denotes a discharge tube formed of a dielectric such as, for example, pyrex glass or titanium oxide; numerals 4801 and 4802 represent a pair of power supply electrodes which are in close contact with the outer wall of the discharge tube 4806; numeral 4803 denotes a power source for applying a high AC voltage to the power supply electrodes 4801 and 4802; and numeral 4 denotes a laser medium. Further, the numeral 2 denotes a coupling mirror; numeral 11c denotes a partial reflection film formed on the resonator constituting side of the coupling mirror 2; numerals 12a and 12b represent antireflecting films; numeral 1 denotes a total reflector; numerals 6 and 7 represent laser beams; numeral 4804 denotes a cooling water inlet; numeral 4805 denotes a cooling water outlets and numeral 5 denotes a housing.

The operation of this embodiment will now be described. First, an AC voltage is applied to the paired power supply electrodes 4801 and 4802 from the power source 4803 to induce an electric discharge in the discharge space 4. As a result, laser gas is optically pumped and laser oscillations occurs in a stable resonator which is constituted by both the partial reflection film 11c of the coupling mirror 2 and the total reflector 1. A portion of the laser beam 6 passes through the partial reflection film 11c and the antireflecting films 12a, 12b of the coupling mirror 2 and is emitted as laser beam 7 to the exterior of the resonator. In the axial-flow type $CO_2$ laser system, the laser oscillation efficiency becomes lower with an increase in the gas temperature of the laser medium 4, so the rise of the gas temperature is prevented by supplying a cooling water into the housing 5 to cool the entire periphery of the discharge tube 4806.

Although in this embodiment the laser system of embodiment 1 is applied to an axial-flow type $CO_2$ laser system, as shown in FIG. 89, this does not constitute any limitation. For example, even when the laser system of embodiment 1 is applied to a high-speed axial-flow type $CO_2$ laser system, there can be obtained the same effect as above. Such high-speed axial-flow type $CO_2$ laser system is provided with a circulation blower for removing a portion of heat generated by electric discharge under a high-speed flow of the laser gas 4 in the discharge tube 4806. Further, also when the laser system of embodiment 1 is applied to a TEA laser system wherein a laser gas of about 1 atmosphere is optically pumped, there is obtained the same effect as above.

Embodiment 49

Figure 90:
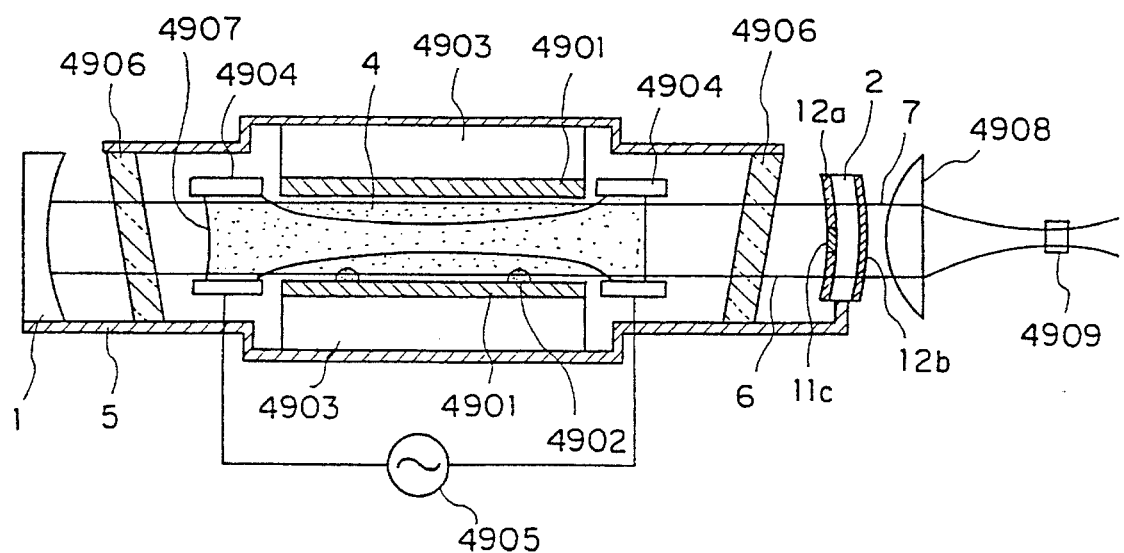
FIG. 90 is a sectional view showing embodiment 49 of the invention.

FIG. 90 shows an example in which, for example, the laser system of embodiment 1 in the present invention is applied to a metal vapor laser system. In the same figure, the numeral 4901 denotes a plasma tube, e.g. ceramic tube; numeral 4902 denotes a metals e.g. copper or gold; numeral 4 denotes a laser medium generated by the metal vapor in the plasma tube; numeral 4903 denotes a heat insulating material; numeral 4904 denotes a cylindrical electrode; numeral 4905 denotes a power source, e.g. a high-speed repetitive pulse source; and numeral 4907 represents an electric discharge generated in the electrode 4904. Further, numeral 4906 denotes a transmission window set at a Brewster angle; numeral 2 denotes a coupling mirror; numeral 11c denotes a partial reflection film formed centrally on the resonator constituting side of the coupling mirror 2; numerals 12a and 12b each denote an antireflecting film; numeral 1 denotes a total reflector; numeral 6 denotes a laser beam present in a resonator; numeral 7 denotes a laser beam outputted from the resonator; and numeral 5 denotes a housing. Numeral 4908 denotes a lens and numeral 4909 denotes an object for light convergence, e.g. iodine-sealed cell.

The operation of this embodiment will now be described. First, a repetitive pulse voltage of several ten kHz is applied to the cylindrical electrode 4904 from the power source 4905 to induce the pulse discharge 4907 in the electrode 4904. The pulse discharge 4907 thus generated is used for heating a buffer gas, e.g. neon (Ne) gas, sealed in the plasma tube 4901. The heated buffer gas heats the plasma tube 4901 covered with the heat insulating material 4903, to a temperature of, say, 1,500° C. or so. Consequently, the metal 4902 provided on the inner surface of the plasma tube 4901 evaporates at a density of, say, $10^{15}$ pcs./cm or so within the plasma tube. The resulting metal vapor is excited by the pulse discharge 4907 to form a laser medium 4.

Figure 91:
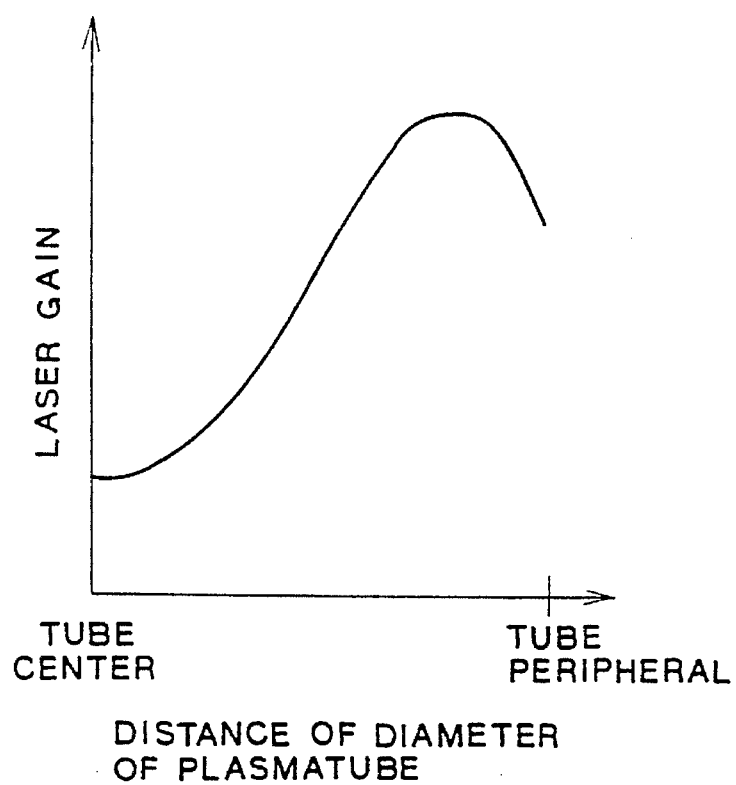
FIG. 91 is a gain distribution diagram in embodiment 49 of the invention.
Figure 92:
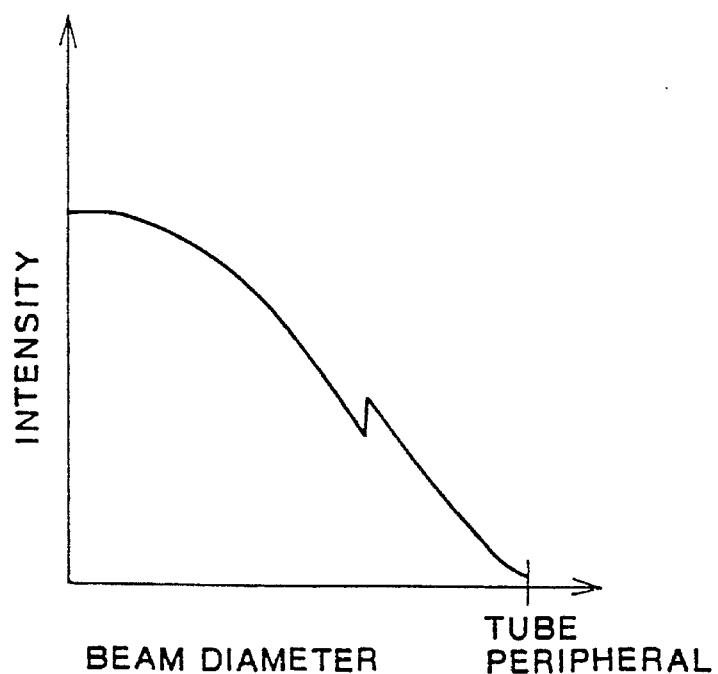
FIG. 92 is an intensity distribution diagram of laser beam in embodiment 49 of the invention.

Outside the laser tube sealed by the transmission windows 4906 mounted at a Brewster angle there is constituted a stable resonator by both an internal reflection film 11c formed in the coupling mirror 2 and the total reflector 1. Therefore, the laser beam 6 propagates in the resonator and is amplified by the laser medium 4, then a portion thereof passes through the partial reflection film 11c and antireflecting films 12a, 12b of the coupling mirror 2 and is emitted as laser beam 7 to the exterior of the resonator. Generally, in a metal vapor laser system, the diameter of the plasma tube 4901 is increased in order to obtain a high laser output. In this case, however, the central part of the laser gain distribution obtained is low in comparison with the peripheral part, as shown in FIG. 91, so it is difficult to generate the laser beam in $TEM_{00}$ mode. But according to this embodiment, a laser beam of $TEM_{00}$ mode having a large cross sectional area such as that shown in FIG. 92 can be obtained easily by selecting an appropriate diameter of the partial reflection film 11c of the coupling mirror 2.

The extracted laser beam 7 thus is converged by the lens 4908 into a highly converged laser beam. By conducting this laser beam to the cell 4909 in which is sealed, for example, a dye solution for dye laser, it is made possible to excite the dye efficiently.

Example 50

Figure 93:
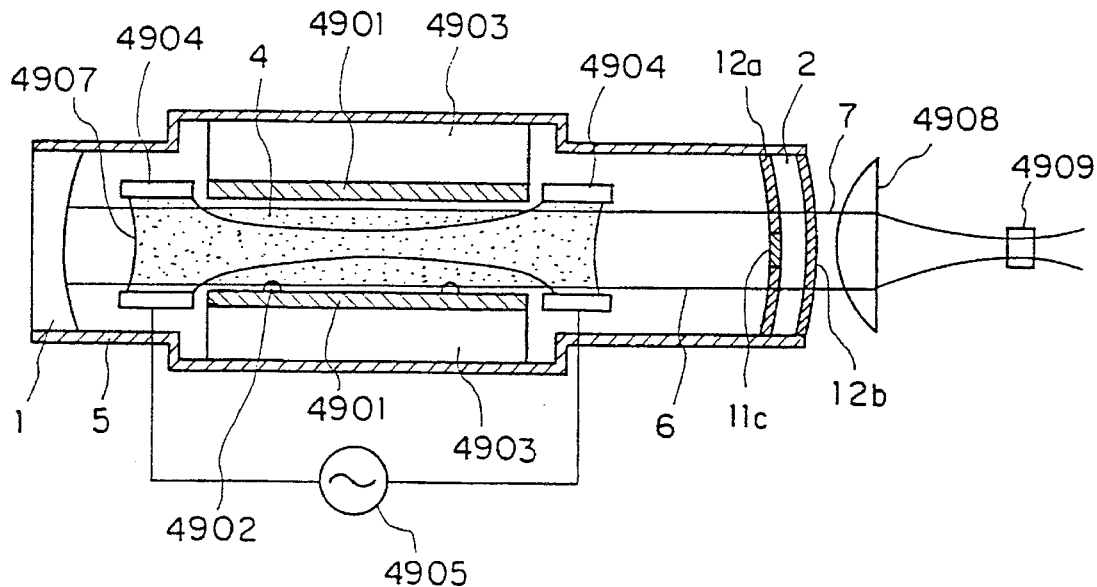
FIG. 93 is a sectional view showing embodiment 50 of the invention.

Although in the previous embodiment 49 the laser tube is sealed with the transmission windows 4906 set at a Brewster angle, the same effect can also be obtained by sealing the laser ink tube with mirrors 1 and 2 which constitute a resonator, as shown in FIG. 93. When the laser beam 7 emitted to the exterior of the resonator is converged using the lens 4908 as in the embodiment 49, there is obtained a highly converged laser beam, so by conducting this laser beam to the cell 4909 with a dye solution for dye laser sealed therein, it is made possible to excite the dye efficiently.

Example 51

Figure 94:
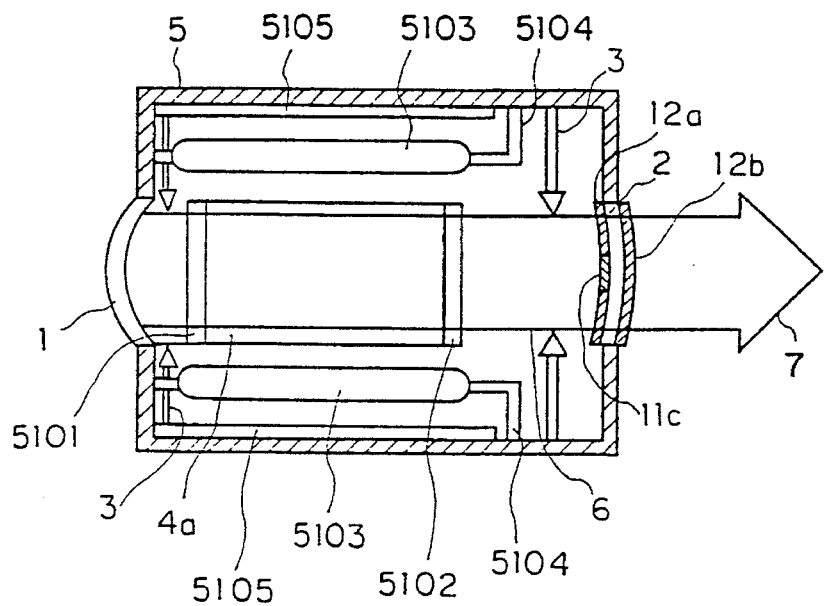
FIG. 94 is a sectional view showing embodiment 51 of the invention.

FIG. 94 shows an example in which, for example, the laser system of embodiment 1 is applied to a solid-state laser system. In the same figure, the numeral 4a denotes a solid-state element which, for example in the case of a YAG laser, is a cylindrical rod having a composition of $Y_{3-x}Nd_xAl_5O_{12}$. Numeral 1 denotes a total reflector and numeral 2 denotes a coupling mirror. Numerals 12a, 12b and 5101, 5102 represent antireflecting films formed of $SiO_2$ for example on both sides of the coupling mirror 2 and the solid-state element 4a. Numeral 3 denotes an aperture and numeral 11c denotes a partial reflection film formed centrally of the resonator constituting side of the coupling mirror 2, using $TiO_2$ for example. Numerals 6 and 7 represent laser beams generated respectively inside and outside a resonator. Numeral 5103 denotes a light source for excitation of the solid-state element 4a, which light source is constituted by a flash lamp for example. Numeral 5104 denotes a support portion for the light source 5103; numeral 5105 denotes a reflecting plate for reflecting the light from the light source 5103 and conducting it to the solid-state element 4a; and numeral 5 denotes an outer frame of the solid-state laser system.

The operation of this embodiment will now be described. The solid-state element 4a is excited by both the direct light from the light source 5103 and the reflected light from the reflecting plate 5105 and forms a laser medium. The laser beam 6 is resonated and amplified by the laser medium, then a portion thereof is extracted as laser beam 7 to the exterior of the solid-state laser system. The mode of the laser beam generated in the resonator is as explained in the foregoing embodiment 1; it is selected on the basis of the diameter of the partial reflection film 11c.

Embodiment 52

Figure 95A:
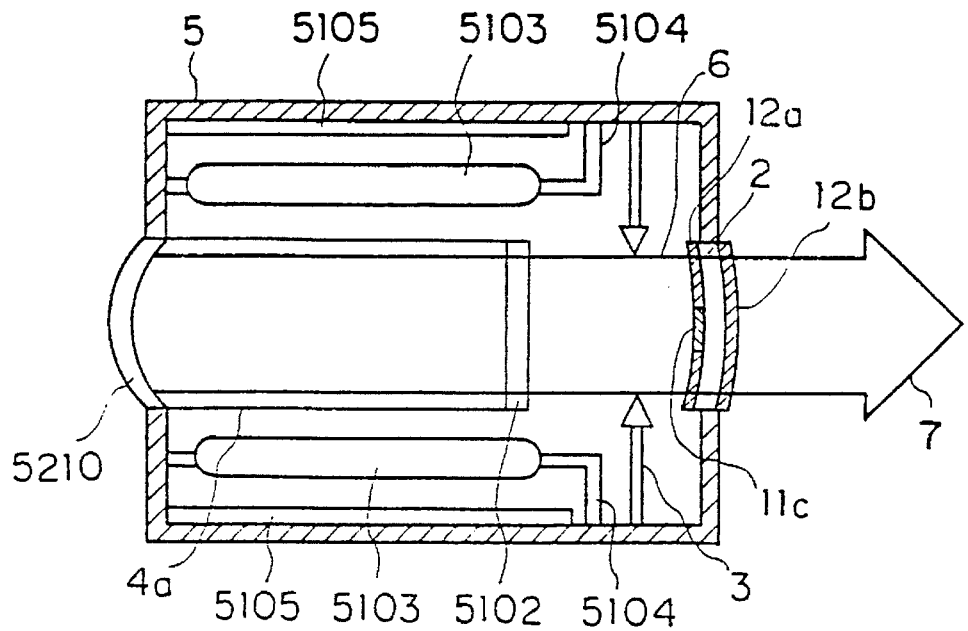
FIGS. 95(a) and 95(b) are each a sectional view showing embodiment 52 of the invention.
Figure 95B:
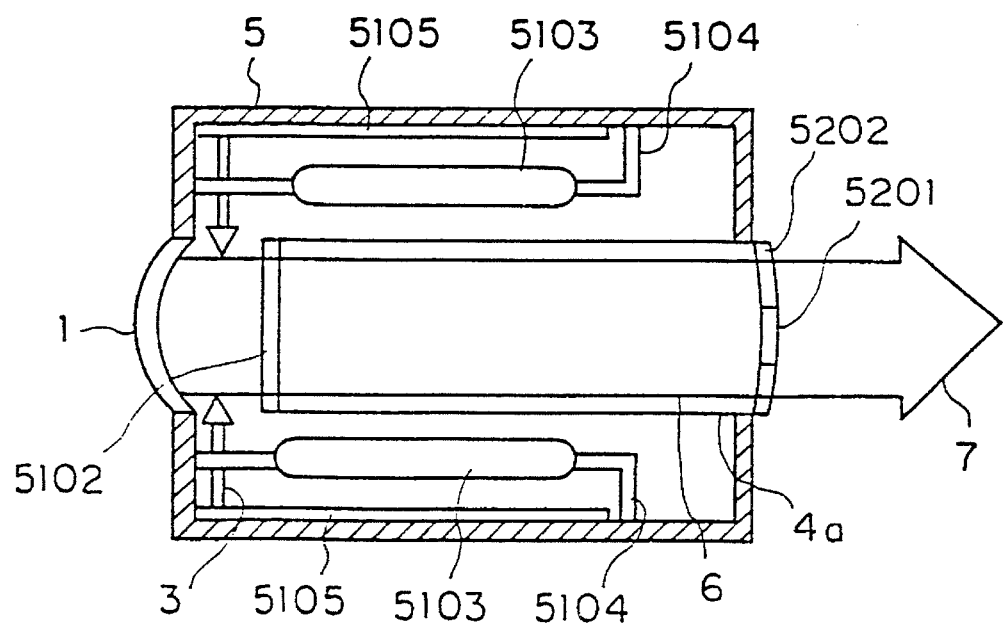

Although in the previous embodiment 51 the resonator constituting mirrors 1 and 2 are used on both sides of the solid-state element 4a, there may be adopted such a construction as shown in FIGS. 95(a) or 95(b) in which one end face of a solid-state element 4a is formed so as to have a radius of curvature and a thin film is formed on the radius of curvature, thereby allowing the end face to play the role of a mirror. FIG. 95(a) shows an example in which one end face of a solid-state element 4a is formed so as to have a radius of curvature and a total reflection film 5210 is formed thereon, while FIG. 95(b) shows an example in which an end face of a solid-state element 4a on the side opposite to the above one end side of the solid-state element in FIG. 95(a) is formed so as to have a radius of curvature, then a partial reflection film 5201 is formed at the central part thereof and an antireflecting film 5202 is formed at the outer peripheral part.

Embodiment 53

Figure 96:
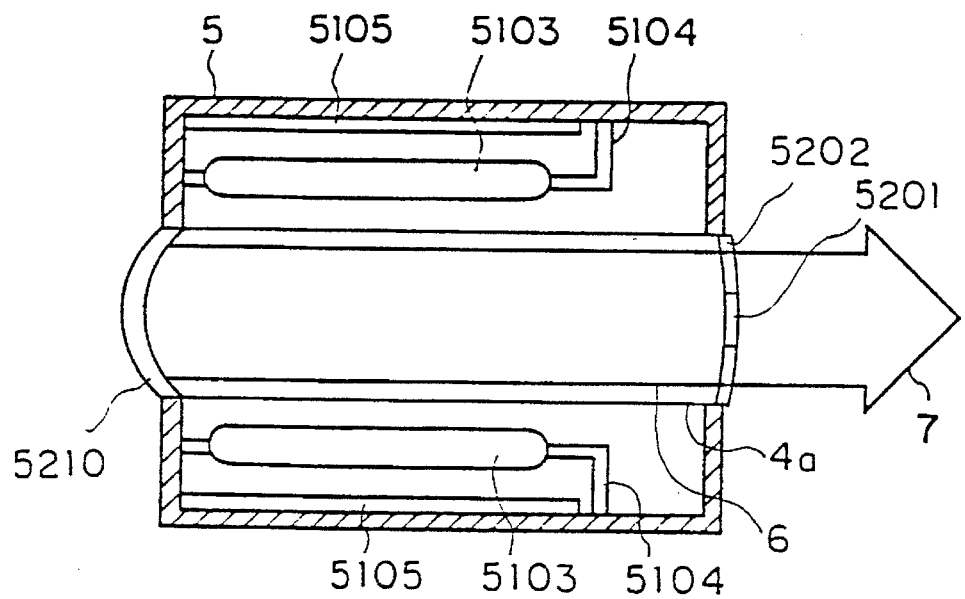
FIG. 96 is a sectional view showing embodiment 53 of the invention.

Although in the previous embodiment 52 one end face of the solid-state element 4a is formed so as to have a radius of curvature, this does not constitute any limitation. Both end faces of a solid-state element 4a may be formed so as to have a radius of curvature, as shown in FIG. 96. In this case, a total reflection film 5210 is formed at one end face, while at the other end face there are formed a partial reflection film 5201 as central film and an antireflecting film 5202 as an outer peripheral film, whereby it is made possible to let the solid-state element 4a itself play the role of mirrors constituting a resonator.

Embodiment 54

Figure 97:
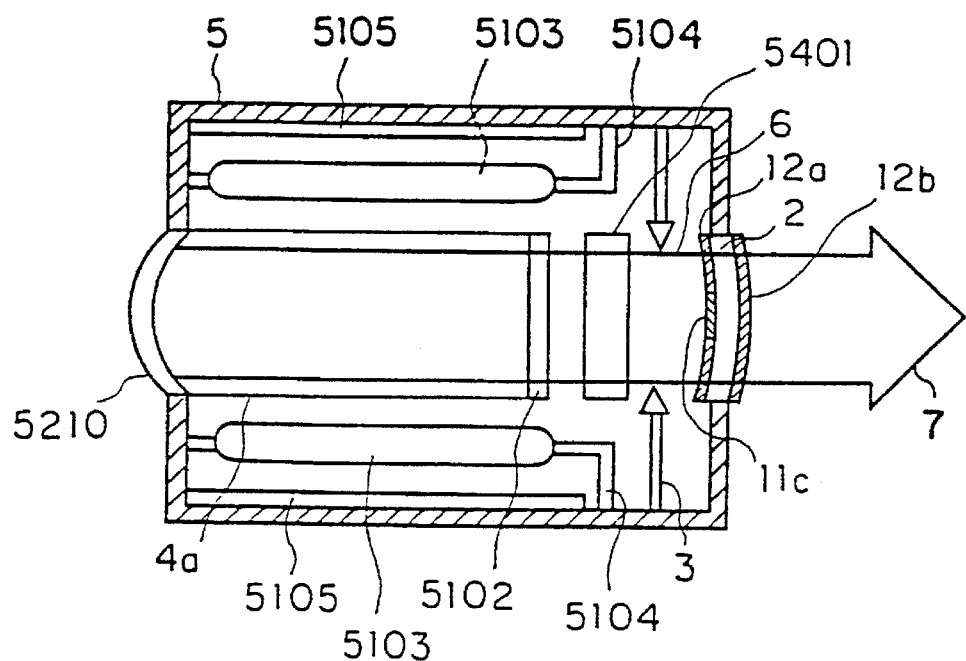
FIG. 97 is a sectional view showing embodiment 54 of the invention.

FIG. 97 illustrates embodiment 54 in which a Q-switch element 5401, e.g. Pockels element, is disposed within a resonator for the purpose of effecting Q-switch pulse oscillation. According to this construction, there is obtained a laser beam of a large peak output, thus permitting an efficient laser processing for example.

If a wavelength changing element such as KTP element is used as the element 5401 shown in FIG. 97, there can be realized an efficient wavelength change. Further, even when a combination of a Q-switch element and a wavelength changing element is used as the element 5401, there can be obtained the same effect as above.

Embodiment 55

Figure 98A:
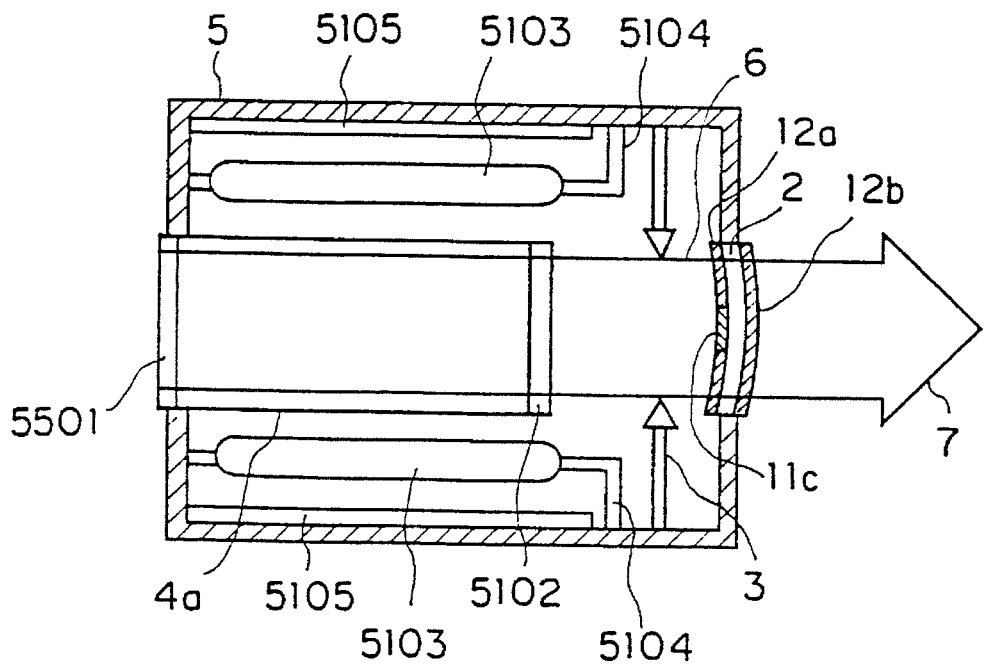
FIGS. 98(a) and 98(b) are each a sectional view showing embodiment 55 of the invention.
Figure 98B:
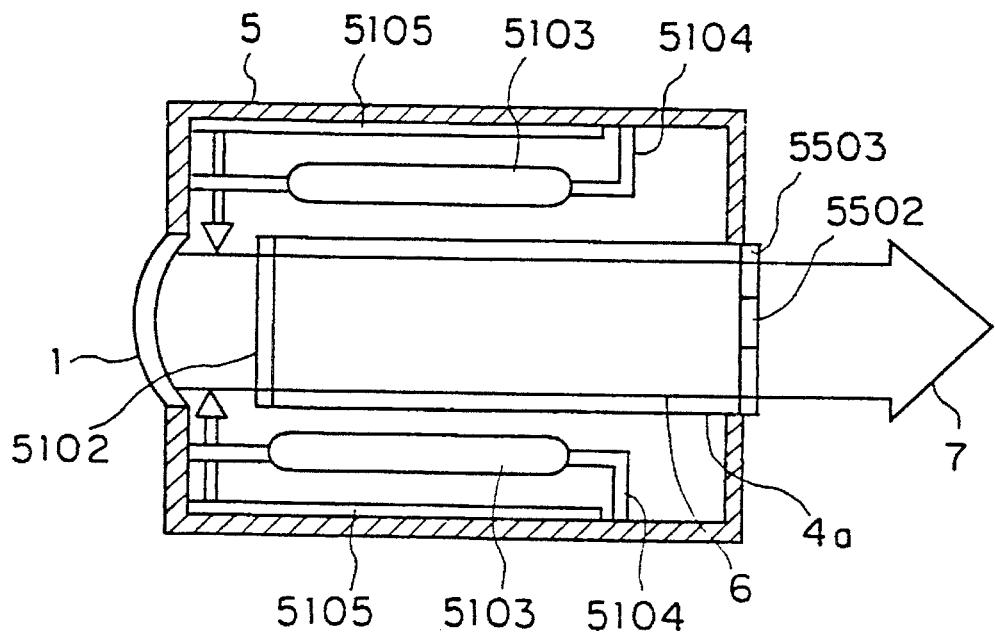

Although in embodiment 52 one end face of the solid-state element 4a is formed so as to have a radius of curvature and a thin film is formed thereon for use as a mirror, a thin film may be formed at one end face of a solid-state element 4a which is formed in the shape of a plane, for use as a mirror, as shown in FIG. 98(a) or 98(b). When a laser medium is formed with light from a light source 5103, the solid-state element 4a plays the role of a kind of convex lens under a heat distribution thereof. Therefore, the embodiment illustrated in FIGS. 98(a) and 98(b) is used as a stable resonator. FIG. 98(a) shows an example in which a total reflection film 5501 is formed at one end face of the solid-state element 4a, while FIG. 98(b) shows an example in which at one end face of a solid-state element 4a there are formed a partial reflection film 5502 as a central film and an antireflecting film 5503 as an outer peripheral film.

Embodiment 56

Figure 99:
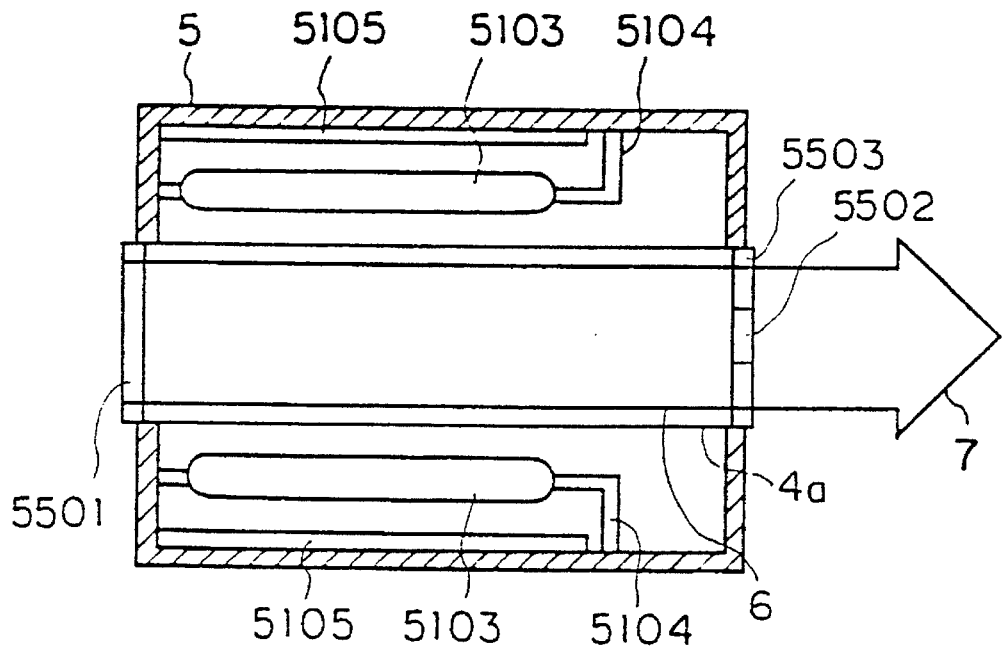
FIG. 99 is a sectional view showing embodiment 56 of the invention.

Although in embodiment 53 both end faces of the solid-state element 4a are formed so as to have a radius of curvature, then the total reflection film 5201 is formed at one of the end faces, while at the other end face there are formed the partial reflection film 5201 centrally and the non-reflecting film 5202 as an outer peripheral film, there may be adopted such a construction as shown in FIG. 99 in which both end faces of a solid-state element 4a remain to be plane and thin films are formed at both such end faces for use as mirrors.

Embodiment 57

Figure 100:
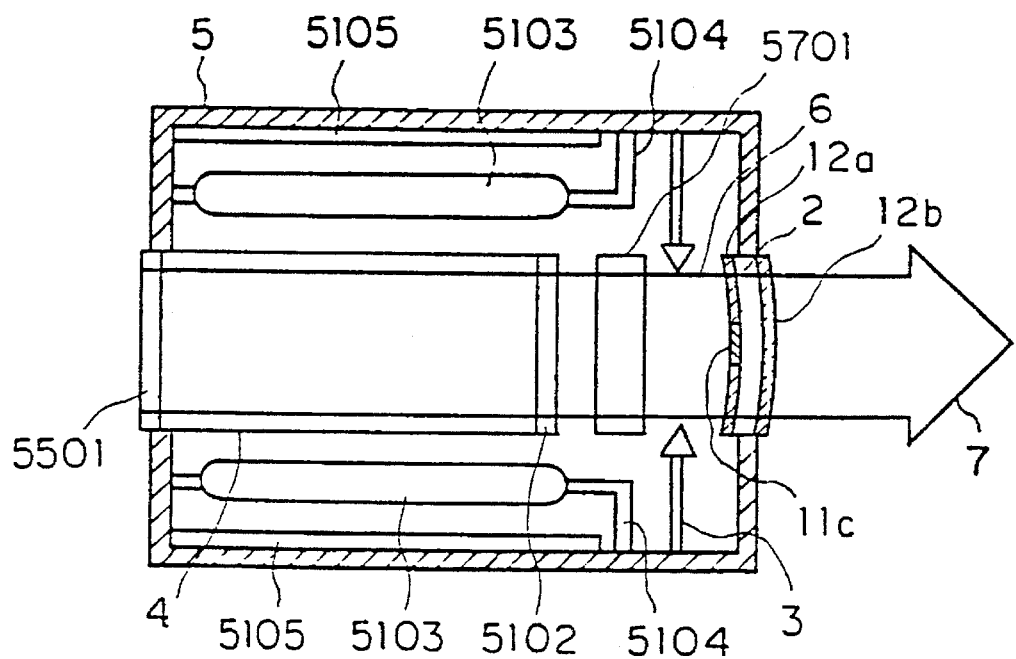
FIG. 100 is a sectional view showing embodiment 57 of the invention.

FIG. 100 illustrates embodiment 57 in which a Q-switch element 5701 such as Pockels element is disposed within a resonator to perform Q-switch pulse oscillation. This embodiment is different from the embodiment 54 illustrated in FIG. 97 in that end faces of a solid-state element 4a used in this embodiment are planar. According to this embodiment thus constructed, there is obtained a laser beam of a large peak output and so, for example, an efficient laser processing can be effected, as in embodiment 54.

Moreover, if a wavelength changing element, e.g. KTP element, is used as the element 5701, there can be realized an efficient wavelength change. Further, even if a combination of a Q-switch element and a wavelength changing element is used as the element 5701, it is possible to obtain the same effect.

Embodiment 58

Figure 101A:
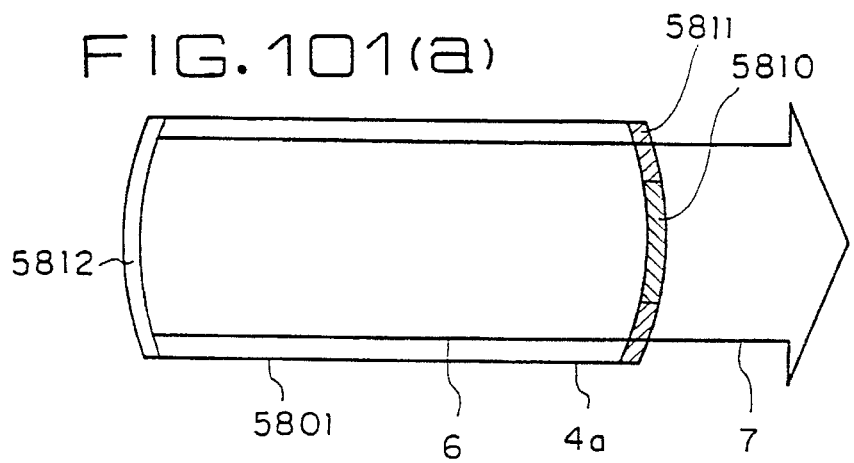
FIGS. 101(a) and 101(b) are each a sectional view showing embodiment 58 of the invention.
Figure 101B:
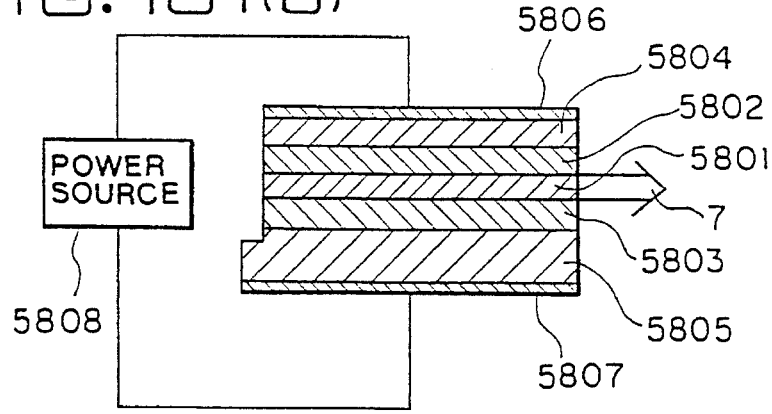

FIGS. 101(a) and 101(b) show an example in which the laser system of embodiment 1 for example is applied to a semiconductor laser. FIG. 101(a) is an internal top view of the semiconductor laser and FIG. 101(b) is a sectional side view thereof. In both figures, the numerals 5801 denotes an active medium layer, e.g. p-type GaAs layer; numeral 5802 denotes a clad layer, e.g. p-type $Ga_{0.9}Al_{0.1}As$ layer; numeral 5803 denotes a clad layer, e.g. n-type $Ga_{0.9}Al_{0.1}As$ layer; numeral 5804 denotes a cap layer, e.g. p-type GaAs layer; and numeral 5805 denotes a substrate crystal, e.g. n-type GaAs crystal. Further, numerals 5806 and 5807 represent electrodes; numeral 5808 denotes an electrode; numeral 5810 denotes a partially reflecting portion formed by the application of photoresist and using such a technique as the photomechanical process; numeral 5812 denotes a totally reflecting portion; numeral 5811 denotes an antireflecting portion; numeral 6 denotes a laser beam present within a resonator; and numeral 7 denotes a laser beam emitted to the exterior of the resonator.

Figure 102:
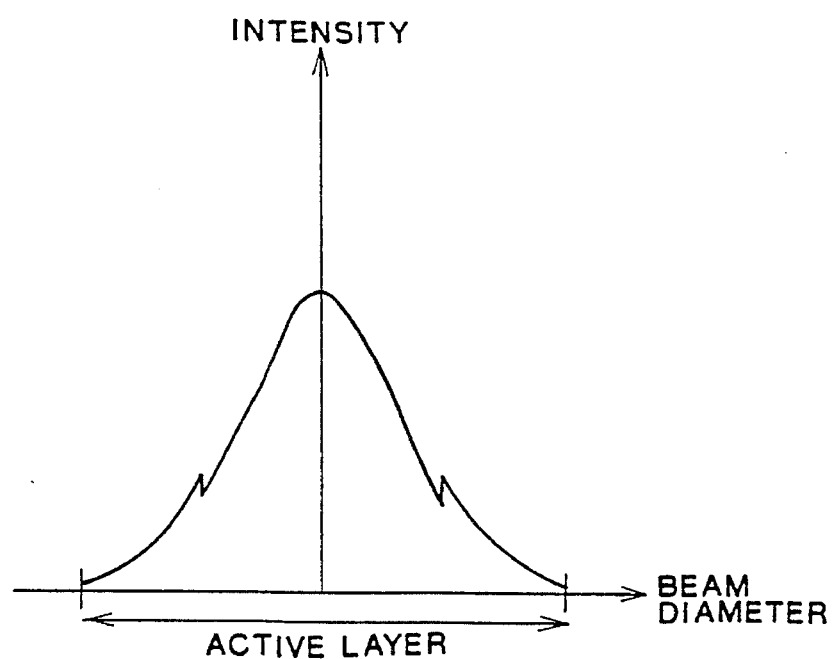
FIG. 102 is an intensity distribution diagram of laser beam in embodiment 58 of the invention.

The operation of this embodiment will now be described. Carriers supplied from the electrodes 5806 and 5807 which are connected to the power source 5808 pass through the p-type cap layer 5804, clad layer 5802 and n-type substrate crystal 5805, clad layer 5803 and form an active medium layer 5801. The laser beam 6 generated within the active medium layer 5801 is amplified while reciprocating within a stable resonator constituted by both partially reflecting portion 5810 and totally reflecting portion 5812 formed at end faces of a solid-state element 4a. Then, a portion of the laser beam 6 passes through the partially reflecting portion 5810 and the antireflecting portion 5811 and is outputted as the laser beam 7 to the exterior of the resonator. Since the active medium layer 5801 is present wide in the resonator, a laser beam of a single $TEM_{00}$ mode having a large cross sectional area shown in FIG. 102 can be obtained easily by selecting an appropriate size of the partially reflecting portion 5810 which plays an important role in the mode selection as in the foregoing embodiment 1.

Embodiment 59

Figure 103A:
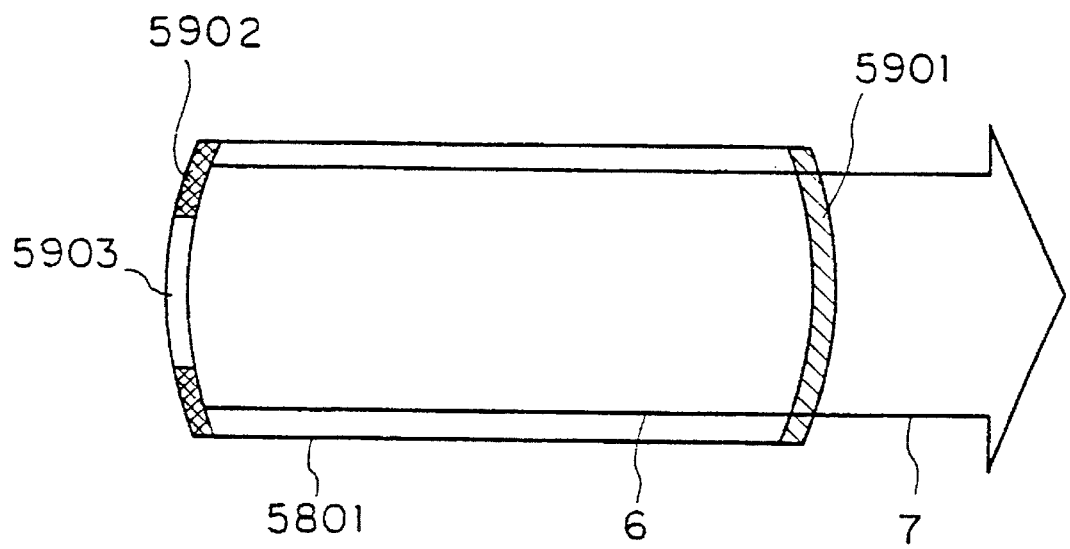
FIGS. 103(a) and 103(b) are each a sectional view showing embodiment 59 of the invention.
Figure 103B:
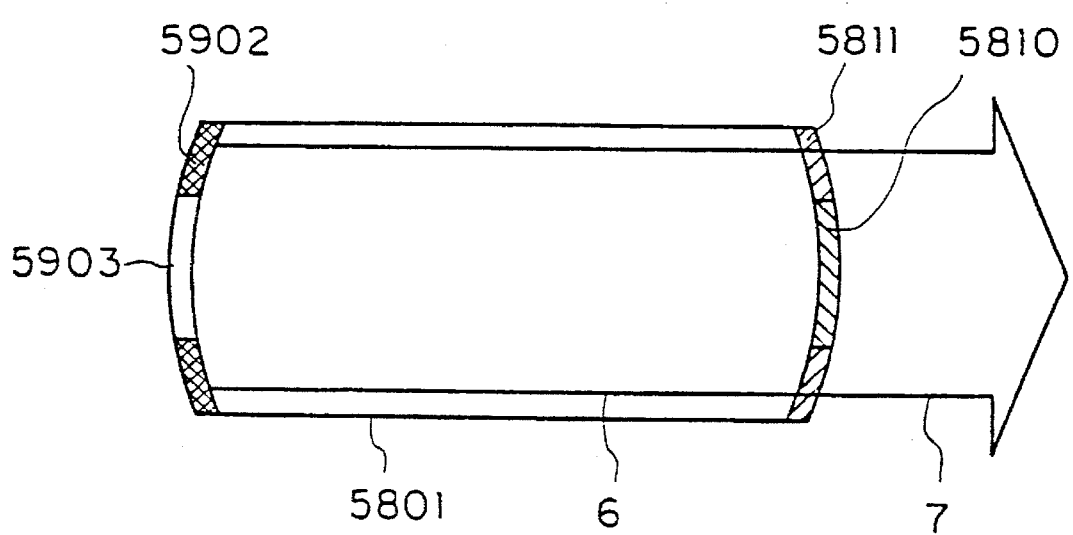

Although in the previous embodiment 58 the mode selection is performed by selecting an appropriate size of the partially reflecting portion 5810, the same effect can be obtained also by selecting an appropriate size of a totally reflecting portion 5903 which is a constituent member of a resonator, as shown in FIG. 103(*a*). In the same figure, the numeral 5902 denotes a ring-shaped partial reflection film formed in a surrounding relation to the total reflection film 5903. Further, as shown in FIG. 103(*b*), also by selecting appropriate sizes of both partially reflecting portion 5810 and totally reflecting portion 5903, there can be obtained the same effect.

Embodiment 60

Figure 104A:
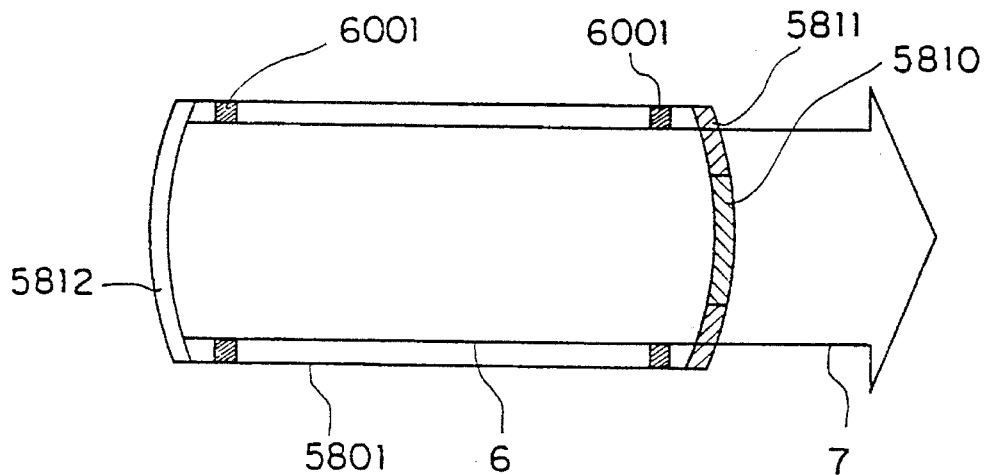
FIGS. 104(a), 104(b) and 104(c) are each a sectional view showing embodiment 60 of the invention.
Figure 104B:
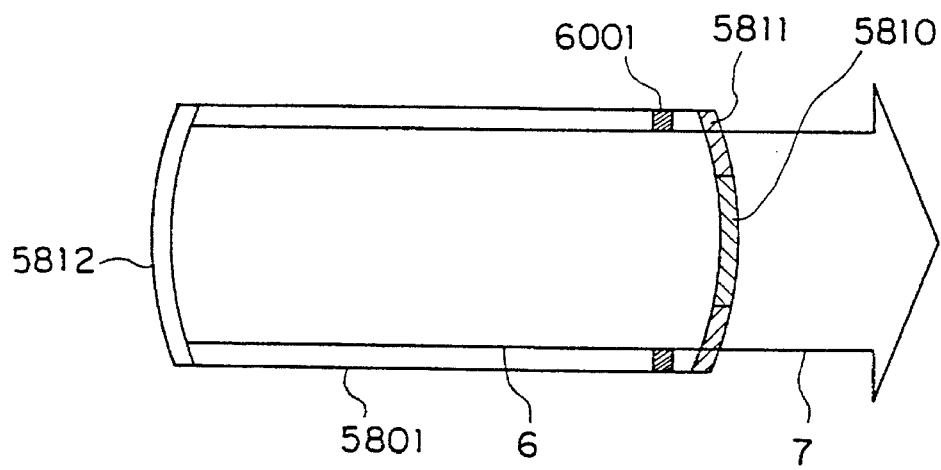
Figure 104C:
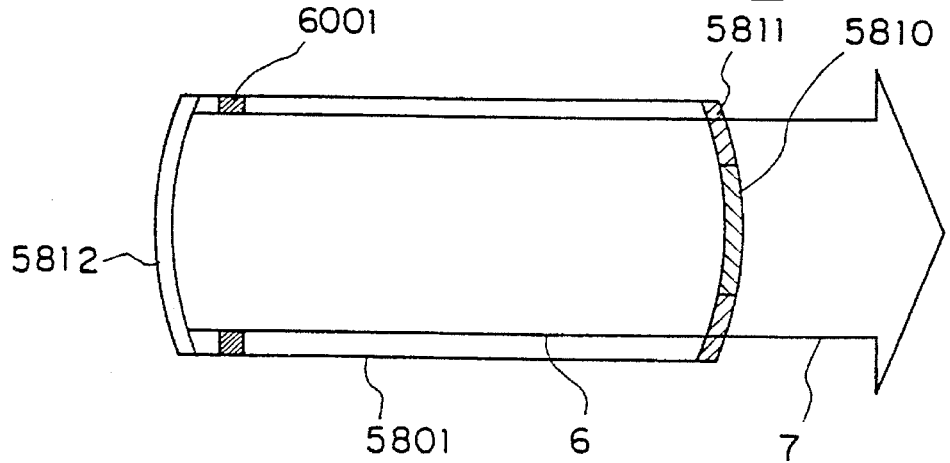

FIG. 104(*a*) illustrate embodiment 60 in which mesa grooves 6001 are formed near the resonator constituting sides of the partially reflecting portion 5810 and the totally reflecting portion 5812 in the semiconductor laser of embodiment 58. The mesa grooves 6001 are provided for eliminating the outer peripheral portion where the quality of the laser beam 6 is poor, and they correspond to the apertures 3 in embodiment 1. As shown in FIGS. 104(*b*) and (*c*), the mesa groove 6001 may be formed near one of the resonator constituting sides of the partially reflecting portion 5810 and the totally reflecting portion 5812, and also in this case it is possible to obtain the same effect as above.

Further, even when the mesa grooves 6001 are formed in the semiconductor laser of embodiment 59, there can be obtained the same effect.

Embodiment 61

Figure 105A:
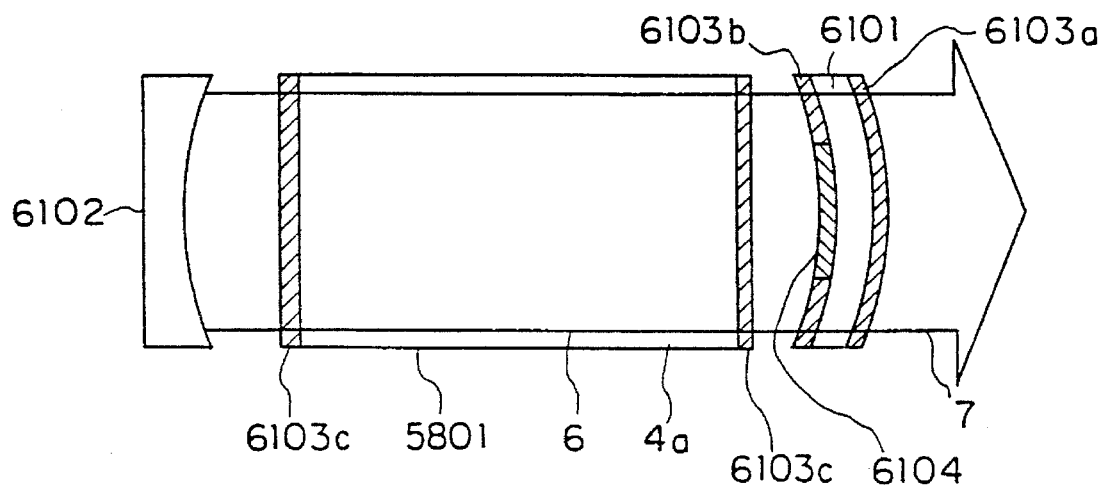
FIGS. 105(a), 105(b) and 105(c) are each a sectional view showing embodiment 61 of the invention.
Figure 105B:
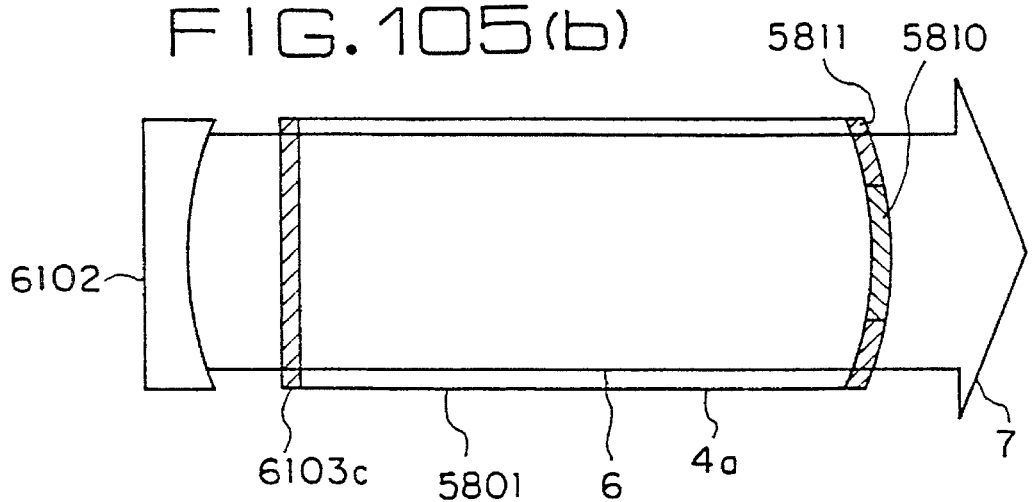
Figure 105C:
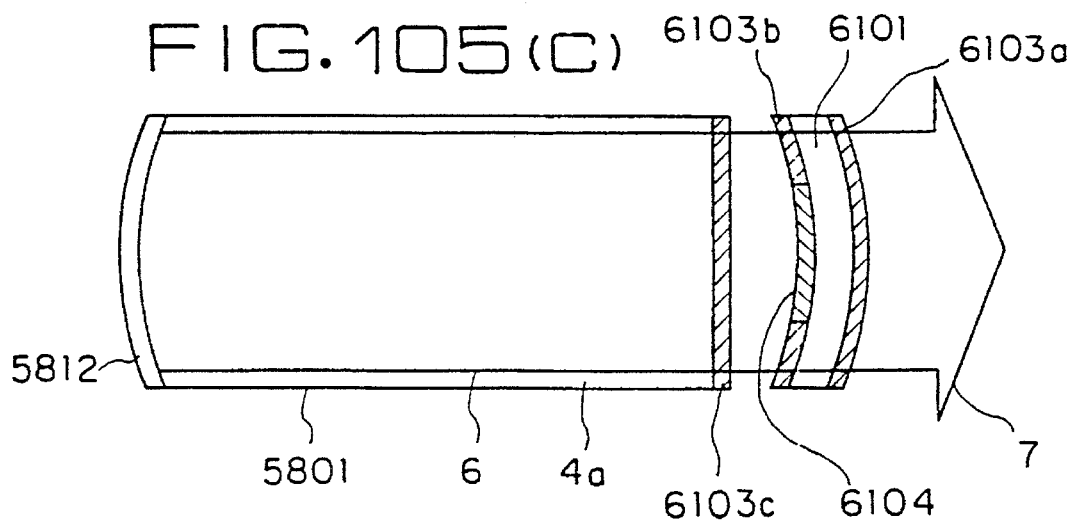

Although in each of the above embodiments 58, 59 and 60 a resonator is formed by processing end faces of the solid-state element 4a in the semiconductor laser, at least one mirror as a constituent of a resonator may be provided outside the solid-state element 4a in the semiconductor laser, as shown in FIGS. 105(*a*), (*b*) and (*c*). Also in this case it is possible to obtain the same effect as above.

FIG. 105(*a*) shows an example in which a total reflector 6102 and a coupling mirror 6101 are disposed outside a solid-state element 4a, a partial reflection film 6104 is formed centrally on the resonator constituting side of the coupling mirror 6101, and non-reflecting films 6103a and 6103b are formed in a surrounding relation to the partial reflection film 6104 to constitute a stable resonator. FIG. 105(*b*) shows an example in which a total reflector 6102 is disposed outside a solid-state element 4a to constitute a stable resonator. Further, FIG. 105(*c*) shows an example in which a coupling mirror 6101 is disposed outside a solid-state element 4a, a partial reflection film 6104 is formed centrally on the resonator constituting side of the coupling mirror 6101, and antireflecting films 6103a and 6103b are formed in a surrounding relation to the partial reflection film 6104 to constitute a stable resonator.

Embodiment 62

Figure 106:
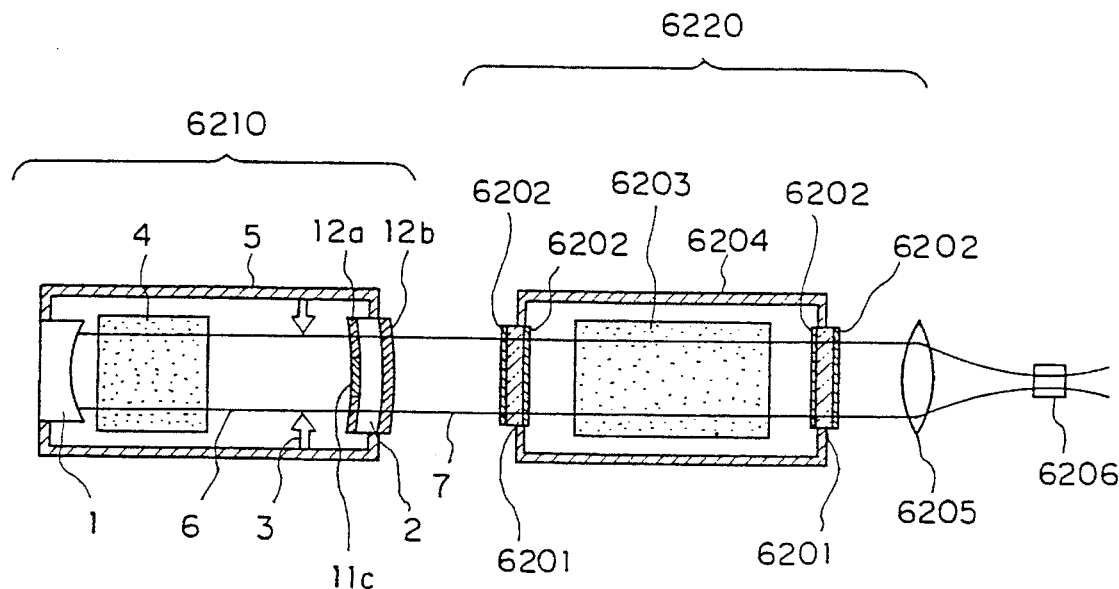
FIG. 106 is a sectional view showing embodiment 62 of the invention.

FIG. 106 illustrates embodiment 62 in which the laser system of embodiment 1 for example in the present invention is used as a laser beam generating stage and is combined with a laser beam amplifying stage to constitute a multi-stage amplifying laser system. In the same figure, the numeral 6210 denotes a laser beam generating stage; numeral 6220 denotes a laser beam amplifying stage; numeral 2 denotes a coupling mirror; numeral 11c denotes a partial reflection film formed centrally on the resonator constituting side of the coupling mirror 2; numerals 12a, 12b and 6202 each denote an antireflecting film; and numeral 1 denotes a total reflector. Numerals 4 and 6203 each denote a laser medium, which is a metal vapor such as copper or gold vapor excited by electric discharge in the case of a metal vapor laser as an example, or a gas medium excited by electric discharge in the case of a $CO_2$ laser or an excimer laser as an example. Numeral 6 denotes a laser beam present within a resonator; numeral 7 denotes a laser beam emitted to the exterior of the resonator; numeral 3 denotes an aperture; numerals 5 and 6204 each denotes a housing; numeral 6201 denotes a transmission window; numeral 6205 and denotes a lens; and numeral 6206 denotes an object where the laser beam is to be converged, which is, for example, a dye cell in the case of a metal vapor laser or a workpiece, e.g. metal, in the case of a $CO_2$ laser.

The operation of this embodiment will now be described. In the laser beam generating stage 6210, the partial reflection film 11c formed centrally of the coupling mirror 2 and the total reflector 1 constitute a stable resonator. Therefore, the laser beam 6 present within the resonator is amplified in the laser medium 4 and a portion thereof passes through the partial reflection film 11c of the coupling mirror 2 and the antireflecting films 12a, 12b and is emitted as the laser beam 7 to the exterior of the resonator. The laser beam 7 is conducted to the laser beam amplifying stage 6220. After passing through the transmission window 6202, the laser beam 7 is amplified by the laser medium 6203 in the amplifying stage into a large output laser beam. Thus, since the laser beam 7 emitted from the laser beam generating stage 6210 becomes a laser beam having a large cross sectional area and an extremely good quality, it is possible to extract energy extremely efficiently from the laser medium 6203 in the amplifying stage.

Further, if the laser beam 7 thus extracted from the laser beam amplifying stage 6220 is converged by the lens 6205, there is obtained a highly converged laser beam. Therefore, if the thus-converged laser beam is conducted to the cell 6206 with a dye solution for dye laser sealed therein, the dye is excited in an efficient manner, or if it is applied to a workpiece for laser processing, the processing can be done efficiently.

Embodiment 63

Although in the previous embodiment 62 there is used a single laser beam amplifying stage 6220, the same effect as above can be obtained also by using a plurality of such amplifying stages. In this case, a laser beam of a still larger output will be obtained from the last amplifying stage.

Embodiment 64

Figure 107:
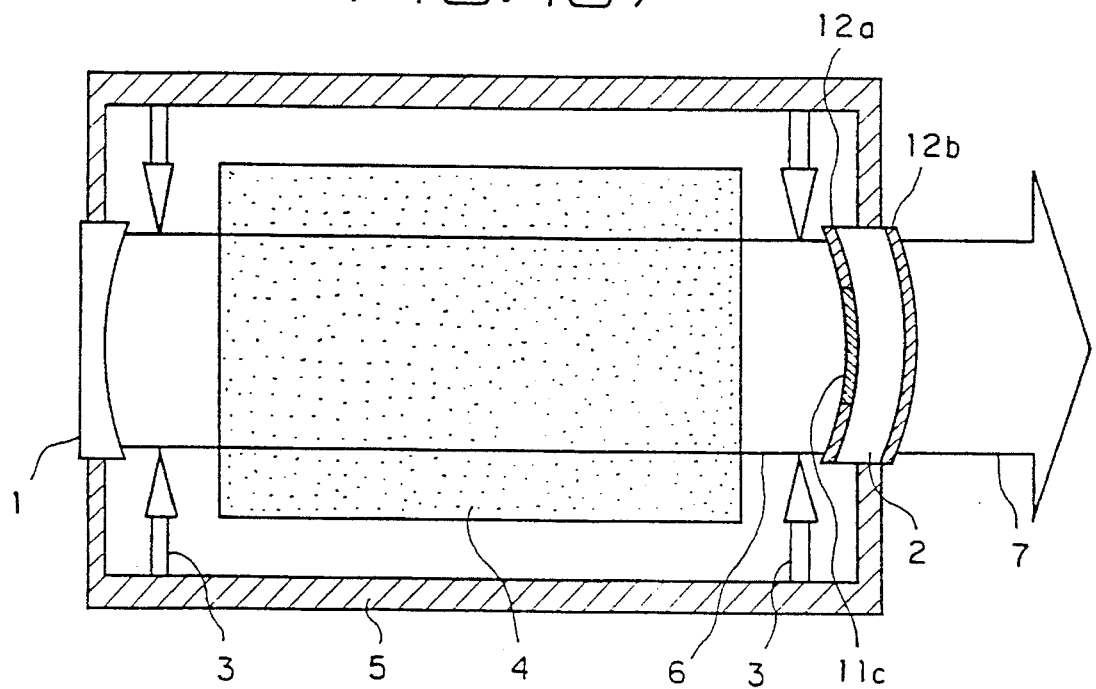
FIG. 107 is a sectional view showing embodiment 64 of the invention.

Although in most of the above embodiments there are constituted two-dimensional, axially symmetric type resonators, there is made no limitation thereto. For example, as shown in FIG. 107, even in the case of resonator construction suitable for a one-dimensional, or slab-shaped, laser medium, the same effect as above is exhibited.

Figure 108A:
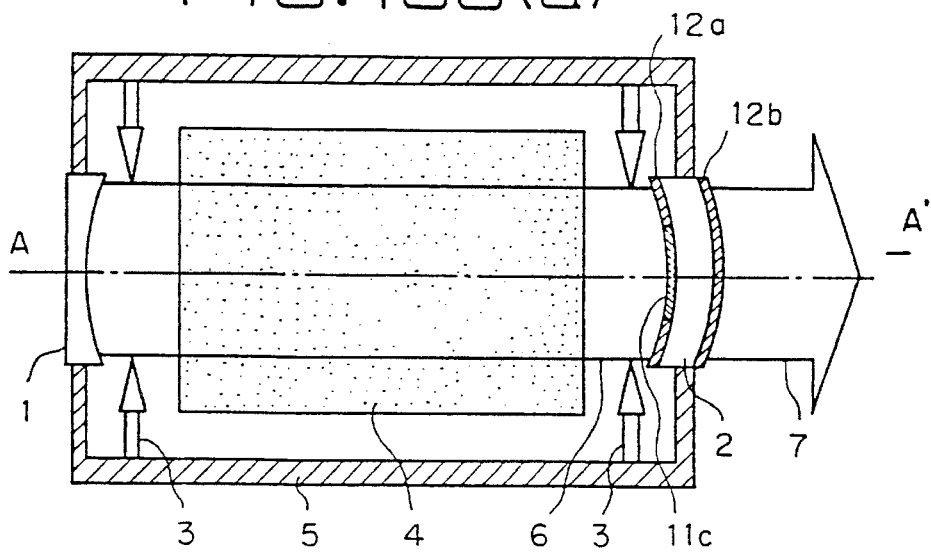
FIGS. 108(a) and 108(b) are each a sectional view showing embodiment 64 of the invention.
Figure 108B:
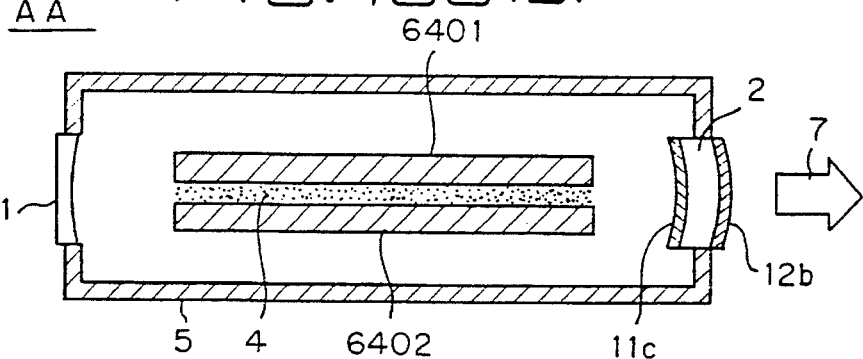

Further, for example, the resonator of embodiment 1 in the present invention may be combined with a waveguide to constitute a hybrid resonator, as shown in FIGS. 108(*a*) and 108(*b*), whereby there can be obtained the same effect as above. In those figures, the numerals 6401 and 6402 each denote a discharge electrode which also plays the role of a waveguide for example.

Embodiment 65

Figure 37B:
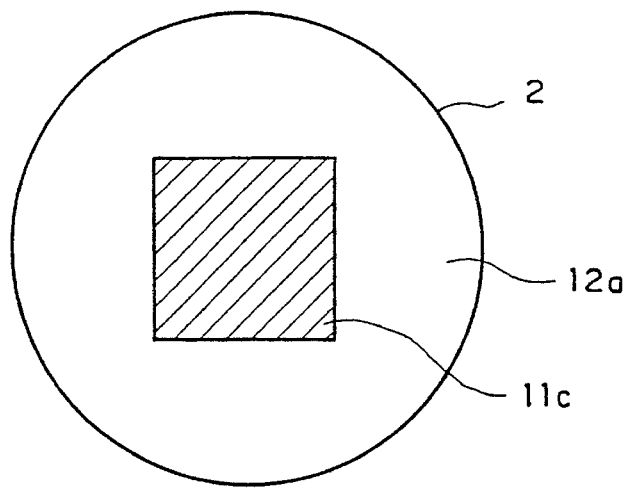
FIG. 37(b) is a top view of a mirror in embodiment 15 of the invention.
Figure 38:
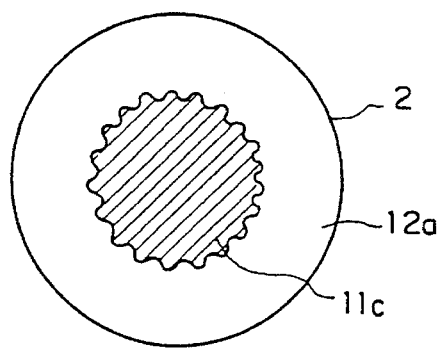
FIG. 38 is a top view of a mirror in embodiment 15 of the invention.

Although in the above embodiments there is used a mirror design according to Laguerre-Gaussian mode, namely, a film of a concentric circle such as shown in FIG. 37(a), except the case where a slab-laser medium is used, there can be obtained just the same effect as above also in the case of using a mirror design according to Hermite-Gaussian mode, namely, such a square film design as shown in FIG. 37(b).

Embodiment 66

Figure 109A:
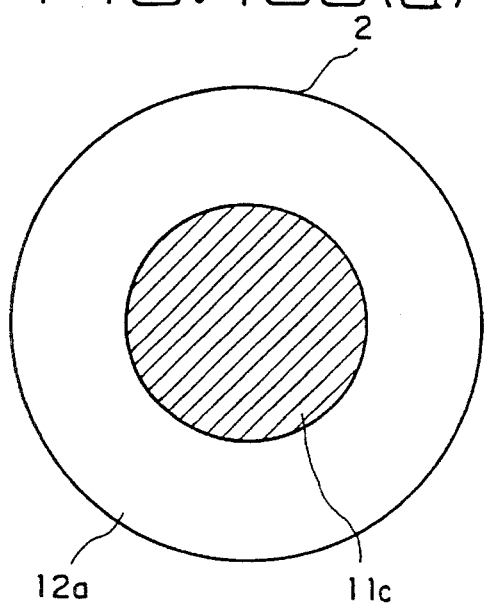
FIGS. 109(a) and 109(b) are a top view and a sectional view of a mirror in embodiment 66 of the invention.
Figure 109B:
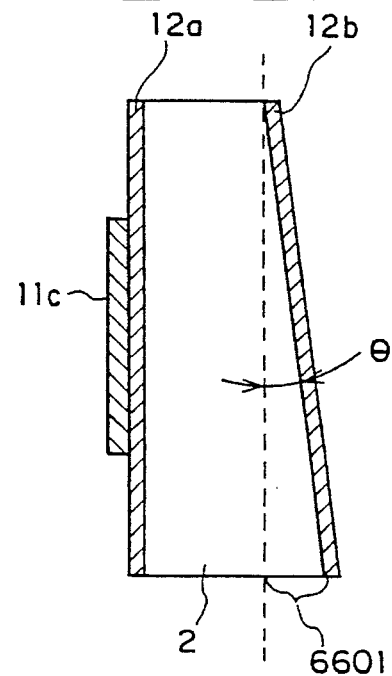

In the high output laser oscillator shown in embodiment 1, the surface of the coupling mirror 2 on the side opposite to the resonator constituting side thereof is inclined at a predetermined angle ("wedge angle" hereinafter) and has a thickness 6601 due to the wedge angle θ, as shown in FIG. 109(b). Thus, both sides of the coupling mirror 2 are usually not parallel to each other. For example, in the case where a three-axis orthogonal type gas laser oscillator is constructed in such a manner that the sections of boundary members (discharge electrodes) 6602 and 6603 disposed opposedly to each other within a resonator and the surface of the coupling mirror 2 with the wedge angle (thickness 6601) present therein are within the same plane, as shown in FIGS. 110(a) and (b), a weak light reflected from the side opposite to the resonator constituting side is reflected by the boundary surface of the boundary members 6602 and 6603 and is amplified by the laser medium 4. Consequently, there sometimes is formed a striped intensity distribution in the laser beam 7, as shown in FIG. 111(a). There has been the problem that the quality of the laser beam 7 having such striped intensity distribution is deteriorated in proportion to the degree of the striped distribution.

Figure 112A:
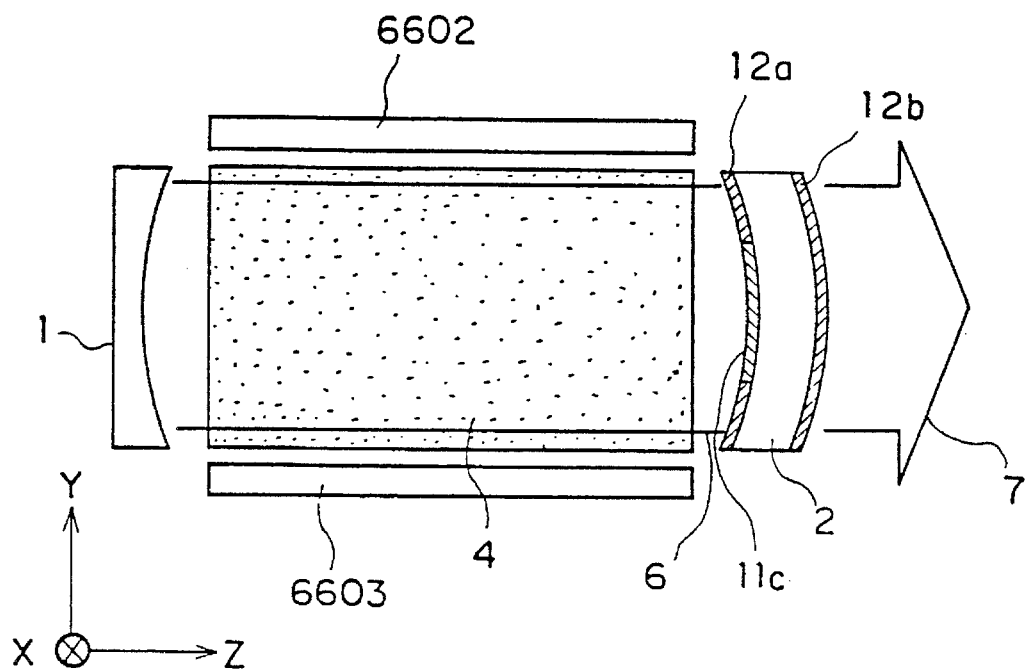
FIGS. 112(a) and 112(b) are a sectional view and a top view, showing embodiment 66 of the invention.
Figure 112B:
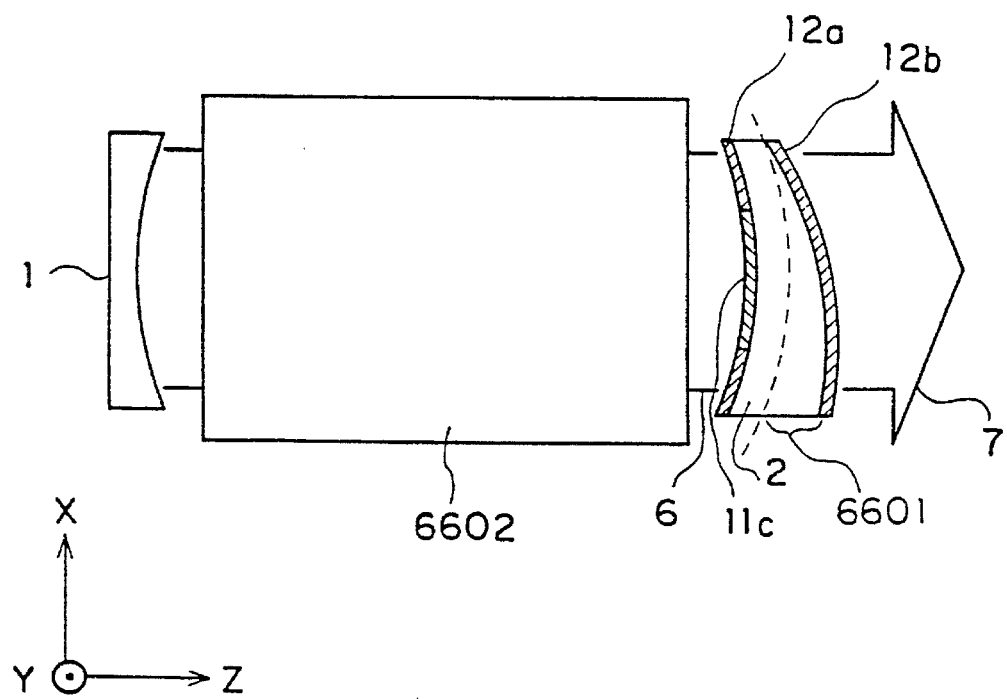

For solving the above-mentioned problem there can be adopted such a construction as shown in FIGS. 112(a) and (b), in which the sections of boundary members 6602 and 6603, e.g. electrodes, disposed opposedly to each other within a resonator and the surface of a coupling mirror 2 on the side where the wedge angle (thickness 6601) is present are not in the same plane. According to this construction there has not been observed a striped intensity distribution in the laser beam 7 emitted, as illustrated in FIG. 111(b). The reason is that even if the weak reflected light from the side opposite to the resonator constituting side is again directed into the resonator, it is not reflected by the boundary surface because the reflecting direction is different from the mounted direction of the boundary members 6602 and 6603 such as electrodes, so is not amplified by the laser medium 4 and leaves the resonator.

Thus, in the gas laser oscillator wherein the boundary members 6602 and 6603 such as electrodes disposed opposedly to each other within the resonator, the quality of the emitted laser beam 7 can be improved by making arrangement so that the sections of the mutually opposed boundary members 6602 and 6603 and the surface of the coupling mirror 2 with the wedge angle (thickness 6601) present therein are not in the same plane.

Embodiment 67

Figure 113:
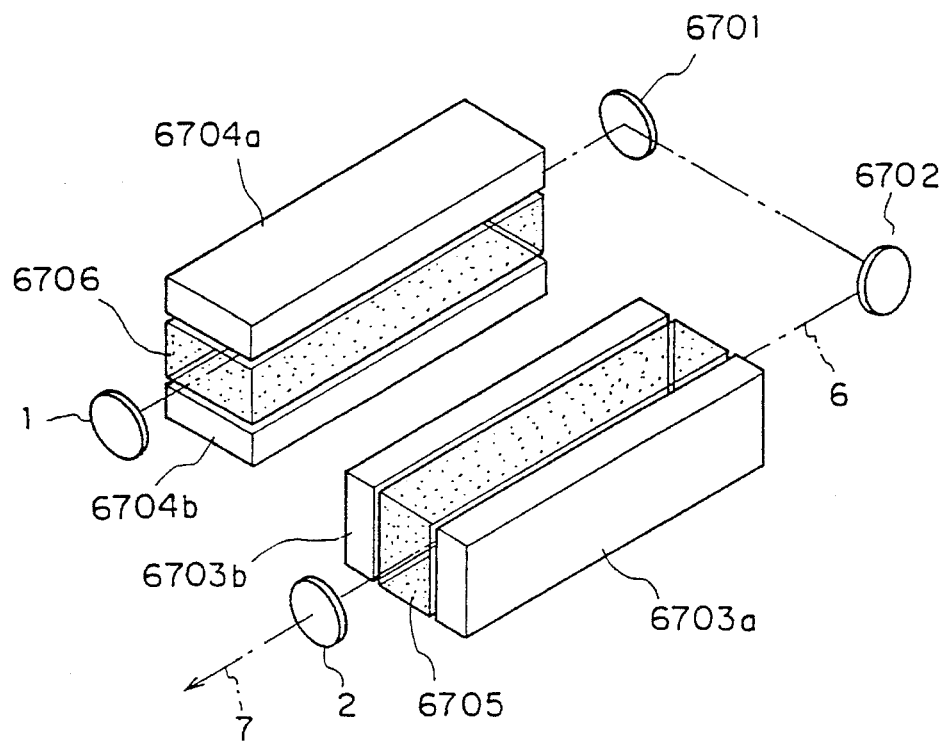
FIG. 113 is an entire view showing embodiment 67 of the invention.

FIG. 113 illustrates embodiment 67 in which the invention is applied to a three-axis orthogonal type gas laser oscillator. According to this embodiment, two sets of discharge-excited spaces 6705 and 6706 are disposed in 90°-turned positions with respect to each other, whereby it is made possible to correct a difference between a gain distribution in an electric discharge direction and that in a gas flowing direction during the circulation of laser gas. The resonator in this embodiment is constituted by the coupling mirror 2 and the total reflector 1 both explained in embodiment 1. Laser beam 6 is turned back by, for example, two sets of plane mirrors 6701 and 6702 on the side opposite to the coupling mirror 2 and is again returned into the resonator by means of the total reflector 1.

Figure 114:
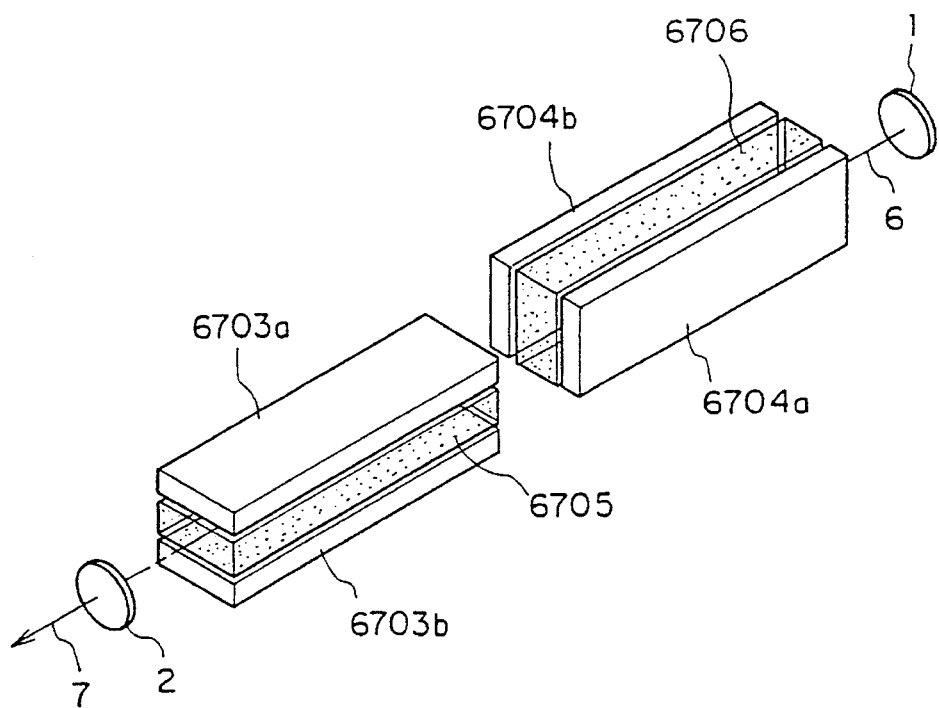
FIG. 114 is an entire view showing embodiment 67 of the invention.

The operation of this embodiment will now be described. The discharge-excited spaces 6705 and 6706, which are created by the excitation of laser gas at discharge electrodes 6703a, 6703b and 6704a, 6704b, are disposed in a 90°-turned state with respect to each other. For example, therefore, the laser beam 6 which has been amplified in the discharge direction of the discharge-excited space 6705 is amplified in the gas flowing direction while passing through the other like space 6706. Thus, the laser beam 6 present within the resonator undergoes an amplifying action in both discharge direction and gas flowing direction in those spaces 6705 and 6706. As a result, laser beam 7 emitted from the coupling mirror 2 is extremely superior in symmetry. FIG. 114 shows an example in which two sets of discharge-excited spaces 6705 and 6706 are connected in series, whereby the same effect as above can be obtained. Further, even when a larger number of such discharge-excited spaces are arranged so as to be different 90° from one another, it is possible to obtain the same effect as above.

Embodiment 68

Figure 115:
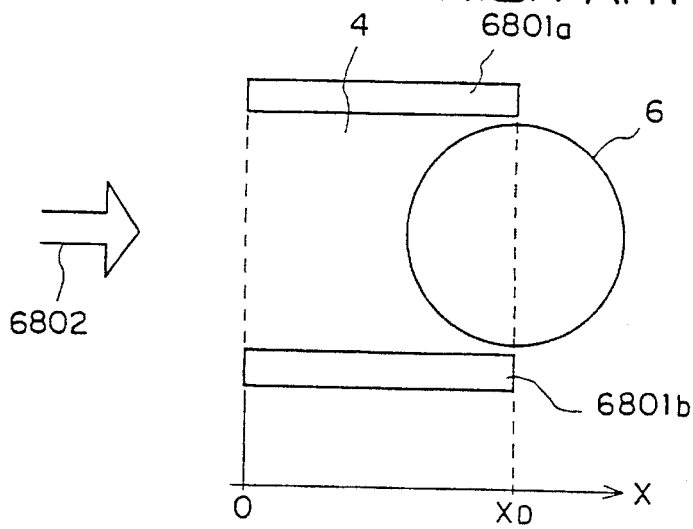
FIG. 115 is a sectional view showing a laser pumping space in a conventional laser system.
Figure 116:
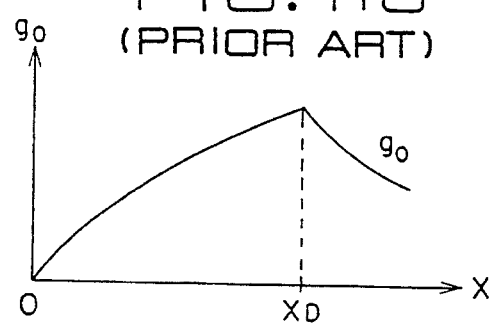

In the case where a resonator according to the present invention is applied to such a three-axis orthogonal type laser as shown in FIG. 115, a discharge-excited space 4 for laser excitation is generally created between discharge electrodes 6801a and 6801b. And for the purpose of ensuring discharge stability and suppressing the rise of gas temperature, a laser gas is flowed at high speed in the direction of arrow 6802 between the discharge electrodes 6801a and 6801b. Consequently, the particles excited by the electric discharge are allowed to flow in the downstream direction together with the gas flow and a maximum gain is obtained at the downstream end of the discharge portion, as shown in FIG. 116, whereby an optical axis of the resonator is set at the gas flow downstream end (X=XD) of the discharge portion. With the optical axis set in this position, there is obtained the highest oscillation efficiency. The energy of the particles excited by the electric discharge is converted to light energy by the resonator, which is extracted as laser beam to the exterior.

Figure 117:
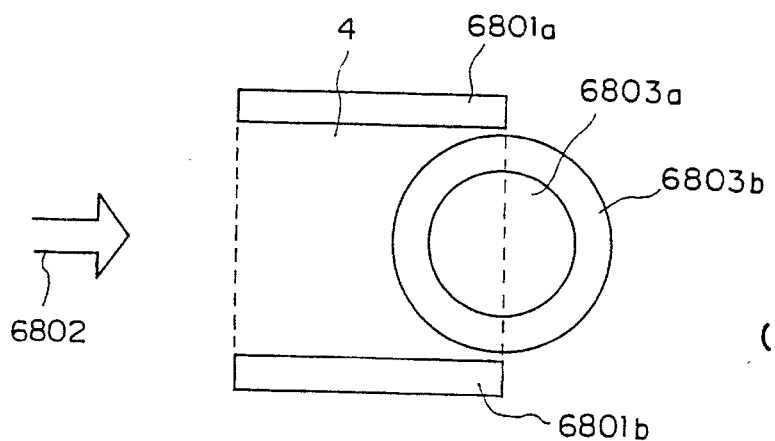
Figure 118:
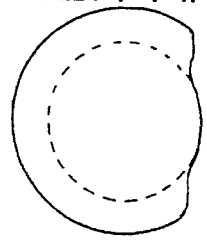

However, it turned out that when the resonator according to the invention is set as in FIG. 117 in the three-axis orthogonal type laser system in which the gas flow and the optical axis are orthogonal to each other, there was obtained such an asymmetric laser beam as shown in FIG. 118. That is, in such three-axis orthogonal type laser system, if the gain is converted to light energy on the gas upstream side, there will no longer be any gain in the gas downstream region outside the discharge space, so that there is outputted a mode in which the gas downstream side is cut out. On the other hand, when the conventional resonator illustrated in FIG. 2 is applied to such three-axis orthogonal type laser system, there is obtained a symmetric beam of true roundness. More particularly, in the conventional resonator, light reciprocates several ten times within the resonator to form a standing wave, so that a mode is formed without being greatly influenced by the distribution of gain and hence there is obtained a laser beam of true roundness.

In the case of the resonator according to the present invention, a central laser beam 6803a is outputted in the form of generally true roundness because it is taken out as a portion of a standing wave, but as to an outer peripheral laser beam portion 6803b, since it is a laser beam portion resulting from amplification of diffraction light during only one reciprocation within the resonator, it is strongly influenced by the distribution of gain and is outputted in a cut-out state of its portion corresponding to the gas downstream region. Thus, the laser system using the resonator according to the invention involves the problem that it is difficult to obtain a symmetric beam of true roundness.

Figure 119:
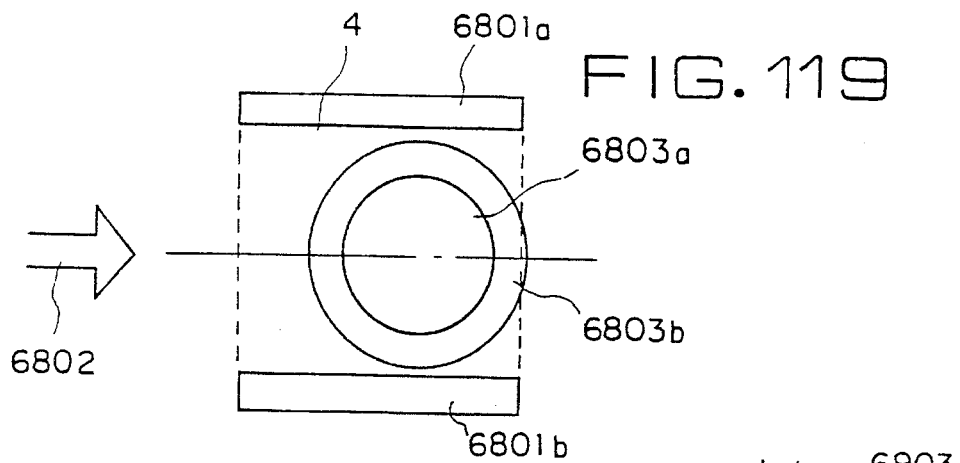

FIG. 119 illustrates an embodiment 68 which is constructed so as to eliminate such problem. In this embodiment 68, the optical axis of a resonator lies within the discharge field unlike FIG. 117, and an outer peripheral portion 6803b of laser beam is set almost equal to the gas downstream end of the discharge portion. According to this construction, almost all discharge energy is converted to a central laser beam portion 6803a, and although the proportion of excited particles which are flowed to the downstream portion is small, there exists a sufficient gain because the downstream portion is directly excited by the electric discharge. Consequently, the laser beam portion 6803b generated by diffraction can be allowed to grow sufficiently and a laser beam of true roundness not cut out in its downstream portion can be taken out.

Embodiment 69

Figure 120:
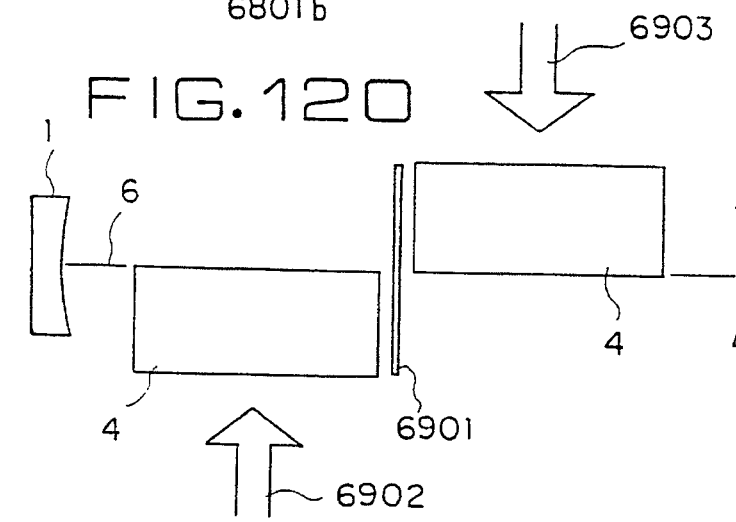

Although in the previous embodiment 68 the optical axis of the resonator is shifted into the discharge-excited space 4 to minimize the change of gain in the gas flowing direction and thereby obtain a laser beam of true roundness, if the gas flowing direction is reversed within the resonator, as shown in FIG. 120, the gain distribution in the gas flowing direction is rendered more uniform and there is obtained a laser beam 7 higher in true roundness. In FIG. 120, the numerals 6902 and 6903 represent arrows indicating gas flowing directions after reversal, and numeral 6901 denotes a gas partition plate having a central hole for the passing of laser beam 6 therethrough.

Embodiment 70

FIG. 121(a) is a side view showing embodiment 70 of the invention and FIG. 121(b) is a sectional view taken on line I—I in FIG. 121(a). In FIG. 121(a), the numerals 7001 and 7002 represent turn-back mirrors provided for constituting a ⊃-shaped resonator. When the optical path is thus turned back in ⊃ shape in the gas flowing direction, laser beam 6 which has experienced an upstream side of gas flow with respect to the beam center is turned back in ⊃ shape and then experiences a downstream side of gas flow, whereby the gain distribution in the gas flowing direction is cancelled completely and there is obtained the same effect as above.

Embodiment 71

FIG. 122 shows an example of a laser processing equipment in which is mounted a laser system incorporating a laser oscillator according to the invention explained above. In the same figure, numeral 7101 denotes a laser oscillator, which comprises a total reflector 1 and a coupling mirror 2. In the oscillator 7101, the mirrors 1, 2 and laser gas are cooled as necessary by cooling water which is fed through cooling water pipes 7102 and 7103. Numeral 7104 denotes a beam transmission system for the transmission of laser beam 7 emitted from the oscillator 7101, the beam transmission system 7104 comprising beam ducts 7105a, 7105b and bend mirrors 7106a, 7106b, 7106c. Numeral 7107 denotes a processing head which comprises a processing lens 7108 for converging the laser beam 7 onto a workpiece 7112 and a nozzle 7110 for blowing assist gas fed from an assist gas pipe 7109 to the workpiece 7112. Numeral 7111 denotes a processing table for moving the workpiece 7112.

According to the laser processing equipment constructed as above, since it is possible to machine the workpiece 7112 with the laser beam 7 which is, for example, large in both diameter and output and is highly converged, it is possible to effect machining at a very high speed or machine a thick plate which has so far been impossible to machine. Further, since the selection of a beam mode can be done by only changing the mirrors 1 and 2 without depending on the beam diameter, it is possible to easily obtain a most suitable beam for various workpieces, including iron, aluminum and non-metals, or for various kinds of machining, including cutting, welding and surface modification.

When viewed from the position of the laser system manufacturer's side, various types of machines can be fabricated by only changing mirrors 1 and 2 and hence mass production is easy, thus permitting a great reduction of cost of the laser system and further the laser processing equipment. Besides, since the laser beam 7 has a large diameter, the beam intensity per unit cross sectional area is low, so the optical components present in the beam transmission system 7104, such as the bend mirrors 7106a, 7106b, 7106c and the processing lens 7108, are little distorted by heat. Thus, despite the large output laser beam, it is possible to converge light stably because of a small distortion of the laser beam 7 in the beam transmission system 7104. There can be attained such outstanding effects.

As set forth above, according to the construction of the laser system in the first aspect of the present invention, since a laser beam mode is selected on the basis of the diameter of the partially reflecting portion provided centrally of the coupling mirror, it is possible to extract a laser beam in $TEM_{00}$ mode or $TEM_{01}^*$ mode of a cross sectional area larger than the laser beam diameter determined by the construction of a stable resonator, which has been impossible in the conventional laser system. Further, a laser beam of several kilowatts or more can be extracted stably without the necessity of considering any measure to be taken for the light-resisting strength of the coupling mirror.

According to the construction of the laser system in the second aspect of the present invention, since it is the same as in the first aspect, it is possible to extract a laser beam in $TEM_{00}$ mode or $TEM_{01}^*$ mode of a large cross sectional area. Further, a laser beam of several kilowatts or more can be extracted stably.

According to the construction of the laser system in the third aspect of the present invention, since the relation of $0<(1-L/R_1)(1-L/R_2)<1$ is satisfied, it is possible to select a concave or convex shape as a curvature shape of the coupling mirror and that of the total reflector both constituting a stable resonator. Thus, the degree of dosing freedom is improved.

According to the construction of the laser system in the fourth aspect of the present invention, since it is constructed so that a total reflector is replaced with a partial reflector having an intensity reflectivity of 99%, the laser beam in the stable resonator can be outputted 1% through the partial reflector. Therefore, by using this laser beam in the measurement of laser output, it is made possible to simplify the output measurement.

According to the construction of the laser system in the fifth aspect of the present invention, since at least one of the coupling mirror and the total reflector disposed oppositely to the coupling mirror is provided with a mirror angle adjusting mechanism, it is possible to correct deviations in the position and direction of the laser beam emitted from the stable resonator. Consequently, it is possible to realize a laser system extremely superior in the beam stability and improve the yield in laser processing.

According to the construction of the laser system in the sixth aspect of the present invention, since a mirror having a curvature changing mechanism is used as the total reflector disposed oppositely to the coupling mirror, it is possible to change the radius of curvature of the total reflector and hence possible to freely select a mode of the laser beam generated in the resonator. As a result, the switching of mode from one to another can be done extremely smoothly. For example, even in a complicated laser processing which is done while changing the mode of laser beam, it is possible to effect the processing extremely stably without interruption of the laser operation.

According to the construction of the laser system in the seventh aspect of the present invention, since the coupling mirror is provided with a phase difference compensating means so that a phase difference between laser beam portions emitted from the partially reflecting portion and the antireflecting portion, respectively, of the coupling mirror to the exterior of the stable resonator is an integer multiple of $2\pi$, such phase difference is compensated and it is possible to improve the laser beam quality. Consequently, in combination with a single mode oscillation of a large cross sectional area and a high output, there arises the possibility of the laser processing being employable in the cutting of ultra-thick plates or steel plate welding which have been impossible in the use of the conventional laser system. Thus, it becomes possible for the laser processing to participate in new or different fields.

According to the construction of the laser system in the eighth aspect of the present invention, since the coupling mirror is provided with a phase difference controlling means for controlling a phase difference between laser beam portions emitted from the partially reflecting portion and the antireflecting portion, respectively, of the coupling mirror to the exterior of the stable resonator, such phase difference is controlled and it is possible to control the laser beam quality. Consequently, in combination with a single mode oscillation of a large cross sectional area and a high output, it is possible to effect a combined laser processing of laser cutting and laser welding or a pulse laser processing using pulses having an extremely high on-axis intensity. Thus, it becomes possible for the laser processing to participate in new or different fields.

According to the construction of the laser system in the ninth aspect of the present invention, since the total reflector is provided with a phase difference compensating means so that a phase difference between laser beam portions emitted from the partially reflecting portion and the antireflecting portion, respectively, of the coupling mirror to the exterior of the stable resonator is an integer multiple of $2\pi$, such phase difference is compensated and it is possible to improve the laser beam quality. As a result, in combination with a single mode oscillation of a large cross sectional area and a high output, there arises the possibility of the laser processing being employable in the cutting of ultra-thick plates or steel plate welding which have been impossible in the use of the conventional laser system. Thus, it becomes possible for the laser processing to participate in new or different fields.

According to the construction of the laser system in the tenth aspect of the present invention, since the total reflector is provided with a phase difference controlling means for controlling a phase difference between laser beam portions emitted from the partially reflecting portion and the antireflecting portion, respectively, of the coupling mirror to the exterior of the stable resonator, such phase difference is controlled and it is possible to control the laser beam quality. Consequently, in combination with a single mode oscillation of a large cross sectional area and a high output, it is possible to effect a combined laser processing of laser cutting and laser welding or a pulse laser processing using pulses having an extremely high on-axis intensity. Thus, it becomes possible for the laser processing to participate in new or different fields.

According to the construction of the laser system in the eleventh aspect of the present invention, since a phase difference compensating means is disposed outside the stable resonator so that a phase difference between laser beam portions emitted from the partially reflecting portion and the antireflecting portion, respectively, of the coupling mirror to the exterior of the resonator is an integer multiple of $2\pi$, such phase difference is compensated and it is possible to improve the laser beam quality. Consequently, in combination with a single mode oscillation of a large cross sectional area and a high outout, there arises the possibility of the laser processing being applicable to the cutting of ultra-thick plates or steel plate welding which have impossible in the use of the conventional laser system. Thus, it becomes possible for the laser processing to participate in new or different fields.

According to the construction of the laser system in the twelfth aspect of the present invention, since a phase difference controlling means for controlling a phase difference between laser beam portions emitted from the partially reflecting portion and the antireflecting portion, respectively, of the coupling mirror to the exterior of the stable resonator is disposed outside the resonator, such phase difference is compensated and it is possible to control the laser beam quality. Consequently, in combination with a single mode oscillation of a large cross sectional area and a high output, it is possible to effect a combined laser processing of laser cutting and laser welding or a pulse laser processing using pulses having an extremely high on-axis intensity, thus permitting participation of the laser processing in new or different fields.

According to the construction of the laser system in the thirteenth aspect of the present invention, since there is formed an aperture for defining a diameter of laser beam in the stable resonator which beam is conducted to at least one of the coupling mirror and the total reflector both constituting the resonator and the diameter of the said aperture is set to a value of not larger than four times the diameter of the partiality reflecting portion of the coupling mirror, it is possible to keep high the quality of the laser beam emitted from the resonator. Further, in a laser processing machine using such laser system according to the invention, it becomes possible to perform operation continuously for a long time, thus permitting reduction of the processing cost and of power consumption.

According to the construction of the laser system in the fourteenth aspect of the present invention, since the coupling mirror is composed of a ring-shaped mirror base and a mirror base engageable with the ring-shaped mirror base, antireflecting films are formed on both sides of the ring-shaped mirror and a partial reflection film is formed on the resonator constituting side of the engageable mirror, while an antireflecting film is formed on the opposite side thereof, it is possible to easily constitute resonators having different partial reflectivities by merely providing several kinds of mirror bases having partial reflection films of different partial reflectivities. Further, a phase difference between the laser beam portion emitted from the ring-shaped mirror base and that from the mirror base engageable therewith can be controlled by adjusting a relative thickness of both mirror bases. As a result, it becomes possible to extract a laser beam in $TEM_{00}$ mode or $TEM_{01}*$ mode of a cross sectional area larger than the laser beam diameter determined by the construction of the stable resonator, which has been impossible in the use of the conventional laser system. Besides, a laser beam of several kilowatts or more can be extracted stably without the necessity of considering a measure to be taken in connection with the light-resisting strength of the coupling mirror.

According to the construction of the laser system in the fifteenth aspect of the present invention, since the partially reflecting portion of the coupling mirror is constituted by plural reflecting films different in intensity reflectivity to change the intensity reflectivity of the partially reflecting portion stepwise, it is possible to enlarge the mode volume of the laser beam generated and hence it is possible to improve the laser output. Consequently, it becomes possible to extract a laser beam in $TEM_{00}$ mode or $TEM_{01}^*$ mode of a cross sectional area larger than the laser beam diameter determined by the construction of the stable resonator, which has been impossible in the use of the conventional laser system. Further, a laser beam of several kilowatts or more can be extracted stably without the necessity of considering a measure to be taken in connection with the light-resisting strength of the coupling mirror.

According to the construction of the laser system in the sixteenth aspect of the present invention, since it is the same as in the fifteenth aspect of the invention, it is possible to extract a laser beam in $TEM_{00}$ mode or $TEM_{01}^*$ mode of a cross sectional area larger than the laser beam diameter determined by the construction of the stable resonator, which has been impossible in the use of the conventional laser system. Further, a laser beam of several kilowatts or more can be extracted stably without the necessity of considering a measure to be taken in connection with the light-resisting strength of the coupling mirror.

According to the construction of the laser system in the seventeenth aspect of the present invention, since a thin metallic film is formed as a partially reflecting portion centrally of the coupling mirror and an antireflecting film is formed around the thin metallic films there is little difference in phase between the laser beam portion passing through the thin metallic film and the laser beam portion passing through the antireflecting film, so it is no longer necessary to use a phase compensating means. As a result, it becomes possible to extract a laser beam in $TEM_{00}$ mode or $TEM_{01}^*$ mode of a cross sectional area larger than the laser beam diameter determined by the construction of the stable resonator, which has been impossible in the use of the conventional laser system. Further, a laser beam of several kilowatts or more can be extracted stably without the necessity of considering a measure to be taken in connection with the light-resisting strength of the coupling mirror.

According to the construction of the laser system in the eighteenth aspect of the present invention, since the partially reflecting portion of the coupling mirror is constituted by a concentric, ring-shaped partial reflection film, it is possible to generate a low-order multi-mode of a large cross sectional area. Consequently, it is possible to extract a laser beam in a low-order multi-mode of a cross sectional area larger than the laser beam diameter determined by the resonator construction, which has been impossible in the use of the conventional laser system.

According to the construction of the laser system in the nineteenth aspect of the present invention, since the partially reflecting portion of the coupling mirror is constituted by a plurality of concentric, ring-shaped reflecting films, it is possible to generate a low-order multi-mode of a large cross sectional area within the stable resonator. Consequently, it is possible to obtain a laser beam in a low-order multi-mode of a cross sectional area larger than the laser beam diameter determined by the resonator construction, which has been impossible in the use of the conventional laser system.

According to the construction of the laser system in the twentieth aspect of the present invention, since the stable resonator is constituted using a coupling mirror of a large diameter, it is possible to obtain a laser beam in a low-order multi-mode of a large cross sectional area.

According to the construction of the laser system in the twenty-first aspect of the present invention, since the boundary surface between the partially reflecting portion and the antireflecting portion both formed on the resonator constituting side of the coupling mirror is formed inclinedly or curvilinearly relative to the coupling mirror axis, it is possible to enlarge the mode volume of the laser beam generated and hence possible to improve the laser output. As a result, it becomes possible to obtain a laser beam in $TEM_{00}$ mode or $TEM_{01}^*$ mode of a cross sectional area larger than the laser beam diameter determined by the construction of the stable resonator, which has been impossible in the use of the conventional laser system. Further, a laser beam of several kilowatts or more can be obtained stably without the necessity of considering a measure to be taken in view of the light-resisting strength of the coupling mirror.

According to the construction of the laser system in the twenty-second aspect of the present invention, since the outer peripheral part of the partially reflecting portion on the resonator constituting side of the coupling mirror is formed in a geometric shape other than a circle, it is possible to enlarge the mode volume of the laser beam generated and hence possible to improve the laser output. Consequently, it becomes possible to obtain a laser beam in $TEM_{00}$ mode or $TEM_{01}^*$ mode of a cross sectional area larger than the laser beam diameter determined by the construction of the stable resonator, which has been impossible in the use of the conventional laser system. Further, a laser beam of several kilowatts or more can be obtained stably without the necessity of considering a measure to be taken in view of the light-resisting strength of the coupling mirror.

According to the construction of the laser system in the twenty-third aspect of the present invention, since the intensity reflectivity of the antireflecting portion formed on the outer periphery of the coupling mirror is set within 5%, it is possible to keep good the quality of the laser beam emitted from the stable resonator. As use a result, it becomes possible to obtain a laser beam in $TEM_{00}$ mode or $TEM_{01}^*$ mode of a cross sectional area larger than the laser beam diameter determined by the resonator construction, which has been impossible in the use of the conventional laser system. Further, a laser beam of several kilowatts or more can be obtained stably without the necessity of considering what measure is to be taken in view of the light-resisting strength of the coupling mirror.

According to the construction of the laser system in the twenty-fourth aspect of the present invention, since the coupling mirror is formed in such a manner that the radius of curvature of its resonator constituting side and that of the opposite side are different from each other, it becomes possible for the coupling mirror to also have the function of lens and it is possible to freely set a radius of curvature of the laser beam emitted from the coupling mirror. As a result, it becomes possible to change the diameter of the laser beam at the time of convergence thereof and a complicated laser processing dependent on the beam intensity can be performed easily.

According to the construction of the laser system in the twenty-fifth aspect of the present invention, since a laser beam mode is selected on the basis of the diameter of the total reflector and that of the partially reflecting portion of the coupling mirror, it is possible to obtain a laser beam in $TEM_{00}$ mode or $TEM_{01}*$ mode of a cross sectional area larger than the laser beam diameter determined by the construction of the stable resonator, which has been impossible in the use of the conventional laser system. Further, a laser beam of several kilowatts or more can be obtained stably without the necessity of considering what measure should be taken in connection with the light-resisting strength of the coupling mirror.

According to the construction of the laser system in the twenty-sixth aspect of the present invention, since it is the same as in the twenty-fifth aspect of the invention, a laser beam can be obtained in $TEM_{00}$ mode or $TEM_{01}*$ mode of a cross sectional area larger than the laser beam diameter determined by the construction of the stable resonator, which has been impossible in the use of the conventional laser system. Further, it is possible to obtain a laser beam of several kilowatts or more stably without the necessity of considering what measure should be taken in view of the light-resisting strength of the coupling mirror.

According to the construction of the laser system in the twenty-seventh aspect of the present invention, since the totally reflecting portion disposed centrally of the reflecting mirror selects a laser beam mode, it is possible to obtain a laser beam in $TEM_{00}$ mode or $TEM_{01}*$ mode of a cross sectional area larger than the laser beam diameter determined by the construction of the stable resonator, which has been impossible in the use of the conventional laser system. Further, a laser beam of several kilowatts or more can be obtained stably without the necessity of considering what measure should be taken in view of the light-resisting strength of the coupling mirror.

According to the construction of the laser system in the twenty-eighth aspect of the present invention, since it is the same as in the twenty-seventh aspect of the invention, a laser beam can be obtained in $TEM_{00}$ mode or $TEM_{01}*$ mode of a cross sectional area larger than the laser beam diameter determined by the construction of the stable resonator, which has been impossible in the use of the conventional laser system. Further, it is possible to obtain a laser beam of several kilowatts or more stably without the necessity of considering the light-resisting strength of the coupling mirror.

According to the construction of the laser system in the twenty-ninth aspect of the present invention, since at least one of the reflecting mirror and the coupling mirror is provided with a mirror angle adjusting mechanism, it is possible to correct deviations in the position and direction of the laser beam emitted from the stable resonator. Consequently, it is possible to realize a laser system extremely superior in the stability of laser beam and hence possible to improve the yield in laser processing.

According to the construction of the laser system in the thirtieth aspect of the present invention, since the reflecting mirror is provided with a phase difference compensating means so that a phase difference between the laser beam portions reflected by the totally reflecting portion and the partially reflecting portion, respectively, of the reflecting mirror is an integer multiple of $2\pi$, the phase difference between the laser beam portions emitted to the exterior of the stable resonator is compensated, so it is possible to improve the laser beam quality. Consequently, in combination with a single mode oscillation of a large cross sectional area and a high output, there arises the possibility of the laser processing being employable in the cutting of ultra-thick plates or steel plate welding which have been impossible in the use of the conventional laser system. Thus, it becomes possible for the laser to participate in new or different fields.

According to the construction of the laser system in the thirty-first aspect of the present invention, since the reflecting mirror is provided with a phase difference controlling means for controlling a phase difference between the laser beam portions reflected by the totally reflecting portion and the partially reflecting portion, respectively, of the reflecting mirror, the phase difference between the laser beam portions emitted to the exterior of the stable resonator is controlled, thus permitting control of the laser beam quality. Consequently, in combination with a single mode oscillation of a large cross sectional area and a high output, it is possible to effect a combined laser processing of laser cutting and laser welding or a pulse laser processing using pulses having an extremely high on-axis intensity.

According to the construction of the laser system in the thirty-second aspect of the present invention, the coupling mirror is provided with a phase difference compensating means so that a phase difference between the laser beam portions reflected by the totally reflecting portion and the partially reflecting portion, respectively, of the reflecting mirror is an integer multiple of $2\pi$, the phase difference between the laser beam portions emitted to the exterior of the stable resonator is compensated and therefore it is possible to improve the laser beam quality. Consequently, in combination with a single mode oscillation of a large cross sectional area and a high output, there arises the possibility of the laser processing being employable in the cutting of ultra-thick plates or steel plate welding which have been impossible in the use of the conventional laser system. Thus, it becomes possible for the laser processing to participate in new or different fields.

According to the construction of the laser system in the thirty-third aspect of the present invention, since the coupling mirror is provided with a phase difference controlling means for controlling a phase difference between the laser beam portions reflected by the totally reflecting portion and the partially reflecting portion, respectively, of the reflecting mirror, the phase difference between the laser beam portions emitted to the exterior of the stable resonator is controlled and therefore it is possible to control the laser beam quality. Consequently, in combination with a single mode oscillation of a large cross sectional area and a high output, it is possible to effect a combined laser processing of laser cutting and laser welding or a pulse laser processing using pulses having an extremely high on-axis intensity. Thus, it becomes possible for the laser processing to participate in new or different fields.

According to the construction of the laser system in the thirty-fourth aspect of the present invention, since a phase difference compensating means is disposed outside the stable resonator so that a phase difference between the laser beam portions reflected by the totally reflecting portion and the partially reflecting portion, respectively, of the reflecting mirror is an integer multiple of $2\pi$, the phase difference between the laser beam portions emitted to the exterior of the resonator is compensated and hence it is possible to improve the laser beam quality. Consequently, in combination with a single mode oscillation of a large cross sectional area and a high output, there arises the possibility of the laser processing being employable in the cutting of ultra-thick plates or steel plate welding which have been impossible in the use of the conventional laser system. Thus, the entry of the laser processing into new or different fields can be made.

According to the construction of the laser system in the thirty-fifth aspect of the present invention, since a phase difference controlling means for controlling a phase difference between the laser beam portions reflected by the totally reflecting portion and the partially reflecting portion, respectively, of the reflecting mirror is disposed outside the stable resonator, the phase difference between the laser beam portions emitted to the exterior of the resonator is controlled and hence it is possible to control the laser beam quality. Consequently, in combination with a single mode oscillation of a large cross sectional area and a high output, it is possible to effect a combined laser processing of laser cutting and laser welding or a pulse laser processing using pulses of an extremely high on-axis intensity. Thus, the entry of the laser processing into new or different fields can be made.

According to the construction of the laser system in the thirty-sixth aspect of the present invention, there is formed an aperture for defining the diameter of the laser beam in the stable resonator which beam is conducted to at least one of the coupling mirror and the reflecting mirror both constituting the resonator, and the diameter of the aperture is restricted to a value of not larger than four times the diameter of the totally reflecting portion of the reflecting mirror, so it is possible to keep high the quality of the laser beam emitted from the resonator. Further, it becomes possible to perform a continuous long-time operation of a laser processing machine using the laser system of the invention, whereby the reduction of the processing cost and that of power consumption can be attained.

According to the construction of the laser system in the thirty-seventh aspect of the present invention, a coupling mirror and a partial reflector both constituting a stable resonator are disposed in an opposed relation to each other and a total reflector is disposed behind the partial reflector, and a laser beam mode is selected on the basis of a totally reflecting portion provided in the total reflector. Therefore, it is possible to obtain a laser beam in $TEM_{00}$ mode or $TEM_{01}*$ mode of a cross sectional area larger than the laser beam diameter determined by the construction of the stable resonator, which has been impossible in the use of the conventional laser system. Further, a laser beam of several kilowatts or more can be obtained stably without the necessity of considering what measure should be taken in view of the light-resisting strength of the coupling mirror.

According to the construction of the laser system in the thirty-eighth aspect of the present invention, since it is the same as in the thirty-seventh aspect of the invention, it becomes possible to obtain a laser beam in $TEM_{00}$ mode or $TEM_{01}*$ mode of a cross sectional area larger than the laser beam diameter determined by the construction of the stable resonator. Further, a laser beam of several kilowatts or more can be obtained stably without the need of considering a measure to be taken in view of the light-resisting strength of the coupling mirror.

According to the construction of the laser system in the thirty-ninth aspect of the present invention, since at least one of the total reflector and the coupling mirror is provided with a mirror angle adjusting mechanism, it is possible to correct deviations in the position and direction of the laser beam emitted from the stable resonator. Consequently, a laser system extremely superior in the stability of beam can be realized and it is possible to improve the yield in laser processing.

According to the construction of the laser system in the fortieth aspect of the present invention, since the partial reflector is provided with a phase difference compensating means so that a phase difference between the laser beam portions reflected respectively by the partial reflector and the total reflector disposed behind the phase partial reflector is an integer multiple of $2\pi$, the phase difference between the laser beam portions emitted to the exterior of the stable resonator is compensated, and hence it is possible to improve the laser beam quality. Consequently, in combination with a single mode oscillation of a large cross sectional area and a high output, there arises the possibility of the laser processing being employable in the cutting of ultra-thick plates or steel plate welding which have been impossible in the use of the conventional laser system, thus permitting entry of the laser processing into new or different fields.

According to the construction of the laser system in the forty-first aspect of the present invention, since the partial reflector is provided with a phase difference controlling means for controlling a phase difference between the laser beam portions reflected respectively by the partial reflector and the total reflector disposed behind the partial reflector, the phase difference between the laser beam portions emitted to the exterior of the stable resonator is controlled and so it is possible to control the laser beam quality. Consequently, in combination with a single mode oscillation of a large cross sectional area and a high output, it is possible to effect a combined laser processing of laser cutting and laser welding or a pulse laser processing using pulses of an extremely high on-axis intensity, thus permitting entry of the laser processing into new or different fields.

According to the construction of the laser system in the forty-second aspect of the present invention, since the coupling mirror is provided with a phase difference compensating means so that a phase difference between the laser beam portions reflected respectively by the partial reflector and the total reflector disposed behind the partial reflector is an integer multiple of $2\pi$, the phase difference between the laser beam portions emitted to the exterior of the stable resonator is compensated and hence it is possible to improve the laser beam quality. Consequently, in combination with a single mode oscillation of a large cross sectional area and a high output, there arises the possibility of the laser processing being employable in the cutting of ultra-thick plates or steel plate welding which have been impossible in the use of the conventional laser system, thus permitting entry of the laser processing into new or different fields.

According to the construction of the laser system in the forty-third aspect of the present invention, in order to control the laser beam quality, the coupling mirror is provided with a phase difference controlling means for controlling a phase difference between the laser beam portions reflected respectively by the partial reflector and the total reflector disposed behind the partial reflector, so that the phase difference between the laser beam portions emitted to the exterior of the stable resonator is controlled, thereby permitting control of the laser beam quality. Consequently, in combination with a single mode oscillation of a large cross sectional area and a high output, it is possible to effect a combined laser processing of laser cutting and laser welding or a pulse laser processing using pulses of an extremely high on-axis intensity, thus permitting entry of the laser processing into new or different fields.

According to the construction of the laser system in the forty-fourth aspect of the present invention, since a phase difference compensating means is disposed outside the stable resonator so that a phase difference between the laser portions reflected respectively by the partial reflector and the total reflector disposed behind the partial reflector is an integer multiple of $2\pi$, the phase difference between the laser beam portions emitted to the exterior of the resonator is compensated and therefore it is possible to improve the laser beam quality.

According to the construction of the laser beam system in the forty-fifth aspect of the present invention, since a phase difference controlling means for controlling a phase difference between the laser beam portions reflected respectively by the partial reflector and the total reflector disposed behind the partial reflector is provided outside the stable resonator, the phase difference between the laser beam portions emitted to the exterior of the resonator is controlled and so it is possible to control the laser beam quality. Consequently, in combination with a single mode oscillation of a large cross sectional area and a high output, there is the possibility of the laser processing being employable in the cutting of ultra-thick plates or steel plate welding which have been impossible in the use of the conventional laser system, thus permitting entry of the laser processing into new or different fields.

According to the construction of the laser system in the forty-sixth aspect of the present invention, there is formed an aperture for defining the diameter of the laser beam in the stable resonator which beam is conducted to at least one of the partial reflector and the coupling mirror both constituting the resonator, and the diameter of the aperture is set to a value of not larger than four times the diameter of the total reflector, so it is possible to maintain the high quality of the laser beam emitted from the resonator. Further, it becomes possible to perform a continuous long-time operation of a laser processing machine using the laser system of the invention, thereby permitting reduction of the processing cost and that of power consumption.

According to the construction of the laser system in the forty-seventh aspect of the present invention, since a ring-shaped mirror selects a laser beam mode on the basis of its inside diameter, it is possible to obtain a laser beam in $TEM_{00}$ mode or $TEM_{01}*$ mode of a cross sectional area larger than the laser beam diameter determined by the construction of the stable resonator.

According to the construction of the laser system in the forty-eighth aspect of the present invention, since it is the same as in the forty-seventh aspect of the invention, it is possible to obtain a laser beam in $TEM_{00}$ mode or $TEM_{01}*$ mode of a cross sectional area larger than the laser beam diameter determined by the construction of the stable resonator, which has been impossible in the use of the conventional laser system.

According to the construction of the laser system in the forty-ninth aspect of the present invention, since at least one of the partial reflector and the other mirror which constitutes the stable resonator conjointly with the partial reflector is provided with a mirror angle adjusting mechanism, it is possible to correct deviations in the position and direction of the laser beam emitted from the resonator, so that a laser system extremely superior in the stability of beam can be realized and it is possible to improve the yield in laser processing.

According to the construction of the laser system in the fiftieth aspect of the present invention, since a mirror having a curvature changing mechanism is used as the other mirror which constitutes the resonator together with the partial reflector, it is possible to change the radius of curvature of the mirror and hence possible to freely select a mode of the laser beam generated in the resonator. As a result, the switching of modes from one to another can be done extremely smoothly. For example, even a complicated laser processing which is conducted while changing the laser beam mode, can be done extremely stably without interruption of the laser processing operation.

According to the construction of the laser system in the fifty-first aspect of the present invention, there is formed an aperture for defining the diameter of the laser beam in the stable resonator which beam is conducted to at least one of the partial reflector and the other mirror both constituting the stable resonator, and the diameter of the aperture is set to a value of not larger than four times the inside diameter of a ring-shaped mirror, so it is possible to maintain the high quality of the laser beam emitted from the resonator. Further, it is possible to effect a continuous long-time operation of a laser processing machine using the laser system of the invention, thus permitting reduction of the processing cost and that of power consumption.

According to the construction of the laser system in the fifty-second aspect of the present invention, since a laser beam mode is selected by the central part of the partial reflector, it is possible to obtain a laser beam in $TEM_{00}$ mode or $TEM_{01}*$ mode of a cross sectional area larger than the laser beam diameter determined by the construction of the stable resonator, which has been impossible in the use of the conventional laser system.

According to the construction of the laser system in the fifty-third aspect of the present invention, since a laser beam mode is selected by the central part of the total reflector, it is possible to obtain a laser beam in $TEM_{00}$ mode or $TEM_{01}*$ mode of a cross sectional area larger than the laser beam diameter determined by the construction of the stable resonator, though this has been impossible in the use of the conventional laser system.

According to the construction of the laser system in the fifty-fourth aspect of the present invention, since a laser beam mode is selected by both the central part of the partial reflector and that of the total reflector, it is possible to obtain a laser beam in $TEM_{00}$ mode or $TEM_{01}*$ mode of a cross sectional area larger than the laser beam diameter determined by the construction of the stable resonator, though this has been impossible in the use of the conventional laser system.

According to the construction of the laser system in the fifty-fifth aspect of the present invention, since at least one of the mirrors which constitute the stable resonator is provided with a mirror angle adjusting mechanism, it is possible to correct deviations in the position and direction of the laser beam emitted from the resonator, so that a laser system extremely superior in the stability of beam can be realized and it is possible to improve the yield in laser processing.

According to the construction of the laser system in the fifty-sixth aspect of the present invention, there is formed an aperture for defining the diameter of the laser beam in the stable resonator which beam is conducted to at least one of the mirrors which constitute the stable resonator, and the diameter of the aperture is set to a value of not larger than four times the diameter of the central part of the mirror located near the aperture, so it is possible to maintain the high quality of the laser beam emitted from the resonator. Further, it becomes possible to perform a continuous long-time operation of a laser processing machine using the laser system of the invention, thus permitting reduction of the processing cost and that of power consumption.

According to the construction of the laser system in the fifty-seventh aspect of the present invention, the stable resonator included in the laser system of the invention is used as a laser beam generating stage, and there also is provided a laser beam amplifying stage for amplifying the laser beam emitted from the laser beam generating stage, so that the laser beam conducted into the laser beam amplifying stage is amplified by a laser medium present in the amplifying stage, thereby affording a large output laser beam. The energy of the laser beam which is large in cross sectional area and extremely good in quality can be extracted highly efficiently from the laser medium in the amplifying stage. When it is converged using a lens, there is obtained a highly converged laser beam. For example, therefore, if this converged laser beam is conducted to a cell with a solution for dye laser sealed therein, the dye will be excited efficiently, or if it is directed to a workpiece for laser processing, it is possible to effect laser processing efficiently.

According to the construction in the fifty-eighth aspect of the present invention, since a plurality of laser beam amplifying stages are provided, the laser beam which has been conducted into those amplifying stages is amplified by the laser medium therein and becomes a large output laser beam. The energy of such laser beam, which is large in cross sectional area and extremely good in quality, can be extracted from the laser medium in the amplifying stages, and when it is converged using a lens, there is obtained a highly converged laser beam. If this converged laser beam is conducted to a cell with a dye solution for dye laser sealed therein, the dye will be excited efficiently, or if it is applied to a workpiece for laser processing, it is possible to effect laser processing efficiently.

According to the construction of the laser system in the fifty-ninth aspect of the present invention, in a discharge-excited gas laser system including the laser system of the invention, a surface having a predetermined inclination angle of the coupling mirror which constitutes a stable resonator, the surface being formed on the side opposite to the resonator constituting side of the coupling mirror, and sections of discharge electrodes disposed opposedly to each other in the resonator, are present in different planes, so it is possible to keep high the quality of the laser beam emitted from the resonator. Further, it becomes possible to perform a continuous long-time operation of a laser processing machine using the laser system of the invention, thereby permitting-reduction of the processing cost and that of power consumption.

According to the construction of the laser system in the sixtieth aspect of the present invention, in a discharge-excited gas laser system including the laser system of the invention, two or more sets of discharge electrodes are disposed within the laser system in such a manner that one set of discharge electrodes are in a 90°-turned position with respect to another set of discharge electrodes, so the laser beam emitted from the stable resonator has an extremely good symmetry. Further, it becomes possible to perform a continuous long-time operation of a laser processing machine using the laser system of the invention, thereby permitting reduction of the processing cost and that of power.

According to the construction of the laser system in the sixty-first aspect of the present invention, the laser system is used in a gas laser system wherein the gas flowing direction and the optical axis of the stable resonator are orthogonal to each other, so that the laser beam emitted from the resonator has an extremely good symmetry. Further, it becomes possible to conduct a continuous long-time operation of an energy processing machine using the laser system of the invention and hence possible to reduce the manufacturing cost and power consumption.

According to the construction of the laser system in the sixty-second aspect of the present invention, since the gas downstream end in the discharge-excited portion and the laser beam downstream end are made approximately coincident with each other, there is obtained a highly symmetric laser beam from the stable resonator. Further, it becomes possible for a laser processing machine using the laser system of the invention to be operated continuously for a long time and therefore the processing cost and power consumption can be reduced.

According to the construction of the laser system in the sixty-third aspect of the present invention, since the gas flow in the stable resonator is reversed, there is obtained a highly symmetric laser beam from the resonator. Further, it becomes possible for a laser processing machine using the laser system of the invention to be operated continuously for a long time and therefore the processing cost and power consumption can be reduced.

According to the construction of the laser system in the sixty-fourth aspect of the present invention, since the laser beam is turned back in ⊃ shape in the gas flowing direction, the laser beam emitted from the stable resonator is extremely good in symmetry. Further, it becomes possible for a laser processing machine using the laser system of the invention to be operated continuously for a long time and therefore the processing cost and power consumption can be reduced.

According to the construction of the laser system in the sixty-fifth aspect of the present invention, the laser beam generated from the laser system is transmitted and directed to a workpiece. Consequently, the workpiece can be processed with a large output laser beam of a large diameter superior in converging property, thus permitting a very high-speed processing. Or it becomes possible to process thick plates which have so far been incapable of being processed. Further, since the selection of a beam mode can be done easily without depending on the beam diameter, a mere change of mirror can afford a most suitable beam according to various workpieces, including iron, aluminum and non-metal workpieces and also according to the type of processing such as cutting, welding or surface modification. Moreover, by merely using different mirrors, various types of systems can be constituted and thus mass production is easy, thus permitting great reduction of the cost of the laser system and that of a laser processing machine using the laser system. Further, since the laser beam is of a large diameter and hence the beam intensity per unit cross sectional area is low, optical components in the beam transmission system, such as bend mirror and processing lens, are little distorted by heat and thus the laser beam in the beam transmission system is little distorted even though it is a large output beam, so can be converged stably.

According to the construction of the laser system in the sixty-sixth aspect of the present invention, since the laser system is used in a gas laser system, the laser beam in the resonator can be emitted from the coupling mirror in an amplified state by a discharge-excited laser gas.

According to the construction of the laser system in the sixty-seventh aspect of the present invention, since the laser system is used in $CO_2$ laser system, the laser beam in the resonator can be emitted from the coupling mirror in an amplified state by a discharge-excited laser gas.

According to the construction of the laser system in the sixty-eighth aspect of the present invention, since the laser system is used in a metal vapor laser system, a laser beam in $TEM_{00}$ mode of a large cross sectional area can be obtained by selecting an appropriate diameter of the partially reflecting portion of the coupling mirror.

According to the construction of the laser system in the sixty-ninth aspect of the present invention, since the laser system is used in a solid-state laser system, the laser beam in the resonator can be emitted from the coupling mirror in an amplified state by an optically pumped laser medium.

According to the construction of the laser system in the seventieth aspect of the present invention, since at least one of a Q-switch element and a wavelength changing element is disposed within the resonator used in the solid-state laser system, there can be obtained a laser beam of a large peak output and it is possible to realize an efficient wavelength change.

According to the construction of the laser system in the seventy-first aspect of the present invention, since the laser system is used in a semiconductor laser system, a laser beam in a single $TEM_{00}$ mode of a large cross sectional area can be obtained by selecting an appropriate diameter of the partially reflecting portion of the coupling mirror.

What is claimed is:

1. A laser system comprising:
   a reflecting mirror having a totally reflecting portion located centrally and a partially reflecting portion located around said totally reflecting portion;
   a coupling mirror disposed in an opposed relation to said reflecting mirror and comprising a partially reflecting portion;
   mean, separate from said coupling mirror and said reflecting mirror, for dividing external diameter of a laser beam; and
   a laser medium provided within a stable resonator which comprises said coupling mirror and said reflecting mirror, said laser medium amplifying a laser beam reflected by said reflecting mirror and said coupling mirror until emission of the beam from the coupling mirror.

2. A laser system according to claim 1, wherein at least one of said reflecting mirror and said coupling mirror is provided with a mirror angle adjusting mechanism.

3. A laser system according to claim 1, wherein said reflecting mirror is provided with a phase difference compensating means so that a phase difference between the laser beam portions reflected by the totally reflecting portion and the partially reflecting portion, respectively, of the reflecting mirror is an integer multiple of $2\pi$.

4. A laser system according to claim 1, wherein said reflecting mirror is provided with a phase difference controlling means for controlling a phase difference between the laser beam portions reflected by the totally reflecting portion and the partially reflecting portion, respectively, of the reflecting mirror.

5. A laser system according to claim 1, wherein said coupling mirror is provided with a phase difference compensating means so that a phase difference between the laser beam portions reflected by the totally reflecting portion and the partially reflecting portion, respectively, of said reflecting mirror is an integer multiple of $2\pi$.

6. A laser system according to claim 1, wherein said coupling mirror is provided with a phase difference controlling means for controlling a phase difference between the laser beam portions reflected by the totally reflecting portion and the partially reflecting portion, respectively, of said reflecting mirror.

7. A laser system according to claim 1, wherein a phase difference compensating means is disposed outside said stable resonator so that a phase difference between the laser beam portions reflected by the totally reflecting portion and the partially reflecting portion, respectively, of said reflecting mirror is an integer multiple of $2\pi$.

8. A laser system according to claim 1, wherein a phase difference controlling means for controlling a phase difference between the laser beam portions reflected by the totally reflecting portion and the partially reflecting portion, respectively, of said reflecting mirror is disposed outside said stable resonator.

9. A laser system according to claim 1, including an aperture for defining a diameter of the laser beam in said stable resonator which beam is conducted to at least one of said coupling mirror and said reflecting mirror both constituting the resonator, said aperture having a diameter set to a value of not larger than four times the diameter of the totally reflecting portion of the reflecting mirror.

10. A laser system according to claim 1, wherein said stable resonator is used as a laser beam generating stage and there also is used a laser beam amplifying stage for amplifying the laser beam generated from said laser beam generating stage, to constitute a multi-stage amplifying laser system.

11. A laser system according to claim 1, wherein the surface of said coupling mirror on the side opposite to the resonator constituting side thereof is inclined at a predetermined angle, and discharge electrodes are disposed opposedly to each other within said stable resonator in such a manner that a discharge direction of the discharge electrodes is different from the direction in which said inclination angle of the coupling mirror is present, to constitute a discharge-excited gas laser system.

12. A laser system according to claim 1, wherein at least two sets of discharge electrodes are disposed within said stable resonator so as to be in 90°-turned positions with respect to each other, to constitute a discharge-excited gas laser system.

13. A laser system according to claim 1, used as a constituent member of a laser processing equipment wherein the laser beam emitted from said coupling mirror is transmitted and applied to a workpiece.

14. A laser system according to claim 1, wherein said stable resonator is used to constitute a discharge-excited gas laser system.

15. A laser system according to claim 1, wherein said stable resonator is used to constitute a discharge-excited $CO_2$ laser system.

16. A laser system according to claim 1, wherein said stable resonator is used to constitute a metal vapor laser system.

17. A laser system according to claim 1, wherein said stable resonator is used to constitute a solid-state laser system.

18. A laser system according to claim 17, wherein at least one of a Q-switch element and a wavelength changing element is provided within said stable resonator.

19. A laser system according to claim 1, wherein said stable resonator is used to constitute a semiconductor laser system.

20. A laser system comprising:
    a reflecting mirror having a totally reflecting portion located centrally and a partially reflecting portion located around said totally reflecting portion;
    a coupling mirror disposed in an opposed relation to said reflecting mirror and comprising a partially reflecting portion;
    means, separate from said coupling mirror and said reflecting mirror, for dividing external diameter of a laser beam; and
    a laser medium provided within a stable resonator which comprises said coupling mirror and said reflecting mirror, said laser medium amplifying a laser beam reflected by said reflecting mirror and said coupling mirror until emission of the beam from the coupling mirror,
    wherein a mode of the laser beam in said stable resonator is selected on the basis of the diameter of said totally reflecting portion of said reflecting mirror.

21. A laser system according to claim 20, wherein at least one of said reflecting mirror and said coupling mirror is provided with a mirror angle adjusting mechanism.

22. A laser system according to claim 20, wherein said reflecting mirror is provided with a phase difference compensating means so that a phase difference between the laser beam portions reflected by the totally reflecting portion and the partially reflecting portion, respectively, of the reflecting mirror is an integer multiple of $2\pi$.

23. A laser system according to claim 20, wherein said reflecting mirror is provided with a phase difference controlling means for controlling a phase difference between the laser beam portions reflected by the totally reflecting portion and the partially reflecting portion, respectively, of the reflecting mirror.

24. A laser system according to claim 20, wherein said coupling mirror is provided with a phase difference compensating means so that a phase difference between the laser beam portions reflected by the totally reflecting portion and the partially reflecting portion, respectively, of said reflecting mirror is an integer multiple of $2\pi$.

25. A laser system according to claim 20, wherein said coupling mirror is provided with a phase difference controlling means for controlling a phase difference between the laser beam portions reflected by the totally reflecting portion and the partially reflecting portion, respectively, of said reflecting mirror.

26. A laser system according to claim 20, wherein a phase difference compensating means is disposed outside said stable resonator so that a phase difference between the laser beam portions reflected by the totally reflecting portion and the partially reflecting portion, respectively, of said reflecting mirror is an integer multiple of $2\pi$.

27. A laser system according to claim 20, wherein a phase difference controlling means for controlling a phase difference between the laser beam portions reflected by the totally reflecting portion and the partially reflecting portion, respectively, of said reflecting mirror is disposed outside said stable resonator.

28. A laser system according to claim 20, including an aperture for defining a diameter of the laser beam in said stable resonator which beam is conducted to at least one of said coupling mirror and said reflecting mirror both constituting the resonator, said aperture having a diameter set to a value of not larger than four times the diameter of the totally reflecting portion of the reflecting mirror.

29. A laser system according to claim 20, wherein said stable resonator is used as a laser beam generating stage and there also is used a laser beam amplifying stage for amplifying the laser beam generated from said laser beam generating stage, to constitute a multi-stage amplifying laser system.

30. A laser system according to claim 20, wherein the surface of said coupling mirror on the side opposite to the resonator constituting side thereof is inclined at a predetermined angle, and discharge electrodes are disposed opposedly to each other within said stable resonator in such a manner that a discharge direction of the discharge electrodes is different from the direction in which said inclination angle of the coupling mirror is present, to constitute a discharge-excited gas laser system.

31. A laser system according to claim 20, wherein at least two sets of discharge electrodes are disposed within said stable resonator so as to be in 90°-turned positions with respect to each other, to constitute a discharge-excited gas laser system.

32. A laser system according to claim 20, used as a constituent member of a laser processing equipment wherein the laser beam emitted from said coupling mirror is transmitted and applied to a workpiece.

33. A laser system according to claim 20, wherein said stable resonator is used to constitute a discharge-excited gas laser system.

34. A laser system according to claim 20, wherein said stable resonator is used to constitute a discharge-excited $CO_2$ laser system.

35. A laser system according to claim 20, wherein said stable resonator is used to constitute a metal vapor laser system.

36. A laser system according to claim 20, wherein said stable resonator is used to constitute a solid-state laser system.

37. A laser system according to claim 36, wherein at least one of a Q-switch element and a wavelength changing element is provided within said stable resonator.

38. A laser system according to claim 20, wherein said stable resonator is used to constitute a semiconductor laser system.

\* \* \* \* \*